US012626550B2

(12) United States Patent
Ansel et al.

(10) Patent No.: US 12,626,550 B2
(45) Date of Patent: May 12, 2026

(54) SYSTEM AND METHOD FOR IMPOSING AND ENFORCING CONDITIONS UPON THE CIRCUMSTANCES UNDER WHICH AN UNLOCK COMMAND MAY BE SENT AND HONORED BY A LOCKING DEVICE

(71) Applicant: AMARILLO TECHNOLOGIES INC, Amarillo, TX (US)

(72) Inventors: Jeffrey Joseph Ansel, Amarillo, TX (US); Brad Anthony Ansel, Dublin, GA (US); John James Strauman, Jr., Lutz, FL (US); Nicholas Patrick Johns, Lutz, FL (US); Jerry Douglas Harder, Parkland, FL (US); James Andrew Gardiner, Tarpon Springs, FL (US); Mark Lyman Kelly, Wesley Chapel, FL (US)

(73) Assignee: Amarillo Technologies Inc., Amarillo, TX (US)

( * ) Notice: Subject to any disclaimer, the term of this patent is extended or adjusted under 35 U.S.C. 154(b) by 97 days.

(21) Appl. No.: 18/614,195

(22) Filed: Mar. 22, 2024

(65) Prior Publication Data

US 2025/0299521 A1 Sep. 25, 2025

(51) Int. Cl.
*G07C 9/00* (2020.01)

(52) U.S. Cl.
CPC .................... *G07C 9/00309* (2013.01); *G07C 2009/00412* (2013.01); *G07C 2009/00523* (2013.01)

(58) Field of Classification Search
CPC ......... H04W 4/35; H04W 4/38; H04W 12/06; H04W 12/122; H04W 12/08; H04W 12/63; H04W 12/68; H04W 4/80; H04W 76/14; H04W 12/37; H04W 76/27; H04W 4/10; G16H 20/13; G16H 40/40; G16H 40/63;
(Continued)

(56) References Cited

U.S. PATENT DOCUMENTS 10,713,871 B2 7/2020 Power
2017/0236352 A1 8/2017 Conrad et al.
(Continued)

FOREIGN PATENT DOCUMENTS

GB 2513455 A 10/2014

OTHER PUBLICATIONS

International Search Report and Written Opinion for PCT /US2025/020556 (Jul. 7, 2025).

*Primary Examiner* — Dionne Pendleton
(74) *Attorney, Agent, or Firm* — Merchant & Gould P.C.

(57) ABSTRACT

Herein is disclosed various embodiments of systems, methods, and apparatuses for controlling access to a digital key or keys used to unlock locks that safeguard the lives of service personnel. According to some embodiments, the systems, methods and apparatuses guide a user through a process by which a user may observe a system of equipment to be in a safe state for servicing. According to some embodiments, such process may be cooperative, so that the process must be completed by more than one user of the systems, methods and processes. According to some embodiments, in the wake of a user concluding the process, the systems, methods and apparatuses cooperate to inform a user of whether or not a system being serviced by the user has changed its safety state in the wake of the user having completed the aforementioned process.

19 Claims, 91 Drawing Sheets

(58) Field of Classification Search

CPC ....... G16H 40/67; G07F 17/0092; G07F 5/26; G07F 17/12; G07F 7/04; G07F 7/10; G07F 11/62; G07F 17/32; G07F 17/3216; G07F 9/026; G07F 9/10; G07F 9/105; G07C 9/00817; G07C 9/00896; G07C 9/00309; G07C 9/00571; G07C 2009/0092; G07C 9/00182; G07C 2009/00412; G07C 2009/00769; G07C 2009/00793; G07C 2209/63; G07C 9/00563; G07C 9/00912; G07C 9/215; G07C 9/25; G07C 9/27; G07C 2009/00555; G07C 2009/00825; G07C 5/008; G07C 9/00174; G07C 9/00904; G07C 9/22; G07C 2009/00325; G07C 2009/00507; G07C 2009/00634; G07C 2009/00761; G07C 2009/00833; G07C 2009/00936; G07C 2209/08; G07C 2209/62; G07C 2209/64; G07C 9/0069; G07C 9/20; G07C 9/257; G07C 9/33; G07C 9/38; G07C 2009/00865; G07C 9/37; G07C 2009/00841; G07C 2009/00928; G07C 2209/65; G07C 9/28; G07C 2009/00293; G07C 2009/00753; F16P 3/08; A61J 7/0076; A61J 7/0084; A61J 7/0427; A61J 1/03; A61J 1/165; B60R 25/24; B60R 25/245; B60R 16/02; B60R 16/037; B60R 25/20; B60R 25/243; B60R 25/246; B60R 25/30; B60R 2325/101; B60R 2325/105; B60R 25/04; B60R 25/1001; B60R 25/2045; B60R 25/01; B65D 25/04; B65D 25/22; B65D 43/16; B65D 43/20; B65D 55/14; B65D 83/04; E05B 65/0075; E05B 2047/0059; E05B 2047/0061; E05B 2047/0095; E05B 47/00; E05B 47/026; E05B 65/108; E05B 19/0005; E05B 47/0012; E05B 2047/002; E05B 2047/0056; E05B 2047/0058; E05B 2047/0068; E05B 2047/0073; E05B 2047/0091; E05B 2047/0093; E05B 47/0004; E05B 47/023; E05B 47/0611; E05B 49/00; E05B 65/5246; E05B 67/22; E05B 73/0082; E05B 81/54; E05B 81/64; E05G 1/005; E05G 1/02; E05G 1/024; E05G 1/026; E05G 1/00; E05G 1/04; E05G 1/10; F41C 33/06; Y10T 70/5031; Y10T 292/0969; Y10T 292/097; Y10T 292/1014; Y10T 292/1021; Y10T 70/5199; Y10T 70/7006; Y10T 70/7062; Y10T 70/7102; Y10T 70/65; Y10T 70/5009; Y10T 70/625; Y10T 70/7073; Y10T 70/7107; G05B 19/4155; G05B 2219/37431; G05B 19/042; G05B 15/00; G05B 15/02; G05B 2219/25168; G05B 2219/25209; G05B 2219/25217; G05B 2219/2628; G05B 2219/2642; G05B 19/0428; G05B 19/10; G05B 2219/2654; H04L 2209/80; H04L 9/3226; H04L 9/3242; H04L 63/1466; H04L 63/068; H04L 63/0846; H04L 63/108; H04L 67/1097; H04L 67/12; H04L 61/10; H04L 63/029; H04L 63/0428; H04L 63/08; H04L 63/126; H04N 7/186; H04N 7/188; A47B 47/00; A47B 81/00; A47B 96/00; A47G 2029/149; A47G 29/141; G06F 21/31; G06F 21/86; G06F 1/266; G06F 1/3215; G06F 1/3218; G06F 1/3265; G06F 1/3278; G06F 13/4286; G06F 21/34; G06F 21/604; G06F 21/606; G06F 21/629; G06F 21/64; G06F 21/81; G06F 21/82; G06F 21/85; G06F 21/88; G06F 2221/2147; H04M 11/025; H04M 1/72412; H04M 11/00; H04M 2250/02; G08B 13/19684; G08B 29/181; G08B 3/10; G08B 5/36; G06V 40/16; G06Q 10/00; G06Q 10/083; G06Q 10/0836; G06Q 20/0855; G06Q 20/127; G06Q 20/18; G06Q 20/3274; G06Q 20/3278; G06Q 20/342; G06Q 20/347; G06Q 20/352; G06Q 20/4012; G06Q 20/40145; G06Q 30/0645; G06Q 50/40; E05F 15/77; E05F 15/70; E05F 15/00; E05F 15/40; E05F 15/60; E05F 15/668; H04B 1/38; E05Y 2400/42; E05Y 2400/44; E05Y 2400/85; E05Y 2400/852; E05Y 2400/86; E05Y 2800/70; E05Y 2900/106; E05Y 2900/531; E05Y 2900/20; G08G 1/04; G08G 1/042; A47F 1/04; A47F 3/001; A47F 3/002; A47F 3/02; A47F 5/01; A47F 7/00; A61G 12/001; A61G 2203/36; E05D 15/0621; G08C 17/02; H01H 9/0235; H04Q 9/00; Y02D 10/00; H10D 62/82; Y04S 40/20

See application file for complete search history.

(56) References Cited

U.S. PATENT DOCUMENTS

2023/0147994 A1* 5/2023 Mercolino ............ A61J 7/0076 700/240
2023/0334926 A1* 10/2023 Trapani .............. G07C 9/00817

* cited by examiner

1300

SYSTEM AND METHOD FOR IMPOSING AND ENFORCING CONDITIONS UPON THE CIRCUMSTANCES UNDER WHICH AN UNLOCK COMMAND MAY BE SENT AND HONORED BY A LOCKING DEVICE

TECHNICAL FIELD

Herein is disclosed a system and method for imposing and enforcing conditions upon the circumstances under which a command to unlock a locking device may be sent and honored, and more particularly to a system and method for determining that individuals will not be imperiled by permitting a given lock to be unlocked.

BACKGROUND

In industrial settings, it is often the case that equipment requires service for the purpose of repair or maintenance. For example, in the context of an industrial setting such as a refinery, a situation may arise wherein a pump, vessel, boiler, furnace, catalyzer or other piece of equipment used in connection with a refining step or process requires service. The act of servicing such pieces of equipment may be perilous. For example, if a technician were to enter the interior region of a vessel to perform servicing, at least some of the valves controlling airflow into the vessel must be open or the technician could be asphyxiated. Moreover, if the vessel were to be filled with fluid while the technician remained in its interior region, the technician could drown. Still further, if the power to the lights illuminating the interior region of the vessel were to be interrupted, the technician could fall from a significant height while trying to navigate the vessel without sight.

To protect the safety of personnel who service industrial equipment, locks are used to secure the various control mechanisms (e.g., valves, power switches, etc.) of a piece of equipment under service. The locks hold the various control mechanisms in their respective proper states, so as to render the piece of equipment, as a whole, safe to be serviced. Thus, assuming the locks were placed correctly, i.e., on all of the required control mechanisms and with each such mechanism being locked in the correct position, then the piece of equipment is rendered as safe as the procedures used to control access to the keys to those locks.

SUMMARY

Against this backdrop, the present invention was developed. According to some embodiments, a safety system may be arranged for use at a facility with one or more systems of equipment having one or more isolation points. The facility may have one or more gateway units installed therein. The gateway units may be configured to receive broadcast message frames and relay payload data of such message frames to a computing platform via a network. The safety system may also include at least one lock. The lock may include a shackle that is arranged to be able to assume an unlocked state and a locked state. The lock may also include a processing unit, that has a port, and may also include a first transceiver communicably connected with the processing unit, and a second transceiver communicably connected with the processing unit. The processing unit may be operably coupled to a memory. The memory may contain instructions that, when executed by the processing unit, cause the processing unit to receive and respond to incoming commands received by the first transceiver, to send a heartbeat message via the second transceiver for reception by the gateway units and subsequent relay to said computing platform, and to send a shackle-unlocked message via the second transceiver in response to a signal received via said the aforementioned port indicating that said shackle has undergone a transition from said locked state to said unlocked state. The aforementioned message may be received by a gateway unit and subsequent relayed to the computing platform. The safety system may also include a mobile device. The mobile device may include a second processing unit, and at least two transceivers communicably coupled to the processing unit of the mobile device. The mobile device may also include an input/output device operably connected with its processing unit, and a memory communicably connected with and readable by its processing unit. The memory may contain instructions that, when executed by said the processing unit of the mobile device, cause such processing unit to permit a user of said mobile device to login, open a network connection with said computing platform, permit such user to identify a selected system from among the aforementioned one or more systems of equipment, send a get-system-information message to the aforementioned computing platform, via a first of the mobile device's transceivers, wherein said get-system-information message includes data indicating said selected system, receive a response to such get-system-information message, via the first of the mobile device's transceivers, wherein said response includes safety information pertaining to whether said selected system is in a safe state to service, present the safety information via the input/output device, and receive, via the aforementioned network connection, asynchronous updates to the safety data from the computing platform, and, in response to said asynchronous updates, present the updated safety data via the input/output device.

According to other embodiments, herein is disclosed a safety system that may be arranged for use at a facility with one or more systems of equipment having one or more isolation points. The facility may have one or more gateway units installed therein. The gateway units may be configured to receive broadcast message frames and relay payload data of such message frames to a computing platform via a network. The safety system may also include at least one lock. The lock may include a shackle that is arranged to be able to assume an unlocked state and a locked state. The lock may also include a processing unit, that has a port, and may also include a first transceiver communicably connected with the processing unit, and a second transceiver communicably connected with the processing unit. The processing unit may be operably coupled to a memory. The memory may contain instructions that, when executed by the processing unit, cause the processing unit to receive and respond to incoming commands received by the first transceiver, to send a heartbeat message via the second transceiver for reception by the gateway units and subsequent relay to said computing platform, and to send a shackle-unlocked message via the second transceiver in response to a signal received via said the aforementioned port indicating that said shackle has undergone a transition from said locked state to said unlocked state. The aforementioned message may be received by a gateway unit and subsequent relayed to the computing platform. The safety system may also include a mobile device. The mobile device may include a second processing unit, and at least two transceivers communicably coupled to the processing unit of the mobile device. The mobile device may also include an input/output device operably connected with its processing unit, and a memory communicably connected with and readable by its processing unit. The memory may contain instructions that, when executed by said the processing unit of the mobile device, cause such processing unit to permit a user of said mobile device to login, open a network connection with said computing platform, permit such user to identify a selected system from among the aforementioned one or more systems of equipment, send a get-system-information message to the aforementioned computing platform, via a first of the mobile device's transceivers, wherein said get-system-information message includes data indicating said selected system, receive a response to such get-system-information message, via the first of the mobile device's transceivers, wherein said response includes safety information pertaining to whether said selected system is in a safe state to service, present the safety information via the input/output device, and receive, via the aforementioned network connection, an asynchronous message from the computing platform, and, in response to the asynchronous message, send a second get-system-information message to the computing platform, receive a response to the second get-system-information message, wherein the response includes updated safety information pertaining to whether the selected system is in a safe state to service, and present the updated safety data via said input/output device.

According to still other embodiments, herein is disclosed a safety system that may be used at a facility with one or more systems of equipment having one or more isolation points. The facility may have one or more gateway units installed therein. The gateway units may be configured to receive broadcast message frames and relay payload data of the message frames to a computing platform via a network. The safety system may include at least one lock. The lock may include a shackle arranged to be able to assume an unlocked state and a locked state. The lock may also include a processing unit having a port, and may also have first and second transceivers communicably connected to the processing unit. A memory may be communicably connected with and readable by the processing unit. The memory may contain instructions that, when executed by the processing unit, cause the processing unit to receive and respond to incoming commands received by the first transceiver, send a heartbeat message via the second transceiver for reception by the gateway units and subsequent relay to the aforementioned computing platform, and send a shackle-unlocked message via the second transceiver in response to a signal received via the aforementioned port indicating that said shackle has undergone a transition from said locked state to said unlocked state, for reception by the gateway units and subsequent relay to said computing platform. The system may also include a means for using the heartbeat message and the shackle-unlocked message to inform a user of the safety system of whether or not a user-selected one of the one or more systems of equipment has changed safety state.

DETAILED DESCRIPTION

Figure 1:
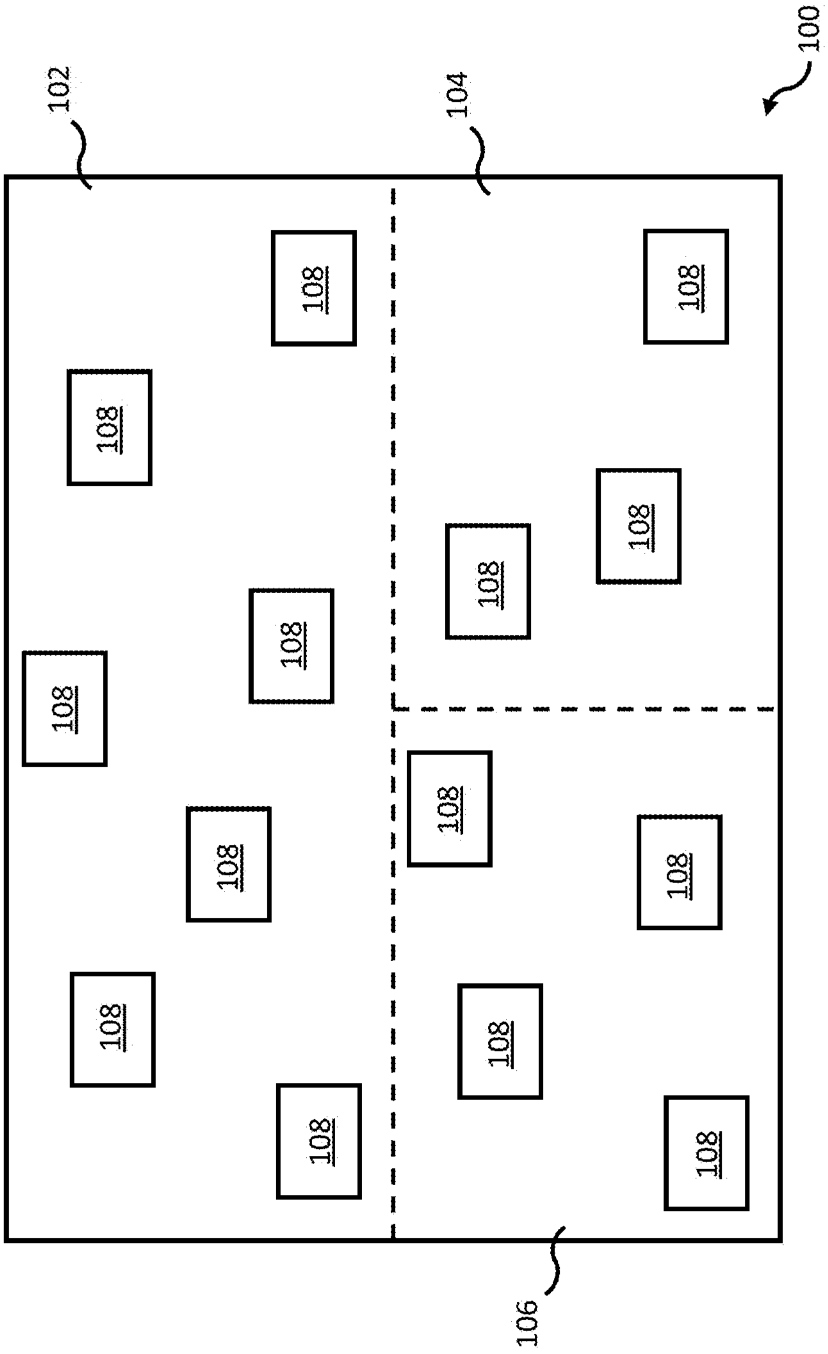
FIG. 1 depicts an exemplary embodiment of a facility including various areas thereof and units therein.

FIG. 1 depicts an exemplary industrial setting 100. The systems and methods disclosed herein are applicable to any industrial setting (example: any manufacturing facility, including any chemical manufacturing facility), but for the sake of illustration only, this document will refer to the industrial setting as a petrochemical refinery. Thus, the industrial setting 100 of FIG. 1 may be a refinery 100. Refineries may span more than two square miles, so for the sake of organizational convenience, a refinery may be divided into geographic regions, and refinery personnel may refer to each area by a name or naming system or nomenclature (example: "Area A," "Area B" and "Area C"). In the particular example depicted in FIG. 1, the refinery 100 is divided into three geographic areas 102, 104, and 106.

Within each area 102, 104 and 106, are processing units 108, also referred to simply as units 108. A processing unit 108 is an arrangement of different pieces of equipment that are interconnected and integrated in such a way as to perform a step in the refining process. For example, processing units 108 may include crude oil distillation units (also referred to as atmospheric distillation units), vacuum distillation units, diesel hydrotreating units, semi-regenerative reforming distillation units, fluid catalytic cracking units, sulfur recovery units, isomerization units, and so on. Refinery personnel may refer to each unit 108 with a name or pursuant to a naming system (example: "Crude Oil Distillation Unit 1," "Crude Oil Distillation Unit 2," and "Crude Oil Distillation Unit 3"). These names may be used together with the aforementioned geographical area designations to provide specificity (example: "Crude Oil Distillation Unit 1 in Area B").

Figure 2:
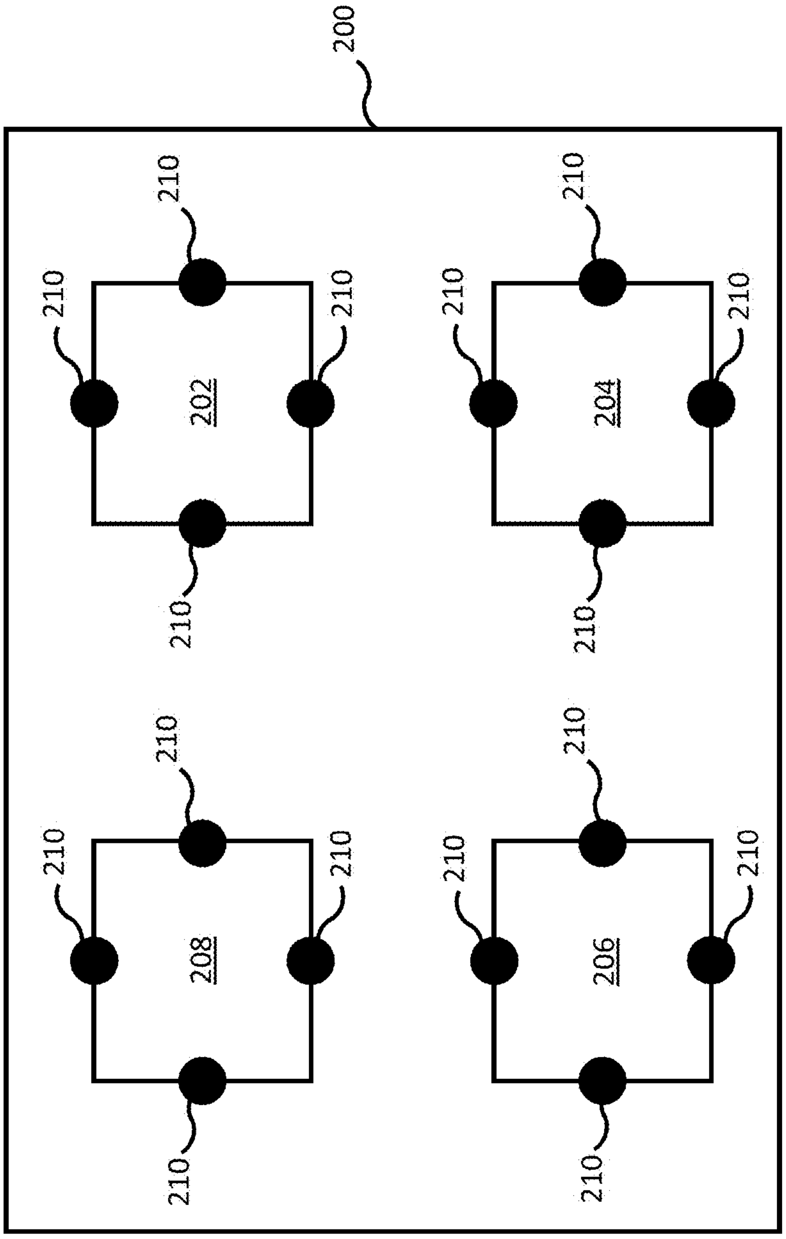
FIG. 2 depicts an exemplary embodiment of a unit, including various systems making up such unit, and various isolation points that are constituents of each such system.

FIG. 2 depicts an exemplary unit 200. The unit 200 is depicted as being constituted of four interconnected or integrated systems 202, 204, 206 and 208. A system 202, 204, 206 and 208 is a piece of equipment that performs a particular function that is used in connection with accomplishing the particular refining step carried out by the unit 200. An actual unit may include more or fewer than four systems (typically more). For example, assuming the unit 200 of FIG. 2 was a crude oil distillation unit, it would include such systems 202, 204, 206 and 208 as a desalter, a heater or furnace, a distillation tower, a crude/distillate heat exchanger, a crude/natural gas heat exchanger, a distillation tower top pump around, a distillation tower bottom pump around, a charge pump, and so on.

When service is performed, it may be performed on a system-by-system 202, 204, 206 and 208 basis. This means that, for a given system 202, 204, 206 and 208, its various control mechanisms must be locked in the correct state or position in order to render the system 202, 204, 206 and 208 safe for the personnel performing the service operations. Each such control mechanism may be referred to as an isolation point. As depicted in FIG. 2, each system 202, 204, 206 and 208 has four isolation points 210. FIG. 2 is a simplified drawing, and an actual system 202, 204, 206 and 208 may have more or fewer than four isolation points 210 (typically more). For example, assuming that system 204 was a charge pump, then its isolation points 210 may include an inlet valve, a discharge valve, an electrical breaker, a bypass inlet, a bypass outlet, an instrumentation loop inlet, an instrumentation loop discharge, and so on. In the context of an electrical breaker, for example, to render the charge pump safe for servicing, an individual would open the electrical panel, break the electrical circuit to the charge pump, close the panel, and then apply a lock to the panel. Thus, in view of these steps, the charge pump is prevented from activating while it is being serviced. To render the hypothetical charge pump as a whole safe for servicing, each such isolation point would have to be locked in the proper position or state—not just the electrical breaker.

Figure 3:
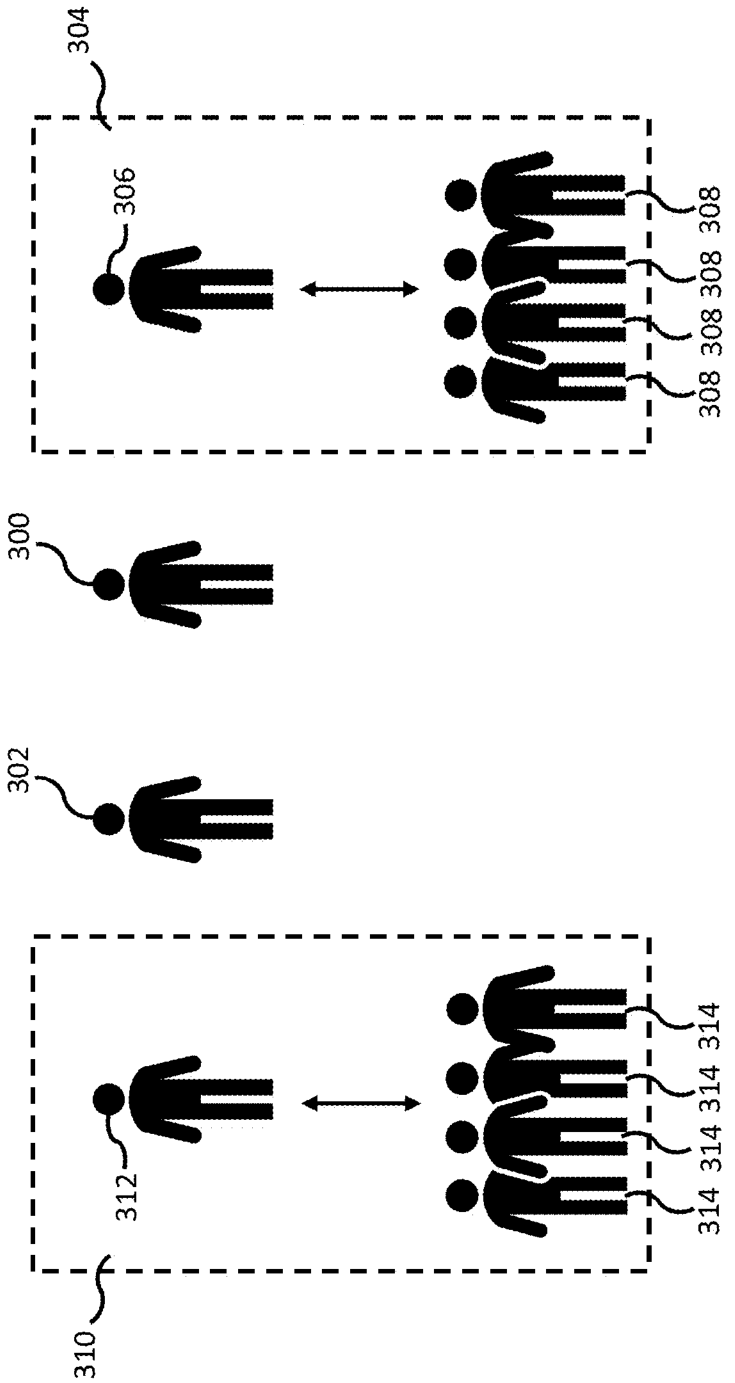
FIG. 3 depicts exemplary embodiments of service teams, such as those that might service various systems throughout a facility.

FIG. 3 depicts the personnel that typically perform service operations. Such personnel include an operator or owner 300, which is a term used to describe an employee of a facility (pursuant to the example used in the context of this document, a refinery) that is assigned to a particular unit 200 as a first-level diagnostic and maintenance/repair expert. An owner 300 will be able to determine whether a given unit 200 is functioning properly, will understand how to service the unit 200, including understanding how to service each of its systems 202, 204, 206 and 208, will know how to properly take the unit 200 offline and how to properly bring it back online again, and so on. A facility engineer 302 or some sort of craftsman (welder, electrician, etc.) may also service any given system 202, 204, 206 and 208. Service may also be performed by third-party contractors 304. Typically, third party contractors 304 organize themselves into service teams led by a foreman 306 who oversees the service activity of craftsmen 308. From time to time, it may be the case that facility employees may organize themselves into a service team 310, such as on an ad hoc basis. Such a team 310 may be led, for example, by an engineer or other facility employee designated as the team 310 leader 312, and the team 310 may be constituted of facility craftsmen 314 and other facility employees 314, such as other engineers 314 or owners (also referred to as operators) 314. Moreover, a team may be constituted of both third-party contractors 304 and facility employees 314, with an individual from either group being the leader of the team.

According to some embodiments of the system and methods disclosed herein, the systems and methods may be constructed so as to render an individual's safety the personal responsibility of that individual. In other words, the systems and methods may be arranged such that any given owner/operator 300, engineer 302, foreman 306, or other employee 312 (example: lead or any other user of the safety system, methods and apparatuses disclosed herein) would need to take affirmative steps to ensure his own safety. This is discussed in greater detail herein. According to some embodiments, the safety of members 308 or 314 of a team 304 or 310 could depend on affirmative steps undertaken by the leader 306 or 312 of the team 304 or 310. This, too, is discussed in greater detail herein.

Figure 4:
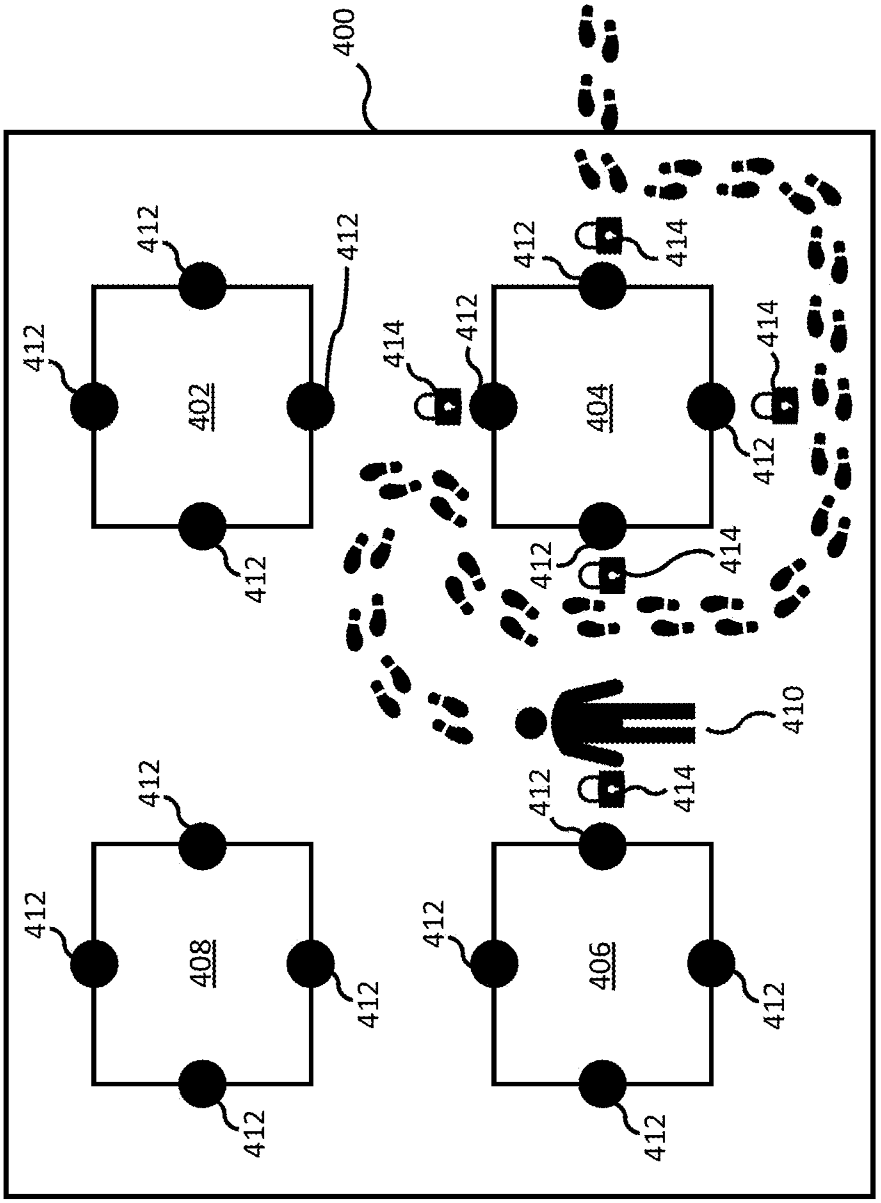
FIG. 4 depicts an exemplary embodiment of a serviceman in the act of applying locks to isolation points of systems, prior to commencement of service activities upon such systems.

FIG. 4 depicts a unit 400 that has been taken offline so that its various systems 402, 404, 406 and 408 may be serviced. As can be seen from FIG. 4, an owner/operator 410 of the unit 400 carries out a lockout process to render each of the systems 402, 404, 406 and 408 of the unit 400 safe for servicing. In this process, the owner 410 applies a lock 414 to each isolation point 412 of each system 402, 404, 406 and 408, to secure each such isolation point 412 in a correct (safe) state or position. As depicted in FIG. 4, the lockout process is midstream, and locks 414 have been applied to only five of the isolation points 412, meaning that eleven more isolation points 412 require the application of locks 414. Of course, if only a subset of the systems 402, 404, 406 or 408 were to be subject to service operations, then only those particular systems to be serviced would be locked out.

According to some embodiments of the invention, the locks 414 constitute part of a safety system and are responsive to electronic signals, such as BLUETOOTH® signals or LORA® (LoRa) signals. For example, such locks 414 can be locked and unlocked pursuant to commands sent via such electronic signals. The electronic signals to which the locks are responsive include a message body or packet or frame. According to some embodiments, a command instructing a lock 414 to unlock must include a code or digital key in the message body or packet or frame in order for the command to be honored by the lock 414. Thus, according to some embodiments, each lock 414 may be associated with a code that is unique to it (i.e., the code that is used to unlock one particular lock 414 cannot be used to unlock any other lock 414). According to some embodiments, a particular code may be associated with more than one lock 414, but has a reuse rate such that the probability of two randomly selected locks 414 being associated with the same code is low (example: less than one in a million or thereabout). According to some embodiments, the digital code or digital key is a long sequence of bits (example: a 5-byte code or 8-byte code), the values of at least some of which are randomly or pseudo-randomly assigned and tested for uniqueness. According to some embodiments, the code may be reused from lock 414 to lock 414.

The owner 410 applies a lock 414 to each isolation point 412 of each system 402, 404, 406 or 408 to be serviced. In the context of this particular example, wherein all of the systems 402, 404, 406 and 408 constituting the unit 400 are to be serviced, every isolation point 412 within the unit 400 will have a lock 414 applied thereto. In the wake of having applied a lock 414 to each isolation point 412 of each system 402, 404, 406 and 408, or, alternatively, in the wake of having applied a lock 414 to a particular isolation point 412 of a particular system 402, 404, 406 or 408, the owner 410 may take steps to place the key or keys corresponding to the placed lock 414 or locks 414 in a key repository or repositories. The purpose of putting the key or keys in a repository or repositories is to control access to the key or keys so that the locks 414 cannot be unlocked during the performance of service operations. Access to the keys, if permitted, would permit the locks 414 to be unlocked, which, in turn, would imperil the safety of the various workers 300-314.

Consider the point in time at which the owner 410 has placed a lock 414 on each of the isolation points 412 of system 404. Further consider the scenario in which each such lock 414 requires a unique digital code to be transmitted to it as a precondition of unlocking. In such a scenario, the digital code required by a given lock 414 as a precondition of its unlocking is the aforementioned lock's 414 key. It is its digital key. According to some embodiments, after placing a lock 414 on a first isolation point 412 of the system 404, the owner 410 takes steps to store its digital key in a digital key repository. According to some embodiments, each system 402, 404, 406, and 408 has a repository associated with it. In other words, there is first repository associated with system 402, a second repository associated with system 404, a third repository associated with system 406, and so on. Thus, after placing a lock 414 on a first isolation point 412 of the system 404, the owner 410 stores the digital key corresponding to the just-placed lock 414 in the particular repository associated with system 404. In the wake of having placed a lock 414 on the second isolation point 412 of system 404, the owner 410 again stores the digital key corresponding to the just-placed lock 414 in the aforementioned repository. The owner 410 repeats the lock-placement and digital-key-storage steps for the third and fourth isolation points 412 of system 404, thereby completely locking out system 404. According to some embodiments, the digital key may reside within the repository prior to the lock-placement step, meaning that no explicit steps are required to arrive at its storage therein. In the wake of having completely locked out system 404, the repository corresponding to that system 404 contains four digital keys, which are the keys required to unlock each of the digital locks 414 placed on its various isolation points 412. According to some embodiments, each of the locks 414 securing the isolation points 412 of system 404 are assigned the same digital key. Therefore, the repository corresponding to system 404 contains only one digital key, the particular digital key used to unlock all four of the locks placed on the isolation points 412 of system 404. According to some embodiments, the digital key or keys corresponding to system 404 are programmatically stored in the repository associated with system 404 in connection with placement of the locks 414 on the isolation points 412, so that the owner 410 need not take an explicit separate step to initiate their storage therein.

According to some embodiments, the lock placement procedure depicted in FIG. 4 proceeds in two stages. In the initial stage, an owner 410 places the locks 414 on the various isolation points 412 of the various systems 402, 404, 406 and 408. In a subsequent phase, the initial placement of the locks 414 on the various isolation points 412 is verified to ensure that each isolation point 412, in fact, is secured by a lock 414. The purposes of the verification phase are to ensure that an isolation point 412 was not accidentally skipped (i.e., was not secured in the proper position or state with a lock 414) or that a lock 414 was not accidentally hung at an incorrect location. According to some embodiments, the safety system is arranged to ensure that the verification of the initial placement of a given lock 414 is performed by an owner that is different than the particular owner 410 that initially placed the aforementioned given lock 414. According to some embodiments, the safety system is arranged so as to minimize the possibility that a user (e.g., owner/operator) could simply assert that he or she had verified the presence of a lock 414 at an isolation point 412, without being in proximity of such lock 414 in order to have firsthand knowledge of its presence.

Figure 5:
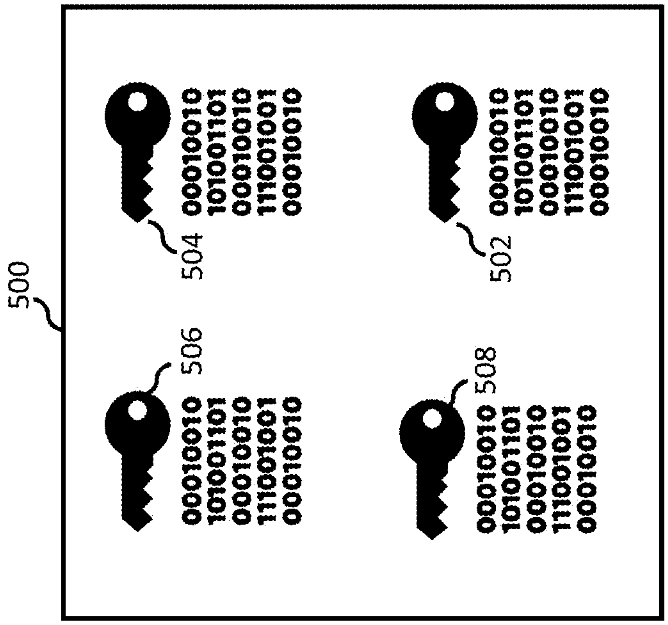
FIG. 5 depicts an exemplary embodiment of a virtual lockbox containing exemplary embodiments of digital keys.

Continuing on with the example wherein the owner 410 has placed a lock 414 on each of the isolation points 412 of system 404, thereby completely locking it out, FIG. 5 depicts a repository 500 containing four digital keys 502, 504, 506, and 508. The repository 500 corresponds to system 404, and therefore the digital keys 502, 504, 506 and 508 contained within the repository 500 are the particular digital keys required to unlock the particular locks 414 securing each of the system's 404 isolation points 412. As stated previously, if more or fewer digital keys 502, 504, 506, and 508 were required to unlock the various isolation points 412 of system 404, then the repository 500 would contain more or fewer digital keys 502, 504, 506, and 508, i.e., it would contain all of the digital keys required to unlock all of the locks 414 securing the isolation points 412 of system 404.

According to some embodiments, the safety system is configured so that the repository 500 is a region of memory that is access-controlled. For example, the region 500 of memory may reside in random access memory (RAM) that is on-board a central processing unit, or RAM that is on a separate integrated circuit, or on a hard drive or solid-state hard drive, or any other unit of memory used by a computer, server or computing system. The keys 502, 504, 506 and 508 may be stored within the memory region 500 in an encrypted state so that any improper attempt to retrieve the keys 502, 504, 506 and 508 would not result in acquisition of the unique codes required to unlock the locks 414 on the isolation points 412 of system 404. According to such embodiments, decryption of the digital keys 502, 504, 506 and 508 prior to their acquisition is subject to one or more conditional tests. In other words, if a particular condition or conditions are not met, the digital keys 502, 504, 506 and 508 will not be decrypted prior to their retrieval, meaning that any acquisition of such keys 502, 504, 506 and 508 is useless. According to some embodiments, access to the memory region 500 by processes is limited by an operating system on the computing system in which the memory region 500 is integrated or interconnected with. According to some embodiments, access to the memory region 500 by processes is limited by a process running on top of the aforementioned operating system. In either case, either the operating system or a process or a combination of both, cooperate to prevent access to the memory region altogether unless a condition or set of conditions are met. According to some embodiments, the memory region is integrated into a computing system devoted to storing the digital keys 502, 504, 506 and 508, so that acquisition of the keys 502, 504, 506 and 508 must occur by interacting with the aforementioned computing system via a network to request the keys 502, 504, 506 and 508, meaning that the computing system can impose conditions on whether and under what circumstances it will return such keys 502, 504, 506 and 508. Example: the keys 502, 504, 506 and 508 may be stored in a database or in an encrypted database, e.g., may be stored in an encrypted format within a database. The various embodiments of a repositories 500 may be implemented singly or in conjunction with one another. Example: a repository may be embodied as a memory region 500 that both stores the digital keys in encrypted form and is also access-controlled.

According to some embodiments, each person to be protected during the course of performance of service activities is assigned a digital personal lock. For example, owner 300, engineer 302, foreman 306, craftsmen 308, facility employee 312 (such as an engineer or facility craftsman), other facility employees 314 (all of which are depicted in FIG. 3), and owner 410 (depicted in FIG. 4) may each be assigned a digital personal lock. According to some embodiments, a digital personal lock is a value or data structure associated with a particular person to be protected, such as a string value, integer value, floating point value or any other such value or unit or composite of data, including, for example, a user ID uniquely identifying a user of the safety system. According to some embodiments, a digital personal lock may be associated with a repository 500. Such association may be referred to as adding a digital personal lock to a repository 500, or using a digital personal lock to secure or lock a repository 500. In the event that a digital personal lock is associated with a given repository 500, no digital key 502, 504, 506 or 508 stored therein may be acquired from such repository 500, either because no such key 502, 504, 506 or 508 may be acquired at all or because it cannot be acquired in an unencrypted state, i.e., no such key 502, 504, 506 or 508 can be acquired in plaintext. Previously, it was stated that access to the memory region 500 to acquire the keys 502, 504, 506, and 508 stored therein may be subject to a condition. One example of such a condition is that no digital personal lock be associated with a given key repository 500 for digital keys stored therein to be accessed in usable form.

Figure 6:
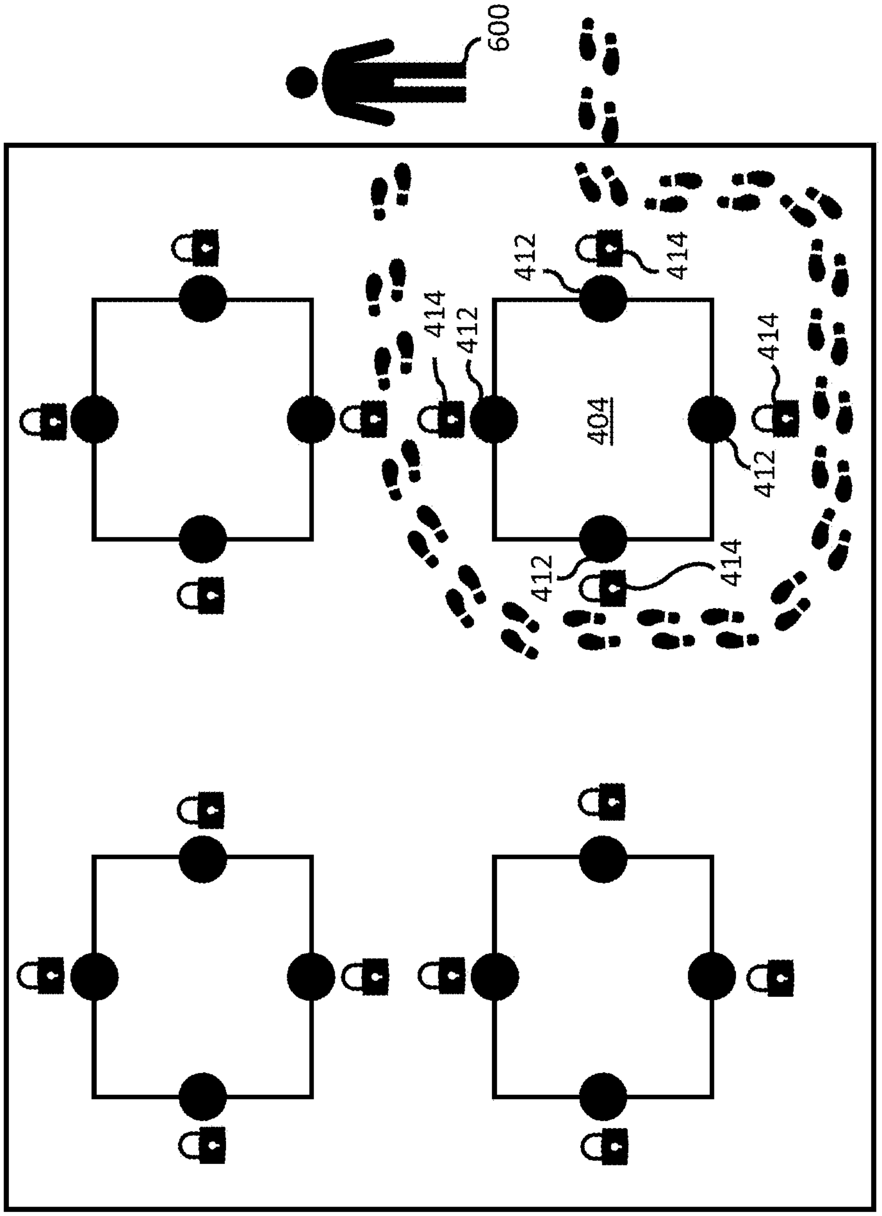
FIG. 6 depicts an exemplary embodiment of a serviceman performing a verification operation upon locks previously initially secured upon isolation points of a particular exemplary system.

Discussion now continues on with the example discussed with reference to FIGS. 4 and 5, wherein an owner/operator 410 has completely locked out a system 404, and the repository 500 associated with the system 404 stores the digital key or keys 502, 504, 506 and 508 required to unlock the various locks 414 securing the isolation points 412 of the system 404. FIG. 6 depicts a foreman 600, such as foreman 306, who is employed by a contractor company and has been engaged by the refinery to lead a service team 304 in servicing system 404. The activities of the foreman 600 described herein with reference to FIG. 6 take place after the system 404 has been completely locked out by owner 410, and optionally after the aforementioned subsequent verification step has been performed by a different owner. Prior to the performance of any servicing activity on the part of the foreman 600 or his team 304, the foreman 600 walks to each isolation point 412 of the system 404 and ensures, on an isolation-point-by-isolation-point basis, that the isolation point 412 he is examining is in the proper state or position required for safety, and that a lock 414 is properly securing the examined isolation point 412, so that the state or position of the isolation point 412 cannot be altered without unlocking the lock 414 securing it. This task of examining each isolation point 412 of a system 404 may be referred to as "walking down" a system 404.

Figure 7:
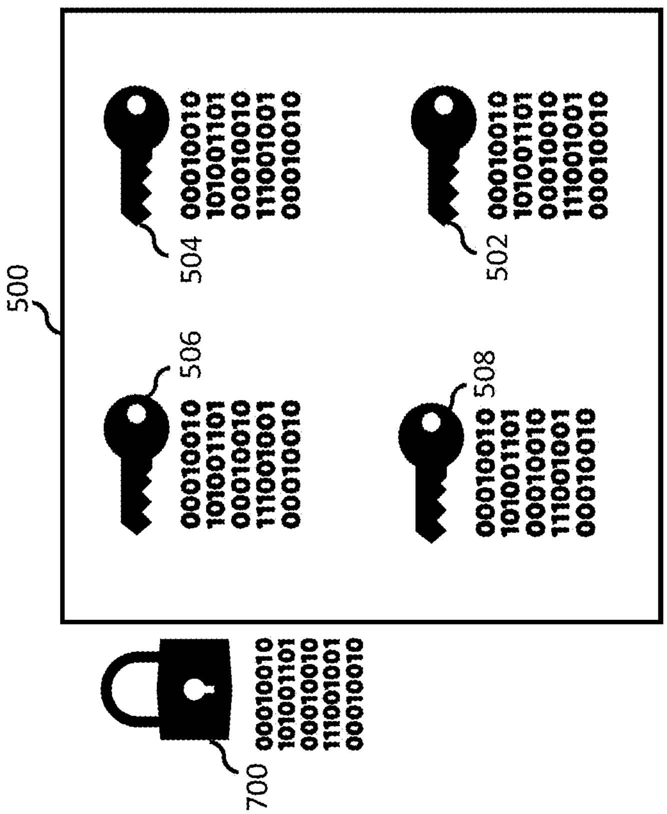
FIG. 7 depicts an exemplary embodiment of a virtual lockbox containing exemplary embodiments of digital keys, wherein such virtual lockbox is secured by an exemplary embodiment of a digital personal lock.

After having walked down the system 404 and having satisfied himself that each isolation point 412 is in a safe state and properly secured by a lock 414, the foreman 600 uses his digital personal lock to lock the particular repository 500 associated with the system 404. Given that the repository 500 contains the digital keys 502, 504, 506 and 508 required to unlock the locks 414 securing the isolation points 412 of the system 404, and further given that the foreman 600 personally performed the walk down of the system 404, the foreman 600 can be sure that the none of the states of any of the isolation points can be altered while his digital personal lock is associated with or "locking" the key repository 500. Therefore, as long as the foreman 600 keeps his digital personal lock on the aforementioned key repository 500 during the period during which he is performing service to system 404, the foreman 600 can know that he will be safe. This is an example of a user of the safety system taking affirmative steps to ensure his own safety. According to some embodiments, the safety system is arranged so that the foreman 600 cannot associate his digital personal lock with the key repository 500 until he has completely walked down the system 404 and indicated that each isolation point 412 is properly secured by a lock 414. FIG. 7 depicts the key repository 500 in the wake of the foreman 600 having associated his digital personal lock 700 therewith.

Figure 8:
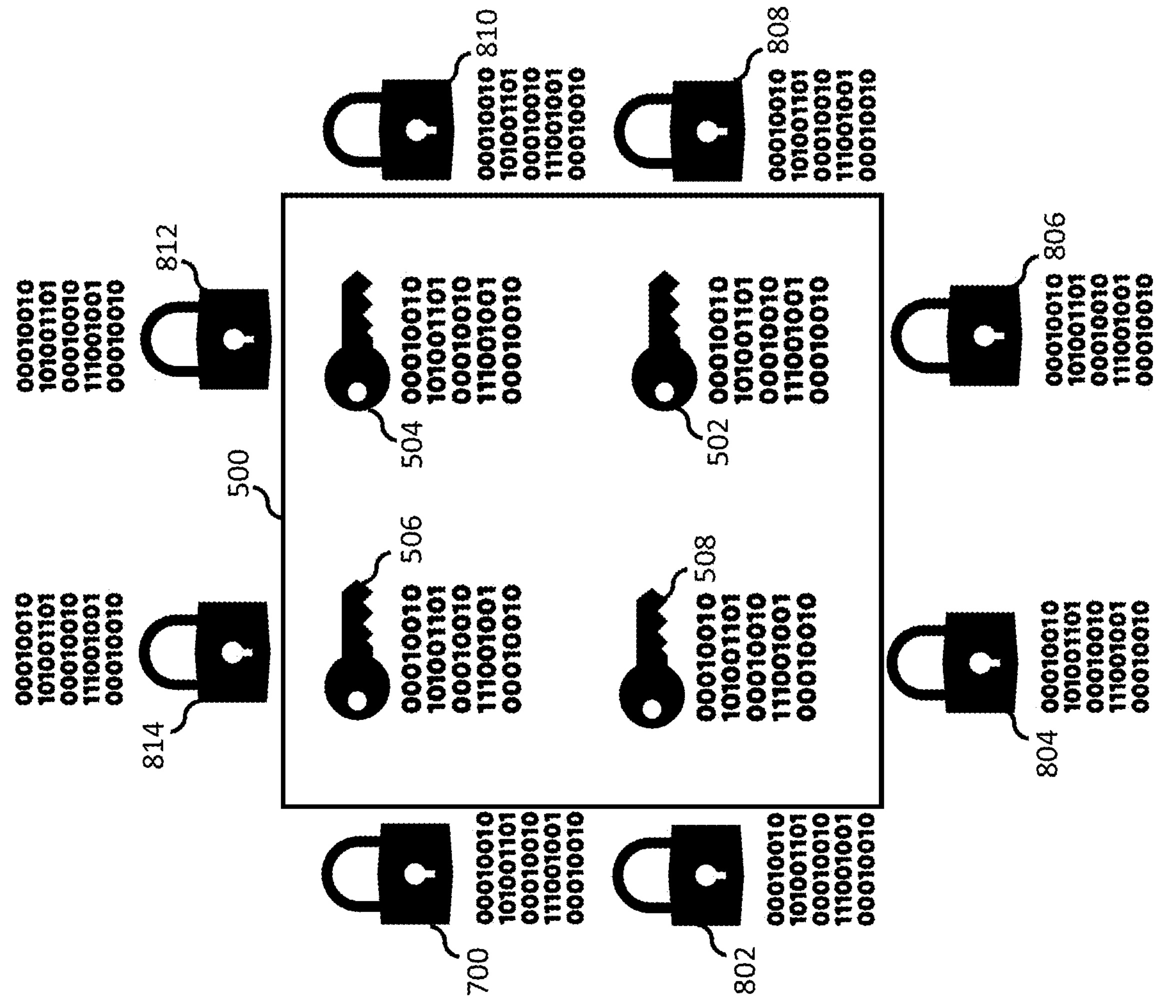
FIG. 8 depicts an exemplary embodiment of a virtual lockbox containing exemplary embodiments of digital keys, wherein such virtual lockbox is secured by exemplary embodiments of plural digital personal locks.

In addition to the foreman 600 associating his digital personal lock 700 with the repository 500, each member 308 of his service team 304 also associates his respective digital personal lock therewith. According to some embodiments, the safety system is arranged so that the foreman 600 must associate his digital personal lock 700 with the repository 500 prior to any member 308 of his service team 304 doing so. According to some embodiments, each member 308 of his service team 304 may associate his respective digital personal lock with the key repository 500 without personally walking down the system 404. In this regard, each such member 308 entrusts his safety to the actions of his foreman 600, i.e., to the leader of the service team of which the members 308 are a part. On the other hand, any given member 308 may personally walk down the system 404 prior to associating his digital personal lock with the repository 500. FIG. 8 depicts the key repository 500 with the foreman's 600 digital personal lock 700 associated therewith, as well as the digital personal locks 802, 804, 806, 808, 810, 812 and 814 of each member 308 of his service team associated therewith. Thus, the digital keys 502, 504, 506 and 508 stored therein cannot be acquired until all of the digital personal locks 700, 802, 804, 806, 808, 810, 812 and 814 associated with the repository 500 are dissociated from it or "removed" from it. Therefore, each member 308 of the team knows that as long as his digital personal lock 802, 804, 806, 808, 810, 812 and 814 remains associated with the repository 500, he is safe. Each member typically adds or associates his digital personal lock 802, 804, 806, 808, 810, 812 and 814 with the repository 500 prior to starting any servicing activity on the system 404, and removes his digital personal lock 802, 804, 806, 808, 810, 812 and 814 upon completion of such servicing activity for the day. According to some embodiments, the safety system is arranged so that each member 308 of the foreman's 600 service team 304 must remove or disassociate his digital personal lock from the key repository 500 before the foreman 600 is able to do so.

The combined results of the foregoing example is that a system is safe for a given individual to service if: (1) a first owner (or a plurality of owners/operators) of the system has initially placed all of the isolation points of the system in a proper state and secured each such isolation point with a lock; (2) a second owner (or a plurality of owners/operators) has optionally verified the initial placement (in the case of the verification operation being performed by a plurality of owners/operators, it is preferable that the placement of a particular lock on a particular isolation point not be performed by the particular owner/operator that initially placed such lock on such isolation point); (3) the given individual has walked down each of the locks of the system, either during the course of initially placing the lock, during the course of verifying the initial placement, or during a separate confirmation step performed in the wake of the initial placement of the locks and their verification (if the given individual is a member of a service team, the leader of that team can fulfill this third condition for the given individual); and (4) the given individual associates his digital personal lock with the repository associated with the system.

The preceding summary can be reformulated on an isolation-point-by-isolation-point basis. A particular user of the safety system can know an isolation point to be in a safe state if: (1) a first owner/operator adjusted the isolation point to put it in a safe state and secured the isolation point with a lock; (2) a second owner/operator verified that the isolation point is in a safe position or state and that a lock is properly securing the isolation point in its safe position or state (this step is optional); and (3) the particular user confirms for himself that the isolation point is in a safe position or state and is secured by a lock, either in connection with initially placing the lock (i.e., because that particular user is the one who initially placed the lock), or in connection with the optional verification step (i.e., because that particular user is the one who verified the initial placement of the lock), or because he confirms these matters for himself in a separate confirmatory step (if the particular user is a member of a service team, the leader of that team can fulfill this third condition for the user). If all of the isolation points of a system are known by the aforementioned particular user to be in a safe state, then the user can associate his digital personal lock with the key repository associated with the system, and know that he is safe during his performance of service activities on the system.

Reflection on the isolation-point-by-isolation-point formulation reveals that the safety system determines the state of an isolation point not as an absolute matter, but rather relative to a frame of reference: an individual user. An isolation point may be in a safe state for a first user (because all three requirements for safety are fulfilled relative to the first user), but not for a second user (because at least one of the requirements for safety is not fulfilled relative to the second user).

Figure 9:
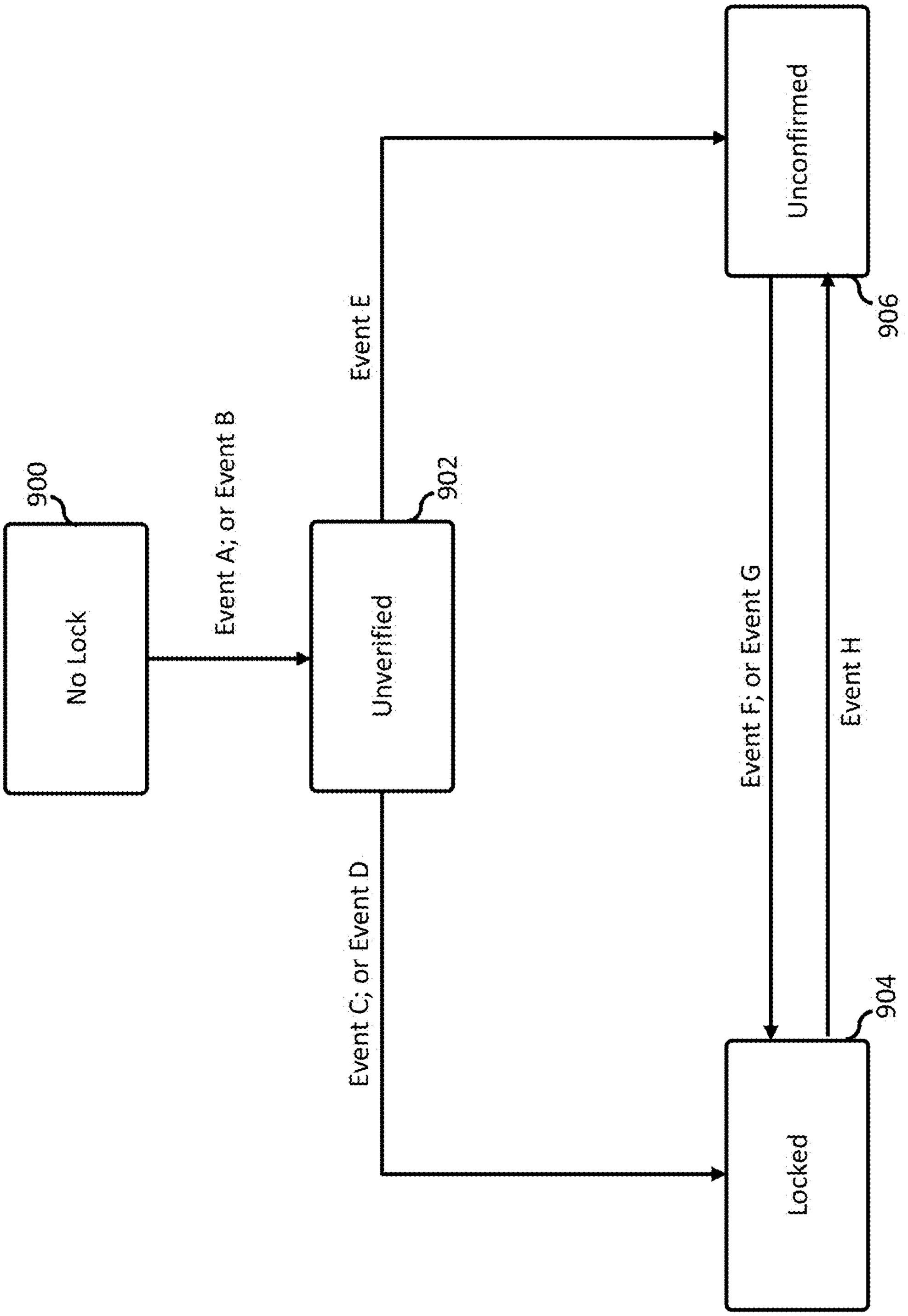
FIG. 9 depicts an exemplary embodiment of a state transition diagram that depicts exemplary state transitions that an isolation point may traverse, in the context of performance of various safety operations to prepare the associated system for commencement of service operations.

FIG. 9 depicts an exemplary embodiment of a state transition diagram defining the state of an isolation point for a given user of the safety system, according to some embodiments. The safety system may use a state machine defined in accordance with the principles of the diagram of FIG. 9 to determine the state of each isolation point from the vantage of each user. In other words, the state machine is used to answer the questions: "what is the state of isolation point #1 for user #1?"; "what is the state of isolation point #1 for user #2?"; "what is the state of isolation point #1 for user #n?"; . . . "what is the state of isolation point #m for user #1?"; "what is the state of isolation point #m for user #2?"; "what is the state of isolation point #m for user #n?"; and so on. The state transition diagram of FIG. 9 is an exemplary and simplified diagram considering state transitions arising exclusively from events asserted to have occurred by users of the safety system, in view of the current state of a given isolation point. An exemplary state transition diagram contemplating state transitions arising from events detected by the locks themselves, as well as those asserted to have occurred by users of the safety system is presented below. Those of skill in the art will understand that other state transition diagrams and machines are possible, including those that contemplate more or different events, those that make different state transitions, those that include different states, and those that determine state transitions based on an isolation point's history of events (example: based upon a given isolation point's last two states or last three states, and so on).

In the discussion pertaining to the state transition diagram of FIG. 9, the transitions from one state to another state are determined by the occurrence of events, and more particularly events from the point of view of a given user—that given user is referred to as "User X" in this discussion. Therefore, in the following discussion, the state transition diagram is referred to in order to answer the question: "what is the state of a given isolation point for User X, given that a particular event has occurred?"

The events that cause transitions between states are labeled: Event A, Event B, Event C, Event D, Event E, Event F, Event G and Event H. The meanings of these events are presented in Table 1, below.

TABLE 1

| Event | Meaning |
|---|---|
| Event A | User X initially places a lock on a given isolation point (only possible if User X is an owner). |
| Event B | Another user who is not User X places a lock on a given isolation point (only possible if that other user is an owner). |
| Event C | User X verifies the initial placement of the lock on the given isolation point (only possible if: (i) User X is an owner or otherwise permitted to conduct a verification operation; and (ii) User X did not initially place the lock). |
| Event D | Another user verifies the initial placement of the lock on the given isolation point (only possible if: (i) this particular other user is an owner or otherwise permitted to conduct a verification operation; and (ii) User X initially placed the lock). |
| Event E | Another user verifies the initial placement of the lock on the given isolation point, wherein User X did not perform the initial placement (only if: (i) this particular other user is an owner or otherwise permitted to conduct a verification operation; and (ii) this particular other user did not initially place the lock). |
| Event F | User X confirms that the given isolation point is properly secured by a lock. |
| Event G | User X's service team leader confirms that the given isolation point is properly secured by a lock. |
| Event H | Anyone asserts that the given isolation point is unsecured by a lock. |

As can be seen from FIG. 9, prior to a user of the safety system asserting that he has placed a lock on a given isolation point, that isolation point is in the No Lock state 900 for User X. (The particular isolation point is, in fact, in the No Lock state 900 for all users of the safety system.) In the event that User X is an owner/operator or otherwise permitted to adjust isolation points at a given facility and lockout some or all of its systems, then User X can adjust the position of the aforementioned isolation point to render it safe, can secure it in that safe position with a lock, and can assert that he has done so (Event A). Such an event causes that particular isolation point to transition to an Unverified state 902 for User X, which may also be referred to herein as a Ready to Verify state (to indicate that isolation point is in a state wherein it is ready for another user to verify that a lock is properly the aforementioned isolation point). Alternatively, another user of the safety system—someone who is not User X—could have also adjusted the position of the aforementioned isolation point to render it safe, secured it with a lock, and asserted that he had done so (Event B). Such an event would also cause that particular isolation point to transition to an Unverified/Ready to Verify state 902 for User X. (Events A & B cause the aforementioned isolation point to enter an Unverified/Ready to Verify state 902 for every user of the safety system.)

According to some embodiments, the safety system is arranged to assign roles to its users. For example, the safety system may assign the following roles: owner/operator, non-owner facility employee, foreman and craftsman. The safety system may be arranged to prevent users that are not assigned an owner role from asserting an initial placement of a lock on an isolation point. Thus, the state transition diagram does not need to contemplate the appropriate state transition in response to such an assertion, nor does the corresponding state machine need to be structured to respond to such an assertion. According to some embodiments, users may also be assigned titles, and such titles may be associated with respective roles. For example, a user may have the title of engineer, and users with the title of engineer may be assigned a role of non-owner facility employee. Association of a title with an employee permits ingestion of a human resources employee list by a backend computing platform, and further permits mapping of a title to a role, wherein roles determine permissible safety system operations, i.e., given that this particular user has this particular role, then the safety system will permit this user to perform these certain operations, but will restrict the performance of other operations.

When the aforementioned isolation point is in the Unverified/Ready to Verify state 902 for User X, the occurrence of two events can cause that isolation point to transition to the Locked state 904: (1) User X, himself, asserts that he has verified the initial placement of the lock on that isolation point (only in the event that User X is an owner/operator or otherwise permitted to verify lock placement, and did not perform the initial placement of the lock) (Event C); or (2) another user of the safety system—a user who is not User X—asserts that he has verified the initial placement of the lock on that isolation point (only if User X performed the initial lock placement, and only if this particular user is an owner/operator or otherwise permitted to verify lock placement). On the other hand, when the aforementioned isolation point is in the Unverified/Ready to Verify state 902 for User X, that particular isolation point will transition into an Unconfirmed/Ready to Confirm state 906 for User X, in the event that another user of the safety system—a user who is not User X, is not the particular owner that initially placed the lock on the aforementioned isolation point, but is assigned an owner/operator role or is otherwise permitted to verify lock placement—asserts that he has verified that a lock is properly securing the aforementioned isolation (Event E). The purpose of the Unconfirmed/Ready to Confirm state 906 is to alert User X that a first owner/operator has asserted that he secured a particular isolation point in a safe state, and that a second owner/operator has asserted that he has verified that the isolation point is, in fact, secured in a safe state, but that User X has not asserted that he has personally witnessed the aforementioned isolation point having been secured in a safe state, i.e., User X has not confirmed this matter for himself. Thus, according to some embodiments, because safety is a personal obligation, the safety system is arranged so as to prevent an isolation point from being in a Locked state 904 for a given user, until that given user has asserted that he has personally witnessed the isolation point having been properly secured (or until the leader of a service team to which that given user is assigned has asserted that he has personally witnessed the isolation point having been properly secured). Hence, as can be seen from FIG. 9, in the event that User X asserts that he has personally witnessed the isolation point having been properly secured (Event F), or in the event that User X is a member of a service team and the team's leader asserts that he has personally witnessed the isolation point having been properly secured (Event G), then the aforementioned isolation point transitions from the Unconfirmed/Ready to Confirm state 906 to the Locked state 904 for User X.

Finally, in the event that an isolation point is in the Locked state 904 for User X, it will transition to the Unconfirmed/Ready to Confirm state 906 for User X in the event that any user asserts that the aforementioned isolation point is unsecured (Event H). (The isolation point will, in fact, transition to the Unconfirmed/Ready to Confirm state 906 for all users, in the wake of such an event.) According to some embodiments, in the event that an isolation point is in the Locked state 904 for User X, it will transition to the Unverified/Ready to Verify state 902—as opposed to the Unconfirmed/Ready to Confirm state 906—for User X in the event that any user asserts that the aforementioned isolation point is unsecured (Event H). Recall: a system is not safe to service unless all of its isolation points are in the Locked state 904. Therefore, the safety system will present the system in which the aforementioned isolation point is located as being unsafe until such time as either User X confirms for himself that the isolation point is, in fact, secured (Event F) or his team leader does so (Event G). According to some embodiments, in the event that an isolation point is in the Locked state 904 for User X, it will transition to the No Lock state 900 for User X in the event that any user asserts that the aforementioned isolation point is unsecured (Event H). According to some embodiments, in the event that an isolation point is in the Locked state 904 for User X, it will transition to the Unverified/Ready to Verify state 902 for User X in the event that any user asserts that the aforementioned isolation point is unsecured (Event H). According to some embodiments, the particular state transition made in response to a user asserting that an isolation point in the Locked state 904 is in fact unsecured is a function of the role assigned to the particular user making the assertion. This is described in greater detail below.

The combined effects of the state transitions depicted in FIG. 9 are: (1) the initial placement of a lock on an isolation point must be performed by a first owner/operator or a user otherwise permitted to perform a lock placement operation, and the initial placement of that lock must be verified by a second owner/operator or a user otherwise permitted to perform a lock verification operation as a prerequisite for a lock to be in the Locked state 904 for any user; (2) for an isolation point to be in a Locked state for any given user, (i) that user must have seen the isolation point locked for himself and asserted so to the safety system, or (ii) that user must have been assigned to a service team, and the leader of that service team must have seen the isolation point locked for himself and asserted so to the safety system; and (3) any time any user asserts that an isolation point believed to be in a Locked state 904 is actually not secured, the aforementioned isolation point transitions out of the Locked state 904.

Figure 10:
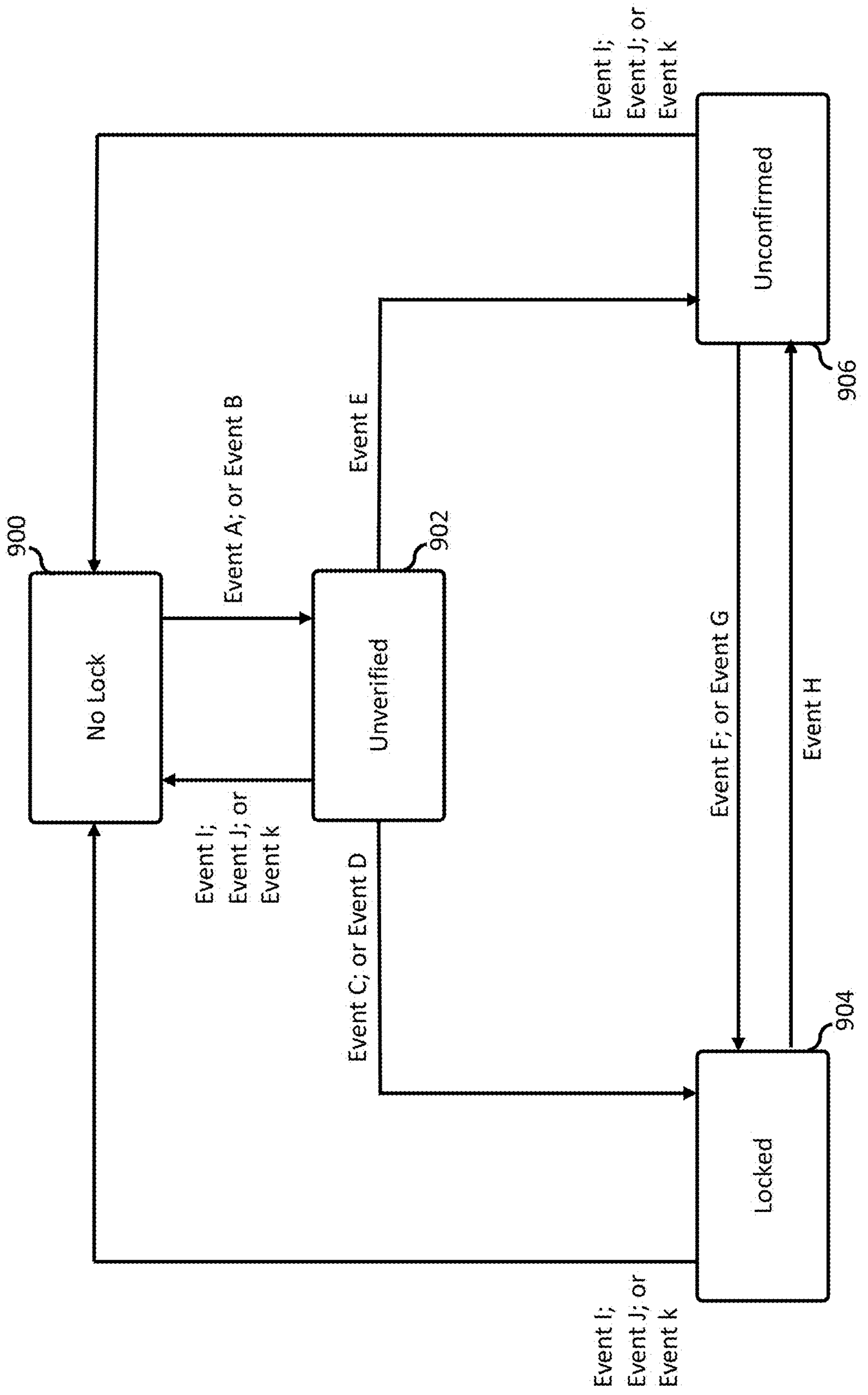
FIG. 10 depicts another exemplary embodiment of a state transition diagram that depicts exemplary state transitions that an isolation point may traverse, in the context of performance of various safety operations to prepare the associated system for commencement of service operations.

FIG. 10 depicts another embodiment of a state transition diagram. The state transition diagram of FIG. 10 is the state transition diagram of FIG. 9 augmented to include state transitions arising from the occurrence of certain events detected or reported by a lock, in addition to those arising from the assertion of a user of the safety system. These additional events are presented in Table 2, below.

TABLE 2

| Event | Meaning |
|---|---|
| Event I | Shackle open event |
| Event J | Shackle cut event |
| Event K | Unlock event |

Events I and J arise from detection circuitry within the lock. Event I arises from detection circuitry within the lock indicating that the lock's shackle has been opened, and Event J arises from detection circuitry within the lock indicating that the lock's shackle has been cut. Event K is of a different variety: it results from the lock reporting that it has received a command—in this case, a command to unlock. Exemplary embodiments of a lock with the capability of detecting and reporting such events (and more events) are disclosed below.

As can be seen from FIG. 10, whether an isolation point is in a Locked state 904, Unverified/Ready to Verify state 902 or Unconfirmed/Ready to Confirm state 906 for a given User X, the occurrence of any of Event I, Event J or Event K causes the aforementioned isolation point to transition to a No Lock state 900. One of ordinary skill in the art will understand that other states are possible, other transitions are possible in view of such events, and that other events are capable of being detected or reported by circuitry within a lock, and will be able to integrate such other events into a state machine operating in accordance with the principles revealed by the state transition diagrams of FIG. 9 and FIG. 10.

Figure 11:
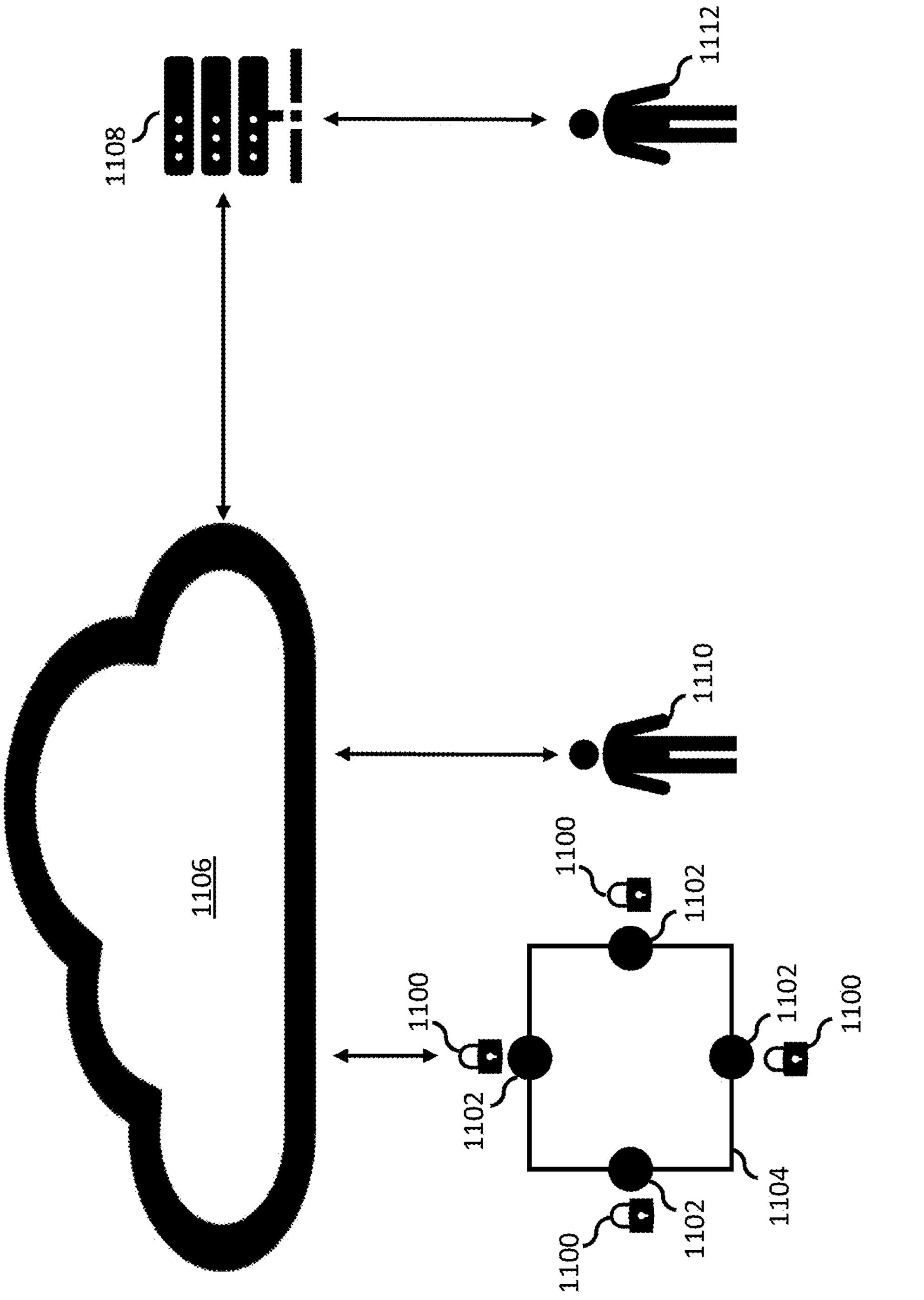
FIG. 11 depicts an exemplary safety system, in accordance with certain embodiments thereof.

FIG. 11 depicts an embodiment of a safety system in accordance with principles discussed with reference to FIGS. 1-10. The safety system includes locks 1100 securing each of the isolation points 1102 of a processing system 1104. FIG. 11 is a simplified illustration of the safety system for the sake of ease of illustration of its principles. The processing system 1104 should be understood to be situated within a processing unit, and the processing unit within a refinery, which may contain many processing units (example: a refinery may contain forty or more processing units). The scale of the safety system depends upon the size of the refinery in which it is deployed and the scope of its deployment within the refinery. The safety system may contain tens of thousands of locks 1100, for example, although only four are depicted in FIG. 10. The locks 1100 contain sensors that detect the occurrence of certain events, such as the shackle of a lock 1100 having been opened, closed, or cut. The locks 1100 also contain communication circuitry such as a transceiver circuit to permit information pertaining to detected events to be sent directly or indirectly to a backend computing platform 1108 via a network 1106 (such as via wireless data service, which may be provided by a cellular carrier or otherwise provided). According to some embodiments, each lock 1100 is identified by a lock identifier. A lock identifier is a unit of data, such as a number or string, that is uniquely assigned to a lock 1100 and therefore uniquely identifies it. A lock identifier may be stored in memory, such as volatile or nonvolatile memory, onboard the lock. Each communication from a lock 1100 pertaining to the occurrence of a lock event may include the lock identifier and an indication of what particular lock event occurred, so that the backend computing platform 1108 can associate a lock event (example: shackle opened) with a particular lock. According to some embodiments, each such lock 1100 communicates the occurrence of a lock event in real-time or near real-time as it is detected by its various detection circuits.

The backend computing platform 1108 maintains a data store, such as a database, that contains information pertaining to: (1) each isolation point 1102; (2) a system with which each such isolation point is associated; (3) a unit with which each such system is associated; (4) an area in which each such unit is located; (5) the areas into which a facility is organized; (6) the facilities of a given organization; (7) each user of the safety system (such as user 1110); (8) a role assigned to each such user; (9) an association between each such user and a particular organization or facility; (10) the state of each isolation point 1102 for each user of the safety system; (11) each service team, including an identifier of the leader of each team, identifiers of each user constituting each team, and an identifier of which system such team is assigned to service; (12) lock IDs associated with each facility or organization; (13) an association between each lock ID of each lock asserted to have been secured on an isolation point and the identity of such isolation point; (14) a key repository associated with each system; (15) an association between particular digital personal locks secured on a key repository and the identity of such key repository; (16) an association between digital key codes stored within a key repository and the identity of such key repository. According to some embodiments, the data store is organized so as to associate the information therein in a manner paralleling the organization of the refinery itself. Thus, data in the data store that represents a facility (such as a refinery) is associated or linked with data representing its areas, and the data representing each area is associated or linked with data representing each unit within each respective area, and the data representing each unit is associated or linked with data representing each system within each respective unit, and the data representing each system is associated or linked with data representing each isolation point of each respective system. The backend computing platform 1108 may be accessed by an administrator 1112, such as an employee of the refinery or an employee of a company providing the safety system. The administrator 1112 may enter information into the platform 1108 and may obtain information therefrom, such as via a computing device in communication therewith or via a web-based portal or website.

For the sake of simplicity of explanation, FIG. 11 depicts a single user 1110 of the safety system. In reality, the number of such users would depend upon the size of the refinery in which the safety system was deployed and the scope of the deployment. A typical deployment may involve thousands of users at a single facility. At various points in the following discussion pertaining to FIG. 11, the user 1110 depicted in FIG. 11 will represent a first owner/operator, a second owner/operator, a foreman or leader of a service team, and a craftsman in a service team led by the aforementioned foreman.

Discussion now turns to use of the safety system depicted in FIG. 11. During the initial placement of the locks 1100, the user 1110 represents an owner/operator of the system 1104. The initial lock 1100 placement proceeds on an isolation-point-by-isolation-point basis. The owner/operator 1110 approaches a first isolation point 1102, adjusts it to a safe state or position, and then secures the isolation point 1102 with a lock 1100. The owner 1110 then asserts to the safety system that he has secured a particular lock 1100 on a particular isolation point 1102. For example, according to some embodiments, the lock identifier is printed on a surface of the lock body or on a tag associated with the lock 1100. The owner 1110 may call the administrator 1112 to assert to him that he has secured a particular isolation point 1102 with a particular lock 1100: "I just secured the middle pump jump around motor of the desulfurization system of the vacuum distillation unit in Area A with lock number 0561792886." In response, the administrator 1112 enters the information into the backend computing system 1108 so that the lock identifier communicated to him by the owner 1110 becomes associated with the data in the data store that represents the particular isolation point at which the lock 1100 was placed. The owner 1110 may assert such information to the administrator 1112 via text message, SMS, app-based communication or any other means, and may similarly assert the information concerning the initial lock placement directly to the backend computing platform 1108 (bypassing the need for an administrator 1112 to enter information concerning the assertion into the platform 1108) via app-based communication to achieve the same outcome of associating the lock identifier of the lock 1100 just placed at a given isolation point 1102 with data in the data store that represents that isolation point 1102. According to some embodiments, a lock identifier may be encoded on an RFID or NFC chip, and may be read, such as by a smartphone or other mobile device, and communicated to the backend computing platform 1108 via such smartphone or mobile device, such as via an app, along with data identifying the isolation point 1102 secured by the lock 1100. According to some embodiments, the backend computing platform 1108 responds to entry of data associating a particular lock 1100 with a particular isolation point 1102 by querying the data store for the particular digital key corresponding to the aforementioned particular lock 1100, removing the digital key from its initial location in the data store (such as a table), and storing it in the key repository associated with the system 1104. After having locked out the first isolation point 1102, the owner/operator 1110 proceeds on to lock out the remaining isolation points 1102 of the system 1104, repeating the steps described above. In the wake of having completely locked out the system 1104, the key repository associated with the system 1104 stores all of the digital keys corresponding to the various locks 1100 on the system's 1104 isolation points 1102.

According to some embodiments, in response to data pertaining to each assertion (such as an assertion that a lock 1100 has been initially placed at a given isolation point 1102) being entered into the data store, the backend computing platform 1108 applies, on a user-by-user basis, such assertion to a state machine, such as one arranged in accordance with the principles discussed with reference to FIGS. 9 and 10, in order to determine the state of the isolation point 1102 for each particular user of the safety system, in view of the newly asserted event. According to some embodiments, each assertion or event that could affect the state of an isolation point 1102 is stored by the backend computing platform 1108, and the backend computing platform 1108 calculates or otherwise determines the state of a particular isolation point 1102 for a particular user in view of such information.

Following the initial placement of the locks, the user 1110 depicted in FIG. 11 represents a second owner/operator of the system 1104. The second owner/operator 1110 performs a verification process to ensure the correctness of the initial placement process performed previously by the first owner. The second owner 1110 proceeds on an isolation-point-by-isolation-point basis. The second owner 1110 approaches a first isolation point 1102 of the system 1104 and inspects it to ensure that it is in a safe position and secured by a lock 1100. Thereafter, the second owner 1110 asserts that he has verified that a lock 1100 is properly securing the aforementioned first isolation point 1102. For example, the second owner 1110 may call the administrator 1112 to make such an assertion: "I just verified that lock number 0561792886 is properly securing the middle pump jump around motor of the desulfurization system of the vacuum distillation unit in Area A." As before, the administrator 1112 enters the information into the backend computing system 1108 so that data representing the assertion that the second owner 1110 has verified the initial placement of the lock 1100 is stored in the data store in association with the aforementioned isolation point 1102. Again, this assertion may be communicated to the administrator 1112 or directly to the backend computing platform 1108 in other manners, as described above. The second owner 1110 proceeds on to verify the initial lock 1100 placement at each of the remaining isolation points 1102 of the system 1104, repeating the steps described above. As described previously, this verification process is optional and may be omitted from the arrangement of some embodiments of the safety system.

According to some embodiments, in response to data pertaining to this particular assertion (an assertion that the second owner 1110 has verified the initial lock 1100 placement at a given isolation point 1102) being entered into and stored by the backend computing platform 1108, the backend computing platform 1108 once again applies, on a user-by-user basis, such assertion to a state machine, such as one arranged in accordance with the principles discussed with reference to FIGS. 9 and 10, in order to determine the state of the isolation point 1102 for each particular user of the safety system, in view of the newly asserted event. According to some embodiments, the assertion is stored by the backend computing platform 1108, and the backend computing platform 1108 calculates or otherwise determines the state of a particular isolation point 1102 for a particular user in view of such information.

Following the verification of the placement of the locks, the user 1110 depicted in FIG. 11 represents a foreman 1110 employed by a third-party contracting service engaged by the refinery to perform servicing activities on the system 1104. The foreman 1110 confirms the placement of the locks 1100 on the various isolation points 1102 to ensure his safety. This confirmation process is performed in a similar manner to that of the preceding verification step, and the backend computing platform 1108 responds in a similar manner (storing data concerning the assertion in association with the isolation point 1102 that is the subject of the assertion, and calculating the state of the isolation point 1102 for each user of the safety system or otherwise using a state machine structured in accordance with the principles revealed in FIGS. 9 and 10 to determine such states), and for the sake of brevity is not discussed further.

After having confirmed all of the placements of all of the locks 1100 on the system 1104, the foreman 1110 requests that his digital personal lock be associated with or "locked on" the key repository associated with the system 1104. This request may be communicated in the same way that the aforementioned assertions were. As described previously, at this point, the system is safe for the foreman 1110 to service. In the wake of this, each member of the service team led by the foreman 1110 may perform the following actions: (1) each member may inquire of the safety service whether the system 1104 is safe for him or her; and (2) in the event that it is safe, may request that his or her digital personal lock be associated with or "locked on" the digital key repository associated with the system 1104. These interactions with the safety system may occur via the same mechanisms as previously mentioned with respect to the aforementioned user assertions.

Turning to a member of a service team inquiring about his or her safety vis-à-vis the system 1104, the backend computing platform is arranged so that a user's membership in a service team led by the foreman 1110 results in the user inheriting the isolation point states of the foreman 1110 (or team leader) for the particular system 1104 to which the service team is assigned. Therefore, the safety system will represent to a member of a service team that the state of any given isolation point 1102 of a system 1104 to which the team is assigned is the same as that of the team's leader. For example, if each of the isolation points 1102 of the system 1104 are in a "Locked" state for the foreman, then, by virtue of inheritance, they are in a "Locked" state for each of the members of his service team. (Recall: a given system is safe for a given user of the safety system if all of its isolation points are in a "Locked" state, and it is safe for that given user to service when, in addition to the aforementioned given system being safe, he has associated his personal lock with the key repository corresponding to the aforementioned given system.) According to some embodiments, the safety system is arranged so that no user is able to add his or her digital personal lock to a key repository corresponding to a particular system unless every isolation point of that particular system is in a "Locked" state for that aforementioned particular user.

Typically, when the foreman or any member of his service team are finished servicing the system 1104 for the day, they request that their digital personal lock be unassociated or "unlocked" from the key repository associated with the system 1104. This request may be communicated in the same way that the aforementioned assertions were. In the event that the foreman and each member of his team have removed their personal locks from the aforementioned key repository, any key stored therein will be available for retrieval, assuming that no other digital personal locks remain associated with the key repository. According to some embodiments, the safety system is arranged so that a foreman's personal digital lock cannot be removed from a key repository until every member of his service team has removed their digital personal lock from that key repository.

Assuming that service of the system 1104 is not concluded on the first day of servicing, then it will continue into the next day. In the context of this discussion, which considers the activities of the second day of servicing, the user 1110 depicted in FIG. 11 represents a foreman. On the second day of servicing the system 1104, the foreman 1110 is not necessarily required to walk down the system 1104 to visually confirm the presence of locks 1100 at each isolation point 1102. Consider: on the previous day, the foreman 1110 had visually confirmed for himself that the locks 1100 were properly securing each isolation point 1102. Moreover, each lock 1100 contains sensors and is configured to determine whether it has been unlocked (such as by having been commanded to unlock, such as via Bluetooth communication), or whether its shackle has been opened or cut, or whether its battery voltage had dropped to a critical voltage or threshold to indicate that the circuitry of the lock may no longer function properly, or whether its battery has been removed (without the subsequent replacement with a new battery)—and each lock communicates the occurrence of such events in real-time or near real-time to the backend computing platform 1108. Were it the case that one of these events was reported by a lock 1100 to the backend platform 1108, the platform 1108 would have recalculated the state of the relevant isolation point 1102 for the foreman 1110. Thus, at the beginning of the second day, the foreman 1110 can simply inquire of the safety system (via mechanisms described previously) whether the system 1104 remains safe to service. If the response is in the affirmative, the foreman 1110 can commence service, along with his team, as soon as the foreman 1110 and his team members associate their respective digital personal locks with the system's 1104 corresponding key repository. On the other hand, should it be the case that one of the particular locks 1100 reported that an unlock, shackle open, shackle cut, battery removal, or battery critically low event had occurred, the particular isolation point 1102 on which the lock 1100 had been secured will no long be in a "Locked" state, and the safety system will require the foreman and potentially other users of the safety system to perform actions to return the aforementioned isolation point 1102 to the "Locked" state. The particular actions required are determined by the design of the state machine employed by the backend computing platform 1108.

Figure 12:
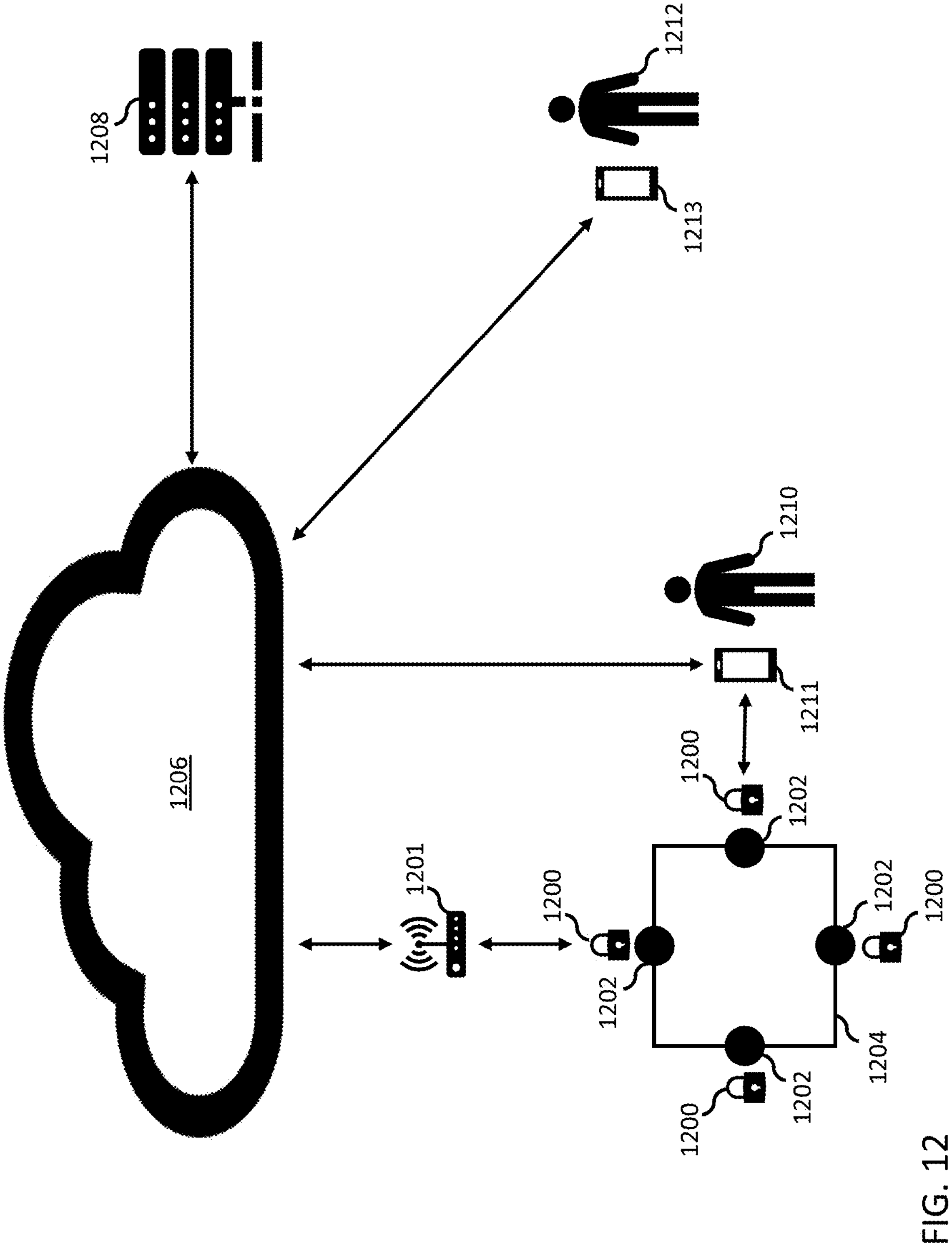
FIG. 12 depicts another exemplary safety system, in accordance with certain embodiments thereof.

FIG. 12 depicts an embodiment of the safety system that includes locks 1200 securing isolation points 1202 of a system 1204. As was the case of the embodiment depicted in FIG. 11, each lock 1200 includes sensors that detect its state (e.g., detect whether its shackle is open, whether it is closed, whether it has been cut, whether its battery is critically low, whether its battery has been removed, whether a new battery has been inserted, and so on), and each lock 1200 is programmed to interpret at least certain commands as events (e.g., to interpret as an event the reception of a command to unlock, or a command to turn on or off). Thus, each lock 1200 both detects the occurrence of events (example: a shackle open event, a shackle cut event, a shackle closed event, a battery removal event, a battery critically low event, and so on), and interprets the receipt of certain commands as events. As was the case in the embodiment of FIG. 11, each lock 1200 is programmed to communicate the occurrence of a lock event in real-time or in near real-time. According to some embodiments, each lock 1200 includes a long range (example: 10 km or more physical range, line of sight), low power communication transceiver, such as a LoRa transceiver. According to some embodiments, such a transceiver operates on sub-gigahertz bands, such as 923 MHZ, 915 MHZ, 865-867 MHZ, 868 MHz, or 433 MHz. According to some embodiments, each lock 1200 communicates via its aforementioned long-range, low-energy transceiver with a base station 1201 that serves as a gateway (e.g., the aforementioned base station 1201 receives communicated data from a lock 1200, wherein such data pertains to the occurrence of a lock event, and, in response, re-communicates such data via wireless data service, such as LTE, to the backend computing platform 1208 via a network 1206). A base station 1201 may also be referred to herein as a gateway. According to some embodiments, each lock 1200 includes an onboard non-volatile memory device with a unique lock identifier stored thereon, and each message from a given lock 1200 to the backend computing platform 1208 includes the particular lock's 1200 respective lock identifier or lock ID, so that a particular message may be associated with a particular lock at the backend computing platform 1208. According to some embodiments, each lock 1200 interprets the elapsing of a period of time as an event (example: the elapsing of an hour or 12 hours or a day), and communicates the occurrence of such an event with the backend computing platform 1208 (example: each hour, each lock 1200 communicates with the backend computing platform 1208 to announce the occurrence of an hourly "check-in" event—this permits software executing on the backend computing platform 1208 to distinguish between silence on the part of a given lock 1200 arising from the non-occurrence of a lock event and silence arising on the part of that particular lock 1200 as the result of the lock having been destroyed or having malfunctioned, for example). Such communication may be referred to herein as a heartbeat message.

FIG. 12 is a simplified diagram of certain embodiments of the safety system. Although FIG. 12 depicts a single base station 1201, a plurality of base stations 1201 may be situated at various locations around the refinery in which the system 1204 is located. Industrial settings such as refineries typically include large units of equipment made, in part, of steel or other metallic material, and such units typically obstruct the propagation pathways of communication signals. Therefore, base stations 1201 may need to be situated throughout the facility. For example, there may be a base station 1201 associated with each processing unit in the refinery, and therefore located proximal to such unit.

FIG. 12 depicts a first user 1210 and second user 1212 of the safety system. The users 1210 and 1212 may occupy any role (foreman or otherwise a leader of a service team, a craftsman—whether employed by the facility or by a third-party contractor—an engineer employed by the facility, an owner/operator employed by the facility, or some other facility employee). The users 1210 and 1212 interact with the locks 1200 and with the backend computing platform 1208 via an app running on mobile computing devices 1211 and 1213, such as tablets, smart phones, or other mobile computing devices. Exemplary embodiments of the aforementioned app are disclosed herein, below.

The users 1210 and 1212 send commands to the locks 1200 and receive responses thereto via the aforementioned app. The communication between the locks 1200 and the app is conducted wirelessly such as via Bluetooth, WiFi, 4G LTE, 5G, and so on. For the sake of illustration only, this document will refer to the communication link between the locks 1200 and the mobile device 1211 and 1213 on which the app is running as being conducted via Bluetooth. Thus, a user 1210 and 1212 will use the app to unlock a lock 1200, query a lock 1200 for information concerning the lock 1200 and its state, and so on. A user 1210 will also use the app to: (1) make assertions to the backend computing platform 1208 (example: to assert that a lock 1200 has been initially placed, to assert that the initial placement of the lock 1200 has been verified, and to assert that the placement of the lock 1200 has been confirmed; to assert that an isolation point 1202 that is expected to be secured by a lock 1200 in fact is unsecured by any lock 1200); (2) query it for information (example: to query the backend computing platform 1208 about the state of a given isolation point 1202 or the safety of a system, to query it to determine which digital personal locks are securing a given key repository, or to query it to determine which particular users are on a given service team, to query it to determine the state of every isolation point 1202 of a given system 1204, and so on); and (3) command it to take actions (example: to command the backend computing platform 1208 to return a digital key corresponding to a particular lock 1200, to command it to create a service team or to add or remove a particular user from a service team, or to command it to add or remove a particular user's digital personal lock to or from a key repository corresponding to a particular system).

In use, user 1210 may use the app, for example, to indicate that he has initially placed a lock 1200. For example, the app may present the user 1210 with a user interface by which he may: (1) identify a particular isolation point 1202; and (2) indicate that he has placed a lock 1200 on the aforementioned identified isolation point 1202. In response, the app may initiate a Bluetooth communication session with the lock 1200 to obtain its lock identifier and optionally other information (example: battery level of the lock may be communicated to the app in the context of some or all response messages, as well as, for example, temperature data, humidity data, and other sensor data), and then send the lock identifier to the backend computing platform 1208 (such as through a network 1206 via wireless data service), together with data indicating that the user 1210 has asserted that he placed a lock 1200 identified by the associated lock identifier on a particular isolation point 1202. According to some embodiments, each such assertion includes data indicating the particular user 1210 making the assertion (i.e., the particular user 1210 that is logged into the app at the time the app is used to make such an assertion), and further includes a time/date stamp and, optionally, global positioning system (GPS) information obtained from a GPS system native to the device 1211. Thus, the backend computing platform 1208 not only responds to a user assertion about an isolation point by calculating the new state of the isolation point for each user 1210 or 1212 of the safety system, it also stores in the data store each such assertion and all of its related data, including user information, the date/timestamp information and the GPS information in association with the isolation point 1202, battery level of the lock, environmental temperature of the lock, environmental humidity of the lock, and so on. Therefore, the datastore can be queried for such information.

In the wake of the initial placement of locks 1200 on the system 1204, a user, such as user 1212, can use the app to either verify their initial placement (if he is an owner/operator or otherwise permitted to perform a verification operation) or confirm their initial placement. For example, the app may present the user 1212 with a user interface by which he may: (1) identify a particular isolation point 1202; and (2) indicate that he has verified or confirmed, as the case may be, the placement of a lock 1200 on the aforementioned identified isolation point 1202. As above, the app may respond by initiating a Bluetooth communication session with the lock 1200 to obtain its lock identifier and optionally other additional information (described above), and then sending the lock identifier to the backend computing platform 1208, together with data indicating that the user 1212 has asserted that he has verified or confirmed placement of a lock 1200 identified by the associated lock identifier at the identified isolation point 1202 (along with the aforementioned additional information). Recall that by virtue of the initial lock 1200 placement process, the backend computing platform 1208 already has a lock identifier associated with the isolation point 1202 by the time its placement is verified or confirmed. According to some embodiments, the platform 1208 queries the data store with the isolation point data in the confirmation or verification assertion message from the app to obtain the lock identifier that was previously associated with the indicated isolation point in connection with the initial lock placement operation. The platform 1208 uses the returned lock identifier as a reference, and compares the lock identifier in the verification or confirmation assertion message with the reference to ensure they match. According to some embodiments, in the event of a mismatch, the platform 1208 sends a message to the app indicating the mismatch, and the app responds by challenging the user 1212 to determine whether the user 1212 is certain he is at the correct isolation point 1202. (In some industrial settings, there may be rows of tanks or pumps or other systems or units of equipment that appear identical, and it is possible for personnel to mistakenly approach one particular unit or system, when he or she intends to be approaching a different unit or system.) According to other embodiments, in the event of a mismatch, the backend computing platform 1208 sends a message to the app indicating the mismatch and that the backend computing platform 1208 has refused the assertion. According to still other embodiments, in the event of a mismatch, the platform 1208 alters the state of the isolation point being confirmed or verified to either an "Unconfirmed" state 906 or an "Unlocked" state 900 (see FIGS. 9 and 10).

It is of note that by virtue of the app requiring a Bluetooth communication session to be established with a lock 1200 in connection with a user assertion about an isolation point that has already had an initial lock placement, it is ensured that the user 1212 is actually located in proximity of the isolation point 1202 that is the subject of the assertion (Bluetooth communication links are operable over a span of about thirty feet, line of sight). This means that a user 1212 cannot simply claim to confirm or verify the placement of a lock 1200 on an isolation point without actually physically traveling to the isolation point 1202 to see that it is actually present. Moreover, by checking the lock identifier returned in the Bluetooth communication session connected with an assertion about an isolation point 1202 against a reference lock identifier, any mistake related to traveling to an incorrect isolation point 1202 to initially place a lock, or verify or confirm a lock placement are eventually detected and addressed.

Figure 13A:
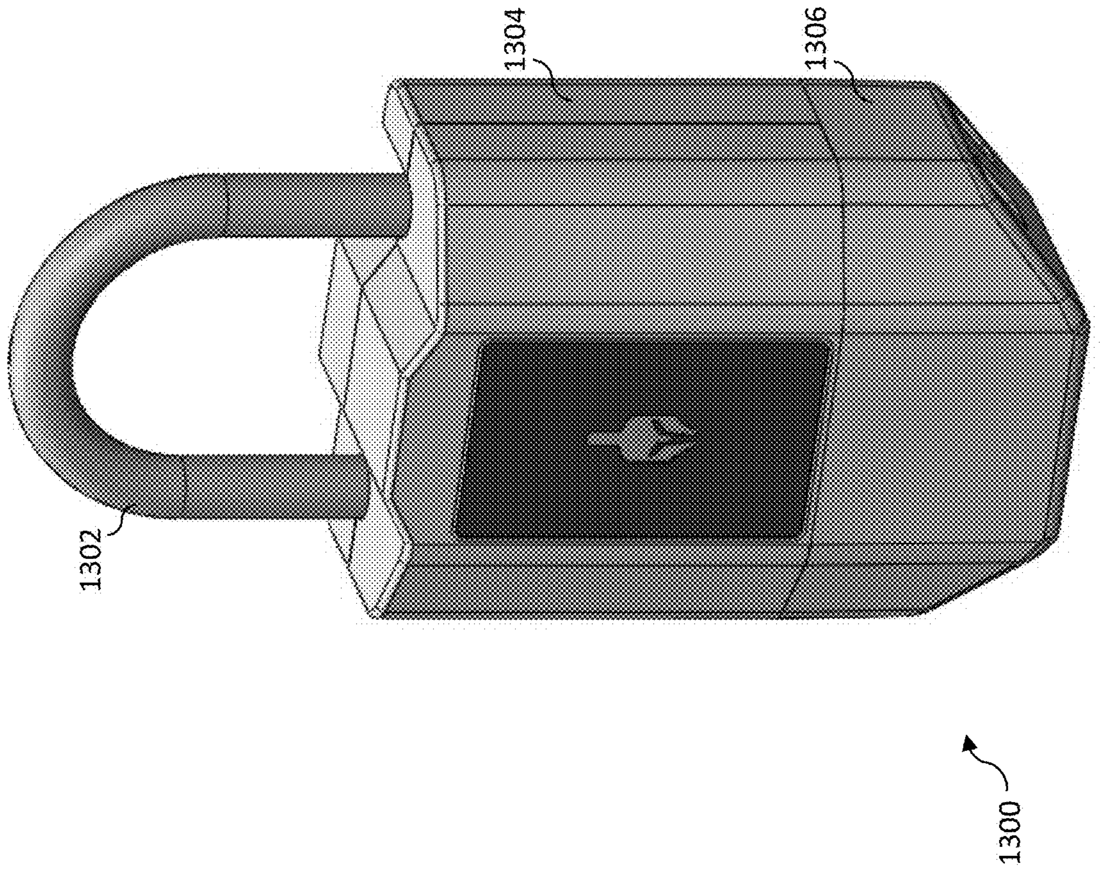
FIG. 13A depicts a lock that may be used in connection with embodiments of a safety system disclosed herein, in accordance with certain embodiments thereof.

FIG. 13A depicts an embodiment of a lock 1300, which may be used in connection with any of the embodiments of the safety system disclosed herein. As can be seen from FIG. 13A, the lock 1300 includes a shackle 1302 that is made of a hard material with a tensile strength of approximately 50,000 psi or more. For example, the shackle 1302 may be made of steel. The lock 1300 also includes an upper housing 1304 and a lower housing 1306, which are made of a dielectric material that is hard and has a tensile strength approximately of approximately 9000 psi or more. For example, the upper and lower housings 1304 and 1306 may be made of a strong polymer or plastic, such as nylon 66 or an ultraviolet resistant polycarbonate, such as the particular polycarbonate that is commercially marketed as HYLEX® P1310FR or other similar polymers and polycarbonates. Other members or pieces described herein as being constructed from polycarbonate may also be made from nylon, such as nylon 66, or other similar polymers.

Figure 13B:
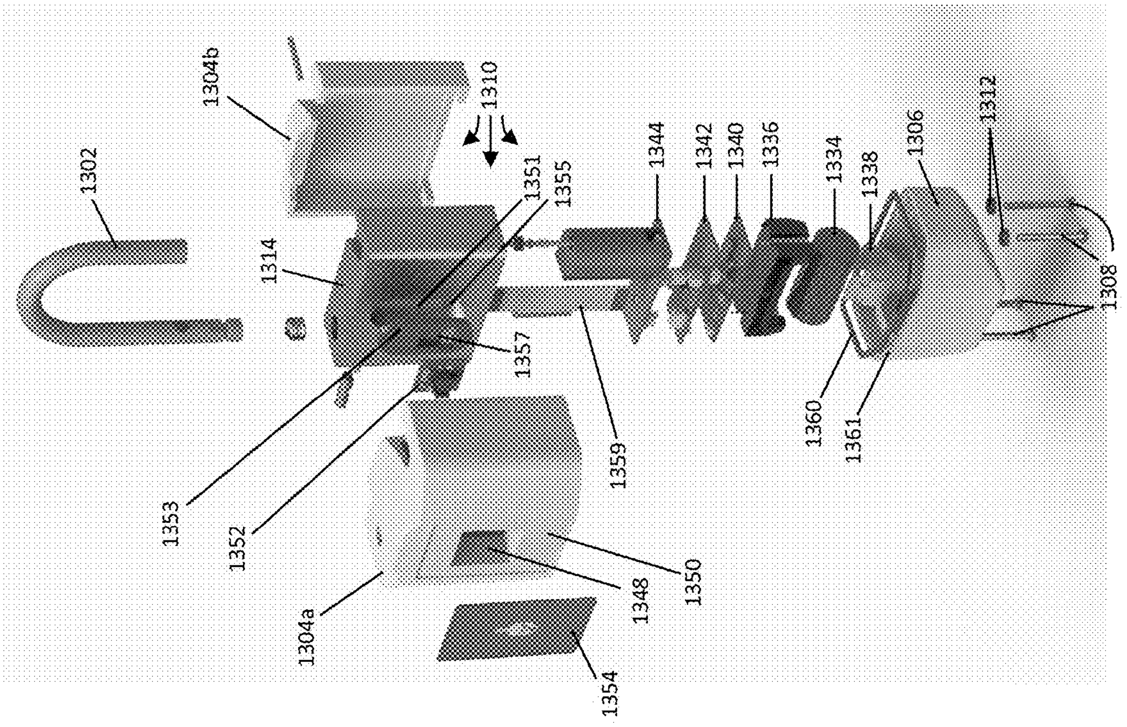
FIG. 13B depicts an exploded view of a lock that may be used in connection with embodiments of a safety system disclosed herein, in accordance with certain embodiments thereof.

The upper and lower housings 1304 and 1306 are joined to one another by threaded fasteners 1308 which are depicted in FIG. 13B, which is an exploded view of the lock 1300. The particular embodiment depicted in FIGS. 13A and 13B shows an upper housing 1304 that is constructed of a front upper housing 1304*a* and rear upper housing 1304*b*, which may be joined, such as with an adhesive, to form an upper housing 1304. According to some embodiments, the front upper housing 1304*a* and rear upper housing 1304*b* are joined together with silicone to prevent water intrusion. As can be seen in FIG. 13B, the upper and lower housings 1304 and 1306, when coupled together via the threaded fasteners 1308, cooperate to define an interior region 1310 that houses various elements of the lock 1300. Sealing washers 1312 may be interposed between the heads of the threaded fasteners 1308 and the outer surface of the lower housing 1306 to seal off the various orifices through which the threaded fasteners 1308 extend, thereby preventing contaminants such as oil, water and dust from reaching the interior region 1310 of the lock 1300 via such orifices. Additionally, a sealing gasket 1360 may be interposed between the upper housing 1304 and the lower housing 1306 to prevent such contaminants from entering the interior region 1310 at the seam where the upper housing 1304 and the lower housing 1304 meet. According to some embodiments, the lower housing 1306 includes a lip 1361 extending around the periphery of the lower housing 1306, wherein the lip 1361 is dimensioned to as to permit the gasket 1360 to fit snugly therein, while permitting the upper surface of the gasket 1360 to make contact with lower surface of the upper housing 1304. According to some embodiments, the upper and lower housings 1304 and 1306 may join together in a tongue-and-groove configuration, and the sealing gasket 1360 may be disposed within such groove. For example, the lower housing 1306 may define a groove extending along its periphery, such as approximately where the lip 1361 is depicted as being defined in FIG. 13B, and the sealing gasket 1360 may be seated within such groove. The upper housing 1304 may define a tongue extending along its periphery, and the tongue may be dimensioned to fit snugly within the aforementioned groove, and to cooperated with the gasket 1360, so as to seal off the interior region 1310 of the lock 1300.

Figure 13C:
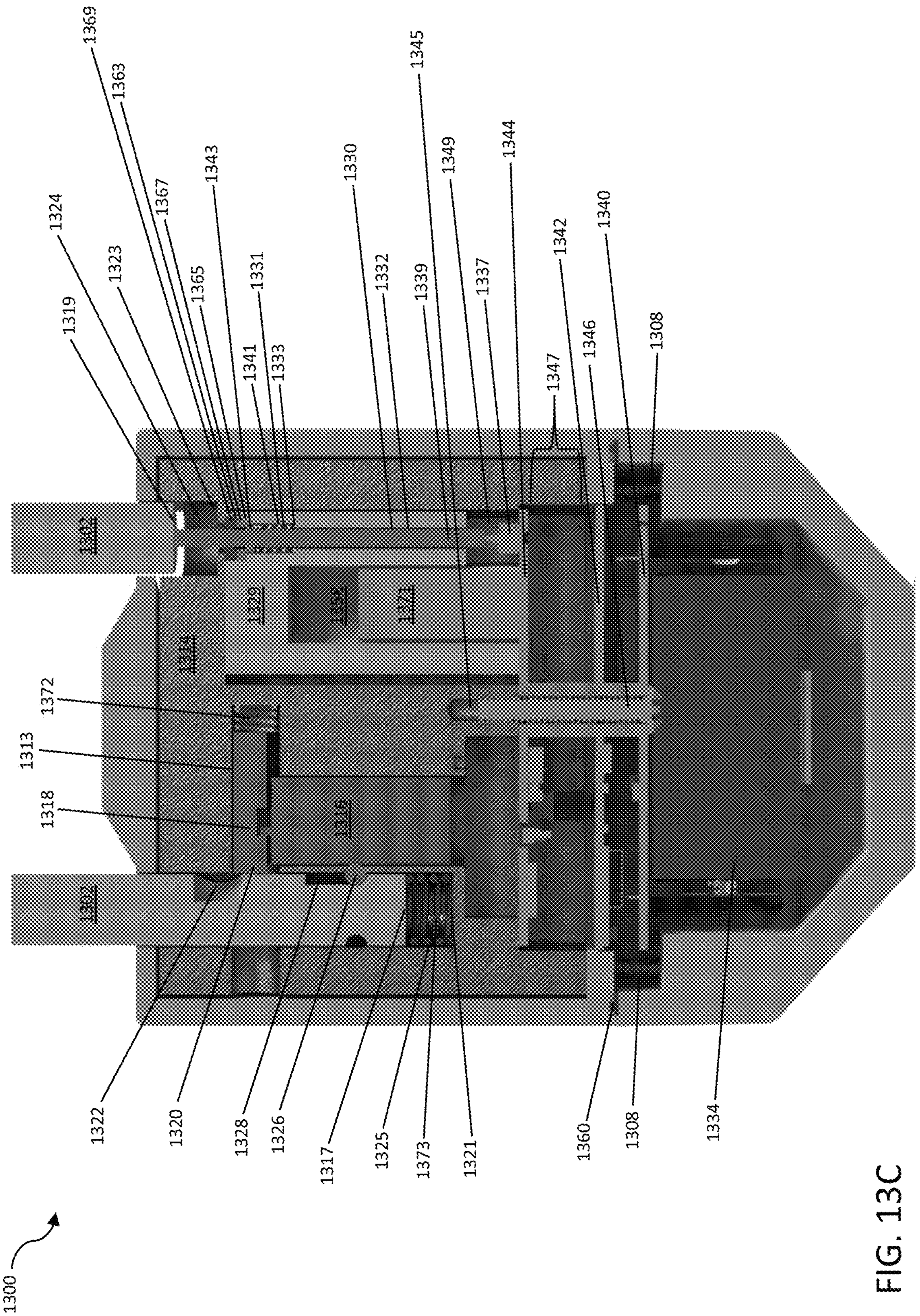
FIG. 13C depicts a cross-sectional view of a lock that may be used in connection with embodiments of a safety system disclosed herein, in accordance with certain embodiments thereof.
Figure 13D:
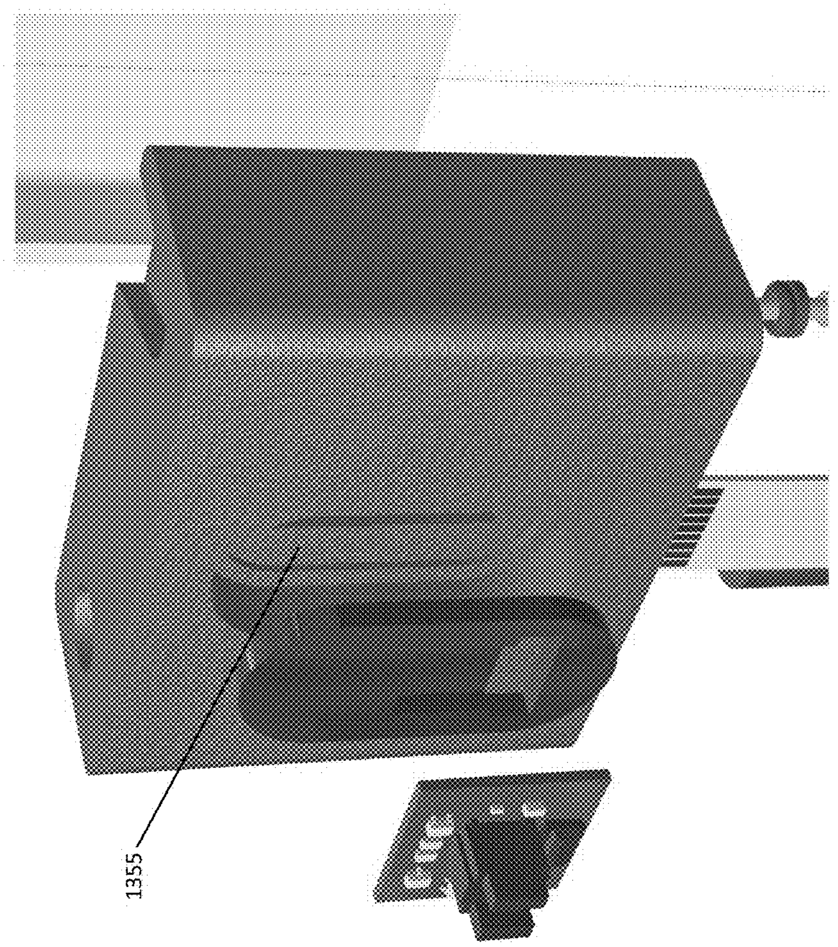
FIG. 13D depicts an enlarged view of a lock body within the aforementioned lock, in accordance with certain embodiments thereof.

FIG. 13C depicts a cross-sectional view of the lock 1300. (For the sake of presenting a clear view of certain elements, discussed below, the depiction of FIG. 13C is enlarged, resulting in portions of the shackle 1302 being eliminated from depiction in FIG. 13C.) As can be seen from FIG. 13C, the interior region 1310 of the lock 1300 includes a lock body 1314. The lock body 1314 may be made of a strong, hard material, with a tensile strength of approximately 40,000 or 50,000 psi or more, such as aluminum or steel, for example. The lock body 1314 houses a motor 1316, which, in turn, actuates a locking pin 1318 that is situated in a channel or void 1313 defined by the lock body 1314. According to some embodiments, the locking pin 1318 is made of a strong, hard material, with a tensile strength of approximately 40,000 or 50,000 psi or more, such as aluminum or steel, for example. According to some embodiments, the motor 1316 is coupled to the locking pin 1318 (such as through a cam mechanism), such that it can advance the locking pin 1318 so that its leading edge 1320 enters a notch 1322 formed in the shackle 1302, thereby preventing the shackle 1302 from being withdrawn from a shackle receptacle 1324 defined by the lock body 1314, meaning that the lock 1300 is in a locked state. As depicted in FIG. 13C, the lock 1300 is unlocked and the shackle 1302 is opened-if it were the case that the shackle 1302 were closed, then each end 1317 and 1319 of the shackle 1302 would approach the bottom surface 1321 and 1323 of each respective shackle receptacle 1324 and 1325 defined by the lock body 1314, and the aforementioned notch 1322 would come into alignment with the locking pin 1318, so that the pin 1318 could be introduced into the notch 1322, thereby locking the lock 1300. According to some embodiments, the pin 1318 is biased (such as by a biasing spring 1372) so as to tend toward entry into the aforementioned notch 1322, so that the lock 1300 enters into a locked state-without action of the motor 1316—when the shackle 1302 is depressed and the notch 1322 aligns with the pin 1318. As can be seen from FIG. 13F, according to some embodiments, the motor 1316 includes an output shaft 1303 that is situated within a notch 1305 defined by the locking pin 1318. The output shaft 1303 is eccentrically disposed relative to the rotational axis of the motor (the rotational axis is indicated by the dashed vertical line in FIG. 13F), so that the output shaft 1303 travels an approximately circular path about the aforementioned rotational axis when the motor 1316 is running. Thus, to unlock the lock, the motor 1316 may turn about the rotational axis in the direction indicated by arrow 1311. The notch 1305 is dimensioned so that the output shaft 1303 travels freely until the shaft 1303 meets the trailing edge 1309 of the notch 1305, at which point, further rotation of the motor 1316 causes the locking pin 1318 to be pulled out of the notch 1322 of the shackle 1302 completely, and for the biasing spring 1372 to be compressed, at which point the motor 1316 can rotate no further. According to some embodiments, the motor 1316 exhibits cogging, such that the biasing spring 1372 is unable to push the output shaft 1303 with its own spring force. Thus, upon the spring becoming fully compressed, the motor 1316 may coast for a brief period—still abutting the trailing edge 1309 of the notch 1305—so that the output shaft 1303 remains a barrier to the biasing spring 1372 urging the locking pin 1318 back into the notch 1322, prior to the shackle 1302 popping open under the force of the ejection spring 1373. In other words, the purpose of the coasting period is to prevent a race condition between: (i) the shackle 1302 popping up; and (ii) the locking pin 1318 immediately re-entering the notch 1322, thereby preventing the shackle 1318 from popping up. During this brief period of coasting, the shackle 1302 pops open (as shown in FIG. 13F). Thereafter, the motor 1316 rotates about the rotational axis in the direction indicated by arrow 1374, until it meets the leading edge 1307 of the locking pin 1318, at which point, the motor 1316 can no longer rotate 1316, because the leading edge 1320 of the locking pin 1318 is abutting the shackle 1302, preventing the output shaft 1303 from having freedom to continue in its approximately circular route of travel. This state is shown in FIG. 13F. When the shackle 1302 is closed, the notch 1322 of the shackle 1302 will come into alignment with the locking pin 1318, and the biasing spring 1372 will force the locking pin 1318 into the notch 1322, with the output shaft 1303 having been previously positioned so as to not inhibit the travel of the locking pin 1318 into the notch 1322, thereby putting the shackle 1302 into a locked state. It should be noted that when the locking pin 1318 is withdrawn from the notch 1322, the shackle 1302 is free to move in a range of motion defined by a retaining pin 1326 and a retaining groove 1328, i.e., the shackle 1302 may be withdrawn until the bottom edge of the retaining groove 1328 meets the retaining pin 1326. This range of motion is sufficient to permit the unretained end 1319 of the shackle 1302 to be completely removed from the shackle receptacle 1324, while the retained end 1317 remains within the shackle receptacle 1325. According to some embodiments, a shackle ejection spring 1373 is disposed on the bottom surface 1321 of the shackle receptacle 1325, and operates so that upon the locking pin 1318 having been withdrawn from the aforementioned 1322, the shackle 1302 is ejected so that the unretained end 1319 of the shackle 1302 exits the shackle receptacle 1324 (i.e., the shackle 1302 "pops up" upon being unlocked).

Returning to FIG. 13B, the interior region 1310 of the lock 1300 houses a battery 1334, such as a 3-volt CR-123 with lithium-ion electrochemistry. The battery 1334 is housed in a battery holder 1336, and retained therein by a battery clip 1338. Also housed within the interior region 1310 are a set of printed circuit boards 1340, 1342 and 1344 that contain a plurality of electrically conductive paths disposed thereon, which, in turn, operatively interconnect various circuit elements mounted on the various printed circuit boards 1340, 1342 and 1344 (such as via surface mounting). The electronic circuits on the boards 1340, 1342 and 1344, are interconnected with one another via connectors that interconnect the boards 1340, 1342, and 1344. The circuits are discussed herein in greater detail with reference to FIG. 14. The battery holder 1336 is mechanically coupled to printed circuit board 1340, which is coupled to printed circuit board 1342, which is, in turn, coupled to printed circuit board 1344. The boards 1340, 1342 and 1344 are coupled to one another via threaded fastener 1346 received by a receptacle 1345 in a recessed surface of the lock body 1314. According to some embodiments, one or more boards 1340, 1342 and 1344 are situated within the aforementioned recess 1347 (FIG. 13C). The battery 1334 is electrically coupled to leads on the battery holder 1336, which are, in turn, electrically coupled to the conductive paths on the printed circuit boards 1340, 1342 and 1344, thereby providing a source of power to the circuitry thereon. According to some embodiments, the battery 1334 may be accessed by a user of the safety system (such as may be required in the event that the battery 1334 is to be replaced) by the loosening threaded fasteners 1308 and removing the lower housing 1306 from the upper housing 1304.

According to some embodiments, the front upper housing 1304*a* defines an orifice 1348, which may be generally rectangular, and which may be surrounded by a lip 1350 that is recessed in relation to the remainder of the front face of the front upper housing 1304*a*. The lock body 1314 defines an aperture 1351 and further defines a recessed lip 1355 that is accessible via the aperture 1351 (the recessed lip 1355 is more clearly visible in FIG. 13D.) The aperture 1351 and orifice 1348 align when the front upper housing 1304*a* and rear upper housing 1304*b* are enclosed around the lock body 1314. An insert or platform member 1353, which defines a void 1357 is disposed upon the recessed lip 1355. The aperture 1351, void 1357 and orifice 1348 align when the front upper housing 1304*a* and rear upper housing 1304*b* are enclosed around the lock body 1351. A circuit board 1352 is disposed upon the platform member 1353, within the aperture 1351. The circuit board 1352 is electrically coupled to circuit boards 1340, 1342 and 1344, such as by an electrical ribbon connector 1359 that is coupled to circuit board 1344, and extends through the hollow interior region of the lock body 1314, through the aperture 1351 and through the void 1357 to couple to the circuit board 1352, meaning the circuit board 1352 is also electrically coupled to the battery 1334 and powered thereby. The circuit board 1352 contains a push-button switch circuit and a composite light element such as a red-green-blue (RGB) light-emitting diode (LED), the circuits of which are discussed in more detail with reference to FIG. 14.

A membrane 1354 that may include a translucent region or pattern is disposed upon the aforementioned recessed lip 1350 of the orifice 1348, such as via an adhesive that bonds or adheres the surface of the lip 1350 to the membrane 1354. A user of the safety system may depress the membrane 1354, which may be flexible, thereby pressing the push-button switch circuit, causing it to close. According to some embodiments, this causes the lock 1300 to power up or exit a sleep state, and to begin advertising to pair via Bluetooth, as discussed in more detail below. According to some embodiments, the aforementioned composite light element illuminates and presents a color and/or blinking pattern under the control of firmware executing on a microcontroller that is mounted on one of the circuit boards 1340, 1342, or 1344. Because the membrane 1354 is translucent, it may appear to a user to glow the color being emitted by the composite light element behind it. According to some embodiments, the membrane 1354 includes a transparent or translucent region that defines a shape or pattern, such as may be recognized as a logo, and the light emitted by the composite light element is transmitted through such region with less loss than is yielded via transmission through the other more opaque portion of the membrane.

Returning discussion to FIG. 13C, the lock body 1314 defines a channel or void 1349 extending from printed circuit board 1344 to the shackle receptacle 1324. A rigid rod 1339 is contained in the channel 1349, extending to a point in proximity of the bottom surface of the shackle receptacle 1324 at the upper end of the rod 1339, and to a top surface of a microswitch 1337 at its lower end. When the unretained end 1319 of the shackle 1302 is introduced into the shackle receptacle 1324 so as to put the lock 1300 in a locked state, the bottom surface of the unretained end 1319 of the shackle 1302 makes contact with the rod 1339 and causes it to travel in a downward direction. The travel of the rod 1339 is sufficient to cause the microswitch 1352 to close, thereby generating a signal indicating to firmware executing on a microcontroller on one of the printed circuit boards 1340, 1342, and 1344 that the shackle 1302 is closed and the lock 1300 is in a locked state (in the context of embodiments wherein the lock 1300 automatically locks when the shackle 1302 is closed-discussed previously). According to some embodiments, the microswitch 1337 is biased to an open state, and must be depressed a certain distance to close (example: must be depressed a quantity of x millimeters to close). After having been depressed the required distance to close the microswitch 1337, the microswitch 1337 may present an elective span of travel (example: the microswitch 1337 may be depressed an additional quantity of y millimeters, after having been depressed the required x millimeters to close the switch). According to some embodiments, the rod 1339 is dimensioned so as to extend from the top surface of the microswitch 1337 and protrude from the bottom surface 1323 of the shackle receptacle 1324 by a quantity of x+y/2 millimeters, so that closure of the shackle 1302 causes the rod 1339 to depress the microswitch 1337 approximately into the center of its span of elective travel.

Discussion now returns to the topic of the void 1349. As can be seen from FIG. 13C, according to some embodiments, an insert 1329 is force-fit into the aforementioned void 1349. According to some embodiments, the insert 1329 may be constructed from plastic mold injection, and may be constituted of the previously mentioned polycarbonate material or other similar materials. The insert 1329 defines a channel 1330 through which the previously mentioned rod 1339 extends. According to some embodiments, the channel 1330 is generally cylindrical, with an upper portion 1331 having a diameter larger than a lower portion 1332, and a top portion 1363 having a diameter larger than the upper portion 1331. By virtue of the expansion in diameter of the upper portion 1331 relative to the lower portion 1332, an annular platform 1333 is formed within the channel 1330 at the top of the lower portion 1332. A spring 1341 is disposed atop the annular platform 1333, extending to a bottom surface of a flange 1343 defined by the rod 1333. By further virtue of the expansion in diameter of the top portion 1363 relative to the upper portion 1331, an annular platform 1365 is formed within the channel 1330 at the top of the upper portion 1331. A washer 1367 is disposed atop the annular platform 1365, with an o-ring 1369 disposed atop the washer 1367. The rod 1339 penetrates the respective orifices of the annular platform 1365 and o-ring 1369, so that they each encircle the rod 1339. The o-ring 1369 fits snugly around the rod 1339. According to some embodiments, the o-ring 1369 is made of a stretchable, deformable polymer, such as silicone, and the orifice of the o-ring 1369 is slightly smaller than the diameter of the rod 1339, so that the rod 1339 expands or stretches the o-ring 1369 as the rod 1339 penetrates it. The aforementioned spring 1341 exerts an upward force upon the flange 1343, resulting in an upward bias of the rod 1339, as a whole. Thus, the default position of the rod 1339 is upward, and the microswitch 1337 is, by default, open. It is only when the unretained end 1319 of the shackle 1302 is introduced into the shackle receptacle 1324 that the rod 1339 is pushed in a downward direction (overcoming the upward biasing force of the microswitch 1337 and the spring 1341), thereby closing the microswitch 1337. As a consequence of the biasing action of the spring 1341 and the microswitch 1337, when the unretained end 1319 of the shackle 1302 is withdrawn from the shackle receptacle 1324, the microswitch 1337 is open. Thus, the aforementioned firmware is supplied with a signal by which it can determine whether the shackle 1302 is open or closed, and whether the shackle 1302 has been cut (the microswitch 1337 may be electrically coupled to an input/output pin or port, such as a general purpose I/O pin or port, of a microcontroller disposed on one of the printed circuit boards 1340, 1342 or 1344). For example, one may consider that the lock 1300 may be embodied so as to function in certain manners: (1) to automatically lock, upon the shackle 1302 being closed, and for the shackle 1302 to automatically "pop up," upon being unlocked, which is referred to below as a Type 1 lock 1300; (2) to refrain from automatically locking, upon the shackle 1302 being closed, so that it must be locked by a second step, such as via receipt of a command that causes the motor 1316 to advance the locking pin 1318, as discussed above, and for the shackle 1302 to automatically "pop up," upon being unlocked, such lock being referred to below as a Type 2 lock 1300; (3) to refrain from automatically locking, upon the shackle 1302 being closed, so that it must be locked by a second step, such as via receipt of a command that causes the motor 1316 to advance the locking pin 1318, as discussed above, and for the shackle 1302 to refrain from automatically "popping up," upon being unlocked, so that the shackle 1302 must be opened manually after having unlocked the lock 1300, and which further relocks itself (such as by driving current through the motor 1316 to cause the locking pin 1318 to engage the notch 1322), if, after a threshold period of time elapses, the shackle 1302 has not been manually opened, such lock 1300 being referred to below as a Type 3a lock 1300; and (4) to refrain from automatically locking, upon the shackle 1302 being closed, so that it must be locked by a second step, such as receipt of a command that causes the motor 1316 to advance the locking pin 1318, as discussed above, and for the shackle 1302 to refrain from automatically "popping up," upon being unlocked, so that the shackle 1302 must be opened manually after having unlocked the lock 1300, and which does not relock itself, even if the shackle 1302 is never manually opened, such lock 1300 being referred to below as a Type 3b lock 1300. According to some embodiments, then, the aforementioned firmware may determine that the shackle has been cut, if the lock 1300 transitions from a locked state to an open state, outside of an unlocking period, wherein the terms "locked state," "open state," and "unlocking period" may vary in definition, based upon the type of the lock 1300 (i.e., Type 1, Type 2, Type 3a or Type 3b). For example, for Type 1 and Type 2 locks 1300, an unlocking period may be defined as beginning when the firmware initiates delivery of electrical current to the motor 1316, and ending at the time the firmware halts delivery of electrical current to the motor 1316. According to some embodiments, such an unlocking period may be expanded by a period of time to permit the action of the shackle ejection spring 1373 to complete, so as to eject the shackle 1302 (example: the unlocking period is expanded by 0.5 second). According to other embodiments, for Type 1 and Type 2 locks 1300, an unlocking period may be defined as beginning when the firmware initiates delivery of electrical current to the motor 1316, and ending at the time the firmware detects the microswitch 1337 open. Hence, although the signal received by the firmware (from the micro switch 1337) is not the result of directly measuring the physical integrity of the shackle 1302, the firmware can determine that the shackle 1302 was cut, if it is the case that the lock transitions from a locked state to an open state outside of the unlocking period, because the span of time constituting the unlocking period is the only time during which such a transition could be made without the shackle 1302 having been cut. Moving on to a Type 3a lock 1300, an unlocking period may be defined as beginning when the firmware initiates delivery of electrical current to the motor 1316, and ending upon the earlier of: (i) firmware having detected that the microswitch 1337 has opened; or (ii) the firmware having halted delivery of electrical current to the motor 1316 in the context of relocking the lock. Now considering a Type 3b lock 1300, an unlocking period may be defined as beginning when the firmware initiates delivery of electrical current to the motor 1316, and ending upon the firmware having detected that the microswitch 1337 has opened. Having presented examples of how to define an unlocking period for Types 1, 2, 3a and 3b locks 1300, discussion now turns to defining locked states and open states for each such variety of lock 1300. For a Type 1 lock 1300, a locked state may be defined as the firmware having detected that the microswitch 1337 is closed (the lock 1300 is in a locked state when the shackle 1302 is closed, because a Type 1 lock automatically locks when the shackle is closed). In the context of Type 2, 3a and 3b locks 1300, a locked state is defined as the firmware having completed the act of causing electrical current to be driven to the motor 1316 in order to cause the locking pin 1318 to engage the notch 1322, if and only if the microswitch 1337 was closed during the period in which current was being driven to the motor 1316 (these Types of locks do not automatically lock, so the shackle 1302 must be closed so that the notch 1322 aligns with the locking pin 1318, and the motor 1316 must be activated to advance the locking pin 1318 into the notch 1322). For Type 1, Type 2, Type 3a and Type 3b locks, an open state may be defined as the firmware having detected that the microswitch 1337 is open. According to some embodiments, the physical integrity of the shackle 1337, itself, is detected, and the aforementioned microcontroller is supplied with a signal via an input/output pin, indicating the condition of the physical integrity of the shackle 1337 (example: intact or not intact, which may be represented at TRUE/FALSE or I/O). For example, a field such as an electrical field or magnetic field may be guided through the shackle 1337 from one end (1317 or 1319) and detected at the other end (1317 or 1319). According to other embodiments, an electrical current may be continuously or intermittently conducted through the shackle 1337 so that the current travels from one end (1317 or 1319) and detected at the other end (1317 or 1319), and the interruption of such current may be detected. According to other embodiments, such a current may be conducted along a conductor (example: a copper wire—insulated or not) embedded within shackle, such as being embedded at its longitudinal axis (as understood prior to the bending operation undergone by the shackle 1337 during its manufacture). According to other embodiments, a continuous or intermittent optical signal may be directed through an optical channel (example: an optical fiber) embedded within shackle, such as being embedded at its longitudinal axis. According to other embodiments, the shackle 1337 may be permanently magnetic or contain a permanently magnetic element embedded within it at a location proximal to one of its ends (1317 or 1319), and absence or presence of a magnetic field emanating from such magnetic element may be detected and delivered to the firmware via an input/output pin of the microcontroller on which the firmware is executing. According to other embodiments a the shackle 1337 may be made of or have embedded within it (such as along its longitudinal axis) a material of high magnetic permeability, and a permanent magnet may be disposed at one end (1317 or 1319) so that the presence or absence of a magnetic field could be detected at the other end (1317 or 1319), and absence or presence of such a magnetic field may be detected and delivered to the firmware via an input/output pin of the microcontroller on which the firmware is executing. (Example, a magnet may be disposed at one end 1317 or 1319 of the shackle 1337, which may be made of or contain within and along it a material of suitable magnetic permeability so that the material, itself, becomes magnetized, i.e., becomes a magnet, while at the other end 1317 or 1319, a magnetically actuated switch is disposed, so that in the event the shackle 1337 is compromised, the magnetic field is disturbed at the end 1317 or 1319 at which the magnetically actuated switch is located, and a signal is sent to an input/output port or pin of the aforementioned microcontroller indicating the event.)

Figure 13E:
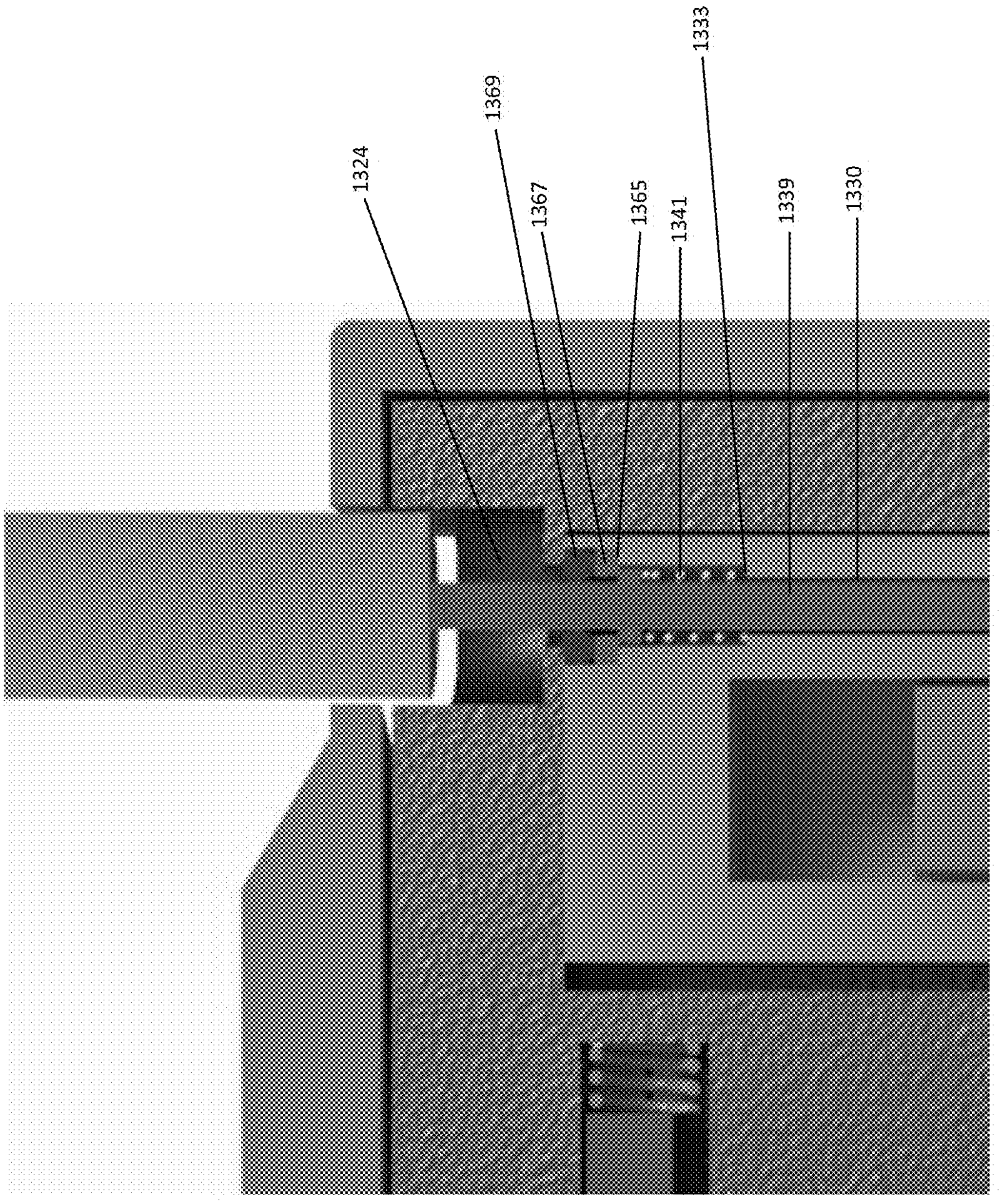
FIG. 13E depicts an enlarged cross-sectional view of a lock that may be used in connection with embodiments of a safety system disclosed herein, in accordance with certain embodiments thereof.
Figure 13F:
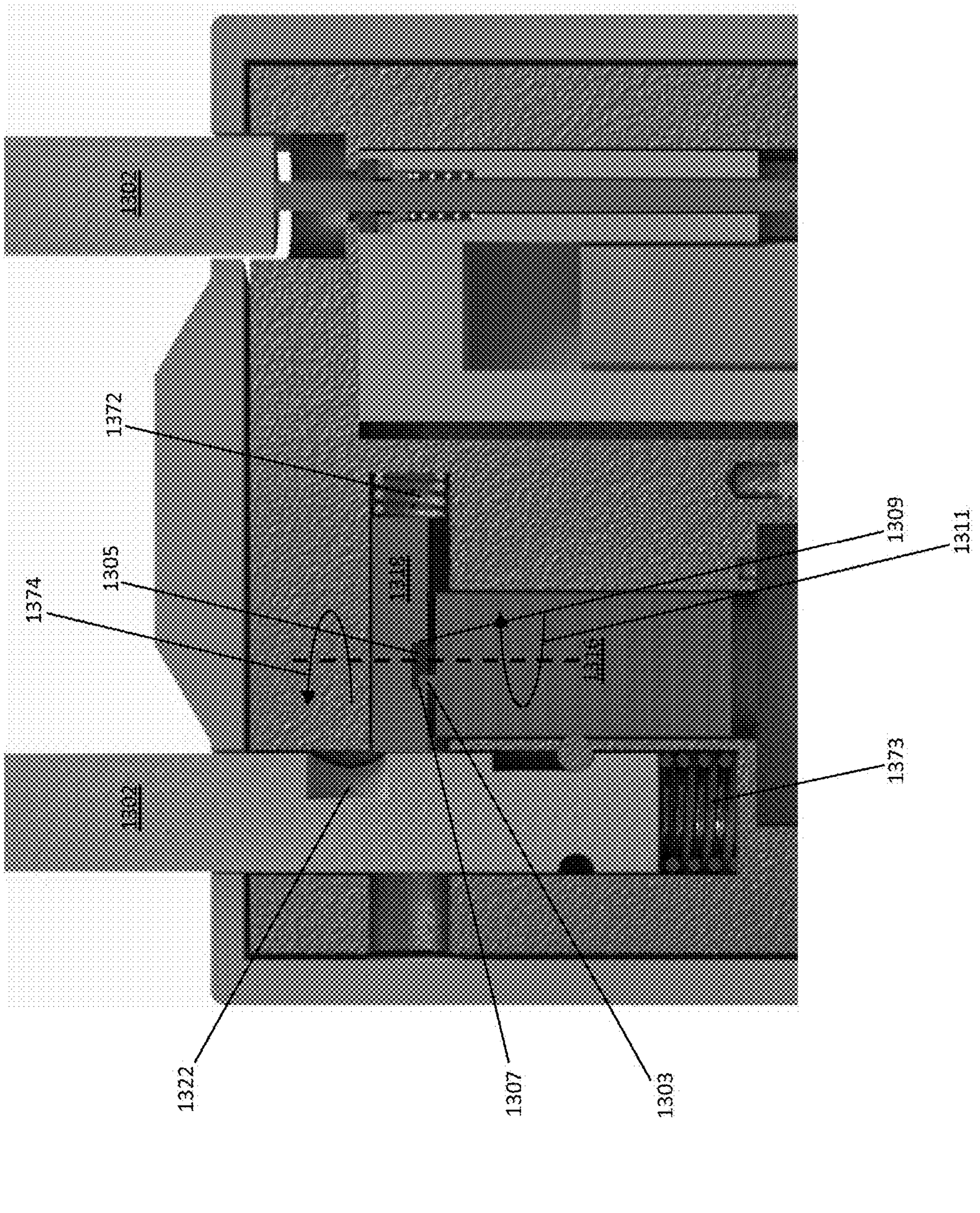
FIG. 13F depicts another enlarged cross-sectional view of a lock that may be used in connection with embodiments of a safety system disclosed herein, in accordance with certain embodiments thereof.

For the sake of clear presentation of certain of the elements proximal to the unretained end 1319 of the shackle 1302, FIG. 13E presents and enlarged and truncated view of that region of the lock 1300.

Returning discussion to the structure of the lock 1300, the washer 1367 and o-ring 1369 are wedged tightly between the annular platform 1365 and the lower surface of the shackle receptacle 1324, and do not move or are otherwise nearly motionless as the rod 1339 is displaced upwardly or downwardly along the channel 1330. The o-ring 1369 prevents the contaminants such as oil, water, and particulate matter from travelling down the channel 1330 of the insert 1329 and reaching the printed circuit boards 1340, 1342 and 1344. According to some embodiments, the o-ring 1369 and washer 1367 are dimensioned such that, together, they have a combined height that is greater than the distance between the annular platform 1365 and the lower surface of the shackle receptacle 1324, so the o-ring 1369 must be compressed and deformed so as to fill the space in the top portion 1363 of the channel 1330 (example: the o-ring 1369 and washer 1367 may have a combined height of approximately 2.5 mm, while the distance between the annular platform 1365 and the lower surface of the shackle receptacle 1324 is only approximately 2.3 mm, so that the o-ring 1369 must be compressed approximately 0.2 mm, and therefore deform outwardly and fill the space in the top portion 1363 of the channel 1330).

As can be seen in FIG. 13C, a void 1358 is depicted as being defined by the insert 1329. According to some embodiments, the void 1358 houses a supercapacitor 1371. The supercapacitor 1371 may be used to power the various circuits of the lock 1300 during periods when the battery 1334 is unable to do so (such as when the battery 1334 has been removed so that it can be changed or during a period where the voltage of the battery 1334 has been drawn down). Details relating to the supercapacitor 1371 are presented below with reference to FIG. 14A.

For the sake of clear presentation of certain of the elements proximal to the unretained end 1319 of the shackle 1302, FIG. 13E presents an enlarged and truncated view of that region of the lock 1300.

Figure 13G:
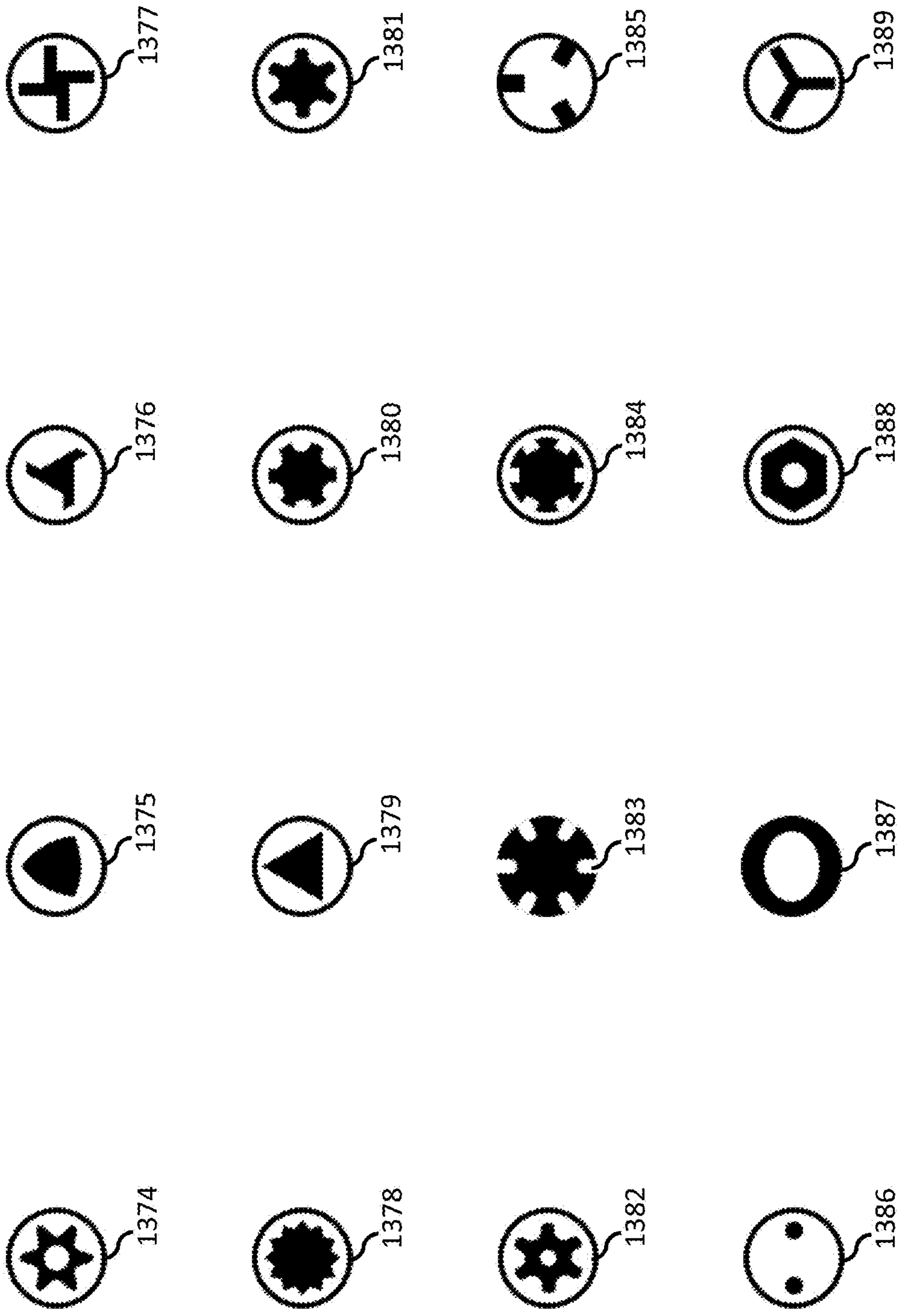
FIG. 13G depicts exemplary embodiments of heads of tamper-proof threaded fasteners that may be used in connection with the various embodiments of the aforementioned lock.

Previously, it was stated that the battery 1334 could be accessed by a user of the security system by loosening the threaded fasteners 1308 and separating the lower housing 1306 from the upper housing 1304. Unauthorized access to the battery 1334 would be potentially detrimental to the goal of continual and secure operation of the security system, including its locks 1300. Therefore, according to some embodiments, the threaded fasteners 1308 include a tamperproof or proprietary head, as shown in FIG. 13G. For example, the threaded fastener 1308 may use a security Torx head 1374, a tri-lobular head (TP3 head) 1375, a tri-wing head 1376, a Torq-set head 1377, a 12spline flange head 1378, a Tri-angle head (TA head) 1379, a polydrive head 1380, a line head 1381, 1382 or 1383, a Bristol head 1384, a Tri-groove head 1385, a spanner head 1386, an oval head 1387, a security hex head 1388, a Tri-point head (TP head) 1389, or another such head recognized as a tamperproof or security head.

Figure 14A:
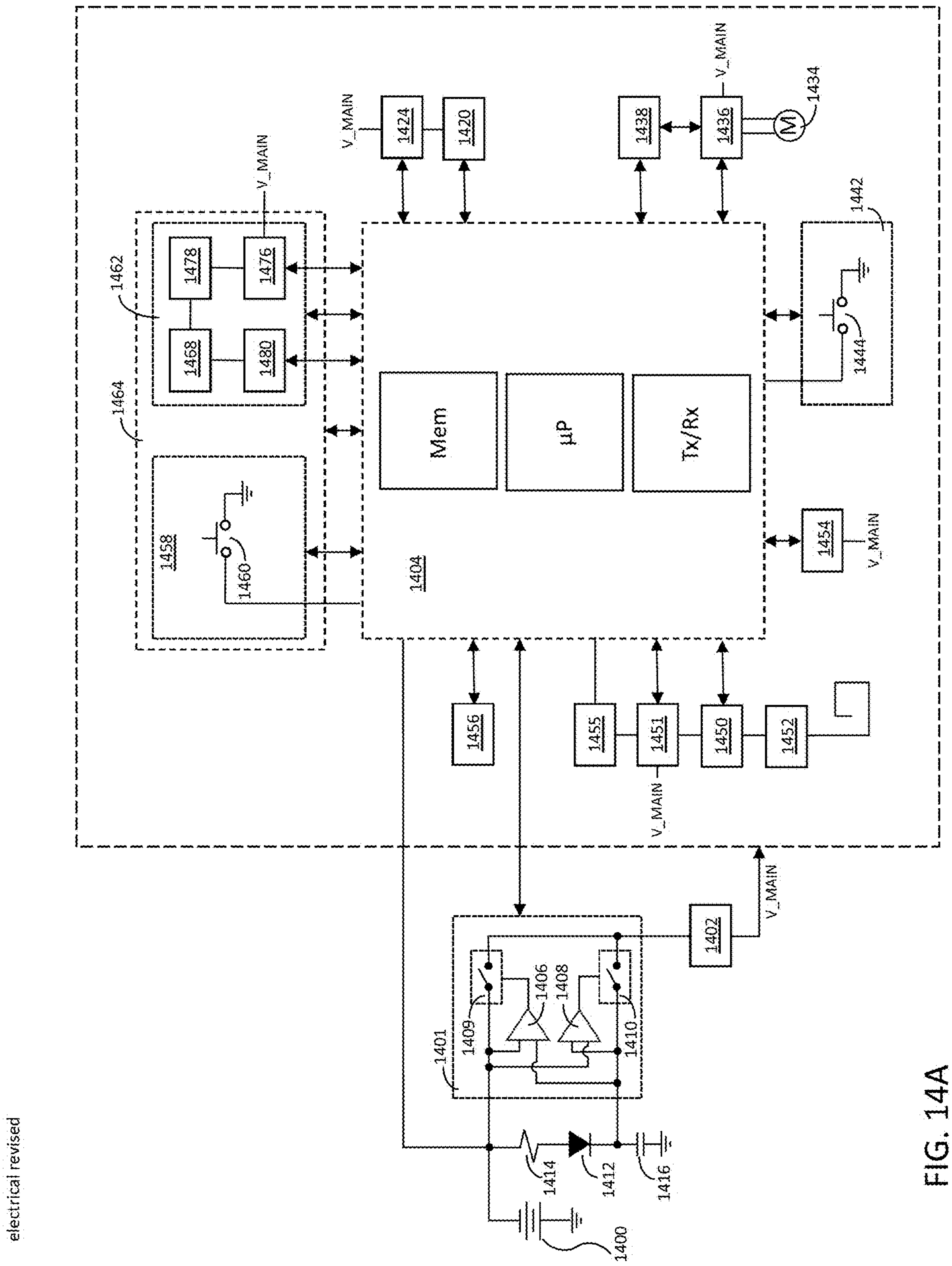
FIG. 14A depicts an exemplary embodiment of a functional block diagram of the electronic system of the various embodiments of the aforementioned lock

FIG. 14A depicts an exemplary functional block diagram of circuitry for a lock in accordance with some embodiments, such as lock 1300 depicted in FIGS. 13A-13G. As a functional block diagram, FIG. 14A omits or does not in all cases depict ordinary circuitry understood as required by the functional blocks included therein (examples: each functional block is not necessarily depicted as connected to a power source or ground, although such connections are understood to be necessary; circuit elements for each functional block to operate are not always included; circuit elements for impedance matching, filtering, biasing, and so on are omitted or not always included; simple supporting circuit elements are omitted such as crystals or oscillators required to permit operation of a processor or modulator, and so on). Those of ordinary skill in the art will understand these elements to be implied by the functional block diagram of FIG. 14A, itself.

The circuitry depicted in FIG. 14A is powered by a battery 1400. The battery 1334 depicted in FIG. 13B is an example of battery 1400. According to some embodiments, the battery 1400 provides 3 volts of electrical potential and a total energy storage of at least 800 or 1,600 mAh. According to some embodiments, the battery 1400 provides 3.6 volts of electrical potential and a total energy storage of at least 2,000 mAh or 2,200 mAh. According to some embodiments, the electrochemical composition of its cell is lithium-ion. According to some embodiments the battery's 1400 electrochemical composition is Lithium Thionyl Chloride.

As can be seen from FIG. 14A, the battery 1400 is coupled to a capacitor 1416 through a resistor 1414 and a diode 1412. The capacitor 1416 is a supercapacitor, which is to say that it is a capacitor with sufficient capacitance to store a quantity of energy capable of running the various circuits of the lock for a period of time in the event that there is a disruption in current delivery from the output of the battery 1400 or the battery 1400 is otherwise unable to properly provide the power required for such circuits to operate properly. For example, in the event that the battery 1400 is removed from the lock, such as might occur if the battery 1400 is changed, there would be an immediate disruption in battery 1400 power supply, and this would cause a chain of events (discussed below) leading to energy stored in the supercapacitor 1416 to be drawn therefrom to power the various circuits of the lock. According to some embodiments, the supercapacitor 1416 is of sufficient capacitance to operate the circuits of the lock for a period of sufficient duration to permit the battery 1334 to be changed (example: 10 seconds, or 30 seconds or more, and according to some embodiments, more than a minute or 15 minutes). According to some embodiments, the supercapacitor 1416 has a capacitance of at least 0.25 farads, and according to other embodiments it has a capacitance of at least 0.5 farads or at least 1 farad, 2 farads or more. By virtue of the imposition of diode 1412, upon being fully charged, a voltage equal to the battery voltage, less the forward voltage drop of the diode 1412, will be exhibited across the capacitor 1416 ($V_{cap}=V_{bat}-V_f$).

The battery 1400 and the positively charged end of the supercapacitor 1416 are each coupled to a source selector 1401. The source selector 1401 determines which of its two power inputs (i.e., battery 1400 power and supercapacitor 1416 power) should be coupled to its output. For example, the source selector may compare the battery 1400 voltage to a threshold and couple the battery 1400 to its output for so long as the battery 1400 voltage remains equal to or greater than such threshold (example: the threshold may equal the minimum voltage required to properly operate the other circuits of the lock, or may equal the minimum required input voltage of the boost converter 1402—discussed below—in each case, optionally increased so as to introduce a suitable margin of safety). According to other embodiments, the source selector 1401 may compare the voltage of the two power sources and couple the particular power source with the greater voltage to its output (an example of such embodiments is presented in FIG. 14A). As can be seen from FIG. 14A, the particular source selector 1401 depicted therein includes a pair of comparators 1406 and 1408. Comparator 1406 is arranged to assert when the voltage of the battery 1400 is greater than the voltage held on the supercapacitor 1416, whereas comparator 1408 is arranged to assert when the voltage held on the supercapacitor 1416 is greater than the voltage of the battery 1400. The output of each comparator 1406 and 1408 is coupled to the control of a corresponding switch 1409 and 1410. Switches 1409 and 1410 close when their particular control is asserted. Example: switches 1409 and 1410 may be embodied as transistors, such as BJT transistors or MOSFET transistors (where the control would be embodied as the base of the BJT or gate of the MOSFET). Thus, as can be seen from FIG. 14A, when the battery 1400 voltage exceeds the voltage held on the supercapacitor 1416, the control of switch 1409 is asserted, meaning switch 1409 is closed, and the battery 1400 voltage is passed on to the output of the source selector 1401. On the other hand, when the voltage held on the supercapacitor 1416 exceeds the battery 1400 voltage, the control of switch 1410 is asserted, meaning switch 1410 is closed, and the supercapacitor 1416 voltage is passed on to the output of the source selector 1401.

The output of the source selector 1401 is operably coupled to the input of a boost convertor 1402. The boost convertor 1402 holds approximately 3 or 3.3 volts of electrical potential at its output (in a selectable manner) under conditions in which at least approximately a minimum threshold voltage is delivered to its input (example: 0.8 or 1.8 volts required input voltage). The purpose of the boost converter 1402 is to supply the various circuits within the lock with a steady source of approximately 3 or 3.3 volts of electrical potential, despite the fact that the battery 1400 may, as it is drawn down over time, produce less than 3 volts of potential at its electrodes, especially as peak currents are drawn and internal battery resistance has developed over the battery's lifetime. Stated another way, the various circuits of the lock are designed to operate properly if supplied a particular range of voltage, and the boost convertor 1402 is designed to output a steady voltage within such range, provided it is supplied a minimum voltage (and further provided it is not supplied more than a maximum voltage, such as 5 volts). The output of the boost convertor 1402 is labeled V_MAIN, and it should be understood that all of the circuitry to be described below may be powered by V_MAIN or may be powered as otherwise described.

Returning to the topic of diode 1412, inspection of FIG. 14A, reveals that it functions to prevent retrograde current flow from the supercapacitor 1416, so that charge—once stored on the supercapacitor 1416—flows exclusively to the input of the source selector 1401 for potential delivery to the boost convertor 1402, to potentially power the various circuitry described below.

Returning to the topic of the battery 1400, FIG. 14A reveals that the battery 1400 is coupled to a port (such as a readable port or readable/writable input/output (I/O) port or a general purpose I/O port) of a microcontroller, which may be integrated into an integrated system 1404. According to some embodiments, the integrated system 1404 is an integrated circuit that includes a microcontroller, such as a reduced instruction set processor/microcontroller for the sake of energy efficiency, on-board memory, including non-volatile memory, such as flash memory, random access memory (RAM), such as static RAM or dynamic RAM, and an on-board transceiver. Reference numeral 1404 may be used to refer to the integrated system 1404 or to its microcontroller, memory, or transceiver on an individual basis. The transceiver is discussed in more detail below. The purpose of the microcontroller 1404 is to store and execute firmware that monitors the state of the lock, controls the lock, and communicates certain information through various wireless channels, as discussed below. It is understood by those of skill in the art that the various memory, microcontroller and transceiver capabilities may be situated on separate integrated circuits, but for the sake of power efficiency may be integrated into a single chip, as shown in FIG. 14A. The battery 1400 is coupled to a port that is, in turn, operably coupled to an analog-to-digital converter (ADC) onboard the microcontroller 1404. Thus, the voltage observed at the aforementioned port is converted into a digital number by the ADC, which represents the voltage produced by the battery 1400, and therefore can be used to represent remaining battery 1400 life or can be used as an input to a calculation that, in turn, yields remaining battery 1400 life. According to some embodiments, the battery 1400 may be coupled to the aforementioned port via the use of a load switch (not depicted) that is interposed in the electrical path between the battery 1400 and such port. The state of such a load switch (open or closed) is controlled by the microcontroller 1404, for the purpose of reducing current draw from the battery when battery 1400 voltage is not being read, thereby extending battery 1400 life.

Except where stated otherwise, where a circuit is depicted as connecting to the integrated system 1404 via a line terminating in arrows, it is to be understood that the circuit is operably coupled to the microcontroller 1404 (or transceiver or memory, as applicable) via one or more ports, which may be readable ports or writable ports or readable/writable input/output (I/O) ports or general purpose I/O ports, as applicable. With this convention in mind, FIG. 14A reveals that the source selector 1401 is coupled to the microcontroller 1404 via one or more ports. According to some embodiments, such connection is used to communicate a signal to the microcontroller 1404 that indicates whether the source selector 1401 has connected power from the battery 1400 or the supercapacitor 1416 to its output. For example, according to some embodiments, the source selector 1401 is coupled to the microcontroller 1404 via a single port, which is held at a high voltage while the battery 1400 is connected to the output, and drops to ground upon the supercapacitor 1401 being connected to the output. According to some embodiments, upon a state change of such port (high-to-low or low-to-high), an interrupt is generated to permit firmware executing on the microcontroller 1404 to respond. The information communicated by the source selector 1401 to the microcontroller 1404 may be used by the firmware executing on the microcontroller to determine that a battery 1400 has been removed, a battery 1400 has been inserted, or that the battery 1400 is critically low and the lock is being temporarily powered by the supercapacitor. For example: (1) if the source selector 1401 indicates that the supercapacitor 1416 is connected to its output, and the aforementioned ADC that is measuring the battery 1400 voltage indicates a voltage of zero, the firmware may interpret those signals as indicating a battery removal event; (2) if the source selector 1401 indicates that the supercapacitor 1416 is connected to its output, and the aforementioned ADC that is measuring the battery 1400 voltage indicates a voltage beneath a certain threshold (example: beneath the minimum voltage required by the boost convertor 1402), the firmware may interpret those signals as indicating a critically low battery voltage event; (3) according to some embodiments, the occurrence of such events is logged (along with the occurrence of other events-discussed below), such as in a log stored in memory of the integrated system 1404, therefore, if the source selector 1401 indicates that the battery 1400 is connected to its output, and the aforementioned log indicates that a battery removal event occurred previously without a subsequent battery insertion event, then the firmware may interpret such data as indicating a battery insertion event (i.e., insertion of a battery following removal of a battery, such as would occur during the course of changing a battery); and (4) if the source selector 1401 indicates that the battery 1400 is connected to its output, and the aforementioned log contains no data or only those events that occur during the course of manufacture, then the firmware may interpret such data as indicating a battery insertion event (i.e., insertion of a battery for the first time, following manufacture of the lock).

According to some embodiments, the lock includes a Bluetooth transceiver 1420. The transceiver 1420 may communicate via serial communication with the microcontroller 1404 via operable coupling to one or more ports. According to some embodiments, such I/O ports include: (1) a data output port, whereby data received by the Bluetooth transceiver 1420 (such as from a mobile device—example: smartphone or tablet device with onboard Bluetooth capability) is serially communicated from the transceiver 1420 to the microcontroller 1404; (2) a data input port, whereby data to be transmitted by the transceiver 1420 to a mobile device of a user of the safety system is serially communicated from the microcontroller 1404 to the transceiver 1420 for transmission; and (3) an operational mode port, the voltage of which may be controlled by firmware being executed by the microcontroller 1404 to select the operational mode of the transceiver 1420 (example: test mode or application mode).

As can be seen from FIG. 14A, the Bluetooth transceiver 1420 is coupled to a load switch 1424, which is, in turn, coupled to a port of the microcontroller 1404. Firmware being executed by the microcontroller 1404 may assert the aforementioned port at an appropriate time, thereby sending such assertion to the input of the load switch 1424. The load switch 1424 responds by activating the Bluetooth transceiver 1420, which includes, among other things, connecting V_MAIN to the main output line of the load switch 1424, which is, in turn, coupled to the particular pin of the transceiver 1420 to which power is to be applied ("the power pin"), thereby delivering power to the transceiver 1420. According to some embodiments, the load switch 1424 is used to both power and reset the transceiver 1420, first powering the transceiver 1420 and then resetting it so that it will come to a proper state for use. For example, the output of the load switch 1424 may be coupled with both the power pin of the transceiver 420 and to a separate reset pin, the assertion of which causes the transceiver 1420 to reset. According to some embodiments, the output of the load switch 1424 is directly coupled to the power pin of the transceiver 1420, but is coupled through a resistor-capacitor (RC) circuit to the reset pin of the transceiver 1420, so that the transceiver 1420 first powers up and then resets after an appropriate delay. According to some embodiments, in the wake of powering up and having been reset, the Bluetooth transceiver 1420 begins to advertise for pairing in order to establish a communication link with an external device such as a smartphone.

Figure 14B:
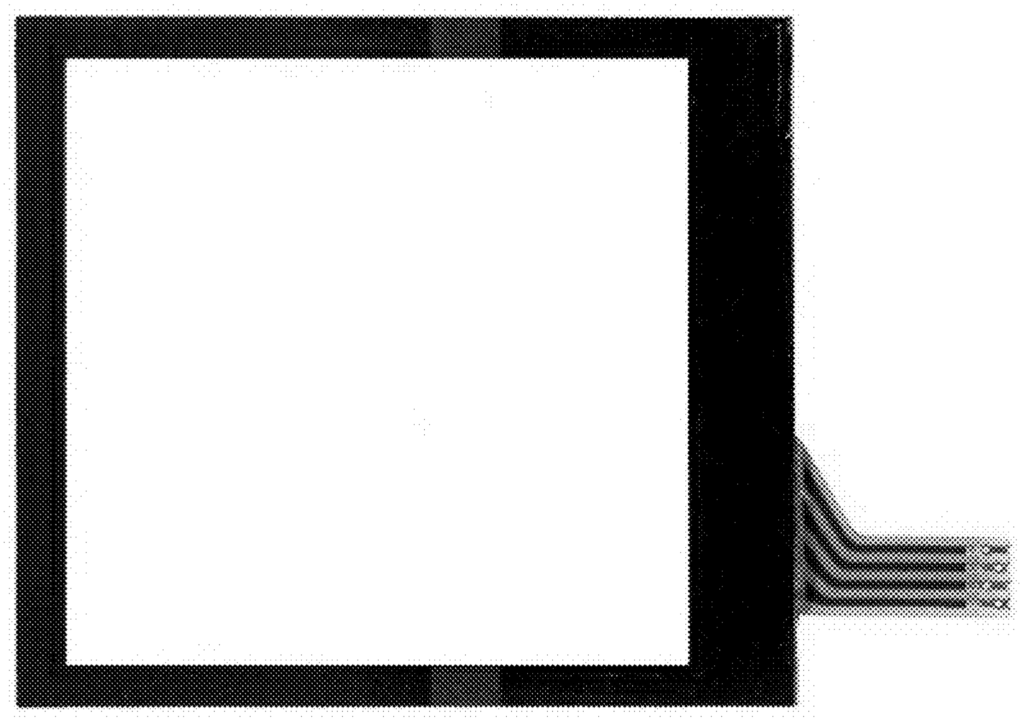
FIG. 14B depicts an exemplary embodiment of a display that may be used in connection with the aforementioned exemplary embodiment of the electronic system.
Figure 14C:
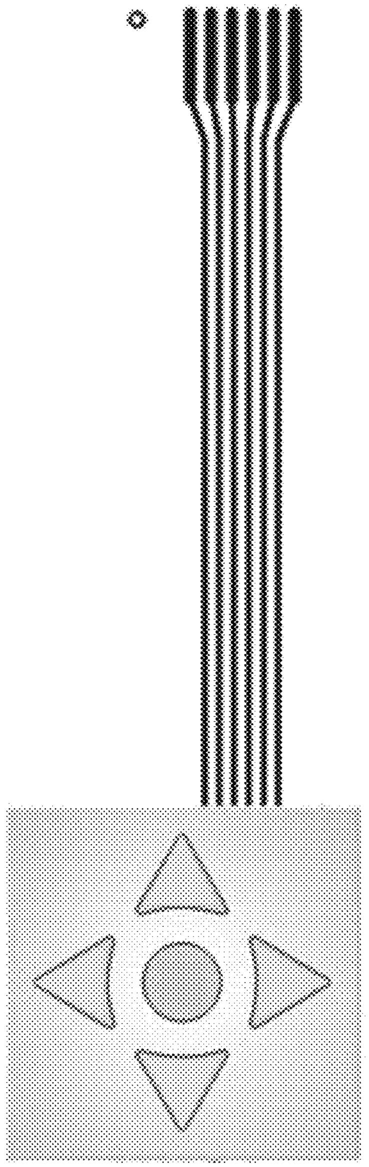
FIG. 14C depicts an exemplary embodiment of a set of buttons that may be used in connection with the aforementioned exemplary embodiment of the electronic system.
Figure 14D:
FIG. 14D depicts an exemplary embodiment of touch-screen display that that may be used in connection with the aforementioned exemplary embodiment of the electronic system.

The lock may also include an input/output device 1464, which may be structured as a single device (example: as a touchscreen, such as a capacitive touchscreen or resistive touchscreen), or may be structured as an input device 1458 (example: a button or set of buttons, such as a keyboard or keypad) and an output device 1462 (example: a display module, such as an OLED display module or similar display). Thus, as shown in FIG. 14A, the microcontroller 1404 may be operably coupled to an input/output device 1464, or may be operably coupled to an input device 1458, and, separately, operably coupled to an output device 1462. The input capability may permit the user of the lock to command it, such as: (1) commanding the lock to exit a sleep state or "off" state; (2) commanding the lock to make itself available to be connected with, such as via Bluetooth; and/or (3) commanding the lock to present—in a selectable manner—certain information (example: battery level, model number, firmware version, hardware version, log entry data, time and date of having been locked, description of isolation point on which it was hung, name of individual(s) associated with having placed or verified such placement such lock on such isolation point). The output capability may permit the lock to: (1) present the operations of the lock (example: advertising for pairing; pairing; paired; connecting; connected; unlocking; powering down; entering sleep mode; and so on); and/or (2) present certain information (example: battery level, model number, firmware version, hardware version, log entry data, time and date of having been locked, description of isolation point on which it was hung, name of individual(s) associated with having placed or verified such placement such lock on such isolation point). FIGS. 13A-13G present embodiments of the lock wherein the input device 1458 is a button/switch and the output device 1462 is an RGB LED, as does some of the description relating to FIG. 14A. However, according to some embodiments, the I/O device 1464 may be embodied as a touchscreen (dimensioned so as to be able to be housed within the space afforded by either the upper housing 1304, the lower housing 1306 or a combination of the two, such as on the lock's 1300 front surface), such as a resistive or capacitive touchscreen, an example of which is depicted in FIG. 14B. According to some embodiments, the input device 1458 may be embodied as a plurality of buttons, such as membrane buttons (example: a keypad, such as a 4×4 keypad, a "qwerty" keyboard, or a 5-way membrane button arrangement permitting a user to navigate through a menu in an upwardly, downwardly, leftward and rightward manner and to make a selection therefrom, and so on) (dimensioned so as to be able to be housed within the space afforded by either the upper housing 1304, the lower housing 1306 or a combination of the two, such as on the lock's 1300 front surface), an example of which is depicted in FIG. 14C. According to some embodiments, the output device 1462 may be embodied as a display, such an OLED display or OLED module (dimensioned so as to be able to be housed within the space afforded by either the upper housing 1304, the lower housing 1306 or a combination of the two, such as on the lock's 1300 front surface), an example of which is depicted in FIG. 14D.

Discussion now returns to embodiments wherein the input device 1458 is a button or switch 1460. Such an input device 1458 may be advantageous by virtue of its low power consumption and broad temperature operating range. According to some embodiments, the button or switch 1460 is disposed so as to be accessible via a surface, such as the front surface, of the lock. The aforementioned membrane 1354 (discussed with reference to FIG. 13B) and corresponding switch mounted on printed circuit board 1352 (also discussed with reference to FIG. 13B), are an example of elements combining to form such a user-accessible button 1460. (A user may depress the membrane, which will flex in response, and permit engagement of the aforementioned switch disposed on the circuit board 1352.) The button 1460 is coupled to a port of the microcontroller 1404. In response to a user of the safety system pushing the button 1460, the aforementioned port is coupled to ground, and the firmware being executed by the microcontroller 1404 responds to this event. One manner in which the firmware responds to such an event is by signaling the load switch 1424 to power (and, according to some embodiments, reset) the Bluetooth transceiver 1420 so that it becomes available for pairing and for communicating with a mobile device of a user of the safety system. Thus, the firmware executing on the microcontroller 1404 may respond to a depression of the button 1460 by activating the Bluetooth transceiver 1420 for a period of time to permit a communication link to be established, and may deactivate the transceiver 1420 in the event that no such link is established during such period of time. This is discussed in greater detail below.

By virtue of the load switch 1424 mediating access to power by the transceiver 1420, the lock is rendered energy efficient vis-à-vis its Bluetooth functions—the transceiver 1420 need not be powered up continually. Instead, the transceiver 1420 may be powered only during a period of time following depression of the button 1460, or during the persistence of any communication link established in the wake of the aforementioned button 1460 having been depressed.

As discussed in more detail below, according to some embodiments, the lock may be put into a quiescent state or "off" state, in which the various circuits of the lock are powered down (excluding the microcontroller 1404, according to some embodiments), thus preventing them from drawing any substantial electrical current from the battery 1400. In such a quiescent state, the sole function of the firmware executing on the microcontroller 1404 is to respond a user having depressed the button 1460 (thereby coupling ground to the aforementioned port). The firmware responds to such a push of the button 1460 by exiting the quiescent state and entering a normal operational state or "on" state of the lock. According to some embodiments, the button 1460 cannot be used to cause a transition into the aforementioned quiescent or "off" state; transition into the quiescent or "off" state can only be caused (absent the occurrence of a critical error) by a command received via one of the lock's wireless communication channels, such as via its Bluetooth communication channel. According to some embodiments, the firmware executing on the microcontroller 1404 requires such an "off" command to include the lock's aforementioned digital key as a prerequisite of the firmware honoring the command. In other words, according to some embodiments, the lock includes a button that a user can easily access to turn the lock "on," but does not include any button that turns the lock "off." This prevents accidental deactivation of the lock by people such as service personnel.

As mentioned previously, the lock may be unlocked via a command received via either of its wireless communication channels, such as via Bluetooth (or the LoRa channel—not yet discussed—or, according to some embodiments, a wireless data channel, such as a 4G or 5G channel). As also mentioned previously, the firmware being executed by the microcontroller 1404 may impose as a precondition of actually unlocking the lock that the particular unlock command to which the microcontroller 1404 is responding include the proper digital key (example: the unlock command must include a digital code matching a digital code stored in nonvolatile or volatile memory onboard the microcontroller 1404). Assuming that a given unlock command contains the proper code or digital key, then the firmware being executed by the microcontroller 1404 will respond by performing a series of operations to cause an actuator 1434 to activate so as to render a locking mechanism within the lock to disengage. For example, the actuator 1434 may be a motor 1434. The motor 1434 may be driven so as to cause the motor 1434 to withdraw a locking pin (such as locking pin 1318, depicted in FIG. 13C) from engagement with a notch (such as notch 1322, also depicted in FIG. 13C) on the lock's shackle (such as shackle 1302, also depicted in FIG. 13C), thereby unlocking the lock. The motor 1316 depicted and discussed with reference to FIG. 13C is an example of actuator 1434. According to some embodiments, the aforementioned locking pin 1318 is biased, such as by a spring 1372, into an engaged position, so that the shackle 1302 of the lock need only be inserted into the shackle receptacle 1324 for the locking pin 1318 to engage the shackle, and for the lock to lock closed. According to some embodiments, the locking pin 1318 is unbiased, and the actuator 1434 is used to engage the locking pin with the aforementioned notch in the shackle.

As can be seen from FIG. 14A, the motor 1434 is electrically coupled to a motor driver 1436. The motor driver 1436 is operably coupled to the microcontroller 1404 and controlled by a plurality of signals delivered via one or more ports to which it is operably coupled. The firmware being executed by the microcontroller 1404 adjusts the assertions of the aforementioned one or more ports to cause the driver 1436 to cause the motor 1434 to turn in a forward direction, a reverse direction, to coast or to brake. For example, the driver 1436 may deliver electrical current in one particular direction to the motor 1434 to cause the motor 1434 to move in a forward direction, and may deliver electrical current in the opposite direction to cause the motor 1434 to move in a reverse direction. The firmware being executed by the microcontroller 1404 may adjust the assertion of another port to cause the motor driver 1436 to enter or exit a sleep state.

As can be seen from FIG. 14A, the motor driver 1436 is coupled to a shunt detector 1438, which is also coupled to a port of the microcontroller 1404. In the event that the locking pin 1318 is fully advanced or fully withdrawn, then the rotor of the motor 1434 that had been actuating the locking pin 1318 is no longer free to rotate-because the locking pin 1318 is no longer free to advance or withdraw, as the case may be. When the rotor is no longer free to rotate, the back EMF in windings of the motor 1434 collapses, and, as a result, the current being driven through those windings would spike (which could burn out the aforementioned windings). To protect the windings, the motor 1434 shunts the current away from the windings under such circumstances. The shunt detector 1438 detects the occurrence of the shunting action of the motor 1434 and sends a signal to the microcontroller 1404 via the aforementioned port, to indicate that the motor 1434 has shunted the current, which means that the locking pin 1318 is fully advanced or fully withdrawn. For example, the shunt detector 1438 may detect the level of current being delivered to the motor 1434 by the motor driver 1436 and may deliver to the microcontroller 1404 (via the aforementioned port) a voltage that is proportional to such current level. An ADC on board the microcontroller 1404 may be coupled to such port, and the firmware executing on the microcontroller 1404 may be structured so as to continue to command the motor driver 1436 to deliver current to the motor 1434, in one direction or another depending upon whether forward motion or reverse motion is intended, until such time as the aforementioned voltage level exceeds a threshold.

According to some embodiments, the lock includes a shackle integrity detector or shackle state (open or closed) detector 1442. For example, the detector 1442 may be embodied as a microswitch 1444 operably coupled to a port of the microcontroller 1404. The microswitch 1444 is directly or indirectly mechanically coupled to the lower surface of one end of the shackle of the lock. According to some embodiments, a rod extends from a top surface of the limit switch 1444 to a bottom surface of an unretained end of the lock's shackle. When the shackle is closed, i.e., when the lock is in a locked state, the bottom surface of one end of the shackle makes contact with the aforementioned rod, thereby displacing the rod in a downward direction in an amount sufficient to change the state of the microswitch 1444 (e.g., to cause it to transition from open to closed). Microswitch 1337 (FIG. 13C) is an example of the microswitch 1444 of FIG. 14A. The shackle 1302 depicted in FIG. 13C is an example of such a shackle, and the rod 1339 depicted in FIG. 13C is an example of such a rod. According to some embodiments, closure of the microswitch 1444 causes ground to be electrically coupled to a port of the microcontroller 1444, thereby signaling to the firmware being executed by the microcontroller 1404 that the shackle is closed.

The aforementioned rod may be biased in an upward direction, such as by a spring (the spring 1341 depicted in FIG. 13E is an example of such a spring). Should it be the case that the shackle is cut, or that the shackle is opened, then bias of the rod will cause it to travel in an upward direction, thereby opening the microswitch 1444, and causing the aforementioned port to "float" to a positive voltage (example: to a voltage level approximately equal to that which is powering the microcontroller 1404, $V_{DD}$, or approximately 3 volts), which, in turn, signals to the firmware running on the microcontroller 1404 that the shackle is no longer in a closed position. Should it be the case that this signal follows receipt and execution of a command to unlock the lock, then the firmware may interpret this signal as a indicating the occurrence of a shackle open event, as described previously. On the other hand, should it be the case that aforementioned port exhibits such a positive voltage when no event indicates that the shackle should be openable, then the firmware may interpret this signal as indicating the occurrence of a shackle cut event. According to some embodiments, the firmware is structured to simply communicate the occurrence of the signal via a communication channel, such as via a LoRa channel (discussed below), to the backend computing platform 1208 (FIG. 12), and the interpretation of whether the signal indicates occurrence of a shackle open event or a shackle cut event is made by software executing on the backend computing platform 1208, in accordance with principles described herein.

According to some embodiments, in the event of the occurrence of a lock event, such as a shackle open event or a shackle cut event, the firmware commands the occurrence of the event to be communicated via one of its wireless communication channels. As has been discussed previously, the microcontroller 1404 may be integrated with a low-power, long-range communication transceiver, such as a LoRa transceiver (which may be fabricated on the same chip or may be fabricated separately). The LoRa transceiver is operably coupled to conductive a plurality of pins or pads that carry signals to be transmitted or carry signals that have been received, and these pins or pads are, in turn, operably coupled to an RF switch 1450. The RF switch 1450 is also coupled to ports of the microcontroller 1404 that are used to control the state of the switch 1450, as described below. According to some embodiments the aforementioned plurality of pins or pads dedicated to delivery of transmission or receipt of received signals include three such pins or pads. Further, according to some embodiments, the RF switch 1450 controls which of the three pins or pads are connected to an antenna 1452. According to some embodiments, a first pin or pad carries a low-power signal from the transceiver on board the controller 1404 to the switch 1450 to be transmitted via antenna 1452 (example: a signal with a transmit power of approximately +13 dBm), a second pin or pad carries a high-power signal from the transceiver on board the controller 1404 to the switch 1450 to be transmitted via antenna 1452 (example: a signal with a transmit power of approximately +17 or +20 dBm), and a third pin or pad carries a LoRa signal received by the antenna 1452 to the LoRa transceiver on board the microcontroller 1404. Thus, the state of the switch 1450 determines whether the LoRa reception or transmission is occurring, and, if transmission is occurring, whether it is a high-power transmission or a low-power transmission. The purpose of providing both a high-power and a low-power transmission capability is to permit the LoRa transceiver to comply with local regulations pertaining to permitted transmission signal strengths in various jurisdictions around the world.

Power is supplied to the RF switch 1450 via a load switch 1451, which is coupled to an I/O port of the microcontroller 1404. Firmware being executed by the microcontroller 1404 may assert the aforementioned I/O port and thereby cause the electrical potential carried by the electrical path V_MAIN (e.g., 3 volts or 3.3 volts) to be delivered to its output, which is coupled to the power input pin of the RF switch 1450. The output of the of the load switch 1451 is also coupled to an RF oscillator 1455, which is coupled to electrical pin or pad, which, in turn, is coupled to the LoRa transceiver on board the microcontroller 1404. Thus, in response to assertion of port to which the load switch 1451 is coupled, the load switch 1451 closes, meaning: (1) the RF switch 1450 is powered up; and (2) the RF oscillator 1455 is also powered up, thereby supplying the LoRa transceiver on board the microcontroller 1404 with the oscillating signal it requires for proper operation.

In the wake of a lock event (and assuming the lock is situated in the United States or another jurisdiction in which relatively high-power LoRa transmission is permissible), the microcontroller 1404 would first assert I/O port to which the load switch 1451 is coupled to power up the RF switch 1450 and RF oscillator 1455, and would then use the aforementioned ports dedicated to controlling the state of the RF switch 1450 to command the RF switch 1450 to couple the antenna 1452 to the particular pin or pad carrying the relatively high-power LoRa transmission signal. In the wake of those events, the LoRa transceiver would send a message signaling occurrence of the particular lock event (along with a lock identifier identifying the lock, and, according to some embodiments, other data as described in further detail, below) to the antenna 1452 for transmission. According to some embodiments, the antenna 1452 is a ceramic chip antenna coupled (such as via surface mounting) to one of the printed circuit boards, 1340, 1342, and 1344 (see FIG. 13C), such as circuit board 1342, which may be situated beneath the aforementioned lock body 1314 (FIG. 13C). Such a position of the antenna 1452 permits electromagnetic signals propagating to or from the antenna 1452 to travel to or from the antenna 1452 through the polymeric (and dielectric) lower housing 1306 (FIG. 13A) without passing through the metallic (and potentially at least somewhat electrically conductive) lock body 1314. (Electrically conductive materials do not permit electromagnetic waves to propagate through their structure, while dielectric materials do-hence, such a position of the antenna 1452 promotes omnidirectional transmission and reception.). According to some embodiments, the transceiver on board the microcontroller 1404 may be embodied as a separate chip or module that is communicably coupled to the microcontroller 1404. According to some embodiments, the transceiver may be a satellite transceiver or satellite transceiver module (whether or not onboard the microcontroller 1404), which may eliminate the need for installation of gateways/base stations 1201 throughout a serviced facility (i.e., the lock communicates to a satellite, and thereby acquires broader network access and a communication pathway to the backend computing platform 1208, and, according to some embodiments, to the app executing on the mobile device 1213, thereby eliminating the need for the Bluetooth transceiver 1420, although, according to some embodiments, the Bluetooth receiver 1420 may be retained alongside a satellite transceiver). Such embodiments may be useful in the context of servicing particularly remote facilities, where satellite service may be the only or most convenient option for obtaining network access. Similarly, according to some embodiments, the transceiver may be a wireless data transceiver or wireless transceiver module (whether or not onboard the microcontroller 1404) (example: a 4G or 5G or similar transceiver or transceiver module), which may eliminate the need for installation of gateways/base stations 1201 throughout a serviced facility (i.e., the lock communicates to wireless data service provider, such as AT&T® or VERIZON® or the like, and thereby acquires broader network access and a communication pathway to the backend computing platform 1208, and, according to some embodiments, to the app executing on the mobile device 1213, thereby eliminating the need for the Bluetooth transceiver 1420, although, according to some embodiments, the Bluetooth receiver 1420 may be retained alongside a wireless data transceiver). Still further, according to some embodiments, the transceiver may be a Wi-Fi transceiver or Wi-Fi transceiver module (whether or not onboard the microcontroller 1404), so that the lock communicates to a wireless router, and thereby acquires broader network access and a communication pathway to the backend computing platform 1208, and, according to some embodiments, to the app executing on the mobile device 1213, thereby eliminating the need for the Bluetooth transceiver 1420, although, according to some embodiments, the Bluetooth receiver 1420 may be retained alongside a satellite transceiver).

According to some embodiments, the lock includes other sensors to gather data and potentially generate lock events. For example, the lock may include an ambient temperature and humidity sensor 1454 and another separate temperature sensor 1456. According to some embodiments, the power input of sensor 1456 is electrically coupled to a port. When the firmware asserts this port to a positive voltage, the sensor 1456 activates. For example, the temperature sensor 1456 may be a linear active thermistor that produces an output voltage determined by its temperature. The output of the sensor 1456 is coupled to a different port that is, in turn, coupled to an ADC on board the microcontroller 1404, so that the value yielded by the ADC represents the temperature of the sensor 1456. According to some embodiments, the sensor 1456 is disposed on or proximal to the boost converter 1402, such being disposed as on the same circuit board 1340, 1342 or 1344 on which the boost converter 1402 is mounted, with the location of such disposal being proximal to that of the boost convertor 1402, in order to monitor for a potential overheat condition. According to some embodiments, the ambient temperature and humidity sensor 1454 is electronically coupled to a pair of ports, and is powered by V_MAIN. The firmware interacts with the sensor 1454 via serial communication, using the pair of ports. According to some embodiments, the pair of ports includes a first port devoted to a clock signal to synchronize serial communication between the microcontroller 1404 and the sensor 1454 and a second port devoted to carrying the serial data between the sensor 1454 and the microcontroller 1404. According to some embodiments, the firmware commands the ambient temperature and humidity sensor in four stages: (1) wake up; (2) measure temperature and humidity; (3) read out the measurements; and (4) sleep. It is of note that sensor 1456 can be deactivated by a third port, so that it draws substantially no electrical current while deactivated. According to some embodiments, measurements from these sensors 1454 and 1456 are taken periodically (example: once per hour) or from time-to-time (example: on a schedule that increases in frequency as a reading approaches an operational threshold of a device or circuit the particular sensor 1454 or 1456 is intended to monitor, such as the maximum permitted temperature of the boost converter 1402, microcontroller 1404 and potentially other such circuits, or as the reading approaches the operational range of the lock as a whole).

Returning discussion to the topic of embodiments wherein the output device 1462 is a lighting arrangement, according to some embodiments, the lock includes a composite light element 1468, such as a light strip or RGB LED. The composite light element 1468 includes a first LED 1468 that emits red light, a second LED 1468 that emits green light, and third LED 1468 that emits blue light. Each LED 1468 may be arranged in a single package so that the light each respective LED 1468 emits is combined with the light emitted by the others. Thus, the user observes the light emitted by the composite light element 1468 as the superposition or composite of the light emitted by each diode. The RGB LED 1468 described as being disposed on printed circuit board 1352 (depicted in FIG. 13B) is an example of a composite light element 1468.

The anode of each LED 1468 is attached to the output of a DC-to-DC converter 1478 that delivers 5 volts of electrical potential at its output when supplied by 3 or 3.3 volts at its input. Its input is electrically coupled to a load switch 1476 that connects the 3 volt or 3.3 volt signal on the V_MAIN electrical path to its output in response to the firmware asserting the particular port to which the load switch 1476 is coupled. Thus, when the firmware asserts the aforementioned port, 5 volts of electrical potential is delivered to the anode of each LED 1468, so that each such LED 1468 may properly emit bright light. The cathode of each diode 1468 is attached to one terminal of a switch 1480 to ground, such as a collector of an NPN transistor 1480, so that there is one NPN transistor 1480 for each diode 1468, with each such transistor 1480 controlling the electrical pathway to ground. In other word, each such transistor 1480 functions as a switch that either draws electrical current through the particular diode 1468 to which it is attached so that it emits light, or prevents electrical current from passing through its respective diode 1468 so that it emits no light. The base of each such transistor 1480 is operably coupled to a respective port of the microcontroller 1404. The firmware executing on the microcontroller 1404 may assert the particular port attached to a given transistor 1480 with a positive voltage (e.g., 3 volts) to cause that particular transistor 1480 to draw current through the LED 1468 to which it is coupled. The firmware 1404 can therefore adjust the color of light emitted by the composite light element 1468 through pulse width modulation conducted via the aforementioned ports. The color of light emitted by the light element 1468 can be used as an indicator to a user of the safety system of the operation of the lock (it can indicate that a particular lock event has occurred, for example, or that the lock is performing a certain operation).

Discussion now turns to FIGS. 15A-15K which depicts a state transition diagram of various exemplary embodiments of the firmware executed by the microcontroller 1404 (FIG. 14A). As can be seen from FIG. 15A, the firmware initially originates its execution in an off state 1500. In the off state 1500, the firmware has powered down substantially all of the circuits of the lock, except for the microcontroller (such as microcontroller 1404, visible in FIG. 14A). In this state 1500, the firmware monitors for the depression of the aforementioned button 1460 (see FIG. 14A), and is responsive to no other substantial inputs. The lock consumes little electrical current or power while in the off state 1500. Details pertaining to the off state 1500 are presented below.

Upon having detected depression of the button 1460, the firmware transitions to state 1502 in which it is determined whether or not the firmware should transition into an awake state 1504. In the event that the button 1460 is depressed for less than a threshold period of time (example: less than 3 seconds or 5 seconds), then the firmware transitions from state 1502 back into the off state 1500. On the other hand, should the firmware detect that the button 1460 has been depressed for more than the aforementioned threshold period of time, then the firmware transitions into the awake state 1504. The purpose of imposing a threshold period of time that the button 1460 must be depressed in order for the firmware to transition into the awake 1504 state is to prevent an unintentional and needless transition into a state (such as awake state 1504) that uses considerably more electrical power than the off state 1500, thereby needlessly draining the battery 1400 (FIG. 14A). For example, if the lock were to be carried in a box or sack or backpack or other such device for containing objects during their transportation, it is possible that another such lock or other object within the box or sack or backpack could bump up against the aforementioned lock and depress its button momentarily, and it would be undesirable for the lock to transition to the awake state 1504 in response to such an event.

While in the awake state 1504, the lock is responsive to commands delivered via its wireless channel or channels. The embodiments of the lock described with reference to FIGS. 15A-15K describe a lock employing Bluetooth and LoRa wireless channels, as examples only. Other wireless channels can be employed by the lock and operated by the firmware, such as wireless data channels (example: 4G LTE, 5G, etc.). While in the awake state 1504, the lock may advertise for pairing via Bluetooth, and if such pairing occurs, the lock will become responsive to commands received via the Bluetooth channel. Additionally, in the awake state 1504, the lock is responsive to any lock events that may occur (shackle open, shackle close, shackle cut, lock, unlock, heartbeat timer expiration, low battery, battery removed, battery inserted, supercapacitor-powering-lock, over-temperature, over-humidity, near-over-temperature, near-over-humidity, power off, power on, and so on). Details pertaining to the awake state 1504, are presented below. According to some embodiments, the firmware remains executing in the awake state 1504 for so long as a Bluetooth session persists.

On an approximately regular basis, such as approximately once per hour, the firmware sends a heartbeat message to the backend computing platform of the safety system (such as backend computing platform 1208, depicted in FIG. 12). The heartbeat message may be initially received by a gateway or base station (such as gateway or base station 1201, depicted in FIG. 12) as a LoRa frame or frames and re-communicated by the gateway to the backend computing platform. The purpose of such a heartbeat message is to provide an indication to the backend computing platform that the particular lock that sent the message is still operational. Recall: generally speaking, a lock does not communicate with the backend computing platform, unless (1) the lock detects the occurrence of a lock event (example: detects that the shackle was closed or opened or cut, or that the battery is low or was removed or inserted, or that the temperature of the lock is approaching the boundary of its operating range, etc.), or (2) the lock receives a command that results in a lock event (example: the lock receives an unlock command or an off command, or is powered on, etc.). Therefore, from the vantage of the backend computing platform, a prolonged period during which no message is received at the backend from a given lock is problematic. The backend computing platform could not distinguish whether the silence was the result of no lock event having been detected by, or initiated via a command to, the aforementioned lock, or whether the silence was a result of the lock having simply malfunctioned in some manner. The heartbeat message indicates to the backend that the lock that sent the message remains operational, although it may have no event to report.

Sending of the heartbeat message is carried out by the firmware via the send heartbeat state 1506. According to some embodiments, a timestamp indicating the time of last entry into the send heartbeat state 1506 is stored by the firmware. During execution of the instructions constituting the awake state 1504, the aforementioned timestamp is compared to the current time, and in the event that the difference between the two exceeds a threshold period of time (example: one hour), then the firmware initiates entry into the send heartbeat state 1506, and the timestamp of such entry is stored in place of the previous such timestamp. On the other hand, according to other embodiments, the timing of entry into the send heartbeat state 1506 is determined by a hardware timer, which may generate an interrupt to stimulate entry into the state 1506. According to some embodiments, the periodicity of the heartbeat messages sent by a given lock or by a given population of locks may be altered during lock operation by command, or by the firmware in response to detection of certain lock events. In the event that the send heartbeat state 1506 was entered from the awake state 1504, the awake state 1504 is re-entered upon completion of the operations constituting the send heartbeat state 1506. The send heartbeat state 1506 may be entered from other states and may exit to other states, as discussed below. More detail relating to the send heartbeat state is presented below.

Returning discussion to the awake state 1504, it was stated previously that upon entry of the state 1504 from the off state 1500, the lock may begin advertising for pairing via Bluetooth. In the event that no such pairing is established for more than a threshold period of time (example: 30 seconds), the firmware transitions into a sleep state 1508. Similarly, assuming that a previously established Bluetooth session terminates, then in response to such termination, the firmware transitions to the sleep state 1508 from the awake state 1504. The sleep state 1508 is a state in which the firmware powers down substantially all circuitry other than: (1) that which is necessary to detect a lock event and deliver an indication of such event to the microcontroller 1404 by an interrupt; and (2) the microcontroller 1404. After having powered down such circuitry, the microcontroller 1404 simply awaits the occurrence of an interrupt, meaning that the lock consumes little electrical current or power while in the sleep state 1508. In the particular embodiments depicted in FIG. 15A, no circuits other than the button 1460 indicate the presence of a lock event to the microcontroller 1404 via an interrupt (i.e., the occurrence of such events are determined via polling for such events by the firmware). Other embodiments are presented herein whereby certain events are signaled to the microcontroller 1404 via an interrupt. Any given lock event may be detected via either polling conducted by the firmware or via the generation of an interrupt to which the firmware will respond. According to some embodiments, the microcontroller 1404 contains an onboard multiplexer permitting the assignment of an interrupt to a designated I/O port, so that a circuit need not necessarily change in order to monitor the occurrence of an event via an interrupt versus polling. The choice between the two such methods is a design decision based on tolerance for latency, availability of I/O ports available for interrupt assignment, electrical current budget, the likelihood that the particular monitored condition leading to the declaration of an event can change rapidly, and so on. Details pertaining to the sleep state 1508 are presented below.

Once in the sleep state 1508, the firmware may exit the state 1508 from time to time, such as on a periodic basis (example: once every five, ten, twenty, thirty minutes, or a time equal to or approximately equal to the period between heartbeat transmissions, such as one hour), to enter a "wake up?" state 1510. For example, a hardware timer may be used to generate an interrupt to which the microcontroller 1404 responds, causing the exit from the sleep state 1508. In the "wake up?" state 1510, the firmware may poll for the existence of events that are not indicated via delivery of an interrupt, and handle any such events before typically returning to the sleep state 1508. Details pertaining to handling such events are presented below.

It is possible that the firmware arrives in the "wake up?" state 1510 by virtue of the button 1460 having been depressed, as this, too, would result in delivery of an interrupt to the microcontroller 1404. Therefore, it is possible that the firmware is in the "wake up?" state 1510 as a result of the user of the safety system having depressed the button 1460 with the intent to wake up the lock. Hence, while in the "wake up?" state 1510, the firmware will also determine whether the button 1460 was depressed for at least a threshold period of time (example: 5 seconds). If so, the firmware returns to the awake state 1504. If the button was depressed for less than the threshold period of time (such as, for example, either having been depressed momentarily, or not having been depressed at all, because entry into the state 1510 was the result of the aforementioned hardware clock having generated an interrupt—not the button circuit 1432 having done so), then the firmware will return to the sleep state 1508, unless it has been more than a threshold period of time since the last heartbeat message was sent to the backend computing system (such as 1208 in FIG. 12) of the safety system, in which case the firmware will transition to the send heartbeat state 1506, send the heartbeat message and then typically return to the sleep state 1508.

Figure 15A:
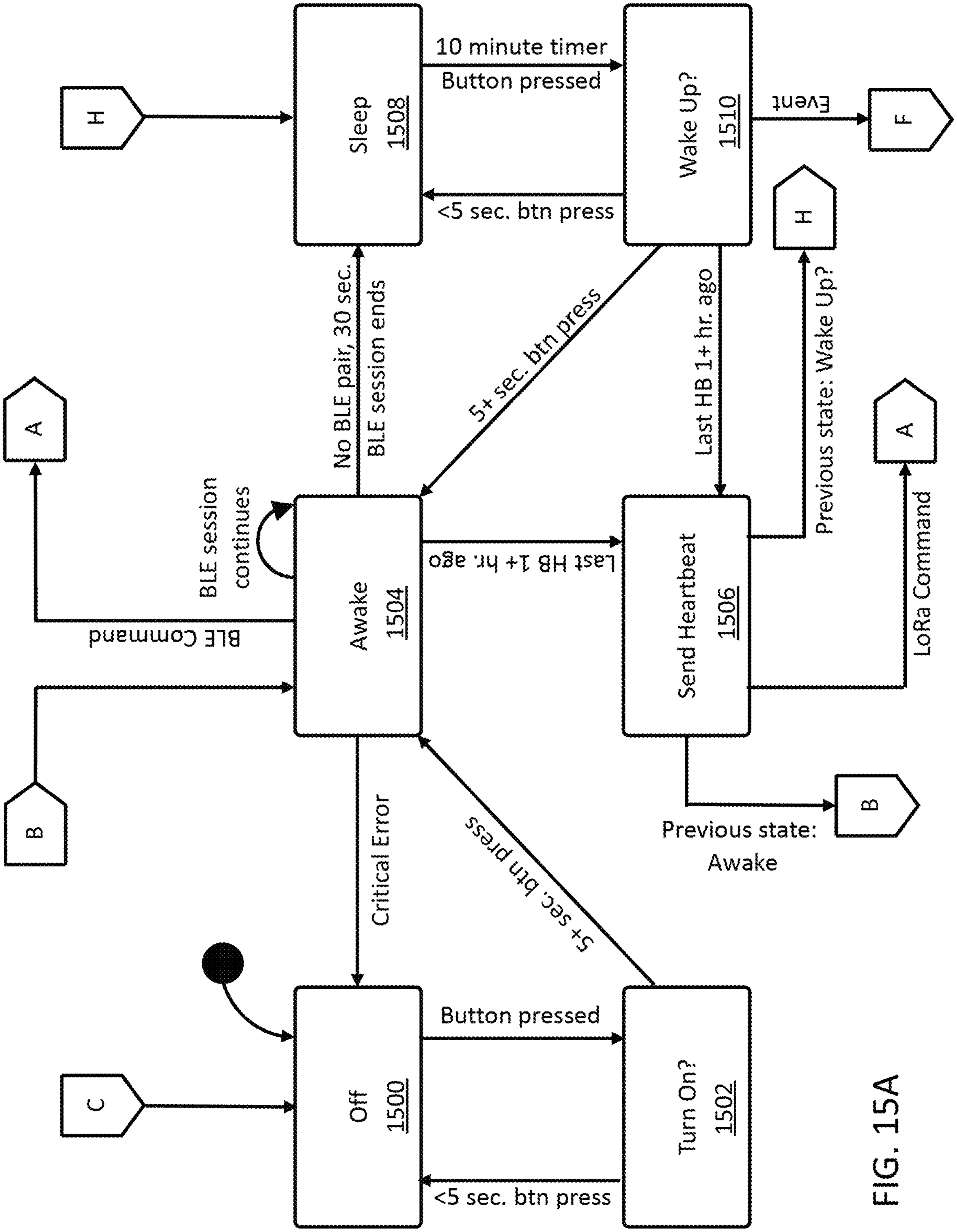
FIG. 15A depicts a portion of a state transition diagram describing the operational and state flow of various embodiments of firmware that may execute on a microcontroller or processor of various embodiments of the aforementioned lock.
Figure 15B:
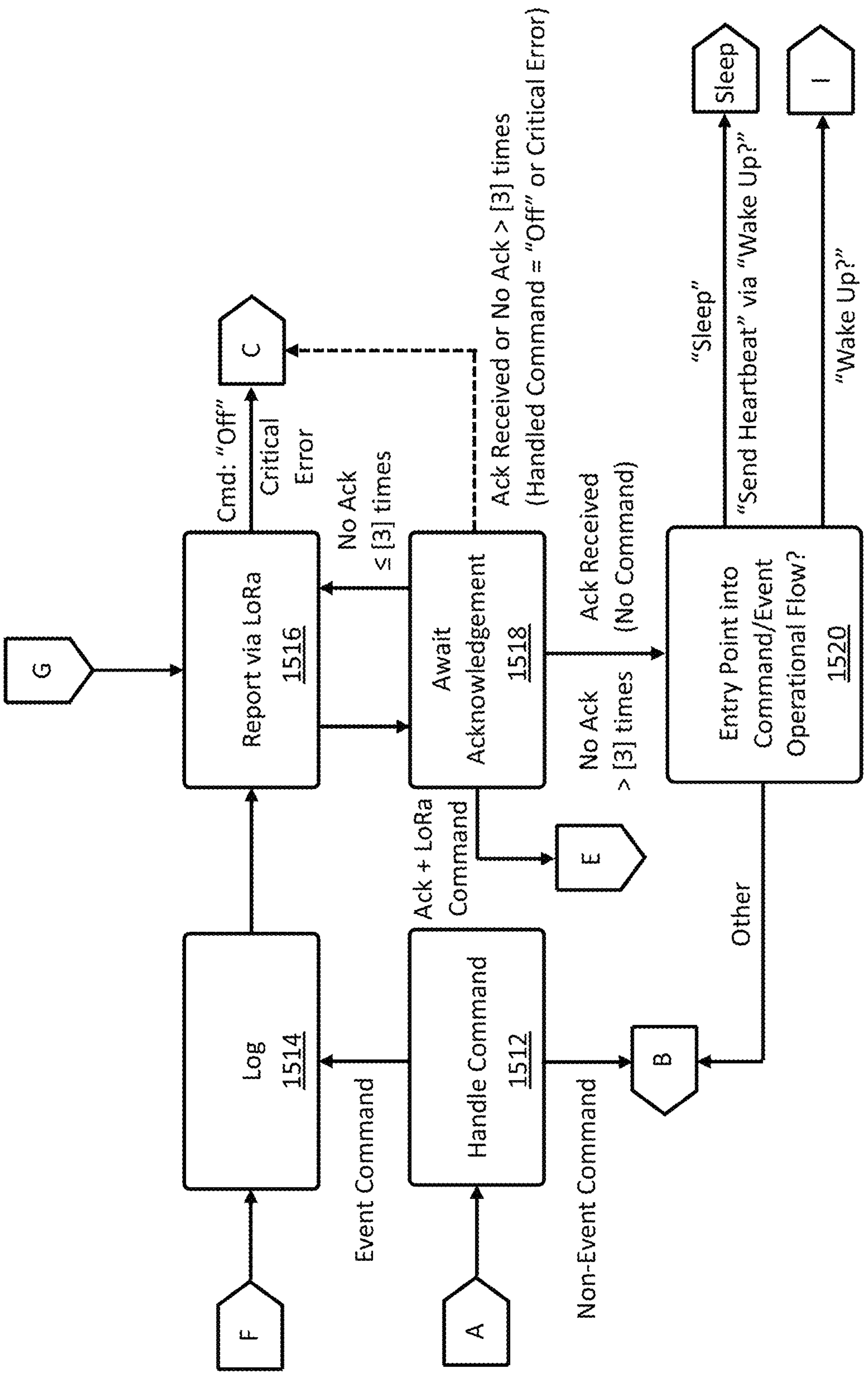
FIG. 15B depicts another portion of a state transition diagram describing the operational and state flow of various embodiments of firmware that may execute on a microcontroller or processor of various embodiments of the aforementioned lock.

Previously, it was stated that commands received and events detected are handled by the firmware. Discussion now turns to FIG. 15B in relation to such topics. FIG. 15B depicts the flow of the firmware as it handles events and commands. The operations contained therein may be entered as a result of having received a command via either the Bluetooth or LoRa channels (see connector A), as a result of having detected an event (see connector F), or as a result of having detected that it is time to send a heartbeat message (see connector G), which may be considered a particular variety of event distinct from those that enter the operational flow of FIG. 15B via connector F.

In the event that the operational arrangement depicted in FIG. 15B is entered as the result of the lock having received a command, then flow initiates in operation 1512, wherein the command is handled. Certain commands may request information from the lock. Examples: (1) a "get-lock-information" command (requesting information pertaining to the identity and variety of the lock and its various state parameters, for example the lock ID, lock state, model number, hardware version, firmware version, battery percentage, and day and time of last battery change); (2) a "get-log" command (which may be implemented as an overloaded method or function either to request all of the entries in an event log maintained by the firmware and discussed in more detail below, or to request a specified quantity of events from the end of the log, i.e., the last so-many events in the log); or (3) a "get-unacknowledged-lock-events" command (asking for those events contained in the aforementioned log that have not been acknowledged as received by a gateway, such as gateway 1201 depicted in FIG. 12). In these cases, handling of the command (operation 1512) includes returning the requested data via the particular communication channel through which the command was transmitted (e.g., through the Bluetooth channel in the event that the command was sent to the lock via Bluetooth, or through the LoRa channel in the event that the command was sent to the lock via the LoRa channel). According to some embodiments, commands seeking information but not asking the lock to perform any action (other than return information) do not result in the declaration of a lock event. Thereafter, the operational flow of the firmware proceeds along the line labeled "non-event command" and re-enters the awake state 1504, as indicated by connector B. The operations of the awake state 1504, itself, are discussed in more detail below.

Other commands request the lock to perform an action. Examples: (1) a "lock" command (requesting the actuator such as servomotor 1316, depicted in FIG. 13, to move the locking device, such as locking pin 1318 so as to secure the shackle, such as shackle 1302); (2) an "unlock" command (requesting the actuator such as servomotor 1316, depicted in FIG. 13, to move the locking device, such as locking pin 1318 so as to release the shackle, such as shackle 1302); (3) a "clear-log" command (requesting the firmware to delete the contents of the aforementioned event log); or (4) a "power-off" command (requesting the firmware to enter the off state 1500, depicted in FIG. 15A). According to some embodiments, all commands requesting the lock to perform an action require inclusion of the lock's digital key in the body of the command. As a part of handling the command, the firmware compares the digital key contained in the body of the command (or otherwise accompanying the command) to the digital key actually assigned to the lock and stored in its memory (such as may have been done during the manufacture or assembly of the lock, or as an antecedent step to its deployment as a part of the safety system), and tests the two keys to determine if they match. If they do in fact match, the commanded action is performed by the firmware. If they do not match, the firmware does not take the commanded action. According to other embodiments, only some of the commands requesting the lock to take an action require inclusion of the lock's digital key in the body of the command. For example, only those commands requesting the lock to take an action that would render a system unsafe for maintenance or would result in data loss pertaining to the operation of the safety system would require inclusion of a lock's digital key. Example: the unlock command, clear-log command, and power-off command would require inclusion of the digital key. (For the sake of clarity, if the lock were to be commanded into the off state 1500, pursuant to certain embodiments, the lock would become unresponsive to the detection of certain lock events, such as a shackle-cut event, which would render a system that the lock was securing unsafe for maintenance; such an event would also not be recorded in the lock's event log or otherwise be reported, resulting in a loss of data.). After either performing the commanded action or not, the lock responds to the device that sent the command via the particular channel through which the command was transmitted (Bluetooth or LoRa) (operation 1512).

The structure of the response to a command includes the lock ID assigned to the particular lock sending the response. As just mentioned, the response may be constituted as a LoRa frame or Bluetooth frame. The lock ID may be presented in the frame header, or may be carried in the payload of the frame. In response to a command requiring a success or failure indication (example: off command, unlock command, clear-log command and optionally a lock-command) the response may be structured to include (in addition to a lock ID): (1) an event ID indicating the sort of event that was generated by the command; (2) an indication of battery life, for example an integer ranging from 0-100 or 0-255 that represents battery voltage or battery, or may be used as an input to a calculation to arrive at battery life; and (3) event data, including an indication of success or failure. In response to a command not requiring a success or failure indication (example: a lock-command according to some embodiments) the response may be structured to include (in addition to a lock ID): (1) an event ID indicating the sort of event that was generated by the command; and (2) an indication of battery life or battery voltage, as described above. In response to a command to retrieve log entries (example: get-log command, or get-unacknowledged-lock-events command) the response may be structured to include a succession of messages—one message for each returned event from the log—that include (in addition to a lock ID): (1) an indicator that the message is an event from the event log; (2) an event ID indicating the type of lock event that is the subject of the log entry; (3) a timestamp indicating the time at which the lock event that is the subject of the log entry occurred; and (4) an indication of whether the lock event that is the subject of the log entry succeeded or failed, if appropriate. In response to a command to retrieve lock information (example: a get-lock-information command) the response may be structure to include (in addition to a lock ID): (1) an indication that the message is returning lock information; (2) an indication of battery life or battery voltage, as described above; (3) the model number of the lock; (4) the firmware version running on the microcontroller of the lock; (5) the hardware version of the lock; and (6) and an indication of the day and time the battery was last changed (i.e., removed so as to run on the supercapacitor 1416, depicted in FIG. 14A, and then reinserted so as to produce approximately 3 volts of electrical potential at the output of the boost converter 1402, depicted in FIG. 14A). Note that an indication of battery voltage is included in every response (except the response pertaining to returning of log entries), although it is not explicitly asked for. The purpose of this is to provide the backend computing platform with a relatively frequent stream of information pertaining to any given lock's battery condition. According to some embodiments, an indication of battery life is an element of every response to a command. As will be seen below, an indication of battery life is an element of a heartbeat message, which is sent approximately periodically, such as once per hour. Battery life is included as an element of a heartbeat message for the same reason. Personnel may use a management portal that draws information from a data store used by the backend computing system to present battery life information, in order to permit the personnel to identify which particular locks require a change of battery (or recharge of battery).

In the wake of having handled the command (operation 1512), the firmware enters the action it took (or failed to take) into an event log maintained by the firmware in memory (operation 1514). In addition to operation 1514 being carried out as a result of having completed operation 1512, operation 1514 can be the entry point of the operational flow of FIG. 15B in the event that a detected lock event is being handled (see connector F) by the operational flow, as opposed to a command (see connector A). If the operational flow is being entered via connector F, the effect is that the step of handling a command (operation 1512) is omitted, which is intuitive because there would be no command to handle, given that the operational flow is being invoked because of a detected lock event—not because of a command having been received by or input into (such as by depression of the button 1460 to command the lock to power up) the lock. A shackle-open or shackle cut event may be an example of such an event that is detected. Whether the operational flow of FIG. 15B is being invoked as the result of the lock having received a command (see connector A) or as the result of having detected an event (see connector F), the event is entered into the aforementioned event log (operation 1514). For the sake of clarity: according to some embodiments, certain commands do not necessarily result in a declaration of a lock event, such as commands that request information (example: a get-log command), in which case, the operational flow is exited pursuant to connector B, as discussed previously, and therefore no entry is made in the aforementioned event log.

According to some embodiments, the event log is implemented as a circular buffer. The circular buffer may be stored in non-volatile memory or in RAM (such as in dynamic RAM) and written to non-volatile memory from time to time or at strategic times to preserve the log. (A write operation is typically performed more quickly when directed to RAM, so it is advantageous to write the log events to a buffer maintained in RAM, and then copy them to non-volatile memory, such as flash memory at a point when it is determined that the information should be preserved in a non-volatile memory.) According to some embodiments, the log is of sufficient length to store a quantity of events anticipated to occur in a month or two months (the time period of a typical turnaround event is between one and two months), or a year or more. According to some embodiments, the log is of sufficient length to include at least 10 entries or 30 entries, or 50 entries, or 100 entries, or 1,000 entries or 10,000 entries or more. According to some embodiments, each entry in the log includes: (1) an indication of the type of lock event that occurred, such as an enumerated indicator; (2) an indication of when the event occurred, such as a timestamp; (3) an optional indicator of whether the event was successful or not (example: FAIL or FALSE or 0 in association with an event type indicating an unlock event, would indicate that the event was declared a failure because the digital key associated with the command was not equal to the digital key actually assigned to the lock, whereas SUCCESS or TRUE or 1 would indicate that the event was declared a success in view of the digital key associated with the command being equal to the digital key actually assigned to the lock); and (4) other optional data that is discussed below. Optionally, an indication of the particular user of the safety system responsible for having issued a command to the lock may be stored in the event log in association with the lock event generated by the command.

In the wake of having written the lock event to the event log, the firmware reports the occurrence of the event to the backend computing platform, such as platform 1208 (depicted in FIG. 12) (operation 1516). According to some embodiments, such report is made via a LoRa transmission by the lock, which is received via a gateway, such as gateway 1201 (depicted in FIG. 12), which, in turn, communicates the occurrence of such event via wireless data service or other network connection to the backend computing platform. According to some embodiments the report is made via a transmission that includes (in addition to the lock ID of the lock transmitting the report): (1) an indication of the type of event being reported; (2) an indication of the charge level or percentage remaining on the lock's battery, such as battery 1400 (depicted in FIG. 14A); (3) optional event data, depending on the event type indication (example: if the event type is an unlock command, data indicating success or failure); and (4) an optional timestamp, indicating the time of the occurrence of the event. According to some embodiments, the timestamp is omitted to reduce the duration of the transmission (to reduce the possibility of interference with transmissions from other locks), and a timestamp is added to the message by the gateway, such as gateway 1201, that receives the transmission, prior to the communication of the event message to the backend computing platform, such as platform 1208. The timestamp may indicate the time of reception of the message by the gateway, such as gateway 1201, as a reasonable approximation of the time of occurrence of the lock event. According to some embodiments, the timestamp is added at the backend computing platform, such as platform 1208. The timestamp may indicate the time of reception of the message by the backend platform, such as platform 1208, as a reasonable approximation of the time of occurrence of the lock event.

In addition to operation 1516 being carried out as a result of having completed operation 1514, operation 1516 can be the entry point of the operational flow of FIG. 15B in the event that a heartbeat message transmission event is being handled (see connector G) by the operational flow, as opposed to a command (see connector A) or another variety of detected event (see connector F) being handled by the operational flow If the operational flow is being entered via connector G, the effect is that the step of handling a command (operation 1512) is omitted, which is once again intuitive because there is no command to handle, and the step of logging the event (operation 1514) is also omitted which is done according to some embodiments for the sake of preserving space in the event log, i.e., to prevent the outcome of filling up the log with periodic heartbeat events which one can simply deduce occurred.

In the wake of having transmitted an event message indicating occurrence of a commanded or detected event or a heartbeat event (operation 1516), the firmware may await a return message (relayed to the lock by the gateway, such as gateway 1201) acknowledging receipt of the transmission (operation 1518). According to some embodiment the return message is made via LoRa transmission and is received by a transceiver (example: LoRa transceiver) onboard the microcontroller, such as microcontroller 1404. According to some embodiments, if it is the case that the event having been reported in operation 1516 was either the occurrence of a command to turn off the lock (i.e, and "off-command" event) or the occurrence of a critical error event such as a loss-of-battery-power error or an over-temperature error, the firmware transitions from operation 1516 to the off state 1500 (depicted in FIG. 15A), as indicated by connector C, without performance of the awaiting-acknowledgement operation 1518.

According to some embodiments, after completing a LoRa transmission (operation 1516) the transceiver onboard the microcontroller opens one or more listening windows (periods of time during which the transceiver listens for messages such as LoRa frames that are addressed to the lock, i.e., LoRa frames that contain the lock ID assigned to the lock). During these listening windows, the transceiver may identify an incoming LoRa frame, addressed to the lock, acknowledging receipt of the transmission by a gateway. The aforementioned LoRa frame acknowledging receipt of the lock's transmission may or may not contain a command to the lock carried in the payload of the frame. Any such command may be of any variety, such as any of the commands previously recited. In the event that an acknowledgement is received by the lock, along with another command delivered in the payload of the LoRa frame, the firmware passes control back to a particular operation in the awake state 1504 identified by connector E, and described in greater below. Summarizing here for the sake of brevity, the ultimate result is that the command will be handled, beginning with operation 1512, pursuant to the operational flow depicted and described with reference to this FIG. 15B. On the other hand, should an acknowledgement be received by the lock, without another command having been delivered via the payload of the LoRa frame, the firmware passes control to operation 1520, the purpose of which is to determine which particular exit path from the operational flow of FIG. 15B ought to be taken by the firmware.

Before discussing operation 1520, it should be observed that it is possible that no acknowledgement is received by the lock in operation 1518. In this case, the firmware passes control back to operation 1516, and re-sends the event message, whereupon control is passed to operation 1518 and an acknowledgement is once again awaited. This loop may repeat for a maximum quantity of iterations equal to a threshold, such as three times. Ultimately, if no acknowledgement is received after repeating the aforementioned loop for a quantity of iterations greater than the threshold, awaiting an acknowledgement is abandoned and control is passed to operation 1520. The purpose of limiting the number of re-transmissions (operation 1516) in an attempt to receive an acknowledgement is to limit the amount of aggregate transmission time devoted to any one event message, so as to reduce the possibility of interference with another lock that may also be attempting to transmit during an overlapping time period. Other embodiments pertaining to dealing with absent acknowledgements are presented herein, below.

Previously, it was stated that if the event having been reported in operation 1516 was either the occurrence of an "off-command" event or the occurrence of a critical error event, the firmware transitions from operation 1516 to the off state 1500 (depicted in FIG. 15A), as indicated by connector C, without performance of the awaiting-acknowledgement operation 1518. According to some embodiments, the firmware in fact awaits an acknowledgement prior to transitioning to the off state 1500. If no acknowledgement is received, the loop defined by operations 1518 and 1516 is iterated up to a threshold period of times (example: up to three times), and if no acknowledgement is received during such iteration, the firmware transitions to the off state 1500, as depicted by the dotted line leading from operation 1518 to connector C.

Returning to the topic of operation 1520, in this operation, a determination is made pertaining to which particular exit from the operational flow of FIG. 15B should be taken by the firmware. Operation 1520 functions by examining the pathway through which the operational flow of FIG. 15B was entered. If the operational flow of FIG. 15B was entered from the "wake up?" state 1510, i.e., through connector F, then it must be the case that the operational flow was entered as the result of an event having been detected via polling while in state 1510. In this case, the proper exit of the operation flow is for the firmware to return to a particular operation within the "wake up?" state 1510 (see connector I) to carry out further operations in that state 1510. Details pertaining to the connector I and operations of the "wake up?" state 1510 generally are presented below. On the other hand, if it is the case that the operational flow was entered from (1) the sleep state 1508, or (2) from the send heartbeat state 1506 if the state immediately prior to that was the "wake up?" state 1510, then the proper exit of the operation flow is for the firmware to exit to the sleep state 1508. (In the event that prior to entering the operational flow of FIG. 15B, the previous state had been the sleep state 1508, then that means that a lock event had been detected during the sleep state 1508 by virtue of delivery of an interrupt to the microcontroller, such as microcontroller 1404—a possibility allowed for in alternate embodiments of FIG. 15A, presented below. In this case, after reporting the occurrence of the event, the firmware should return to sleep 1508, until another interrupt causes it to exit that state in the future. Alternatively, in the event that prior to entering the operational flow of FIG. 15B, (1) the previous state was the send heartbeat state 1506, and (2) the state immediately before the send heartbeat state 1506 had been the "wake up?" state 1510, this means that the firmware had exited the sleep state 1508 and determined it was time to send a heartbeat message. Thus, given that the heartbeat has been sent (operation 1516), the proper decision of operation 1520 is to exit the operational flow by returning to sleep). In all other cases, the operation 1520 exits the operational flow by returning to the main run loop of the awake state 1504 (see connector B). The operations of the awake state 1504, including its run loop are presented below.

Based on the preceding discussion, certain general principles are evident. The lock primarily alternates between the awake state 1504 and the sleep state 1508. The awake state 1504 is entered as a result of a user depressing the button 1460 (FIG. 14A) to indicate that the user desires to interact with the lock to send a command to it. While in the awake state 1504, the lock is responsive to commands received via wireless channels (such as via Bluetooth and LoRa channels) and can detect the occurrence of events, which it logs in an internal event log and reports to the backend computing platform 1208 (FIG. 12). Some commands also result in the declaration of an event, and are similarly logged and reported. For the sake of preserving the energy stored in the lock's battery 1400 (FIG. 14A), the lock transitions from the awake state 1504 to the sleep state 1508 when its communication session or sessions end, or in the event that such a session fails to be established in the first place. While in the sleep state 1504, the lock powers down substantially all circuits other than the microcontroller 1404 (FIG. 14A) and those circuits that will announce the occurrence of an event to the microcontroller via an interrupt. The microcontroller 1404 "sleeps" by going into a low activity state wherein it simply awaits the delivery of an external interrupt. Very little electrical power is consumed during this period. The sleep state 1508 is exited for three reasons: (1) the button 1460 (FIG. 14A) is pushed, thereby delivering an interrupt—this causes a transition to the awake state 1504, which has been discussed; (2) an event other than a button-push is announced via an external interrupt, in which case the event is handled (logged and reported, as discussed with reference to FIG. 15B); and (3) a timer on-board the microcontroller periodically "fires," thereby generating an interrupt, causing the firmware to (i) power-up those circuits detecting events not announced via an interrupt, or command that they exit sleep state, (ii) poll those circuits to determine if they reveal the occurrence of an event, (iii) handle any such events and then power down those circuits or command them into a sleep state, (iv) check to see if the button was also pushed for at least a threshold period of time and transition to the awake state if that is the case, and (v) determine if it is time to send a heartbeat message and send such a message if that is the case. Unless the button 1460 (FIG. 14A) was pushed, the firmware will ultimately re-enter the sleep state 1508 to preserve power. Thus, if the button 1460 is not pushed the firmware periodically exits the sleep state 1508 to either handle an event or send a heartbeat, and then ultimately returns to the sleep state 1508—through various possible paths—to preserve power.

Neither the operations of the awake state 1504 nor the sleep state 1508 have been discussed in detail yet. Discussion now turns to certain embodiments of the operations of the awake state 1504.

The operations of the awake state 1504 can be divided into: (1) operations performed prior to the establishment of a user-initiated communication link, e.g., prior to pairing via Bluetooth in the wake of the user depressing the button 1460 (FIG. 14A); and (2) operations performed following the establishment of a user-initiated communication link. Discussion now turns to FIG. 15C which depicts the operation of the awake state 1504 prior to establishment of a user-initiated communication link, which is described herein as a Bluetooth link for exemplary purposes only.

Figure 15C:
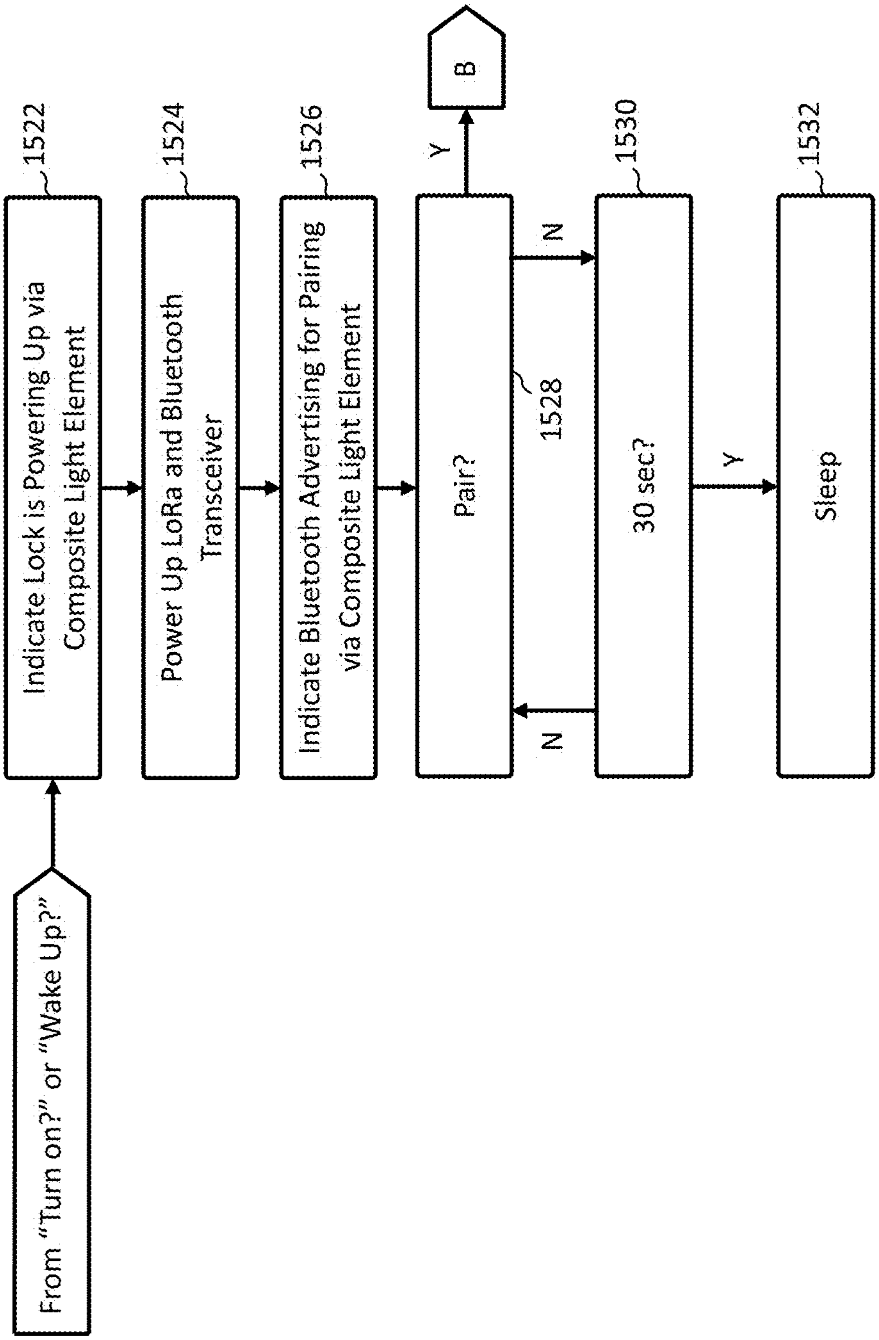
FIG. 15C depicts another portion of a state transition diagram describing the operational and state flow of various embodiments of firmware that may execute on a microcontroller or processor of various embodiments of the aforementioned lock.

The operations of FIG. 15C can be entered from either the "turn on?" state 1502 or the "wake up?" state 1510, in each case as a result of the user of the safety system having depressed the button 1460 (FIG. 14A) for at least a threshold period of time (example: 2, 3, or 5 seconds). (According to some embodiments, the operations of FIG. 15C can be entered upon insertion of a battery 1334, such as by bypassing the off state 1500, upon insertion of a battery 1334.) In response, the firmware controls the composite light element 1468 (FIG. 14B) to indicate that the lock is powering up. For example, the light element 1468 may be controlled to cause it to light up a particular color, such as blue, for a period of time determined by the firmware, or during the period in which the power-up activities are occurring.

Next, in operation 1524 the Bluetooth transceiver 1420 is powered up and reset, as is the LoRa transceiver onboard the microcontroller 1404. According to some embodiments, the carrying out of operation 1524 causes the Bluetooth transceiver 1420 to begin advertising that it is available for pairing. Thereafter, in operation 1526, the firmware controls the composite light element 1468 to indicate to the user that the Bluetooth transceiver is advertising for pairing. For example, the firmware may cause the light element 1468 to transition from emission of the particular hue determined in operation 1522 to a new hue, such as a blinking white light. This indicates to the user that he may attempt to pair the lock with an app on a mobile device such as a smartphone or tablet, in order to interact with the lock.

After having indicated to the user that the lock is advertising for pairing, the firmware enters a loop defined by operations 1528 and 1530. In operation 1528, the firmware tests to determine whether a communication session has been established. If not, control is passed to operation 1530, in which the firmware compares an indication of the current time against (such as a timer that begins counting at power-up of the microcontroller 1404) against a timestamp indicating the time at which the Bluetooth transceiver 1420 began advertising for pairing, in order to determine whether a threshold period of time has elapsed, such as 10, 20 or 30 seconds. The loop defined by operations 1528 and 1530 continues until either Bluetooth pairing occurs, at which point the firmware powers down the light element 1432 and enters a run-loop (see connector B) described below, or until the threshold is reached, at which point the firmware powers down the light element 1432 and transitions to the sleep state 1508 (operation 1532). According to some embodiments, the firmware may command the composite light element 1468 (FIG. 14A) to emit a particular color light (example: green) to indicate that a successful Bluetooth session has been established. According to some embodiments, the composite light element 1468 remains illuminated for the duration of the session, and according to other embodiments, the composite light element 1468 illuminates for a fixed duration (example: 2 or 3 seconds—long enough to produce an observable indication to the user, and upon expiration of the fixed duration the element 1468 is deactivated, to preserve battery 1334 power).

Figure 15D:
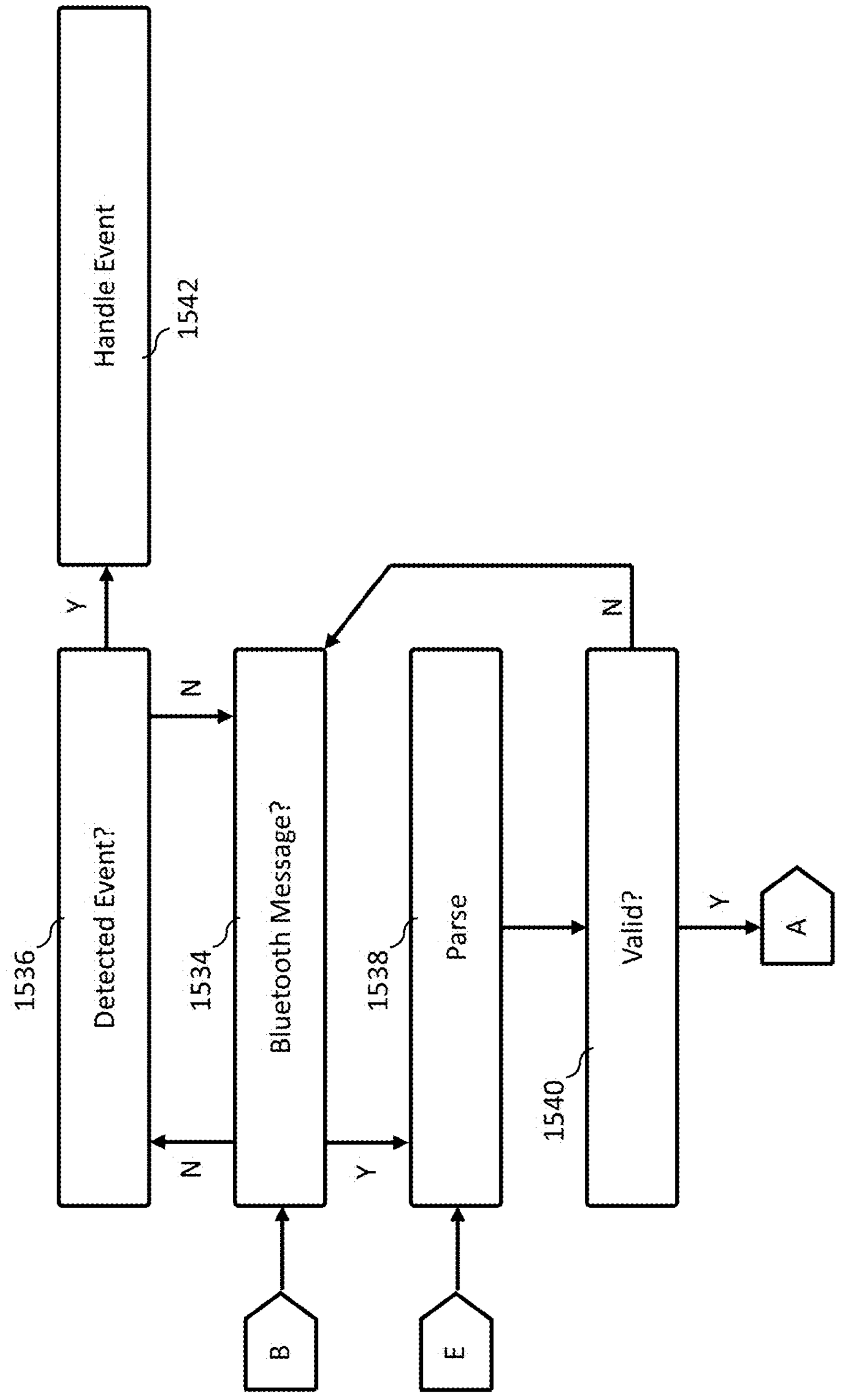
FIG. 15D depicts another portion of a state transition diagram describing the operational and state flow of various embodiments of firmware that may execute on a microcontroller or processor of various embodiments of the aforementioned lock.

FIG. 15D depicts the operational flow of the awake state 1504 after a communication session has been established. There are two possible entry points to the operational flow of FIG. 15D: (1) connector E, which defines the proper entry point of operational flow in the wake of having received a command via the LoRa channel, such as may occur at operation 1518 of FIG. 15B during a listening window that has opened in the wake of a LoRa transmission; and (2) connector B, which defines the proper entry point when the run-loop of the awake state is to be executed.

Operations 1534 and 1536 define the run-loop of the awake state 1504. The run-loop is entered from connector B. The firmware passes operational control to connector B (and therefore to operation 1534) after pairing is established in operation 1528 of FIG. 15C, which was just discussed. The firmware may also pass control to connector B (i.e., operation 1534) at operation 1520 (FIG. 15B), after having handled a command or event, and determined that the proper exit of that operational flow is to return to the run-loop of the awake state 1504. In either case, the firmware traverses the loop defined by operations 1534 and 1536, in which the firmware tests for the reception of a command via its Bluetooth channel (operation 1534), and if no such command is found, then tests for the detection of an event (operation 1536). The firmware remains in the aforementioned loop until either a command or an event is detected.

In the event a command is detected, operational control is passed to operation 1538, whereupon the command received from the Bluetooth transceiver 1420 is parsed into its constituent data elements. The data elements are then examined to determine if the Bluetooth message is indeed a valid command (operation 1540). If it is, in fact, a valid command, then the command is handled as previously described with reference to FIG. 15B (see connector A). On the other hand, if the command is invalid, then it is discarded and control is returned to the run-loop at operation 1534.

Figure 15E:
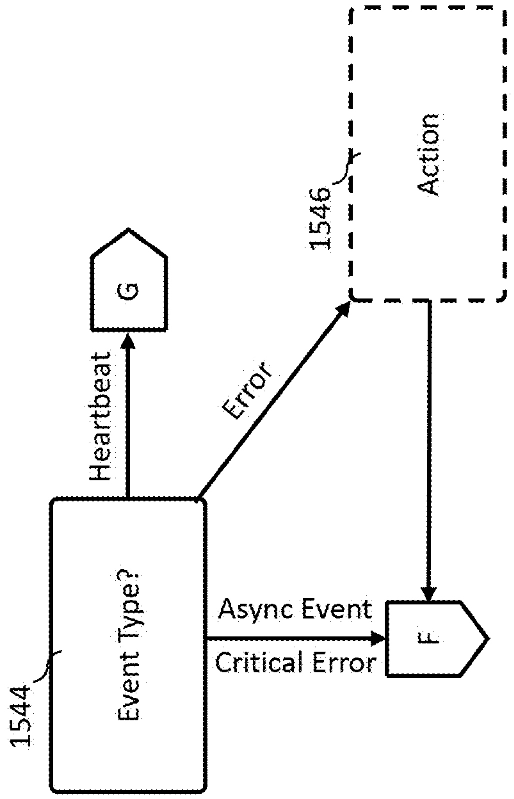
FIG. 15E depicts another portion of a state transition diagram describing the operational and state flow of various embodiments of firmware that may execute on a microcontroller or processor of various embodiments of the aforementioned lock.
Figure 15F:
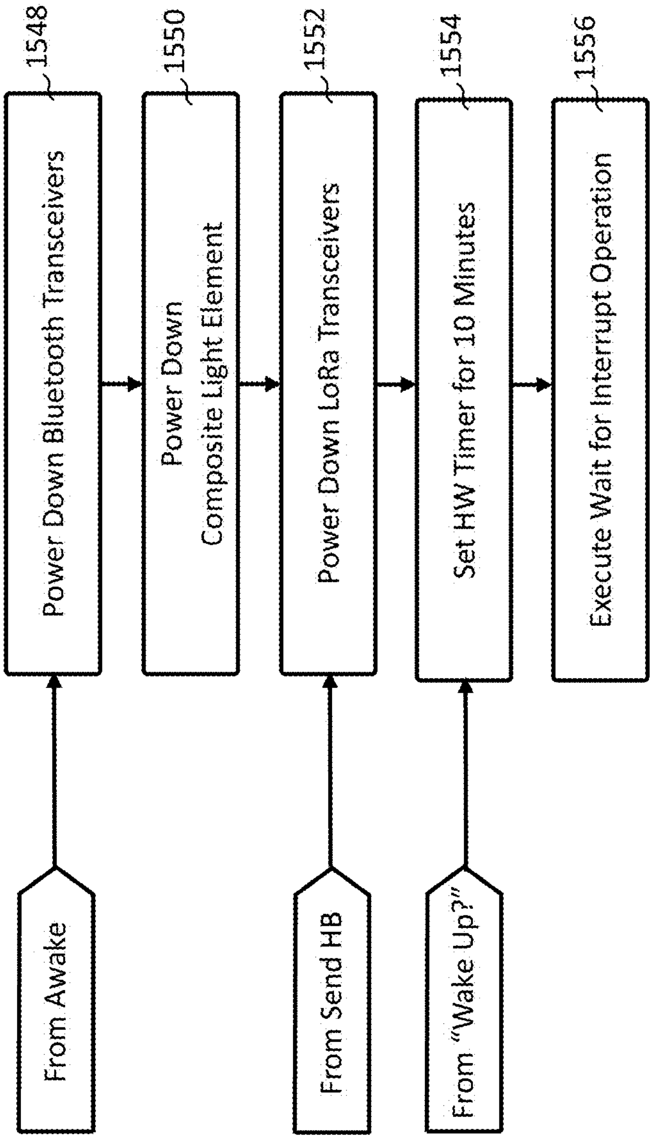
FIG. 15F depicts another portion of a state transition diagram describing the operational and state flow of various embodiments of firmware that may execute on a microcontroller or processor of various embodiments of the aforementioned lock.
Figure 15G:
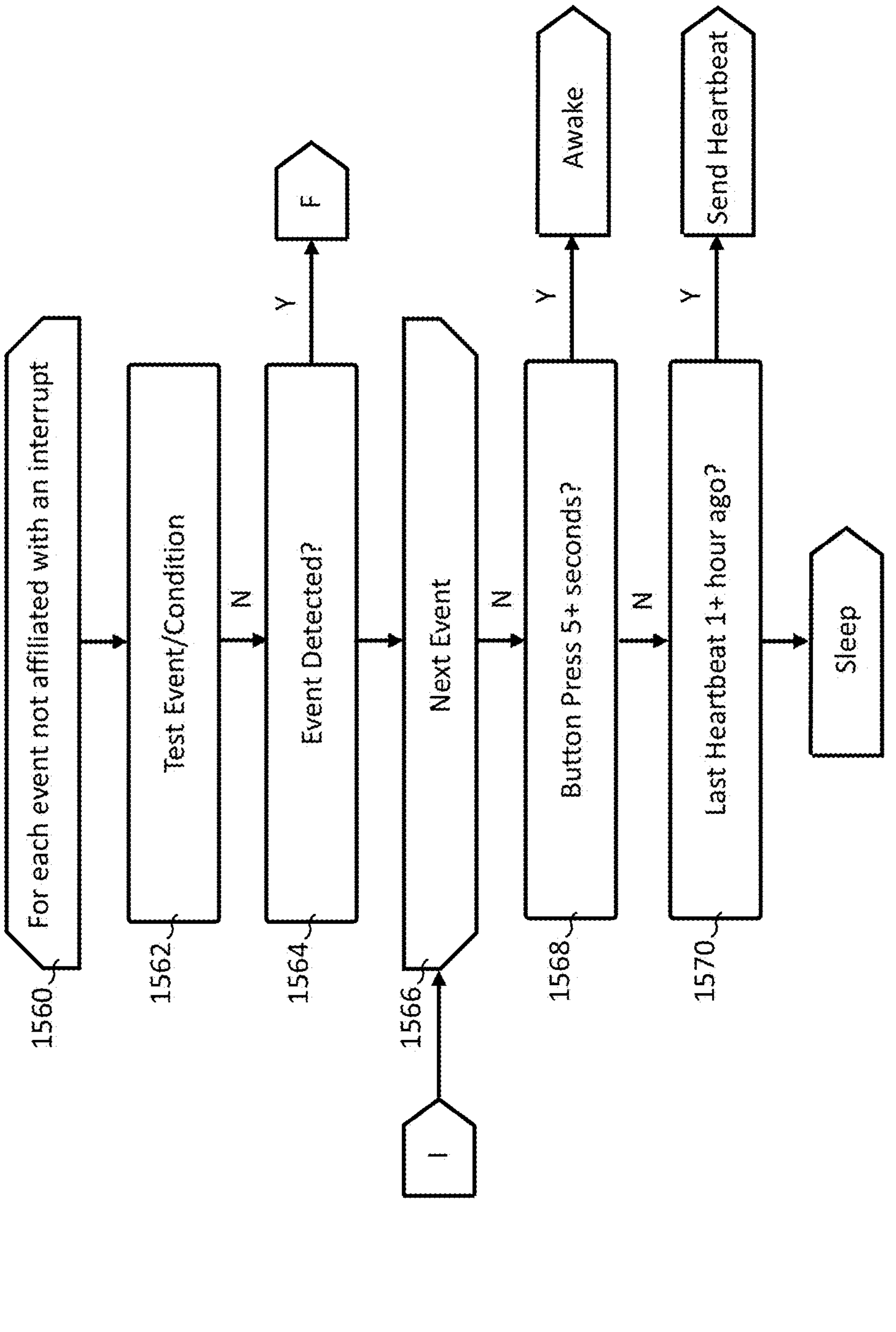
FIG. 15G depicts another portion of a state transition diagram describing the operational and state flow of various embodiments of firmware that may execute on a microcontroller or processor of various embodiments of the aforementioned lock.

If it is the case that an event is detected while in the aforementioned run-loop, then the event is processed (operation 1542) prior to being handled via the operational flow of FIG. 15B, as described previously. FIG. 15E depicts the operational flow by which a detected event is processed prior to handling. Processing operation begins with determining the variety of event that has been detected (operation 1544), as a precursor to determining how to handle the event, and whether there may be an antecedent step to such handling. If the detected event is that it has been more than a threshold period of time since the previous transmission of a heartbeat message, then the send heartbeat state 1506 is entered, the operational flow of which is constituted of invoking connector G, i.e., initiating the handling operational flow of FIG. 15B at operation 1516 to transmit the heartbeat message via LoRa. On the other hand, if the detected event is a critical error or non-error asynchronous event (example: shackle closed, battery inserted, etc.), then control is passed to connector F, i.e., the handling operational flow of FIG. 15B is initiated at operation 1514 whereupon the event is logged, and thereafter handled as described previously with regard to FIG. 15B. Finally, if the detected event is a non-critical error (example: low-battery error, near-over-temperature error, etc.), then control is optionally passed to operation 1546 wherein a corrective or mitigating action is taken (example: the periodicity of the clock that generates external interrupts to cause periodic exit from the sleep state 1508 may be elongated to slow the consumption of power—which would both reduce heat generated internal to the lock and would also slow the draining of the battery.). After having optionally taken the corrective or mitigating action, control is passed to connector F, meaning the handling operational flow of FIG. 15B is initiated at operation 1514, as described above.

Previously, the sleep state 1508 was described as being entered from various different firmware states, as the consequence of various events. For example, the sleep state 1508 may be entered from: (1) the awake 1504 in response to the termination of a user-initiated communication session such as a Bluetooth session, or the failure to have established such a session such as may be determined in operation 1530 (FIG. 15C); (2) from the send heartbeat state 1506 if it was the case that the firmware had exited the sleep state 1508 to send a heartbeat message such as may be determined in operation 1520 (FIG. 15B); or (3) from the "wake up?" state 1510, in the event that the button 1460 (FIG. 14A) had either never been depressed by the user or was depressed for a period of less than a threshold period of time, such as 2, 3 or 5 seconds.

In the event that the sleep state 1508 is entered from the awake state 1504 (see the connector labeled "From Awake"), then the firmware powers down the transceivers handling the user-initiated communication sessions such as the Bluetooth transceiver 1420 (FIG. 14A) (operation 1548). Next, the composite light element 1468 (FIG. 14B) is powered down (operation 1550).

In operation 1552, the transceiver responsible for sending heartbeat messages or reporting lock events (such as the LoRa transceiver onboard the microcontroller 1404) is powered down. Operation 1552 may be executed as the result of having completed operation 1550, or as a result of entering the operational flow of FIG. 15F because of having completed the communication of a heartbeat message (see the connector labeled "From Send HB"). The consequence of entering the operational flow at operation 1552 is that the steps of powering down the Bluetooth transceiver 1420 and composite light element 1468 are omitted, which is intuitive in the case where the sleep state is being re-entered after having exited that state to send a heartbeat message, because those circuits were not powered up in the context of having sent a heartbeat message.

Next, in operation 1554, a hardware timer is set to a timeframe that determines the next time at which the sleep state will be exited to enter the "wake up?" state 1510, for example, it may be set to 10 minutes. Operation 1554 may be executed as the result of having completed operation 1552, or as a result of entering the operational flow of FIG. 15F because during the "wake up?" state 1510, it was determined that the button 1460 was either never depressed by the user or was depressed for less than the aforementioned threshold period of time (see the connector labeled "From 'Wake Up?'". The consequence of entering the operational flow at operation 1554 is that the steps of powering down the Bluetooth transceiver 1420, composite light element 1468 and LoRa transceiver are omitted, which is intuitive in the case where the sleep state is being re-entered after determining that the button 1460 was not depressed for at least a threshold period of time, because those circuits were not powered up in the context of having sent a heartbeat message. Finally, in operation 1556, the firmware executes a wait for external interrupt operation, causing the microcontroller to enter a low activity (and therefore low power) state wherein the microcontroller simply awaits the occurrence of the next external interrupt.

The "wake up?" state 1510 has been discussed in connection with describing various exits and possible returns from and to the sleep state 1508, but its operations have not yet been described in detail. Discussion is now turned to FIG. 15G which depicts the operation of the "wake up?" state 1510.

The operations of the "wake up?" state 1510 are entered from the sleep state 1508 at operation 1560. Loop limit indicators 1560 and 1566 define a loop, wherein each event or condition that is not associated with an interrupt is tested (operation 1562), meaning that the data defining the condition or occurrence of an event is read, such as reading a digital value determined by an ADC, such as an ADC onboard the microcontroller 1404, in order to obtain a digital value representing battery level or temperature or humidity and so on, for instance. In the context of testing for the occurrence of an event, to the extent the occurrence of such event is indicated based upon data from a sensor circuit that supplies an ADC, operation 1562 includes: (i) powering up or waking up the relevant sensor circuit; (ii) optionally commanding the sensor circuit to deliver data; (iii) reading the data from the circuit; and (iv) powering down or commanding into sleep mode the sensor circuit. In the context of testing to determine a tested condition of the lock (such as the level of the battery 1400), operation 1562 includes: (i) reading data from the sensor, by for example, reading the data from the particular ADC onboard the microcontroller 1404 that was previously described as coupled to a particular port; and (ii) storing the just-obtained data, or a value obtained from that data, in memory to represent the near-present state of the lock's battery 1400.

To test if an event has occurred, the data read in operation 1562 may be compared against a threshold (example: comparing temperature data against upper or lower thermal operational limits to determine that an over-temperature, under-temperature, near-over-temperature or near-under-temperature event has occurred; or comparing battery level data against a lower limit to determine that a low-battery-event has occurred) (operation 1564). If an event has occurred, the event is handled, as discussed previously with reference to FIG. 15B (see connector F), and the next event or condition is tested (see connector I, returning control to loop limit indicator 1566). According to some embodiments, the signal associated with the microswitch 1444 is an example of a signal not associated with an interrupt, although this is not preferable. Thus, the ADC coupled to the particular port to which the microswitch 1444 is coupled may be read (operation 1562) and tested to determine whether an open-shackle event occurred or a shackle-cut event occurred. On the other hand, if no event is detected in operation 1564, then control is directly passed from operation 1564 to loop limit indicator 1564, and the next event or condition is tested. It should be noted that with regard to sensor circuits not coupled to an I/O port assigned to an interrupt are powered up (or commanded out of a sleep state) immediately prior to obtaining data therefrom, and are promptly powered down after having obtained such data. This procedure preserves battery power, as these circuits are not usually in an operational state.

In the wake of testing and potentially handling all of the events and conditions, control is passed to operation 1568, wherein it is determined whether the lock's button 1460 (FIG. 14A) was depressed, and if so, whether the button remained depressed for a period at least equal to a threshold, such as 2, 3 or 5 seconds. If so, then the firmware exits the "wake up?" state 1510, and enters the awake state 1504 (see the connector labeled "Awake"), the operations of which have been described previously. It is worth noting that if the "wake up?" state 1510 is exited via the connector labeled "Awake," the necessity of sending a heartbeat message will be tested by the operations of the awake state 1504, as described previously. This means that a user depressing the button 1460 to wake up the lock will not pre-empt sending a heartbeat message.

Returning discussion to operation 1568 wherein it is determined whether the lock's button 1460 was depressed for a period of time at least equal to a threshold, if it is the case that the button 1460 was either not depressed at all or not depressed for a sufficient period of time, then control is passed to operation 1570, wherein it is determined whether at least a threshold period of time (example: 1 hour or 2 hours) has elapsed since the last heartbeat message was sent. If not, then the "sleep" state is re-entered (see the connector labeled "Sleep"). On the other hand, if a threshold period of time has, in fact, elapsed since the sending of the last heartbeat message, then the "wake up?" state 1510 is exited and the "send heartbeat" state 1506 is entered (see the connector labeled "Send Heartbeat"). The operations of the "send heartbeat" are invoked by entry of the operational flow of FIG. 15B at connector B, as discussed previously. According to some embodiments, the heartbeat message includes: (1) a message code indicating that the message is a heartbeat message; (2) an indication of the level of the battery 1400 of the lock; and (3) an indication of whether the lock is open or locked, which may optionally be indicated via a bit designated for such indication within the aforementioned message code. According to some embodiments, the heartbeat message also includes the final entry in the event log. Thus, a determination can be made at the backend computing platform 1208 (FIG. 12) whether any events have failed to be communicated to the platform 1208 (such as may occur due to interference) since the reception of the last event message or heartbeat message from the lock. According to some embodiments, a heartbeat message includes all events in the log that have not been acknowledged as received by the gateway in operation 1518 (FIG. 15B). As discussed below, events received pursuant to re-transmission attempts (because of lack of acknowledgement of reception) are used for input into a state machine to determine isolation point status. Any such event messages carried within a heartbeat message will therefore be used as such an input.

Figure 15H:
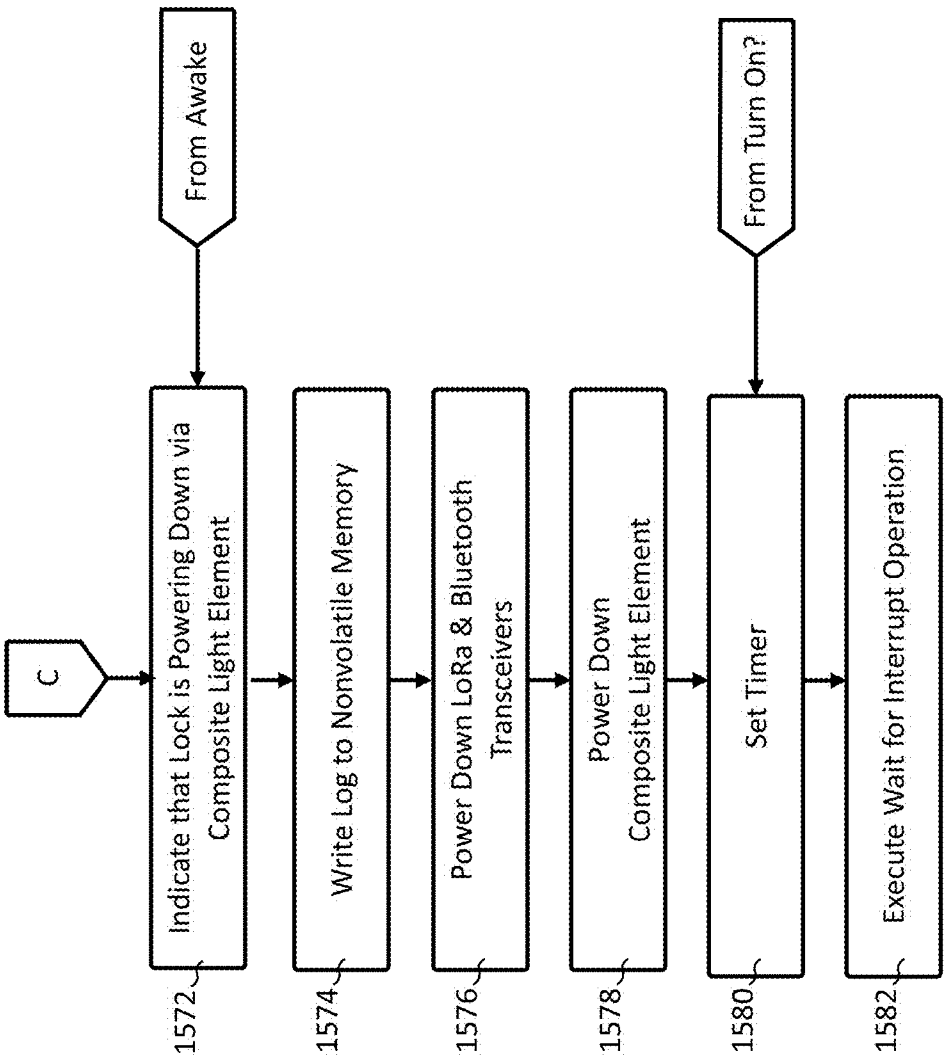
FIG. 15H depicts another portion of a state transition diagram describing the operational and state flow of various embodiments of firmware that may execute on a microcontroller or processor of various embodiments of the aforementioned lock.

Discussion now turns to FIG. 15H, which depicts an embodiment of the operational flow of the "off" state 1500. Operation 1572 is entered by virtue of the occurrence of a critical error event or the lock having been commanded to turn off (see, for example, discussion relating to operation 1516 of FIG. 15B). In operation 1572, the firmware controls a light element, such as composite light element 1468 (FIG. 14B) so as to indicate that the lock is powering down. For example, the firmware may control the light element so as to emit a red light.

Next, in operation 1574, the lock log is written to non-volatile memory. This is done because the lock may have encountered a critical error (that is one particular reason for entering the "off" state 1500) and it is conceivable that the lock may encounter conditions that cause it to lose power to its volatile memory in which the event log is stored by virtue of the occurrence of a critical error. Additionally, the lock may have been commanded off as an antecedent to changing its battery. According to some embodiments, it is not necessary to command the lock to power off prior to changing its battery, nor should power loss be expected from changing its battery. Nevertheless, out of an abundance of caution (a battery could be removed for a protracted period such as days or weeks prior to reintroduction of a new battery), the event log is written to non-volatile memory.

After having written the log to non-volatile memory 1574, control is passed to operation 1576, wherein the Bluetooth transceiver 1420 and LoRa transceiver onboard the microcontroller 1404 are powered down (including their supporting circuitry described with reference to FIGS. 14A and 14B). (Recall: the entry point to the operational flow of FIG. 15H is connector C, which is invoked in the context of an "off" command or critical error at operation 1516 or 1518, after having logged the command or critical error and reported it via the LoRa transceiver—thus, the LoRa transceiver will have been activated by virtue of its use in operation 1516 and therefore should be deactivated as a part of the process transitioning into the "off" state 1500.)

After having powered down the transceivers (operation 1576), control is passed to operation 1578, wherein the composite light element 1468 (FIG. 14B) is powered down (operation 1578). Next, according to some embodiments control is optionally passed to operation 1580 in which a hardware timer (which generates an external interrupt) is set for a particular time interval, which will determine a period at which the "off" state 1500 will be exited and the "turn on" state 1502 will be entered by virtue of the aforementioned interrupt having been delivered. Conceptually, operation 1580 may be omitted, but according to some embodiments, a technical limitation of some microcontrollers, such as microcontroller 1404 in certain embodiments, is that they cannot indefinitely await the occurrence of external interrupt, so one must be provided by a timer. According to some embodiments, the aforementioned timer is onboard the microcontroller 1404, and is set to the longest period possible given the architecture of the timer.

Operation 1580 may be a point of entry of the operational flow of FIG. 15H, in the event that the operational flow is entered from the "turn on?" state 1502. In such a scenario, the firmware determines that the lock's button 1460 (FIG. 14A) either was not depressed (i.e., the "turn on?" state 1502 was entered as the result of an interrupt generated by the aforementioned hardware timer), or the button 1460 was in fact depressed, but not for the requisite threshold duration of time to result in transition to the "awake" state 1504. Thus, the "off" state 1500 is to be re-entered from the "turn on?" state 1502, and the only requisite action is to set the aforementioned timer (if required by the architecture of the microcontroller 1404), prior to proceeding on to operation 1582. In operation 1582, the microcontroller 1404 is commanded to await the delivery of an external interrupt, thus causing it to enter into a low-activity state, as discussed previously with respect to the "sleep" state 1508 (FIG. 15A).

Figure 15I:
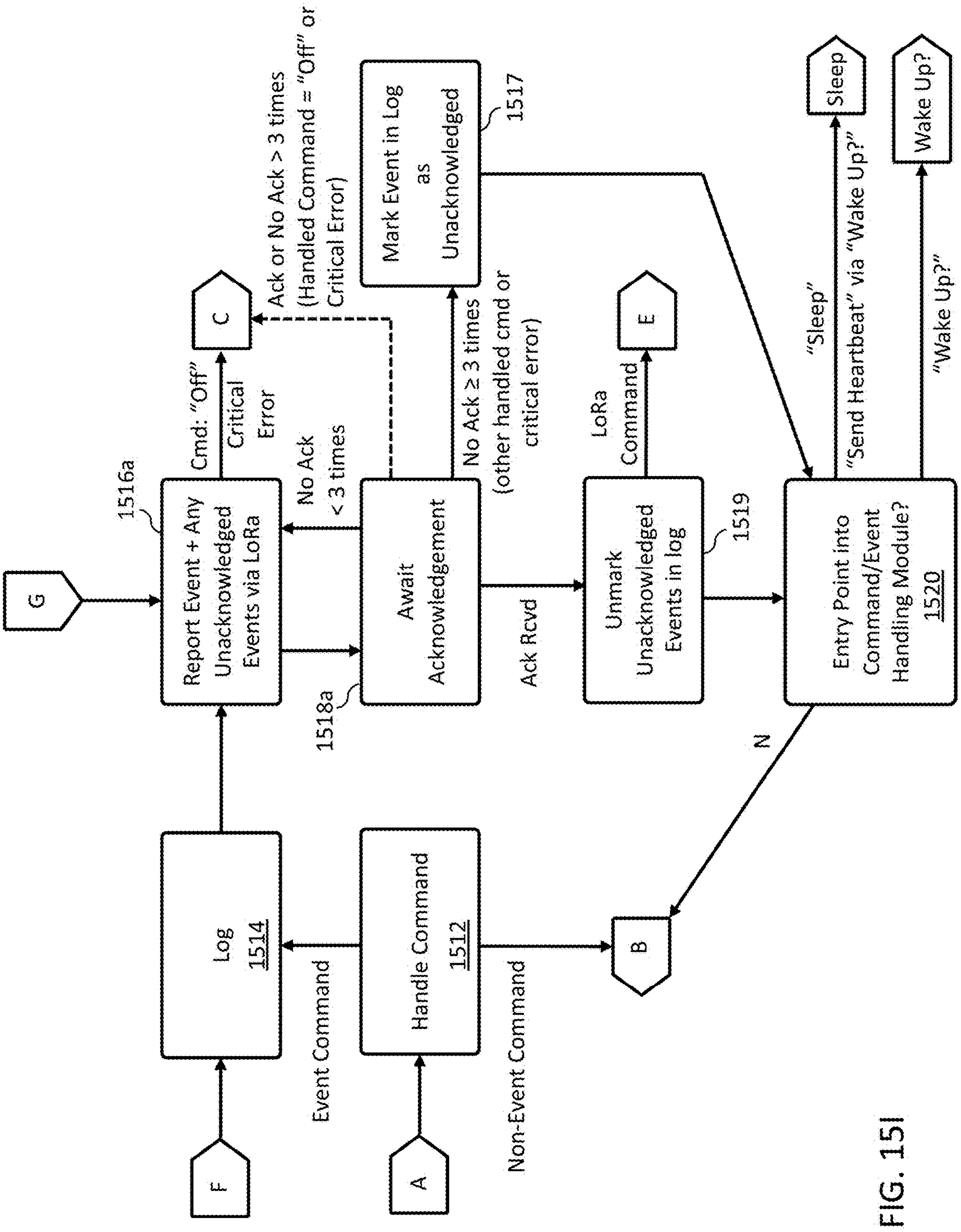
FIG. 15I depicts another portion of a state transition diagram describing the operational and state flow of various embodiments of firmware that may execute on a microcontroller or processor of various embodiments of the aforementioned lock.

FIG. 15I depicts an alternate embodiment of the operational flow depicted in FIG. 15B. In the context of FIG. 15B, operations 1516 and 1518 defined a loop wherein a given event would be reported via a long-range transmission capability (such as LoRa) (operation 1516), and an acknowledgement of receipt of the reported event would be awaited in operation 1518. If no acknowledgement of receipt of the reported event was received by the lock in operation 1518, the firmware would re-attempt reporting the event (operation 1516), and this cycle would continue until: (1) an acknowledgement was actually received; or (2) no acknowledgement was received but a maximum-transmission-attempt limit (example: three transmission attempts) had been hit. Assuming a transmission attempt limit of three, then according to the embodiments of FIG. 15B, no more than a trio of attempts will be made to report a given event in pursuit of receipt of an acknowledgement of the report, however the embodiments of FIG. 15I allow for multiple trios of attempts to be made to report a given event.

According to the embodiments of FIG. 15I, the aforementioned event log is altered to include the following informational elements: (1) an indication of the type of lock event that occurred, such as an enumerated indicator; (2) an indication of when the event occurred, such as a timestamp; (3) an optional indicator of whether the event was successful or not (example: FAIL or FALSE or 0 in association with an event type indicating an unlock event, would indicate that the event was declared a failure because the digital key associated with the command was not equal to the digital key actually assigned to the lock, whereas SUCCESS or TRUE or 1 would indicate that the event was declared a success in view of the digital key associated with the command being equal to the digital key actually assigned to the lock); and (4) an indication of whether the event had been reported and acknowledged.

According to the embodiments of FIG. 15I, operation 1516 is altered to become 1516*a* so as to report all events that are not indicated within the event log as having been reported and acknowledged—not simply the most recent event as was the case pursuant to the embodiments of FIG. 15B. In other words, pursuant to the embodiments of FIG. 15I, the most recent event will be reported (because such event just occurred and no previous attempt has ever been made to report the event), and any previous events that went unacknowledged will also be reported during execution of operation 1516*a*. Operations 1516*a* and 1518*a* cooperate to define a loop whereby the aforementioned event(s) will be reported in operation 1516*a* and an acknowledgement of such report will be awaited in operation 1518*a*. If no acknowledgement of receipt of the reported event(s) is received by the lock in operation 1518*a*, the firmware re-attempts reporting the event(s) (operation 1516*a*), and this cycle continues until: (1) an acknowledgement was actually received; or (2) no acknowledgement was received but a maximum-transmission-attempt limit (example: three transmission attempts) had been hit. Other than in cases in which the most recent event was the occurrence of a critical error or an "off" command, in the event that the maximum-transmission-attempt limit is reached, the firmware transitions to operation 1517. In operation 1517, the most recent event is recorded in the event log as having been unacknowledged, meaning that the next time operation 1516*a* is executed, this event will be reported. In the wake of completing operation 1517, control is passed to operation 1520 to determine the appropriate exit for the operational flow of FIG. 15I.

Returning the discussion to operation 1518*a*, if an acknowledgement is, in fact, received during execution of operation 1518, then the firmware transitions to operation 1519, whereupon all of the log entries corresponding to the events reported in operation 1516*a* are altered to indicate that they have been acknowledged. This means that the just-acknowledged events will not be reported in any future executions of operation 1516*a*. (The operations not mentioned with reference to discussion of FIG. 15I operate in a similar manner to those described with reference to FIG. 15B and are not re-discussed for the sake of brevity.)

Figure 15J:
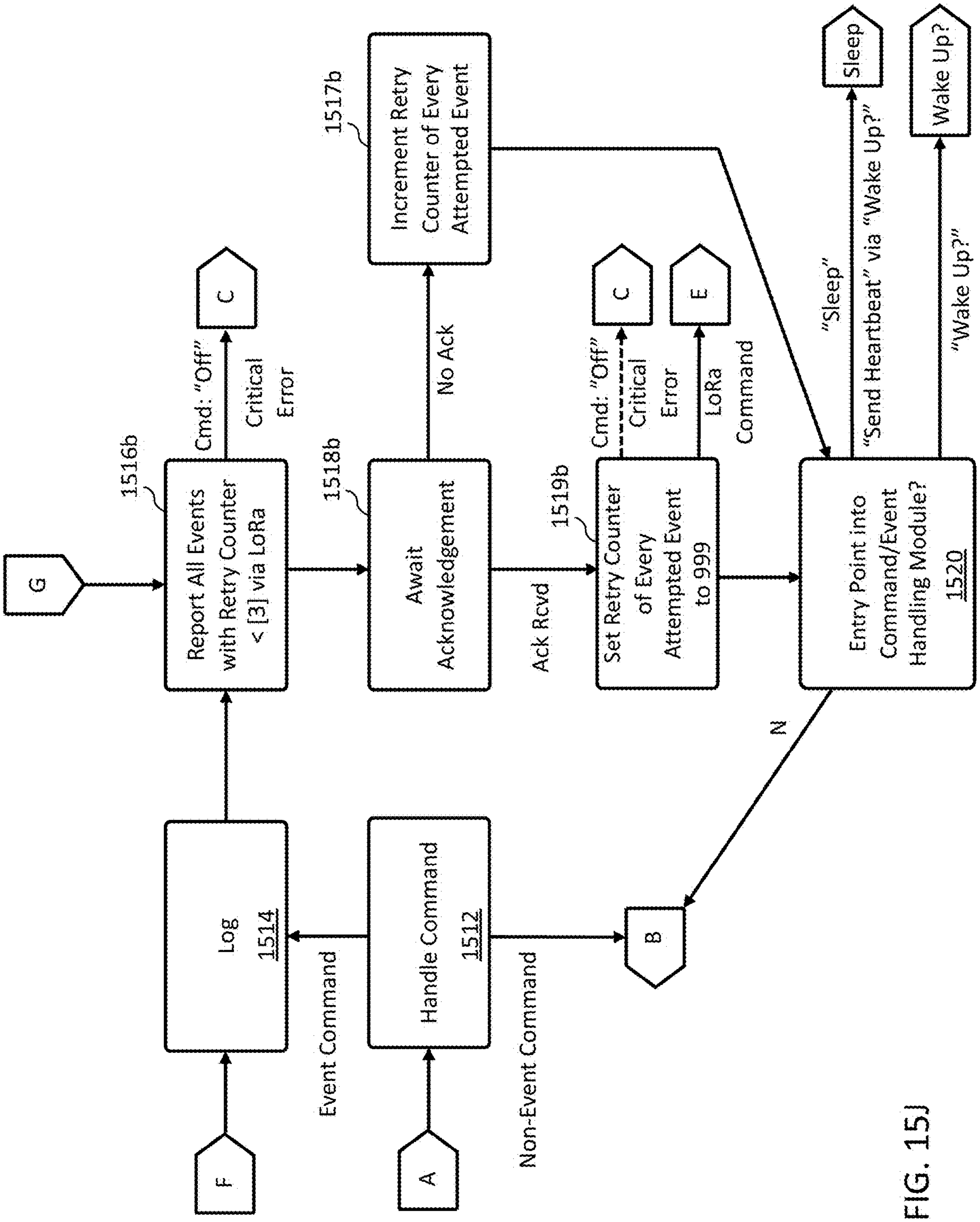
FIG. 15J depicts another portion of a state transition diagram describing the operational and state flow of various embodiments of firmware that may execute on a microcontroller or processor of various embodiments of the aforementioned lock.

FIG. 15J depicts additional alternate embodiments of the operational flow of FIG. 15B. (The operations not discussed in reference to FIG. 15J operate similarly to those depicted and discussed with reference to FIG. 15B. For the sake of brevity, their discussion has not been repeated.)

According to the embodiments of FIG. 15J, the aforementioned event log is altered to include the following informational elements: (1) an indication of the type of lock event that occurred, such as an enumerated indicator; (2) an indication of when the event occurred, such as a timestamp; (3) an optional indicator of whether the event was successful or not (example: FAIL or FALSE or 0 in association with an event type indicating an unlock event, would indicate that the event was declared a failure because the digital key associated with the command was not equal to the digital key actually assigned to the lock, whereas SUCCESS or TRUE or 1 would indicate that the event was declared a success in view of the digital key associated with the command being equal to the digital key actually assigned to the lock); and (4) an indication of the quantity of transmission attempts of the event.

To summarize the operational flow of FIG. 15J, the flow has been altered so that only a single attempt at transmitting a report is made during a single pass through the flow. All events that are indicated in the log as (1) not having been acknowledged, and (2) having been included in fewer than a threshold quantity of report transmissions, will be included in the aforementioned transmitted report. Thus, for example, if the threshold is set to three, then a given event will be the subject of an attempted report transmission during the particular pass through the flow that is initiated by the occurrence of the aforementioned given event. If the report is not acknowledged, the log is updated to indicate that the given event has been the subject of one report transmission without acknowledgement. When a subsequent lock event occurs, both the new event and the aforementioned unacknowledged event are included in the report transmission stimulated by the new event. If the report transmission stimulated by the new event is unacknowledged, the log is updated to reflect that: (1) the first event has now been included in two report transmissions without acknowledgement; and (2) the new event has been included in one report transmission without acknowledgement. After an event has been included three report transmissions without acknowledgement, that particular event will no longer be included in a report transmission (assuming that three is chosen as the threshold).

Turning discussion to operation 1516*b*, inspection of FIG. 15J reveals that it has been altered (as compared to operation 1516 of FIG. 15B) so that its execution includes preparation of a transmission payload that includes all events that have not been acknowledged and have been included in a transmission payload fewer than a threshold period of times (example: fewer than three times). After transmission of the report, control is passed to operation 1518*b* in which an acknowledge of the transmission is awaited. If no acknowledgement of the transmission is received, control is passed to operation 1517*b* in which the log entry corresponding to each event included in the transmission body is adjusted by incrementing the unit of data reflecting the quantity of transmission attempts in which the event has been included. Thereafter, control is passed to operation 1520 to determine the proper exit of the operational flow (discussed previously, and therefore not discussed presently). On the other hand, if an acknowledgement of the transmission is received, then the log entry corresponding to each event included in the transmission body is adjusted by setting the unit of data reflecting the quantity of transmission attempts in which the event has been included to be equal to a number greater than the aforementioned threshold (example: 999) (operation 1519*b*). Thereafter, control is passed to operation 1520 to determine the proper exit of the operational flow.

In the wake of execution of either operation 1517*b* or 1519*b*, the event log will show that each event entry therein is in one of three conditions: (1) it has been included in a quantity of report transmissions less than the threshold, in which case it will be included in a subsequent report transmission; (2) it has been included in a quantity of report transmissions equal to the threshold, in which case it not will be included in a subsequent report transmission; or (3) it has been in a quantity of report transmissions greater than the threshold, which means that it was included in a transmission that has been acknowledged as having been received by a gateway (such as gateway 1201 of FIG. 12). This grouping is significant because it permits unacknowledged event data to be retrieved by an operator using an app installed on a mobile device (such as mobile device 1211 of FIG. 12) and relayed without reliance on the long-range communication technique (example: LoRa) to the backend computing platform (such as platform 1208 of FIG. 12) for processing, as discussed below.

Figure 15K:
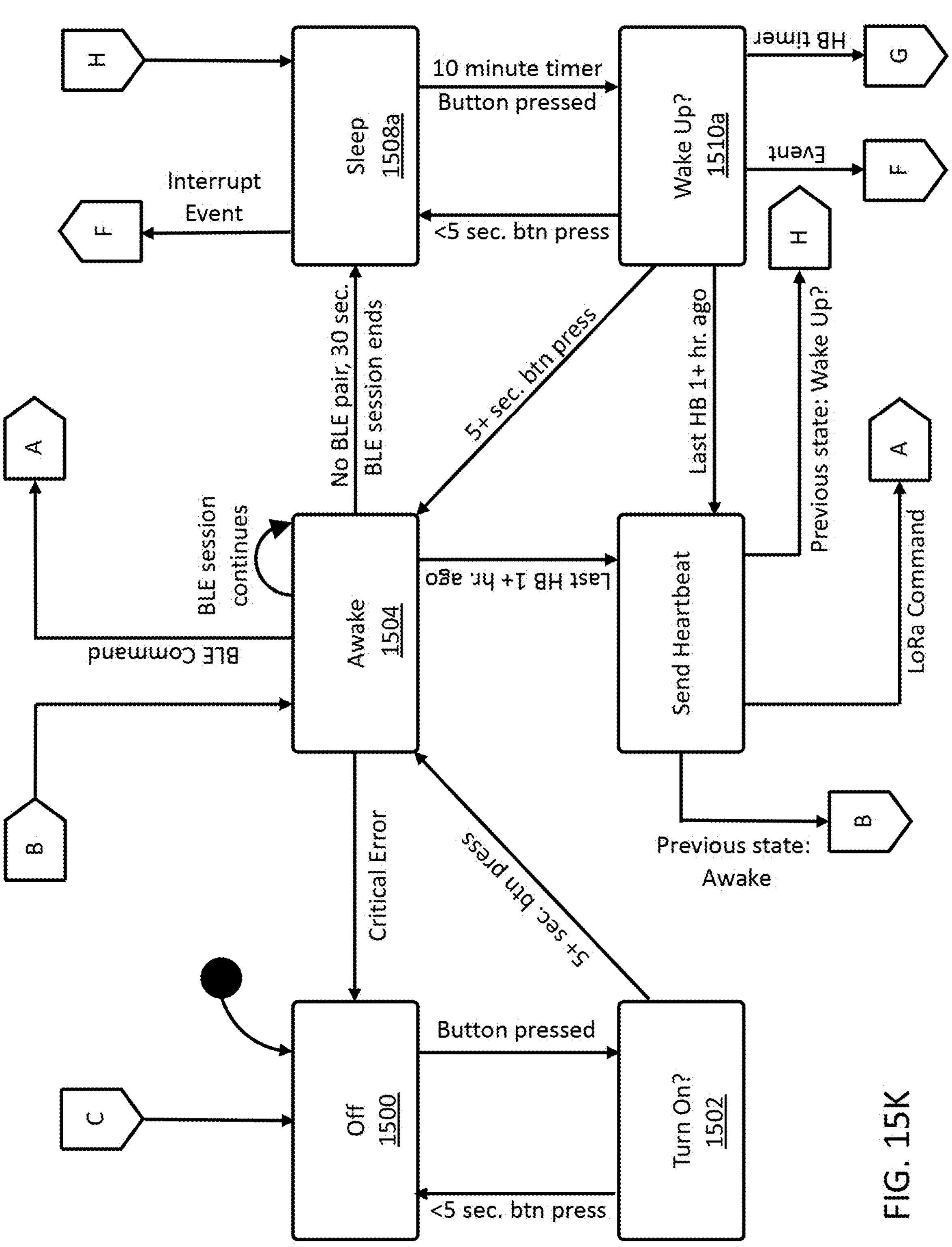
FIG. 15K depicts another portion of a state transition diagram describing the operational and state flow of various embodiments of firmware that may execute on a microcontroller or processor of various embodiments of the aforementioned lock.

FIG. 15K depicts an alternate embodiment of the state flow of FIG. 15A. In FIG. 15K, an interrupt (or interrupts) has been assigned to one or more of the ports to which the output of various sensor circuits is coupled. (Example: an interrupt is assigned to the particular port to which the microswitch 1444 of FIG. 14A is coupled-recall, the microswitch 1444 is used to detect a situation in which the shackle of the lock, such as shackle 1302 of FIG. 13C, has been opened or cut open.) As a result, when such a sensor circuit asserts the port to which it is coupled, an interrupt is generated and the sleep state 1508*a* is exited through connector F causing the event to be handled, as discussed previously with respect to FIG. 15B. Thus, FIG. 15K presents embodiments of the lock in which certain events can be detected and handled in real-time or near real-time, even during periods when the lock is in the sleep state 1508*a*, as opposed to requiring the lock to be in a non-sleep state for such events to be tested for (such as in operation 1562 of FIG. 15G), detected (such as in operation 1564 of FIG. 15G), and then handled (as discussed with reference to connector F of FIG. 15B). According to some embodiments, the sleep state 1508*a* may be remained in indefinitely, as opposed to being limited to a particular period of time (example: 10 minutes). The aforementioned ten-minute timer may be replaced with a hardware clock on board the microcontroller 1404 that the firmware sets to generate an interrupt on a regular basis (example: once per hour) equal to the desired heartbeat transmission rate (such a clock serves as a heartbeat timer). Thus, interrupts associated with a button-push or such hardware clock cause the sleep state 1508*a* to be exited, and the wake up? state 1510*a* to be entered. Thus, the microcontroller 1404 need not exit the sleep state 1508*a* periodically to determine if a heartbeat message should be sent—it will exit the sleep state 1508 only in response to: (1) an interrupt from such heartbeat timer, causing entry into the wake up? state 1510*a*, and then exit through connector G; (2) an interrupt stimulated by a button-push event, also causing entry into the wake up? state 1510*a*; and (3) an interrupt generated by a sensor, such as microswitch 1444, causing such an event to be handled as described previously with regard to connector F of FIG. 15B.

Previously, in the context of discussions relating to FIGS. 12, 14A-B, and 15A-K (and elsewhere), it was stated that an app installed on a mobile device 1211 may permit a user 1210 to interact with a lock (such as lock 1300) and with the backend computing platform 1208 of the safety system disclosed herein, in accordance with the various embodiments. Discussion now turns to exemplary embodiments of such an app, and, briefly, to an exemplary embodiment of a backend computing platform 1208 with which the app interoperates.

Figure 16A:
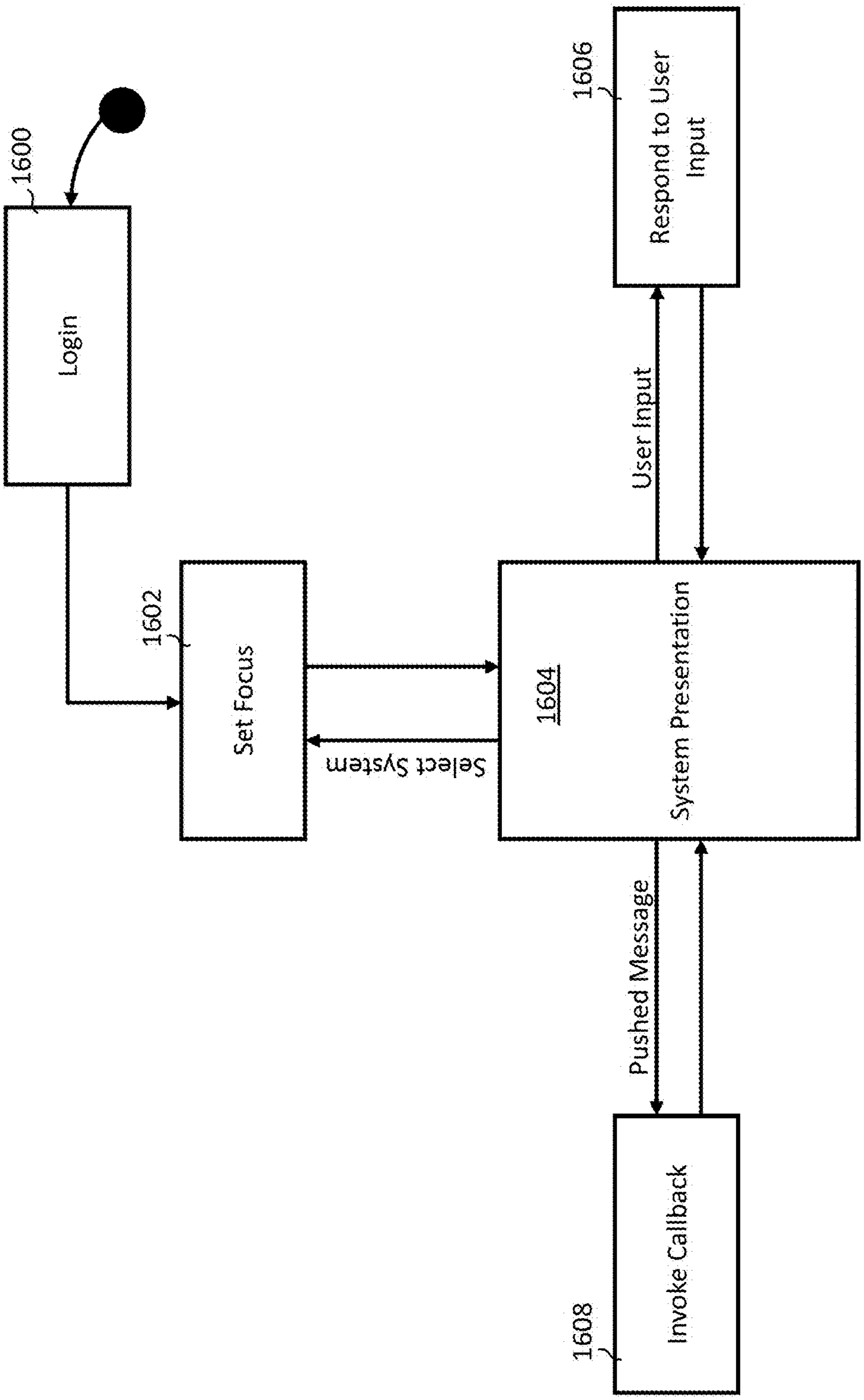
FIG. 16A depicts a portion of a state transition diagram or flowchart describing the operational and state flow of various embodiments off an app that may execute on a microcontroller of processor of a mobile device that may be used in connection with various embodiments of the safety system disclosed herein.

FIG. 16A depicts a state diagram by which such an app may operate. As can be seen from FIG. 16A, upon launch, the app initiates its operation in a Login state 1600. According to some embodiments, the Login state 1600 conducts a set of operations in concert with the backend computing platform 1208, in order to accomplish one or more of the following: (1) identify the particular user interacting with the app; (2) determine the particular facility the user intends to use the app in connection with; and (3) establish a functional connection between a client-side asynchronous data-updating framework that is integrated into the app and a corresponding server-side aspect of the framework that is executing at the backend computing platform 1208. This document describes a Login state 1600 that accomplishes all three objectives, although this need not be the case.

As will be appreciated from the discussion (below) of the Login state 1600, the app makes use of considerable interaction with the backend computing platform 1208 during the course of some of its operations, such as those particular operations included in the Login state 1600 and other states. Therefore, prior to proceeding further with a discussion of the Login state 1600, a brief overview of an embodiment of the backend computing platform 1208 (and certain related client systems) is in order.

Figure 18:
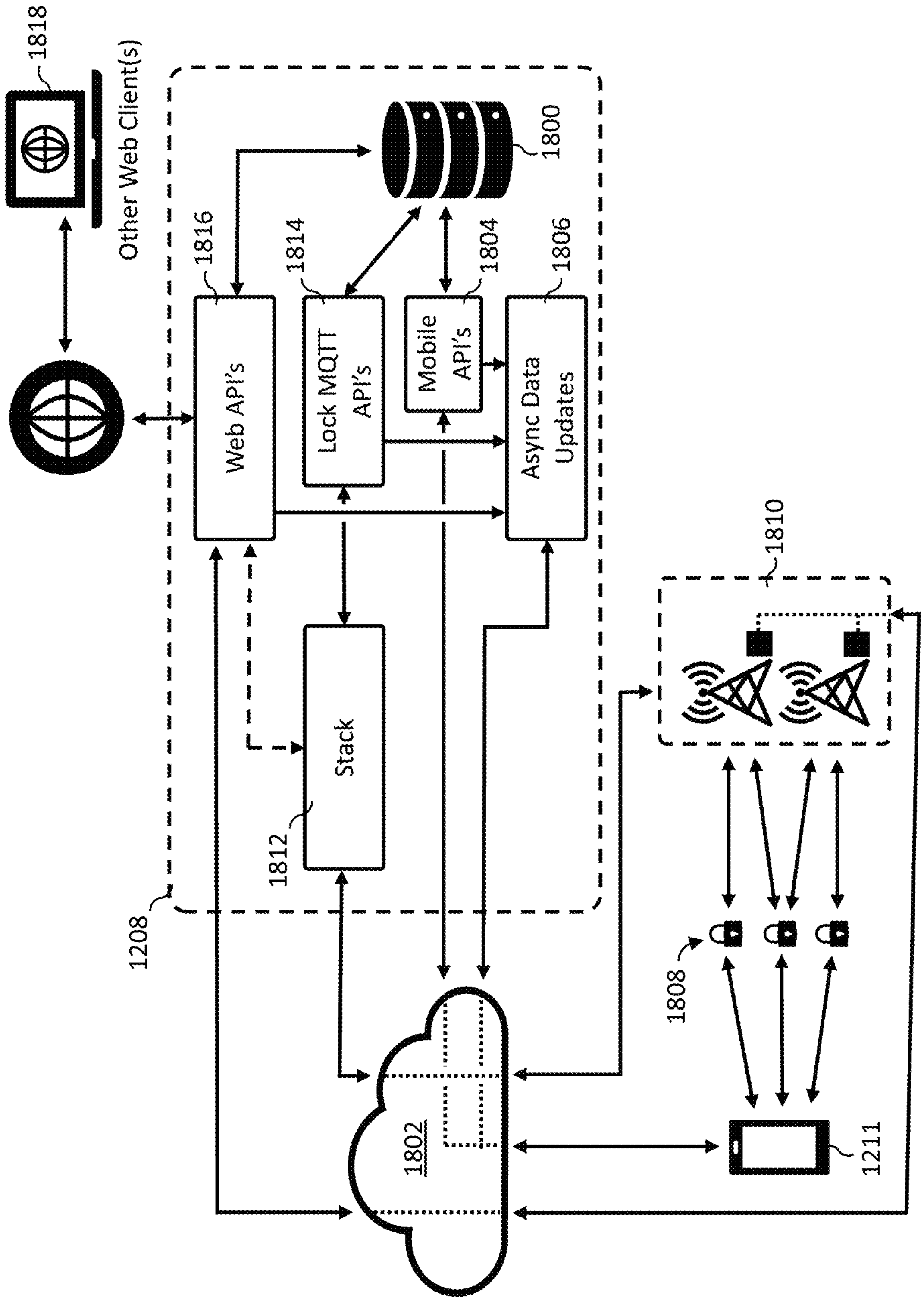
FIG. 18 depicts an exemplary safety system, in accordance with various embodiments thereof.

FIG. 18 depicts an embodiment of the backend computing platform 1208. Variations of the embodiment are possible and will present themselves to those of skill in the art, and certain variations and alternate embodiments are discussed herein. The backend computing platform 1208 interacts with an app executing on a mobile device 1211, in order to support the operations of the app, which are discussed in greater detail below. Briefly, among other functions, the app: presents information concerning the safety status of various systems within a facility, information concerning the particular isolation points associated with each such system, such as the state of each isolation point in view of the particular user logged into the app, and other related information; permits a user to make assertions about the state of each such isolation point; permits certain users to construct service teams including other users; permits users to add or remove a digital personal lock from virtual lockboxes, which are associated with each such system on a one-virtual-lockbox-to-one-system basis; permits users to send commands to physical locks that are a part of the safety system (example: a user may access the app to send a command to the app in order to read certain data from the lock, such as its battery level or tag information or previously sent but as-yet unacknowledged lock messages, and so on); permits certain users to unlock physical locks that secure isolation points; and also permits the performance of other related operations.

With regard to its aforementioned functions related to presentation of information, the app communicates with the platform 1208 through a network 1802, such as a wireless data network 1802 (e.g., a 4G network, a 5G network, and so on, which is in communication with the backend computing platform 1208, such as via the Internet), utilizing wireless data services and capabilities onboard the mobile device 1211. The communication is directed to certain information-returning API's 1804 within a set of APIs 1804 that are exposed by the platform 1208 for the purpose of servicing the app so that it is able to perform its intended functions relating to presenting information. APIs 1804 servicing the mobile app may be referred to as mobile APIs 1804, and according to some embodiments, the mobile APIs 1804 may be embodied as web APIs accessed via HTTP commands issued by the app. The middleware associated with the particular APIs 1804 invoked by the aforementioned information-seeking calls typically respond to such invocation by executing a workflow that typically includes, without limitation, accessing a database 1800 to obtain information requested by the app, processing and formatting such information to render it in a state proper for return to the app, and then returning the information to the app via the network 1802.

When a user interacts with the app to perform an operation, such as making assertions about the state of an isolation point (e.g., to assert that a lock was placed so as to secure an isolation point, to assert validation or confirmation of a previous placement of such a lock on an isolation point so as to render it properly secured, to assert that no lock is actually securing an isolation point, etc.), constructing a service team associated with a system, or adding or removing a digital personal lock from a digital lockbox associated with a system, the app invokes a particular mobile API 1804 within the set of APIs 1804, in order to cause the middleware corresponding to the invoked API 1804 to execute a series of operations, ultimately inserting or altering/updating/deleting a record in the database 1800, thereby effectuating such isolation point state assertion, digital personal key addition or removal, service team membership construction or alteration, or the performance of whatever the particular operation initiated by the user happened to be.

(The database 1800 may be structured so as to contain information concerning, and associations between: clients; the particular facilities operated by each such client; the particular areas into which each such facility is divided; the units within each such area; the systems making up each particular unit; the isolation points of each particular system; the assertions pertaining to each particular isolation point; the resulting state of each particular isolation point for each particular user, in view of such assertions, and in further view of certain lock events and service team structures; unique identifiers (e.g., lock IDs) associated with each of the physical locks assigned to a facility or client; the lock IDs of each lock asserted to be securing each particular isolation point; a digital key corresponding to each lock ID, with each such digital key interoperating with its respective corresponding physical lock, so as to unlock it; the various users of the app; the login credentials of each such user; the particular client or facility to which each such user is assigned; a role assigned to each such user (e.g., operator, facility employee/engineer, foreman/lead, craftsman, and so on); contact information associated with each such user (e.g., email address, phone/cell number or radio channel, if appropriate to role); identifiers of personal locks (e.g., personal lock IDs) assigned to each such user; other information associated with each such user; identifiers of any service teams (e.g., service team IDs) to which each such user has been added; the identity of any system (e.g., a system ID) to which any service team has been assigned; personal lock IDs associated with each such user; identifiers of virtual lockboxes (e.g., virtual or digital lockbox IDs) associated with each system; each personal lock ID securing each such virtual lockbox; and other information and associations described or referred to herein.)

When a particular user interacts with the app to perform an operation, this oftentimes causes a condition wherein the information displayed via the user interfaces of other instances of the app (used by other users) needs to be updated. For example, in the event a first user interacted with his instance of the app so as to make an assertion about the state of an isolation point, then the user interface of another instance of the app-accessed by a second user via a second device 1211—would need to reflect the new state of the isolation point in view of such assertion. Previously, the app was described as interacting with the mobile API's 1804 in order to obtain the information it presents via its user interface. Such API 1804 interaction is an example of synchronous acquisition of information for display, i.e., the information is obtained by the app in response to the app accessing a particular API 1804 in the ordinary course of its programmatic flow. According to some embodiments, it is desirable to update the information displayed by the app asynchronously (as well as synchronously), such as in near real-time, in order to update the app's information nearly simultaneously with the occurrence of events that changed some particular state of affairs described by such information. Asynchronous updating of information results in updating the app's information without the app having to access an API 1804 in order to acquire such updated information. Thus, according to some embodiments, the app utilizes an asynchronous data-updating framework. Stated another way, the asynchronous data-updating framework permits updated information to be "pushed" to instances of the app, as opposed to such instances having to "pull" the information from the backend platform 1208, such as in response to a user interface gesture made by a user to "update" his or her user interface.

The asynchronous data-updating framework includes a client-side framework that is integrated into the software making up the app and a server-side system 1806, which is depicted in FIG. 18 as executing on the backend computing platform 1208. The client-side framework handles communication with the server-side system 1806 on behalf of the other software making up the app. The server-side system 1806 may include a hub that allows for event-subscription, event-declaration and event-publication.

The server-side system 1806 may organize data into publications. A publication is a collection or grouping of data to which another unit of software may subscribe. An app instance may subscribe to one or more publications via interaction with the aforementioned hub. Middleware operating on the backend platform 1208 (such as middleware associated with the mobile APIs 1804) may interact with the hub to declare occurrence of a data event, meaning that one or more units of data that has been organized so as to belong to a publication has been altered by the operation of the middleware. In response, the hub "pushes" the altered data to instances of apps that have subscribed to publications to which the altered data belongs.

The following example is presented for the sake of illustrating the concepts of publications, publication data, data events and subscriptions in concrete terms. Consider a scenario in which a particular client has a single facility with a single area and a single unit with two systems: a desalter and a charge pump. Such a scenario is drastically simplified from most realistic use cases, and pursuant to such a scenario, the safety system could be used in connection with only the two aforementioned systems. Further consider that there are four users of the safety system, resulting in four instances of the app—one instance accessed by each such user. Pursuant to such a scenario, the data could be organized as described below.

Safety data pertaining to each system could be organized into individual publications, on a one-publication-per-system basis. Hence, there would be a Desalter Publication and a Charge Pump Publication. As suggested by the naming convention, the Desalter Publication would contain safety data pertaining to the desalter system, while the Charge Pump Publication would contain safety data pertaining to the charge pump system. Stated another way, safety data pertaining to the desalter system would "belong" to the Desalter Publication, and safety data pertaining to the charge pump would "belong" to the Charge Pump Publication.

Considering, for example, the Desalter Publication, the data belonging thereto may include: (1) for each isolation point of the desalter system, a lock ID of a lock associated with such isolation point (if any); (2) for each lock ID associated with an isolation point, a name of a user that initially placed the associated lock at such isolation point (or a user ID uniquely associated with such user), and a time and date of such initial placement; (3) for each lock ID associated with an isolation point, a name of a user that verified its placement (if any) (or a user ID uniquely associated with such user—it is to be understood that throughout this document where a user name is referred to, a user ID may be substituted for such data or may sit alongside such data), and a time and date of such verification (if any); (4) for each lock ID associated with an isolation point, a name of a user that confirmed its verified placement (if any), and a time and date of such confirmation (if any), such as a name and date and time associated with a most recent confirmation event, as many such confirmation events are possible; (5) for each lock ID associated with an isolation point, a date and time indicating the last time data was received (such as via the gateways 1810) from the lock referred to by such ID; (6) a name of every user with his or her digital personal lock on the desalter's digital lockbox. In the event that a first and second user were servicing the desalter, they would interact with their respective instances of the app so as to view and manage the safety data pertaining to the desalter system. Therefore, instances of the app running on their particular devices 1211 would interact with the hub of the server-side aspect of the asynchronous data-updating framework 1806, so as to subscribe to the Desalter Publication. Consequently, in the event that a lock was initially placed upon an isolation point of the desalter, or in the event that the presence of a lock placed on any of its isolation points were verified or confirmed, or in the event that a user added or removed his or her digital personal lock to or from the desalter's virtual lockbox, the following would happen: (i) the app would call the API 1804 corresponding to such lock placement, lock verification, lock confirmation, digital personal lock addition, or digital personal lock removal function; (ii) the middleware associated with such called API 1804 would be invoked and therefore executed; (iii) the invoked middleware would interact with the server-side aspect of the asynchronous data updating framework 1806 to declare the occurrence of a data event impacting the Desalter Publication, and send it data pertaining to the function giving rise to the data event (i.e., data corresponding to the lock placement, lock verification, lock confirmation, digital personal lock addition, or digital personal lock removal function)—this data would also be persisted in the database 1800 (for example: in the wake of an initial lock placement on an isolation point of the desalter system, it would no longer be the case that no lock ID was associated with such isolation point, and it would no longer be the case that no user name was associated with such initial lock placement, and so on—these sorts of units of "new" data, i.e., the lock ID of the lock placed at the isolation point, the user name of the user that conducted such placement, and so on would be both sent to the server-side asynchronous data-updating framework 1806 in the context of declaration of a data event and would also be preserved in the database 1800); (iv) the server-side aspect of the asynchronous data updating framework 1806 would "push" the data sent to it in connection with declaration of the data event to each instance of the app that subscribed to the Desalter Publication. In summary, as a user used the app to perform a safety function, performance of the safety function would cause safety data pertaining to a system to change; in response to an API 1804 call by the app, certain middleware would cooperate with the app to perform the safety function and that middleware would interact with the server-side aspect of the asynchronous data updating framework 1806 to declare a data event pertaining to the particular System Publication, along with the new safety data that was ultimately begotten by performance of the safety function, itself; and the hub would push the new safety data to the app instances that have subscribed to the aforementioned particular System Publication, thereby updating those instances with the newly changed data.

Service team membership data may be organized into the aforementioned System Publication. Thus, in the event a team is constructed to service a given system, data describing the team would be added to the System Publication pertaining to the aforementioned given system. Conceptually, a composite or structure of data such as shown below may be added to a System Publication:

```
[Service Team ID, Team Name, Area, Unit, System,
  [User Name_1, Lead? (T/F), Role, Title, Image Path]
  [User Name_2, Lead? (T/F), Role, Title, Image Path]
  ...
  [User Name_n, Lead? (T/F), Role, Title, Image Path]
]
```

so that information concerning additions or removals to or from service teams assigned to a given system would be automatically pushed to app instances that have subscribed to a given System Publication.

Service team membership may also be organized into individual Team Publications, in addition to or as opposed to being organized into System Publications as just described. Pursuant to such embodiments, creation of a service team results in creation of a Service Team Publication, so that there comes to be a one-Service-Team-Publication-to-one-service-team relationship. As a particular user is added or removed to or from a service team, the middleware invoked to add or remove the aforementioned user may: (1) relate the aforementioned particular user to an app instance into which said user is logged in; and (2) subscribe or unsubscribe the aforementioned app instance to or from the Team Publication pertaining to the service team that the user was added to or removed from. Thus, in the wake of a particular user logging into an instance of the app executing on a device 1211, the aforementioned app instance is supplied with information describing service teams to which or from which the aforementioned particular user was added or removed, with such information being pushed to the app instance in near real-time, as the service team addition or removal events occur.

According to some embodiments, facility information may be organized into Facility Publications, on a one-Facility-Publication-to-one-facility basis. Facility information may include: (1) areas into which a facility is divided; (2) units situated within each such area; (3) systems making up each such unit; and (4) isolation points of each such system. Other facility information, including other organizational or nomenclature systems for identifying a unit or system, are possible and will be understood by those of skill in the art. According to some embodiments, such facility information may be input or updated via a web client 1818, such as a web-accessible portal 1818. Thus, safety personnel (or other personnel) employed by a given client may access the portal 1818 in order to update information concerning a facility, if, for instance, a new system (with new isolation points) is added to a unit—the personnel would access the portal 1818 and enter information to indicate that a particular unit within a particular area of a particular facility now includes a newly-introduced system with new isolation points. In the wake of a user logging in to the app (and the app being supplied with a particular facility with which the user is associated), the app may subscribe to the particular Facility Publication pertaining to the particular facility with which the logged-in user is associated. Thus, as facility information is updated, instances of the app will be supplied with new facility data, in the event that such instances are logged into by users that are associated with that facility.

Further information concerning interaction with the server-side aspect of the asynchronous data-updating framework 1806 is presented in connection with discussion of the operations of the app, which is presented below.

As mentioned previously, the app also permits the user to interact with physical locks 1808 that are part of the safety system. The app may use Bluetooth capabilities native to the mobile device 1211 on which it is executing in order to interact with such locks 1808. According to other embodiments, the app may use any communication capability native to the mobile device 1211 (and supported by the locks 1808), in order to communicate with the locks 1808. The locks 1808 handle such commands, and respond via the communication link established by the app, for example, via a Bluetooth link. In view of the response, the app updates its user interface appropriately, and also sends the information contained in the response to the backend computing platform 1208, packaging such information in a message directed to the mobile APIs 1804 and delivered via the network 1802, as described previously.

As also mentioned previously, the locks 1808 contain sensors that permit the detection of certain events (low battery, battery replaced, shackle open/close, shackle cut, overheat, under-temperature, over-humid etc.) and are also programmed to send periodic "check-in" event messages to the backend platform 1208 in order to provide evidence of their continued proper operation. Such events are not stimulated by the arrival of a command from the app, meaning there may be no active communication link with any app instance at the time such event occurs. Thus, to communicate the occurrence of such event, a lock 1808 may establish a communication link with, or otherwise broadcast to, one or more gateway devices 1810 that have been installed through the facility being serviced. According to some embodiments, the app uses LoRa transmission capabilities onboard the lock 1808, in order to establish a LoRaWAN communication link to send such event messages to the backend computing platform 1208 via the gateways 1810. The gateways 1810 may receive such message frames from the app, and forward them to the backend computing platform 1208 via the network 1802, as described previously.

According to some embodiments, the gateways 1810 may communicate with the backend computing platform 1208 by virtue of forwarding LoRaWAN frames received from the locks 1808 via User Datagram Protocol over Internet Protocol (UDP/IP), directing such forwarded frames to a server stack software system 1812. According to some embodiments, the server stack 1812 may, itself, be constituted of subsystems. For example, the server stack 1812 may include: (1) a first subsystem, which may be referred to as a bridge, which may convert incoming LoRaWAN frames into a common data format, such as JavaScript Object Notation (JSON) or the like (and vice versa, in the context of outgoing messages); (2) a second subsystem, which may be referred to as a network server, which may cooperate with the bridge, and which may primarily deduplicate incoming packets (consider: more than one gateway 1810 may receive a LoRaWAN frame and forward it to the server stack 1812, thus necessitating deduplication), and which may perform authorization to determine whether incoming frames originated from devices that are authorized to communicate on the safety system network and which may reject those frames that are unauthorized (consider: a gateway 1810 may receive a LoRaWAN packet transmitted from some foreign facility, thus necessitating some form of authorization service to reject foreign packets); and a third subsystem, which may be referred to as an application server, which may cooperate with the network server, and may primarily handle controlling which particular devices are authorized to communicate on the safety system network, thereby permitting the network server to perform its authorization functions, and which may also maintain encryption keys for each such authorized device, and which may decrypt incoming payloads and encrypt outgoing payloads, using such keys. The server stack 1812 directs incoming messages from the locks 1808 to a set of lock APIs 1814 that are structured to handle such messages. According to some embodiments, the server stack 1814 employs a Message Queueing Telemetry Transport (MQTT) protocol to communicate messages to the lock APIs 1814. According to such embodiments, the server stack 1812 includes a hub that handles subscriptions to certain sets of events or event types. Thus, each particular API 1814 within the set of lock APIs 1814 may individually subscribe to a particular type of lock event, meaning that a message conveying the occurrence of one particular type of lock event will be directed via MQTT to the particular API 1814 designed to handle that particular lock event, while a message conveying the occurrence of another type of lock event will be directed via MQTT to an API 1814 designed to handle such other lock event, and so on. Alternatively, a single API 1814 may be structured to handle all lock messages, regardless of the particular lock event they are communicating, and therefore such singular API 1814 may interact with the hub so as to subscribe to all lock event messages. The middleware associated with the lock APIs 1814 processes the lock event, including interacting with the server-side aspect of the asynchronous data updating framework 1806 to declare occurrence of a data event when appropriate, and interacts with the database 1800 to record data memorializing the occurrence of the lock event and to retrieve data required by the occurrence of such event.

FIG. 18 depicts the various components or systems making up the platform 1208 as executing on a single server or on servers within a single server facility. This need not be the case. Each system or subsystem need only communicate with the other systems and subsystems to perform the operations described herein—each may be hosted on a separate server or on servers situated at separate server facilities, for that matter. For example, the stack 1812 may be hosted at, and executing upon, servers located in a facility that is separate from a facility that operates the servers on which the lock APIs 1814 are running, and the lock APIs 1814 may be hosted at, and executing upon, servers located in a facility that is separate from a facility that operates the servers on which the database management system 1800 are running, and so on. Additionally, although the database 1800 is depicted as a single database, the backend computing platform may, in fact, include plural databases 1800 operating on the same or different database management systems. Other aspects of the backend computing platform 1208 are discussed below, as are the web clients 1818 and the APIs 1816 with which they interact. Discussion now returns to the app, and its operational states and operational flow.

Figure 16B:
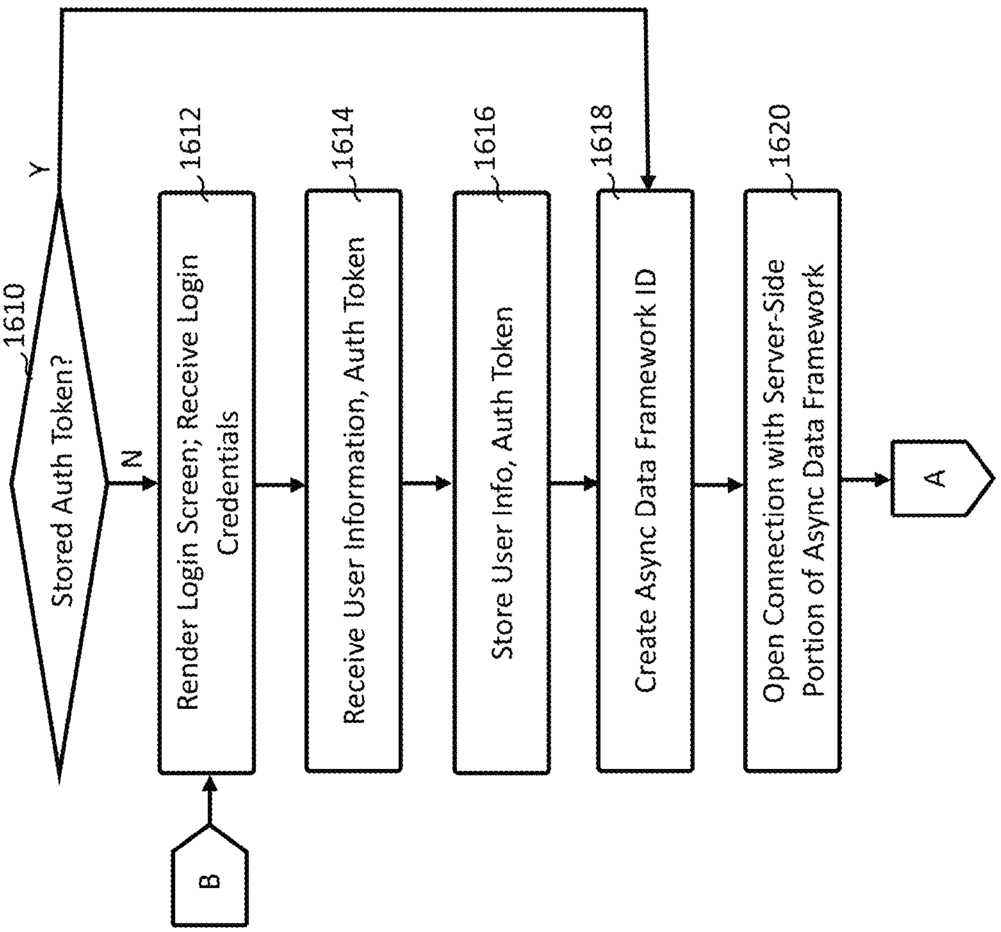
FIG. 16B depicts another portion of a state transition diagram or flowchart describing the operational and state flow of various embodiments off an app that may execute on a microcontroller of processor of a mobile device that may be used in connection with various embodiments of the safety system disclosed herein.
Figure 16C:
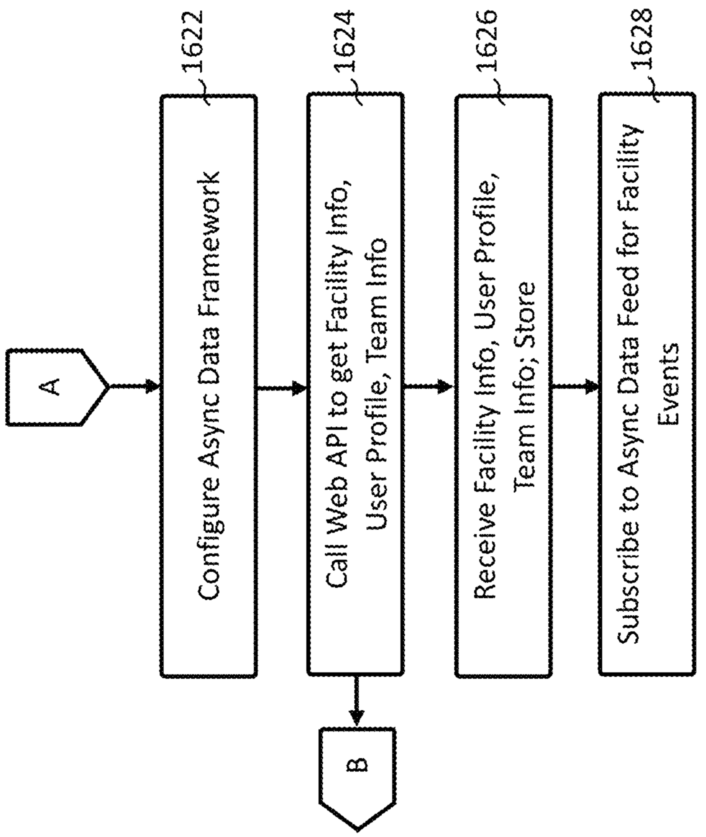
FIG. 16C depicts another portion of a state transition diagram or flowchart describing the operational and state flow of various embodiments off an app that may execute on a microcontroller of processor of a mobile device that may be used in connection with various embodiments of the safety system disclosed herein.

Discussion now returns to the Login state 1600, which is depicted in FIG. 16A, and to FIGS. 16B and 16C in order to aid discussion of the login operations.

FIGS. 16B and 16C depict an exemplary embodiment of operations included in the Login state 1600. Upon launch, the app may access a form of persistent non-volatile storage (preferably resident on the device 1211 on which the app is executing), such as a database, a file on a drive (such as a solid-state drive integrated into the aforementioned device 1211), an area of memory nominally dedicated to the persistent storage of user preferences, and so on, in order to locate a potentially previously-stored authorization token, as depicted in operation 1610 (FIG. 16B). An authorization token is an unpredictable, random string that corresponds to a particular communication session between the app and software systems operating on the backend computing platform 1208, wherein the session was initiated by a particular user and is associated with that particular user. Thus, at the backend computing platform 1208, the token can be associated with a session, and the session to a user that initiated it via the operations of the Login state 1600. According to some embodiments, an authorization token is included in every communication interaction (except those involved in a user logging in) with the software systems of the backend computing platform 1208, for the purpose of proving to those software systems that the app is authorized to interact with them. Example: when the app makes a call to an API 1804 (FIG. 18) in order to invoke the middleware associated therewith, it includes an authorization token, such as by including it in the header of the message directed to the API 1804; at the backend computing platform 1208, the authorization token is extracted from the incoming message, and examined to determine if it is valid, i.e., it is examined to determine whether it corresponds to a properly established communication session that was initiated by a known user via the login process; if the token is valid, then the software system responds to the API call, and if the token is invalid then the software system returns an error. According to some embodiments, the software systems operating on the backend computing platform 1208 may expire a valid authorization token, causing it to become invalid. For example, the software systems may expire such a token after a defined period of time has elapsed since the creation of the communication session with which it is associated (example: one day or one week).

Figure 17A:
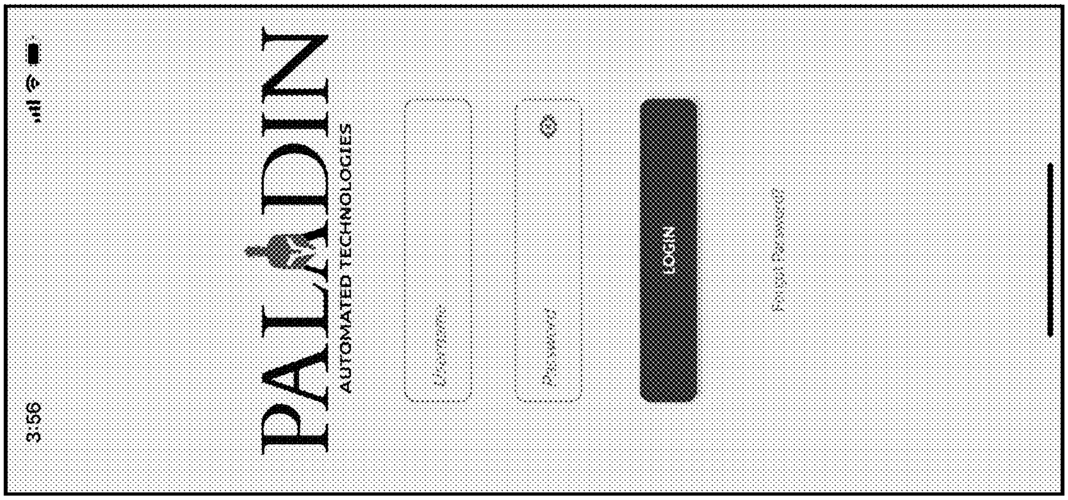
FIG. 17A depicts an exemplary embodiment of a user interface screen that may be used in connection with the various embodiments of the aforementioned app disclosed herein.

If a previously-stored authorization token is located in operation 1610, then the app may bypass operations connected to a user signing into the app, and proceed as though the user is known by virtue of the user having already completed the aforementioned sign-in steps. In the context of this embodiment, this means passing control to operation 1618, which is discussed further, below. On the other hand, if no previously-stored authorization token is located in operation 1610, then the app proceeds to operation 1612, whereupon the app renders the user interface screen depicted in FIG. 17A, which prompts the user to enter his or her username and password. Upon receiving the entered username and password, the app conducts a communication session with the backend computing platform 1208, such as by constructing a message body including the username and password, and sending it to a Login API (which, according to the embodiment depicted in FIG. 18, would be included within the set of mobile APIs 1804) exposed by the software systems of the backend computing platform 1208. The software systems respond by determining whether the username and password pair correspond to a valid username and password pair that is authorized to access the software systems. If the username and password pair are not valid, then an error is returned, and further access to the software systems of the backend 1208 is refused, meaning the user can proceed no further than operation 1612 and is therefore "stuck" on the user interface screen of FIG. 17A, i.e., he or she must try to login again (optionally subject to a maximum login attempt limit). Assuming the username and password pair are valid, then the software systems of the backend computing platform 1208 respond by: (1) creating an authorization token that the app may use to identify itself in future communication interactions with the software systems while the user remains logged in; and (2) locating certain user information associated with the username and password pair. In the context of the embodiment depicted in FIG. 18, such operations are performed as part of the workflow of the middleware associated with the Login API, which is included in the set of mobile APIs 1804. Examples of the aforementioned located user information include: username, user email address, user phone number (e.g., mobile phone number), user radio channel, path to an image of the user, a user role, and a facility with which the user is associated. The purpose of the user information is discussed below. The software systems return the authorization token and user information to the app, which receives them in operation 1614, and stores them (operation 1616) in the aforementioned region of persistent, non-volatile memory accessed in connection with operation 1610. According to some embodiments, in operation 1610, at the time the app seeks to locate a previously-stored authorization token (as previously described), it also seeks to locate user information that may have been previously-stored in connection with a previous execution of operation 1616.

The aforementioned user information may be used by the app to populate a User Profile screen (not shown). If it is the user's first time accessing the app, the user information will not exist when it is sought during execution of operation 1610, and, during the course of the Login state 1600, the user may be diverted to the aforementioned User Profile screen and either forced or given the opportunity to enter such information (the screen contains fields for entry of such information, permits the user to photograph himself to provide an image or to upload an image from device 1211 memory, and so on), which is communicated to, and stored by, the software systems of the backend computing platform 1208, in association with the user's username and password pair. In the context of the embodiment of FIG. 18, such user profile information may be sent to an UpdateUserProfile API, which may be included in the set of mobile APIs 1804 depicted therein. For the sake of brevity and simplicity, FIG. 16B depicts an exemplary flow of Login state 1600 operations performed by the app in the context of login attempts that are not a user's initial login, and therefore does not depict diversion of the user to the aforementioned User Profile Screen. One purpose of collecting user information via the User Profile screen is to provide it to the software systems of the backend computing platform 1208, so that they may provide it to: (1) other instances of the app, executing on other devices 1211, so that other users of these other instances may access such information in the context of performing certain functions (such as a constructing a service team, which is described below); and (2) other client systems 1818 in communication with the software systems of the backend computing platform 1208 (such as a management portal), so that users of such other client systems 1818 can access such user information (example: a user of a management portal may, by virtue of use of the portal, become informed of the occurrence of a potentially hazardous event related to a particular system, and may use the portal to identify users with personal locks on a virtual lockbox associated with the aforementioned system; the user may then access cellular telephone numbers or radio channels associated with such identified users, in order to contact them—or the backend computing platform 1208 may programmatically initiate contact, such as via a programmatically-initiated call with a prerecorded message warning of the danger, or via a programmatically-initiated SMS or text message to warn of the danger, and so on). This is described below.

In operation 1618, the app generates a globally unique identifier that will be used to identify a connection that the app will create with the previously mentioned server-side portion of the asynchronous data-updating framework 1806. Next, in operation 1620, the app establishes the just-mentioned connection with the server-side portion of the asynchronous data-updating framework 1806, sending it the aforementioned ID in the body of the message sent by the app to establish the connection. For example, the app may invoke the client-side portion of the asynchronous data-updating framework in order to cause it to direct a remote procedure call to its counterpart server-sided portion 1806. In response to the remote procedure call, the server-side portion 1806 associates the ID with the particular network connection through which the remote procedure call was made. For example, the server-side portion may create one or more records in a database 1800, associating the globally unique ID with a network connection identifier or with the underlying IP address and port number related with such network connection identifier. Thus, if supplied with a particular globally unique ID, the server-side portion of the asynchronous data-updating framework 1806 can ultimately relate that ID to a network connection or an IP address and port number in order to send messages, such as via a remote procedure call, to the particular instance of the app associated with the ID.

Turning attention to FIG. 16C, operational control next flows to operation 1622, wherein the app configures the client-side asynchronous data-updating framework to receive and respond to "pushed" data messages from its server-side counterpart 1806. In operation 1622, the app specifies to the framework the identity of which methods or functions (callback methods or callback functions) that are to be called in the event that a given type of data message is received (example: "call $\text{method}_1$ in the event of a data message updating data belonging to a System Publication; call $\text{method}_2$ in the event of a data message updating data belonging to Team Publication; and call $\text{method}_3$ in the event of a data message updating data belonging to a Facility Publication."). The callback methods or functions respond to invocation by updating: (1) receiving the new/updated data passed thereto in the invocation; (2) updating data representation in device 1211 memory to include such new/updated data; (3) updating the user interface to present such new/updated data; and (4) performing any other workflow associated with such data having been updated (example: potentially inactivating a button on a user interface, potentially graying out an inactivated button, and so on). According to other embodiments, the server-side aspect of the asynchronous data-updating framework 1806 does not actually pass any new/updated data to its client-side aspect. Instead, it merely passes a data message indicating that a data event has occurred that affects a given publication (example: "a data event has occurred that affected a System Publication" or "a data event has occurred that affected a Team Publication" or "a data event has occurred that affected a Facility Publication"). The callback methods then call the particular API or APIs 1804 that were initially called in connection with obtaining the data to populate the particular screen or screens on which the data belonging to the aforementioned affected publication is presented. Thus, the data for the screen or screens is reacquired by virtue of the API 1804 call(s), and the user interface is repopulated/updated in the wake of such API 1804 call(s).

Next, in operation 1624, the app makes an API 1804 call (example: getUserFacilityInfo), the main purpose of which is to obtain, from the software systems of the backend computing platform 1208, descriptive information pertaining to the facility with which the user is associated. According to some embodiments, the previously-described globally unique identifier used in connection with the asynchronous data-updating framework is passed by the app to the API 1804 in the course of the call. Recalling from previous discussion that an authorization token is included in every API 1804 call, and that an association between an authorization token and a particular user is created during the middleware's response to invocation in operation 1612 (i.e., as part of the workflow relating to receiving a user's login credentials), the middleware responds to invocation by querying the database 1800 to determine whether the authorization token passed as part of the API 1804 call is validly associated with a user. Recall: according to some embodiments, the backend computing platform 1208 expires authorization tokens after a certain period of time, so it is possible that, if it is the case that this operation 1624 has been arrived at via an operational flow that bypassed operations 1612-1616 (i.e., bypassed the operations by which user entered his or her credentials to login), then the app may have passed an invalid/expired authorization token to the API 1804 in this operation 1624, if it were case, for example, that the app was being launched in the wake of an extended period of time since the user most recently entered his or her login credentials. If the authorization token passed to the API 1804 in this operation 1624 is not valid, then operational flow is returned to operation 1612, and the user is prompted for his or her login credentials as described previously. On the other hand, if the authorization token is valid (such as would be the case if, for example, the app were being launched a very short time after the user had previously logged in), then the middleware associated with the invoked API 1804 adds to the previous association between a user and an authorization token, an additional association with the aforementioned globally-unique identifier used by the asynchronous data-updating framework:

User↔Authorization Token↔Globally Unique ID.

Recall: a globally unique identifier is associated with a connection ID by which data may be "pushed" to a user, for example, by way of a remote procedure call. Therefore, the database 1800 contains associations between: a user; an authorization token; a globally unique ID; and a connection:

User↔Authorization Token↔Globally Unique ID↔Connection.

After forming and preserving the aforementioned associations, the middleware associated with the invoked API 1804 then returns descriptive information pertaining the facility with which the user is associated, and also returns user profile information. For example, according to some embodiments, the middleware returns descriptive facility information that includes: (1) the facility name and a facility identifier (e.g., a facility ID); (2) the names of the areas into which the aforementioned associated facility is divided; (3) the names of the units in each such area; and (4) the names of the systems of each such unit. According to some embodiments, the middleware also returns user profile information that may include: (1) user name; (2) user email; (3) user phone number; (4) user radio channel; (5) name of company/client with which the user is affiliated; (6) name of facility with which the user is affiliated; (7) a path by which an image of the user may be accessed; and (8) user role (example: operator, engineer/facility employee, foreman/lead, craftsman). According to some embodiments, data describing any teams of which the user is a member is also returned to the app. For example, the middleware may return, for each team of which the user is a member: (1) an identifier of the team (team ID); (2) a name of the team; (3) the area, unit and system to which the team is assigned; (4) the name of each member on the team; (5) a path to an image of each such user; (6) the role of each such user (example: craftsman); (7) the title of each such user (example: electrician, in the case that a particular craftsman is an electrician); (8) an indication of whether each such user is the lead of the team (example: TRUE/FALSE).

In FIG. 16C, an explicit path back to operation 1612 is depicted and described as being traversed in the event that the authorization token included in the API 1804 call is found not to be valid by the middleware of the backend computing platform 1208. Although not depicted in FIGS. 16D-16U, according to some embodiments, it is the case that the operational flow of the app returns to operation 1612 in the wake of any API 1804 call, wherein the response to such API 1804 call indicates that the authorization token is invalid. Such paths are not literally depicted in FIGS. 16D-16U, for the sake of eliminating visual clutter and so that the user can more easily appreciate other aspects of the app and broader system.

In operation 1626, the app receives the data referred to in the previous description of operation 1624, and stores the information in device memory, so as to preserve the various associations (i.e., so that areas remain associated with the units therein, so that systems remain associated with the units they are a part of, and so on).

Finally, in operation 1628, the client-side portion of the asynchronous data-updating framework within the app calls its server-side counterpart 1806 to subscribe to the particular Facility Publication identified by the facility ID returned to the app in operation 1626. Therefore, in the event that a change is made to the data describing the facility (to reflect an actual change to the facility, itself, such as the introduction of a new unit with its various systems and isolation points), the app is supplied with such new information descriptive of the facility immediately, as described previously.

Thus, in the wake of execution of the operations 1610-1628 making up the Login state 1600: the particular user interacting with the app will have been identified; a facility associated with the aforementioned user will have been determined, and descriptive information concerning the facility returned to the app, along with profile information concerning the user, and information concerning any service teams of which the user may be a member; and a functional connection will have been created between a client-side asynchronous data-updating framework within the app and a corresponding server-side aspect of the framework 1806, so that: (i) there is sufficient informational association by which to link a user identifier to a network connection (such as an IP address and port number) that may be used to push data to the user's instance of the app; (ii) the app establishes what methods or functions to call in response to receipt of such pushed data; and (iii) the app subscribes to a Facility Publication corresponding to the facility with which the user has been associated, so that changes in data descriptive of the facility will be made evident to the user via the user interface of the app in near real time.

As can be seen from FIG. 16A, in the wake of the app having completed performance of the Login state 1600, the app transitions into the Set Focus state 1602, which is discussed below.

Figure 16D:
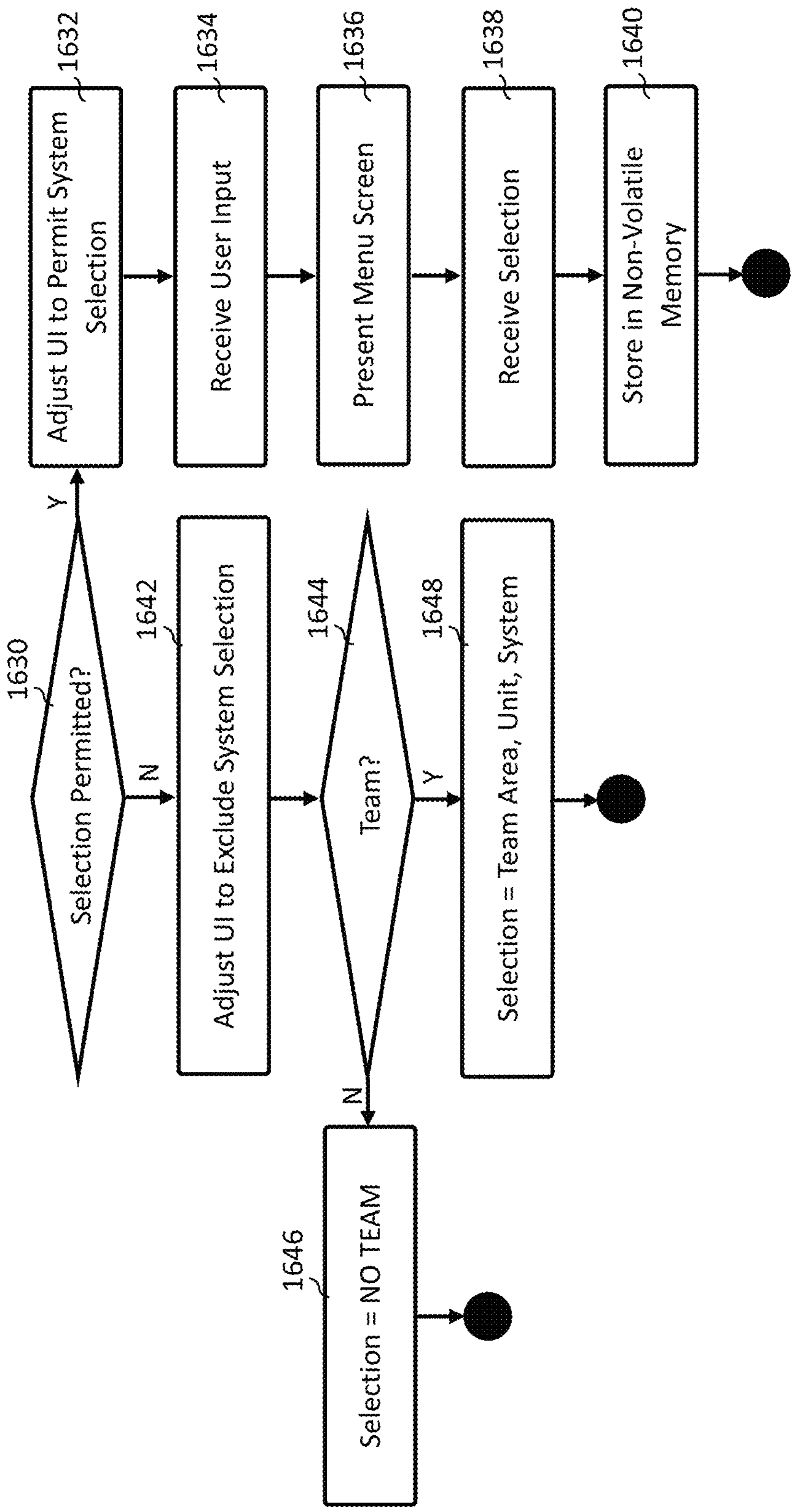
FIG. 16D depicts another portion of a state transition diagram or flowchart describing the operational and state flow of various embodiments off an app that may execute on a microcontroller of processor of a mobile device that may be used in connection with various embodiments of the safety system disclosed herein.

FIG. 16D depicts operations making up the Set Focus state. The purpose of the Set Focus state is to determine which particular system the app is to present safety information concerning and to permit the performance of safety operations upon. For some users, this determination is made via user selection, while for other users the determination is made programmatically. For example, users assigned a role of operator, facility employee or foreman would typically traverse menus (shown and discussed below) to select the particular system they desire the app to "focus" upon, presumably a system the user intends to lockout in order to service in some fashion. For other users, the focus of the app is determined by team selection—for a craftsman, for example, the particular system to be serviced by the service team to which the craftsman has been added as a member is programmatically determined to be the system-of-focus by the app.

With the foregoing discussion as a backdrop, discussion now turns to operation 1630 of FIG. 16D. In operation 1630, the role assigned to the logged-in user (received and stored during the course of operation 1626) is accessed to determine whether the user is permitted to make a selection of the system-of-focus, or whether the selection is to be made programmatically, as referred to above. Assuming the role of the user is such that he or she is permitted to make a selection of the system-of-focus (example: the user's role is either operator, facility employee, foreman/lead), then operational flow is passed to operation 1632. Discussion will advance for now as though the role of the user does, in fact, permit selection of the system-of-focus, and will return to the topic of programmatic selection later.

Figure 17B:
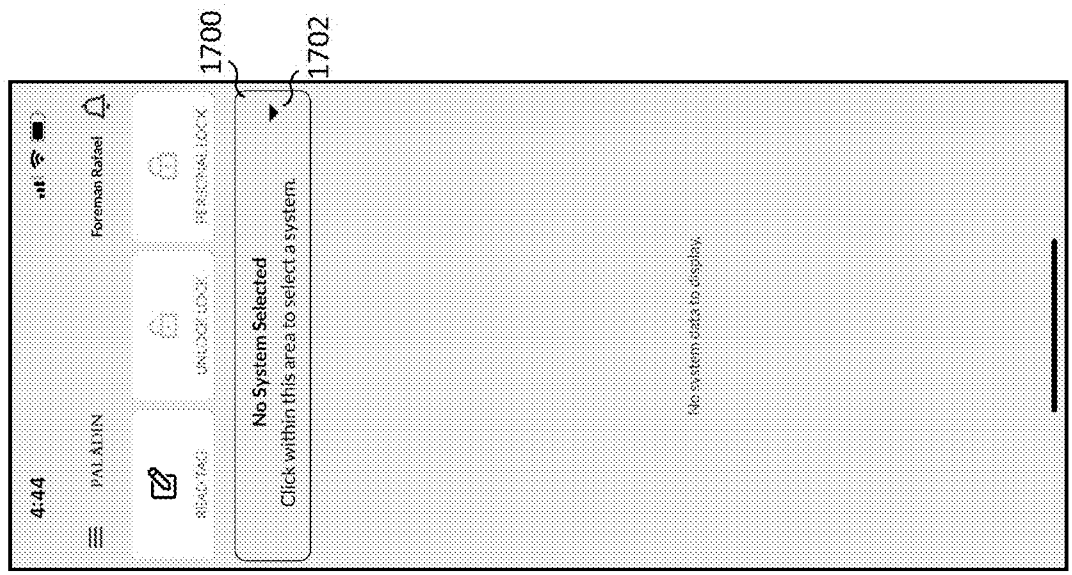
FIG. 17B depicts another exemplary embodiment of a user interface screen that may be used in connection with the various embodiments of the aforementioned app disclosed herein.
Figure 17C:
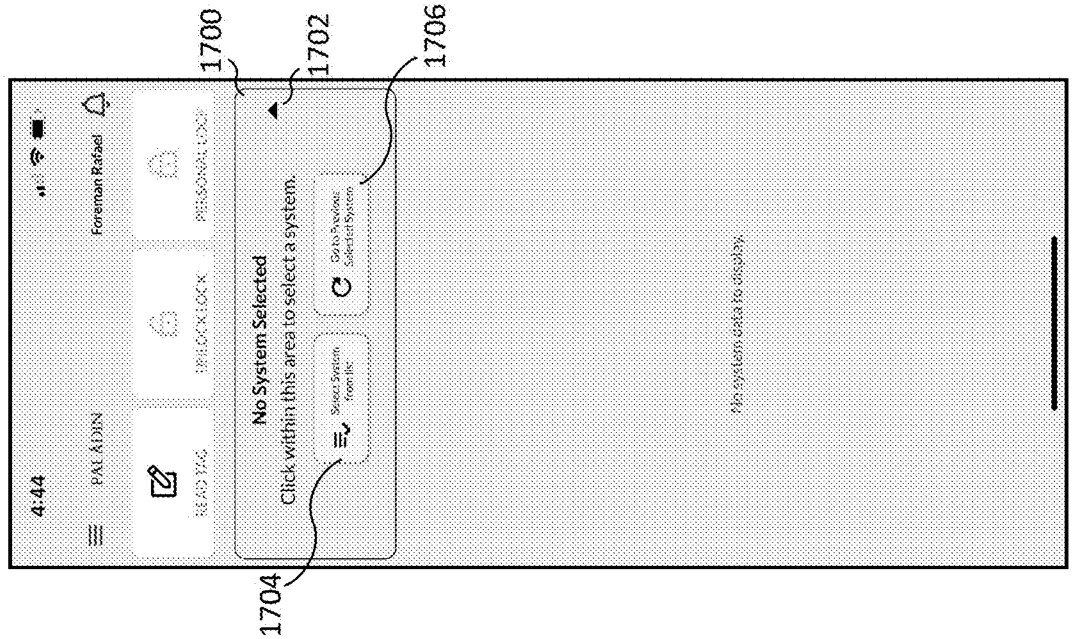
FIG. 17C depicts another exemplary embodiment of a user interface screen that may be used in connection with the various embodiments of the aforementioned app disclosed herein.

In operation 1632, the user interface is adjusted to permit the possibility of user-determined selection of the system-of-focus. The reader's attention is turned to FIG. 17B which depicts an exemplary user interface screen for a particular user (Rafael) who has been assigned the role of foreman. The screen contains a banner 1700 that indicates that no system-of-focus has yet been made by the user. In operation 1632, the app adjusts the banner 1700 so as to render it both selectable and expandable in response to such selection or tap. The app may add a visible element to the banner, such as carrot 1702, to indicate to the user that the banner (or carrot 1702, itself) is selectable and that it will expand in response to such selection or tap. The user may tap the banner 1700 in order to initiate the process of user selection of the system-of-focus. FIG. 17C depicts an exemplary state of the screen in the wake of the user having tapped the banner 1700. As can be seen from FIG. 17C, the expanded banner 1700 includes a button 1704 that the user may tap in order to access a screen by which he or she may select a system-of-focus. Optionally, in operation 1632, the app may access memory, such as a region of memory devoted to non-volatile storage, in order to access a memory location or variable or property of an object that is devoted to holding a value representing a previously selected system, and if such location or variable or property contains data validly describing a previously selected system, the app may present a second button 1706 that permits the user to restore the previously chosen system-of-focus to, once again, be the user's selection as the system-of-focus.

Figure 17D:
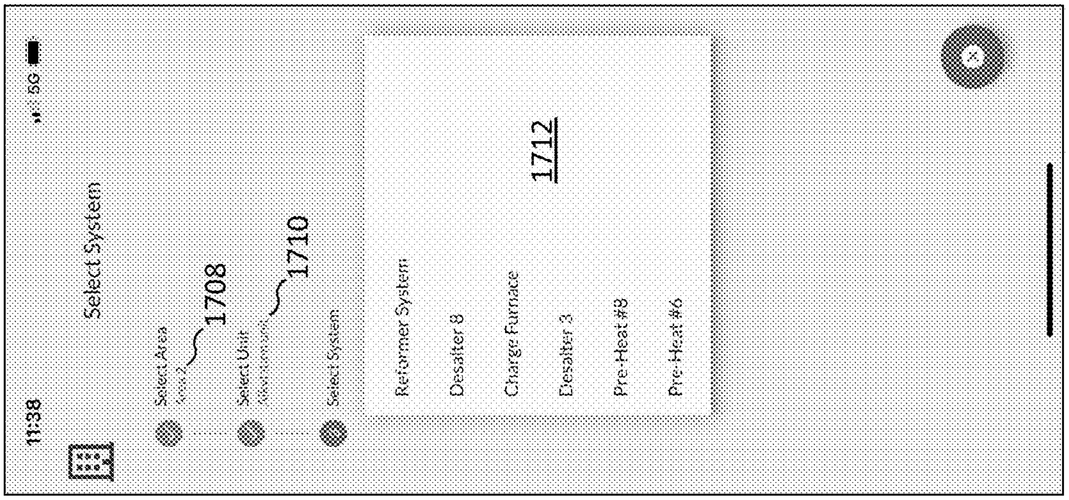
FIG. 17D depicts another exemplary embodiment of a user interface screen that may be used in connection with the various embodiments of the aforementioned app disclosed herein.

In the event that the user taps the banner 1700, thereby expanding it to expose the aforementioned button 1704, and thereafter taps the button 1704, the app receives such user input in operation 1634, and responds to such selection of the button 1704 by presenting the screen depicted in FIG. 7D (operation 1636). The screen depicted in FIG. 7D presents the user with a succession of menus that the user may navigate in order to select a system to be the system-of-focus. The exemplary screen of FIG. 7D initially presents the user with a first menu, the menu items (or options) of which are populated with the areas into which the facility associated with the user is divided. The app accesses the facility information stored in the context of operation 1626 in order to populate the menu. The user may select the particular area in which the system he intends as the system-of-focus resides. In the wake of having made an area selection, the selection is stored, such as by storing it in a selection property of a menu object corresponding to the visually presented first menu, and the selection is optionally presented on the user interface so that the user can see what particular area he or she in fact selected with his or her tap gesture. Thereafter, menu items (or options) of a second menu object are populated with units situated within the area indicated by the selection property of the first menu object (i.e., the area selected by the user via the first menu). The app accesses the facility information stored in the context of operation 1626 in order to associate the selected area with units within such area, and populates the second menu with such units. The populated menu is presented on the screen. In the wake of having made a unit selection, the selection is stored, such as by storing it in a selection property of a menu object corresponding to the visually presented second menu, and the selection is optionally presented on the user interface so that the user can see what particular unit he or she in fact selected with his or her tap gesture. The exemplary image of the screen depicted in FIG. 7D presents the menu screen in the wake of the user having selected Area 2 via the first menu, and having further selected the Alkylation Unit via the second menu. Thus, the selection made via the first menu is presented on the user interface via an area data element 1708, and the selection made via the second menu is presented via a unit data element 1710. Thereafter, menu items (or options) of a third menu object are populated with systems making up the particular unit indicated by the selection property of the second menu object (i.e., the unit selected by the user via the second menu). The app accesses the facility information stored in the context of operation 1626 in order to associate the selected unit with systems making up such unit, and populates the third menu with such systems. An example of such third menu 1712 is depicted in FIG. 17D. The user may make a system selection from the third menu 1712, and the selection will be, once again, stored in the selection property of the menu object corresponding to the visually presented third menu. In operation 1638, the app receives such selections and performs the above-recited actions. The act of having set the respective selection properties of the first, second and third menu objects accomplishes the task of determining the system-of-focus. Thereafter, in operation 1640, data representing the selected system (example: an area ID uniquely identifying the selected area, a unit ID uniquely identifying the selected area, and a system ID uniquely identifying the selected system) is stored in a region of nonvolatile memory devoted to storing the current system-of-focus and any previous data stored in such region is relocated to a region of nonvolatile memory devoted to storing a previously selected system-of-focus. Thus, referring back to FIG. 17C, a tap of button 1706 causes the respective selection properties of the first, second and third menu objects to be populated with the data stored in the just-mentioned region of nonvolatile memory devoted to storing a previously selected system-of-focus. With the system-of-focus having been determined, the app transitions into the System Presentation state 1602, which is discussed following discussion of operations 1642-1648 of FIG. 16D.

Figure 17E:
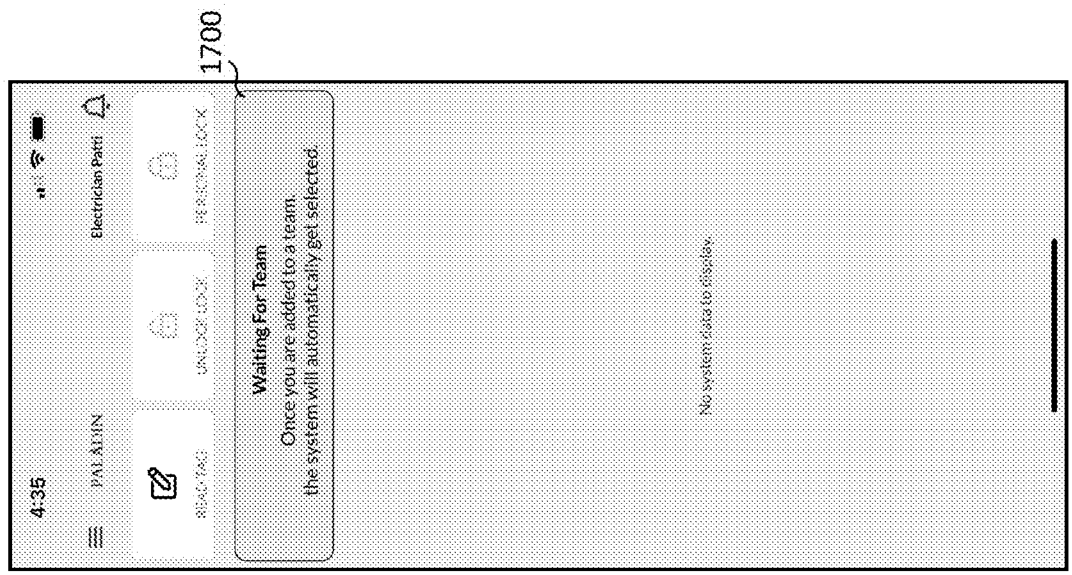
FIG. 17E depicts another exemplary embodiment of a user interface screen that may be used in connection with the various embodiments of the aforementioned app disclosed herein.

Previously, it was stated that the role assigned to the logged-in user is accessed in operation 1630 to determine whether the user is permitted to make a selection of the system-of-focus, or whether the selection is to be made programmatically. If the role is such that the selection of the system of focus is to be made programmatically (example: the role of the logged-in user is craftsman), then in operation 1642 the aforementioned banner 1700 is rendered not-expandable and no buttons are added thereto. Next, in operation 1644, the information stored in the context of operation 1626 is accessed to determine whether the logged-in user is a member of a service team. If not, the respective selection properties of the first, second and third menu objects are set to null or some other value indicating no selection (operation 1646). The combined effect of operations 1642 and 1646 is to render the banner 1700 to appear as shown in FIG. 17E. As can be seen from FIG. 17E, the banner 1700 indicates that the user has not been added to a team, and that the system-of-focus will be programmatically made once a team assignment has occurred. According to some embodiments, in the event that the logged-in user is later added to a service team, the server-side aspect of the asynchronous data-updating framework 1806 cooperates with its client-side counterpart in the app to push the service team information to the app, including the area, unit and system to which the team is assigned, and that information is used to establish the system-of-focus, as described above, and the app transitions into the System Presentation state 1602, which is discussed below.

If, in operation 1644, it is determined that the logged-in user is, in fact, a member of a service team, then the respective selection properties of the first, second and third menu objects are set to the area, unit, and system to which the service team is assigned, and data representing the selected system is stored in non-volatile memory, as described above in connection with operation 1640 (operation 1648). (Such information is obtained from the data stored in connection with operation 1626.) Thus, the system-of-focus is determined programmatically by such property settings. With the system-of-focus having been determined, the app transitions into the System Presentation state 1604.

Figure 17F:
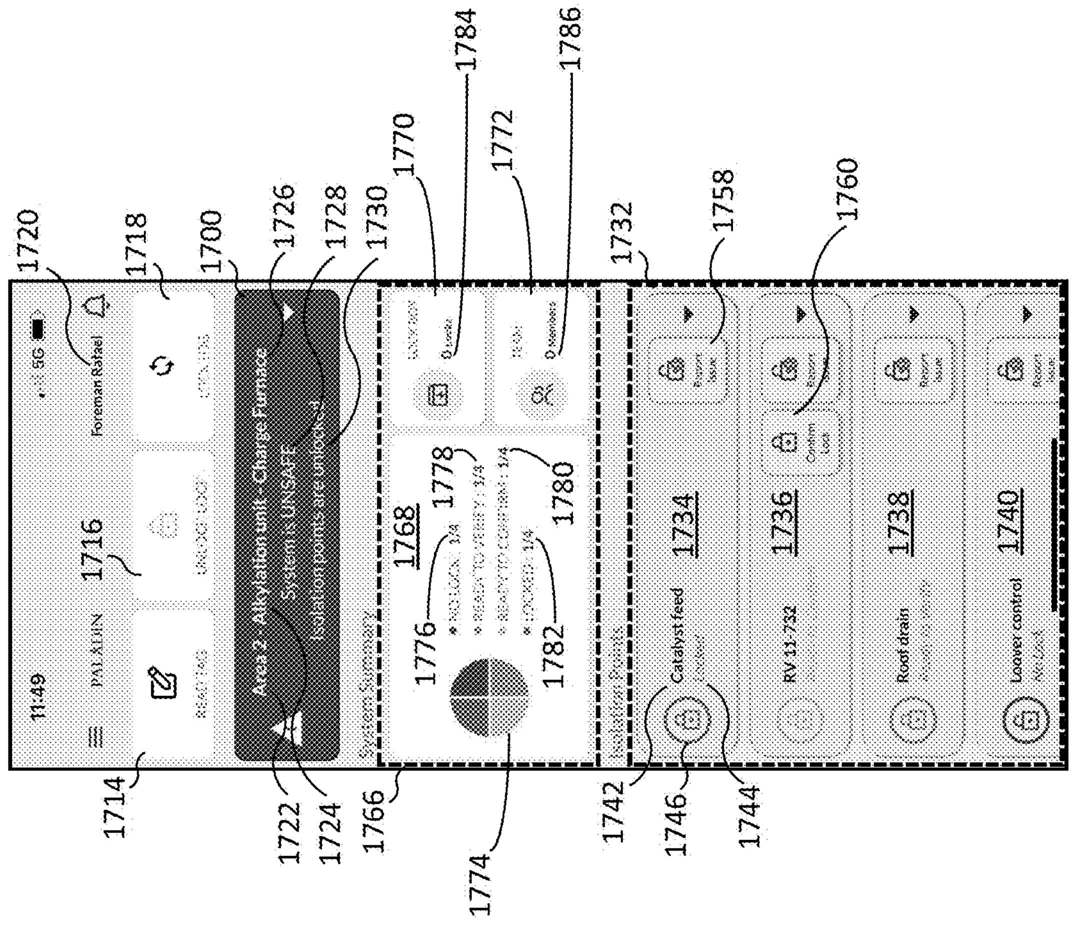
FIG. 17F depicts another exemplary embodiment of a user interface screen that may be used in connection with the various embodiments of the aforementioned app disclosed herein.

In the System Presentation state 1604, safety data pertaining to the system-of-focus is presented via the user interface, as depicted in FIG. 17F. Prior to proceeding with a discussion of the various exemplary operations conducted by the app within the System Presentation state 1604, discussion presently turns to an overview of the user interface, itself.

As can be seen from FIG. 17F, the user interface may include three buttons 1714, 1716 and 1718. A user may tap button 1714 to initiate a read-tag sequence, by which information concerning a given lock is acquired therefrom (example: a lock ID; a lock state, e.g., locked or unlocked; a lock model number; a lock hardware version; a lock firmware version; a battery level of the particular battery powering the lock; and so on), and from the backend computing platform 1208, such as via interaction with the mobile APIs 1804 (example: if the lock is currently reflected in the database 1800 as securing an isolation point, (1) a name of the particular facility in which the isolation point is located, (2) a name of the geographic area within the facility in which the isolation point is situated, (3) a name of the unit of which the isolation point is a component, (4) a name of the system of which the isolation point is a component, and (5) a name of the isolation point, itself; a name of a user that initially placed the lock so as to secure such isolation point; a name of a user that verified such initial lock placement, if any; and a name of a user that most recently confirmed such lock placement, if any). The read-tag sequence is discussed in greater detail, below. A user may tap button 1716 in order to initiate an unlock sequence and thereby unlock a given lock. User access to this button 1716 may be subject to certain restrictions, and retrieval of the particular digital key required to successfully unlock a given lock may be subject to certain rules. For example, according to some embodiments, only users assigned a role of operator may access button 1716 (and thereby attempt to unlock a particular lock). Thus, according to such embodiments, for users assigned any other role, the button 1716 may appear in a grayed-out form or other similar form, to indicate that the button 1716 has been deactivated. In the particular example depicted in FIG. 17F, the user interface includes a user label 1720 that identifies the logged-in user, together with the role assigned to that user, and as can be seen based upon the label 1720, the logged in user (first name: Rafael) has been assigned a foreman role, meaning that the button 1716 has been deactivated. Had the button 1716 been activated, retrieval of the digital key corresponding to the particular lock with which the sequence was initiated would have been subject to certain rules or conditions, such as refusal of such retrieval in the event that the records stored in the database 1800 indicated that the aforementioned particular lock was securing an isolation point of a particular system, and that the aforementioned particular system had any digital personal locks on its corresponding digital lockbox. The unlock sequence is discussed in greater detail below. A user may tap button 1718 in order to initiate a scan sequence and thereby read certain entries from an event log maintained in memory by the particular lock with which the sequence was initiated. For example, according to some embodiments, the scan lock sequence results in a transmission of lock event messages that had been the previous subjects of attempted communication to the backend platform 1208 via the gateways 1810 but had not been acknowledged as having been successfully received by the server stack 1812. Thus, such messages are retrieved by the app via the scan lock sequence and are relayed to the backend platform 1208 via the mobile APIs 1804. The scan sequence is discussed in greater detail, below.

As previously referred to, the user interface also includes a banner 1700. According to some embodiments, the banner includes an area label 1722, a unit label 1724, and a system label 1726, which, together, present the name of the system-of-focus ("Charge Furnace" in the example of FIG. 17F), the name of the unit of which such system is a component ("Alkylation Unit" in FIG. 17F), and the name of the area in which such unit is situated ("Area 2" in FIG. 17F). Thus, a complete articulation of the system-of-focus is presented in the banner 1700, utilizing a naming convention also used by the personnel of the facility at which the safety system is deployed. The banner 1700 also includes a safety label 1728, which states whether or not the system-of-focus is in a safe state to be serviced, and if it is not, it includes a reason label 1730 which states a reason that the system is not in a safe state, and, according to some embodiments, does so in such a way that it suggests the next action that should be taken to render the system safe. Thus, the banner 1700 identifies the system-of-focus, states whether it is in a safe state for service, and, if it is not, provides a reason explaining its unsafe state. As described previously, the user may tap the banner 1700 in order to expand it, and select another system-of-focus, as described previously in connection with the set focus state 1602.

Figure 17G:
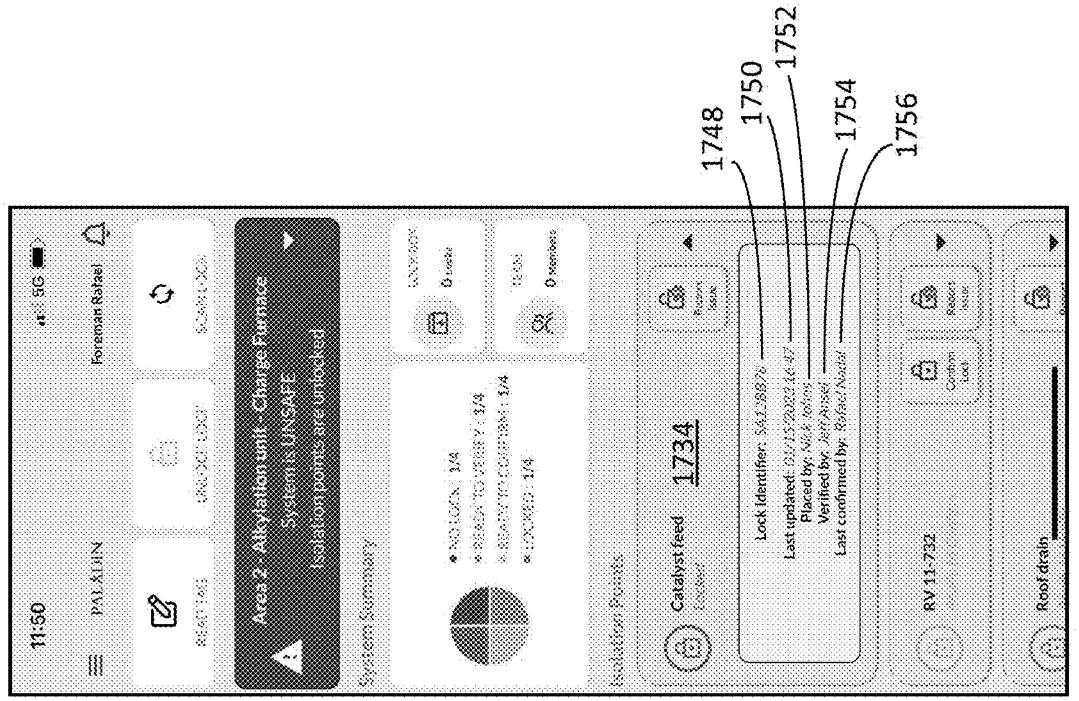
FIG. 17G depicts another exemplary embodiment of a user interface screen that may be used in connection with the various embodiments of the aforementioned app disclosed herein.

The user interface also includes a region 1732 that contains a plurality of isolation point tiles 1734, 1736, 1738 and 1740. There is one tile 1734, 1736, 1738 and 1740 for each isolation point of the system-of-focus. Each isolation point tile 1734, 1736, 1738 and 1740 corresponds to an isolation point of the system-of-focus. Examining isolation point tile 1734, it can be seen that it includes an isolation point label 1742 that identifies the name of the particular isolation point to which the tile 1734 corresponds (i.e., the "Catalyst Feed"). Thus, all of the information contained in the tile 1734 pertains to the Catalyst Feed isolation point. The tile 1734 also includes a state label 1744 that presents the state of the isolation point (e.g., Locked, Ready to Verify, Ready to Confirm, or No Lock). According to some embodiments, the state label 1744 may be color coded so that color of the label 1744 is determined by the state. According to some embodiments, the tile 1734 also includes an icon 1746 that may match the color of the label 1744, in order to supply an additional visual element that reinforces the aforementioned color-coded state message. (According to some embodiments, the color red may indicate that an isolation point contains no lock; the color orange may indicate that the isolation point has been secured by a first operator with the initial placement of a lock and the presence of the lock is ready to be verified by a second operator; the color yellow may indicate that initial placement of a lock at the isolation point has been verified by a second operator and the presence of the lock is now ready to be confirmed by a party that is not the first or second operator—such as by a foreman or a third operator, for example; and the color green may indicate that the placement of the lock has been verified or confirmed in such a manner that the user of the app is entitled to consider that isolation point properly locked out.) The user may tap any particular tile 1734, 1736, 1738 and 1740 to expand it, in order to present additional information pertaining to the safety status of the corresponding isolation point. For example, FIG. 17G depicts isolation point 1734 in an expanded state. In an expanded state, the tile may present a lock identifier label 1748, which states the lock ID of the particular lock (if any) securing the corresponding isolation point, a last-updated label, which is a time and date stamp that states the most recent time and date (if any) on which data was received from such lock at the backend platform 1208, a placement label 1752, which states the name of the user (if any) that initially placed such lock at the corresponding isolation point, a verification label, which states the name of the user (if any) that verified such placement of such lock at the corresponding isolation point, and a confirmation label, which states the name of the user (if any) that most recently confirmed the presence of the lock at the corresponding isolation point. According to some embodiments, the user may tap the tile 1734, 1736, 1738 and 1740, while it is in its expanded state, in order to return it to its original contracted state. According to some embodiments, each isolation point tile 1734, 1736, 1738 and 1740 contains at most two buttons. Isolation point 1734 contains a first button 1758 that a user may tap to report an issue relating to the corresponding isolation point (examples of issues: the user does not actually see a lock securing the corresponding isolation point, despite it being reported in a Locked state; the lock securing the corresponding isolation point appears to be out of batteries or is otherwise unresponsive; and so on). The operation of the app in response to a user tapping button 1758 is discussed below. A tile 1734, 1736, 1738 and 1740 may also contain a second button, which the user may tap to initiate the next operation required to advance the state of the tile's 1734, 1736, 1738 and 1740 corresponding isolation point toward the Locked state. In the case of tile 1734, the corresponding isolation point is already in a Locked state, so no such second button is presented. The presence of a second button may be determined by user role. For example, tile 1740 is presented as corresponding to a Loover Control isolation point, which is in a No Lock state (i.e., no initial lock placement has been conducted at the Loover Control in order to secure it). Thus, the next operation to be performed to advance the Loover Control toward the Locked state ordinarily would be to perform an initial lock placement. According to some embodiments, an initial lock placement can only be performed by users assigned an operator role. Given that the particular exemplary user logged into the app, has been assigned a role of foreman, then it is the case that the button by which a user might initiate an initial lock placement has been removed from the tile 1740. Alternatively, such button could have been presented in a grayed-out format and deactivated. Similarly, tile 1738 is presented as corresponding to a Roof Drain isolation point, which is in a Ready to Verify state (i.e., an initial lock placement has been conducted at the Roof Drain in order to secure it, but such placement has not been verified by another user). Thus, the next operation to be performed to advance the Roof Drain toward the Locked state is to perform a verification operation. According to some embodiments, a verification operation can only be performed by users assigned an operator role. Given that the particular exemplary user logged into the app, has been assigned a role of foreman, then it is the case that the button by which a user might initiate a verification operation has been removed from the tile 1740. Alternatively, such button could have been presented in a grayed-out format and deactivated. Turning to tile 1736, it can be seen that it corresponds to an exemplary RV 11-732 isolation point, which is in a Ready to Confirm state. According to some embodiments, initiation of a confirmation operation is permitted by a user of any role. Thus, tile 1736 contains a confirm-lock button 1760. The operation of the app in response to a user tap of such button 1760 is described below. Returning to the topic of informational content of the tiles, although only the informational content of tile 1734 was explicitly discussed, it is to be understood that such tiles 1736, 1738 and 1740 contain parallel informational content (as can be partially seen from inspection of FIG. 17F). Additionally, although the exemplary system-of-focus of FIG. 17F contains four isolation points, it is to be understood that, in principle, the app and the user interface are operable with a system having any number of isolation points. Region 1732 may be scrollable so that a user may, via a swipe gesture, bring into the viewable portion of the region 1732 a particular isolation point tile that happens not to be visible prior to such gesture. For example, a hypothetical fifth tile, located conceptually beneath tile 1740, could be brought into view via an upward swipe gesture, which would also cause the tile 1734 at the top of the region 1732 to exit the region 1732 as the aforementioned hypothetical fifth tile entered the region 1732.

Figure 17H:
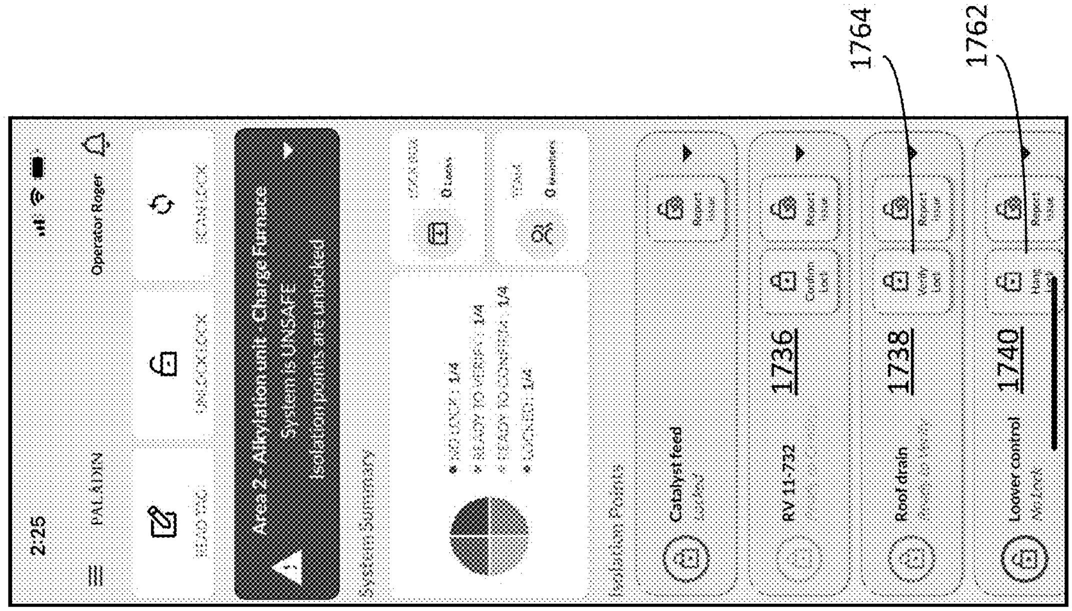
FIG. 17H depicts another exemplary embodiment of a user interface screen that may be used in connection with the various embodiments of the aforementioned app disclosed herein.

For the sake of completeness, FIG. 17H depicts the user interface of FIG. 17F, with a user assigned to an operator role logged into the app. As a consequence, tiles 1736, 1738 and 1740 include two buttons. Specifically, as can be seen from FIG. 17H, tile 1740 includes a button 1762 that a user may tap to initiate an initial lock placement operation (discussed below), and tile 1738 includes a button 1764 that a user may tap to initiate a lock verification operation (discussed below). Buttons 1762 and 1764 were not presented in FIG. 17F, for reasons already stated.

Returning to FIG. 17F, interposed between the banner 1700 and region 1732 is a region 1766, which presents safety information pertaining to the system-of-focus as a whole, rather than on an isolation-point-by-isolation-point basis (which data is presented in tiles 1734, 1736, 1738 and 1740). Region 1732 includes three fields 1768, 1770 and 1772. Field 1768 includes a graphical element 1774 (in this case, a pie chart) that visually indicates the quantity of isolation points of the system-of-focus that are in each particular state, e.g., that indicates the quantity of isolation points in the No Lock state, the quantity of isolation points in the Ready to Verify state, the quantity of isolation points in the Ready to Confirm state, and the quantity of isolation points in the Locked state. According to some embodiments, the graphical element 1774 is color coded according to the same state color-coding scheme deployed in the isolation point tiles 1734, 1736, 1738 and 1740, which was described previously. According to some embodiments, the field 1768 also includes a key by which the graphical element may be understood. The key may include state quantification labels 1776, 1778, 1780 and 1782 which explicitly state the quantity of isolation points of the system-of-focus in each particular state, so that the user is not required to interpret the graphical element 1774 in order to determine this information. Thus, as depicted in FIG. 17F, state quantification element 1776 indicates that one isolation point out of a total of four isolation points of the system-of-focus is in the No Lock state. Element 1778 indicates that one isolation point out of a total of four isolation points of the system-of-focus is in the Ready to Verify state. Element 1780 indicates that one isolation point out of a total of four isolation points of the system-of-focus is in the Ready to Confirm state. Finally, element 1782 indicates that one isolation point out of a total of four isolation points of the system-of-focus is in the Locked state.

Field 1770 includes a lockbox label 1784, which indicates the quantity of digital personal locks currently associated with (or currently "locked on") the virtual lockbox corresponding to the system-of-focus. As can be seen from FIG. 17F, label 1784 indicates that no digital personal locks are currently locked on the virtual lockbox of the system-of-focus, which is an intuitive result, given that the system-of-focus is presented in an only partially-locked-out state, meaning that no user should have been able to add his or her digital personal lock to the aforementioned virtual lockbox to begin with. According to some embodiments, field 1770 is selectable, so that it functions as a button, and the user may tap the field 1770 in order to access a virtual lockbox screen, which is discussed below.

Field 1772 includes a team-member label 1786, which indicates whether the logged-in user is assigned to a service team dedicated to the system-of-focus, and if so, the total quantity of team members currently assigned to such team. As can be seen from FIG. 17F, label 1786 indicates that the currently logged in user is not a member of a service team assigned to the system-of-focus. According to some embodiments, field 1772 is selectable, so that it functions as a button, and the user may tap the field 1772 in order to access a service team screen, which is discussed below.

Figure 16E:
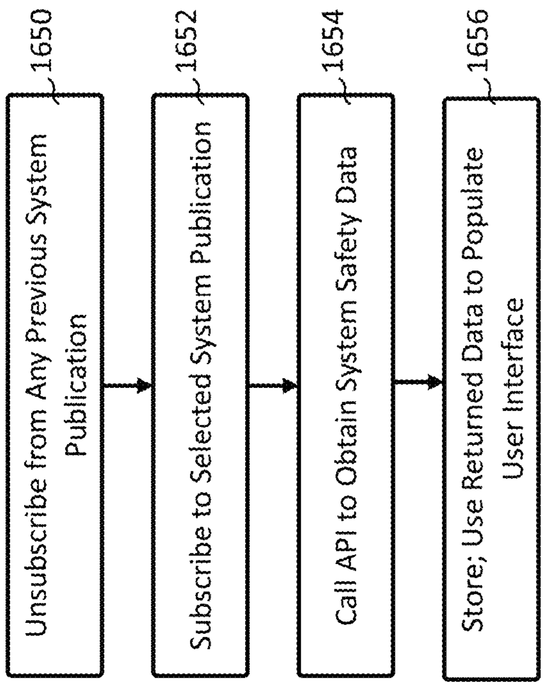
FIG. 16E depicts another portion of a state transition diagram or flowchart describing the operational and state flow of various embodiments off an app that may execute on a microcontroller of processor of a mobile device that may be used in connection with various embodiments of the safety system disclosed herein.
Figure 16F:
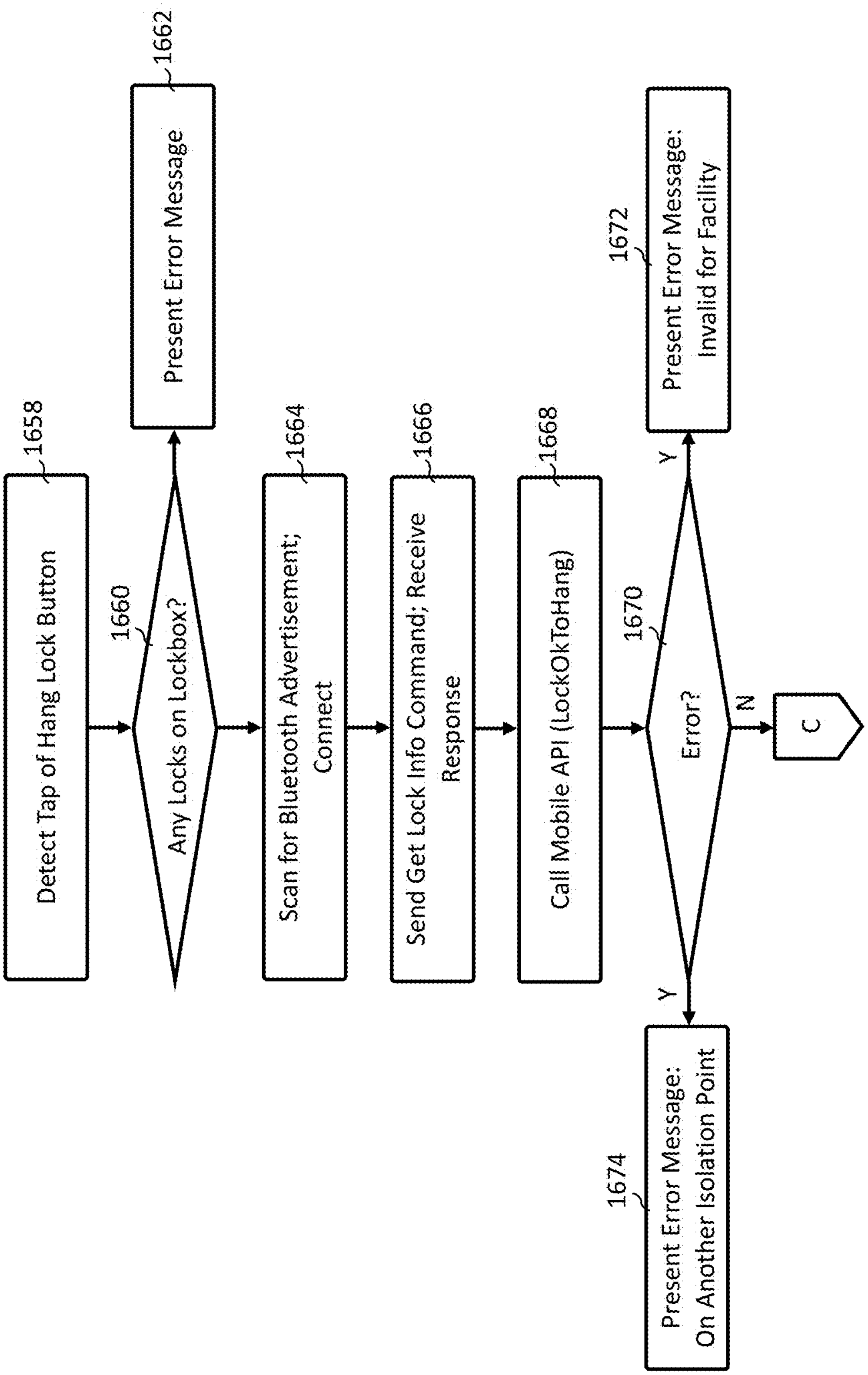
FIG. 16F depicts another portion of a state transition diagram or flowchart describing the operational and state flow of various embodiments off an app that may execute on a microcontroller of processor of a mobile device that may be used in connection with various embodiments of the safety system disclosed herein.

With the overview of the user interface of FIG. 17F as a backdrop, discussion now returns to the System Presentation state 1604 (FIG. 16A). FIG. 16E depicts operations included in the System Presentation state. Initially, in operation 1650, the client-side asynchronous data-updating framework within the app interacts with its server-side counterpart 1806 to unsubscribe from any previous System Publication subscription, and thereafter, in operation 1652, subscribes to the newly established system-of-focus (accessing the data stored in operations 1640 or 1648 to effectuate such subscription).

Next, in operation 1654, the app calls an API 1804 (example: getSystemData) with the system ID of the system-of-focus. The API 1804 responds by accessing the database 1800 in order to construct a response that includes a body of safety data pertaining to the system associated with the aforementioned system ID. According to some embodiments, this body of safety data includes data sufficient to populate regions 1732 and 1766 of the user interface (see FIG. 17F) and banner 1700. According to some embodiments, the aforementioned body of safety data includes all of the data presented in regions 1732 and 1766 and in the banner 1700, with the exclusion of the team label 1786 information, which is determined by the data stored in operation 1626, and with the further exclusion of the data contained in the area label 1722, unit label 1724 and system label 1726, which is determined by the data stored in operations 1640, 1646 or 1648. For example, according to some embodiments, the body of safety data in the response includes: (1) a system ID identifying the system to which the body of data relates; (2) an array of safety data structures, with one structure pertaining to each isolation point of the system identified by the system ID; (3) the number of personal locks on the digital lockbox associated with system identified by the system ID; (4) a safety indicator indicating whether it is safe or unsafe for the user to operate upon the system (Safe/Unsafe); and (5) a reason string that, in the event that the system is unsafe for the logged-in user to service, expresses the next step that the user should take to advance the system toward a safe state. According to some embodiments, each of the aforementioned safety data structures includes: (1) an isolation point ID identifying the isolation point to which the data structure relates; (2) the name of the isolation point identified by the isolation point ID; (3) a time/date stamp indicating the most recent date and time that data was received from the lock at the backend computing platform 1208; (4) a lock ID with a lock securing the isolation point identified by the isolation point ID (if there is any such lock); (5) a lock state (Locked/Unlocked) of the lock identified by the aforementioned lock ID; (6) the state of the isolation point, as calculated for the logged-in user (example: No Lock, Ready to Verify, Ready to Confirm, or Locked); (7) a user ID identifying the particular user that initially placed the lock identified by the lock ID at the isolation point identified by the isolation point ID (if any such lock was actually placed); (8) the name of the user identified by the aforementioned user ID; (9) a time/date stamp indicating the time and date of such initial lock placement (if any); (10) a user ID identifying the particular user that verified the initial placement of the lock identified by the lock ID at the isolation point identified by the isolation point ID (if any such verification operation actually occurred); (11) the name of the user identified by the aforementioned user ID; (12) a time/date stamp indicating the time and date of such verification operation (if any); (13) a user ID identifying the particular user that asserted that no lock was, in fact, found at the isolation point identified by the isolation point ID, despite the existence of a record in the database 1800 indicating that a lock had been initially placed thereupon, which may be referred to herein as an "invalidation operation"; (14) the name of the user identified by the aforementioned user ID; (15) a time/date stamp indicating the time and date of such invalidation operation (if any); (16) a user ID identifying the particular user that removed the lock initially at the isolation point identified by the isolation point ID (if any such removal operation actually occurred); (17) the name of the user identified by the aforementioned user ID; (18) a time/date stamp indicating the time and date of such removal operation (if any); and (19) an array of user names that have performed a confirmation operation upon the lock identified by the aforementioned lock ID.

Next, in operation 1656, the body of safety data is stored in device 1211 memory, so as to preserve its various interrelations and associations. Thereafter, it is used to populate the region 1732, region 1766 and banner 1700, such as is depicted in exemplary FIG. 17F.

Previously, it was stated that in response to invocation of the middleware associated with the getSystemData API 1804, the state of each isolation point associated with the system-of-focus is calculated for the particular user logged into the app. According to some embodiments, the aforementioned middleware includes a state machine. A state machine is software that receives as inputs data identifying a user (such as a user ID) and data identifying an isolation point, the state of which is to be determined relative to the identified user, and, making use of isolation point safety data, such as data pertaining to lock placement assertions, verification assertions, confirmation assertions, and making further use of service team rosters and their respective system assignments, determines the state of the isolation point relative to the identified user. Discussion now diverts to an exemplary method by which the state of an isolation point relative to a given user may be determined, and will return to discussion of the system presentation state 1604, below.

Figure 19:
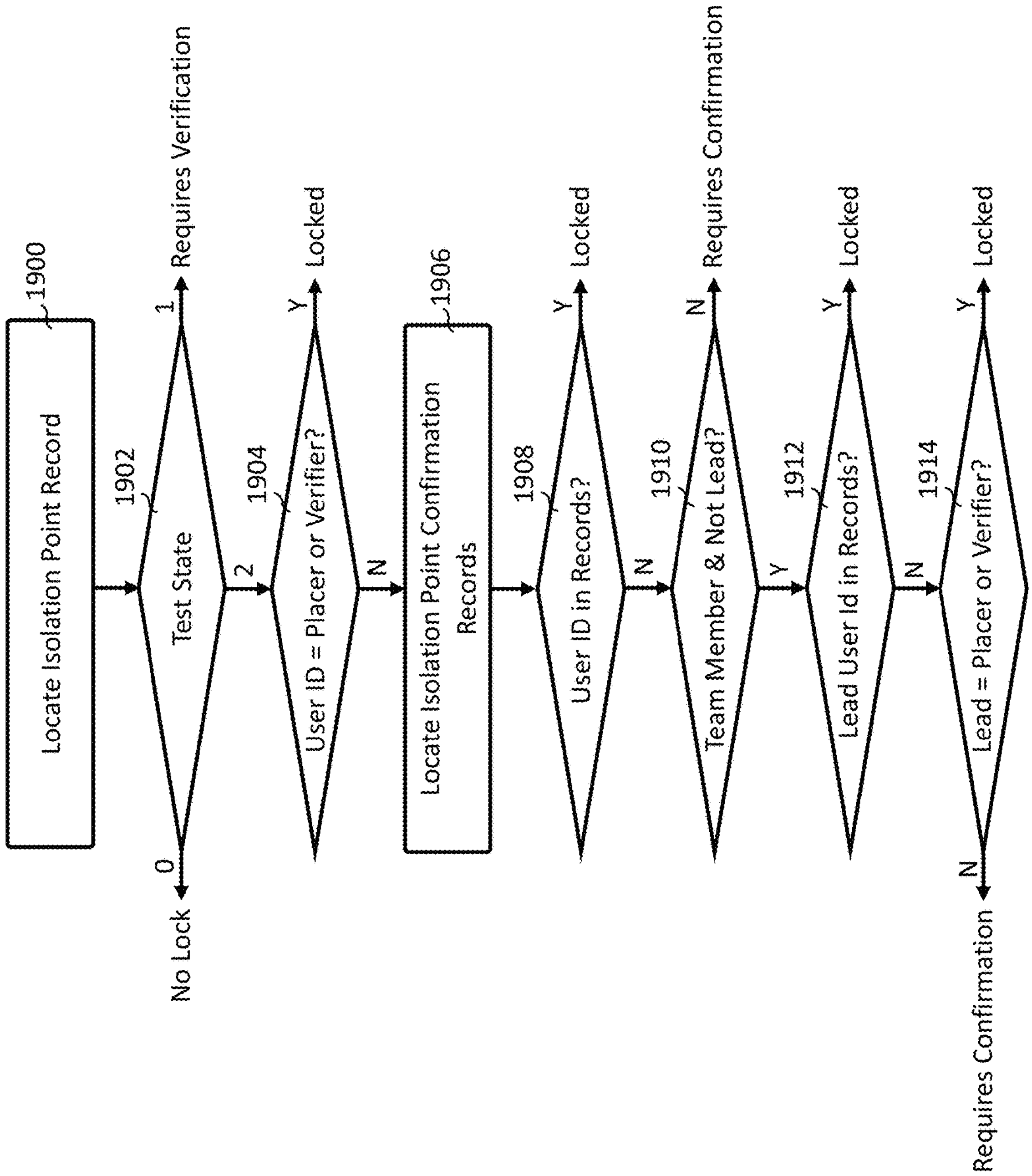
FIG. 19 depicts an exemplary embodiment of certain software that may execute upon the various embodiments of the backend computing platform of the various embodiments of the safety system disclosed herein.

FIG. 19 depicts an exemplary method that the middleware of the backend computing platform 1208 may employ to determine the state of a particular isolation point relative to a particular user. The exemplary method makes use of certain assumed data organizational features. Specifically, it assumes that, with respect to the database 1800: (1) an isolation point table contains a record for each isolation point of a facility, and that each such record includes (a) an isolation point ID identifying the isolation point referred to by the record, (b) a lock ID of a lock asserted to have been secured upon such isolation point (if any), (c) a user ID of a user that asserted such initial lock placement (if any), along with a time/date stamp of such placement (if any), (d) a user ID of a user that asserted verification of such initial lock placement (if any), along with a time/date stamp of such verification (if any), (e) a state treatment indicator that reveals whether such isolation point is to be treated as though (i) no lock has been placed thereupon (example: the state indicator may take on a value of 0 to indicate such treatment), (ii) a lock has been placed thereupon but has not been verified (example: the state indicator may take on a value of 1 to indicate such treatment), or (iii) a lock has been placed thereupon and such placement has been verified (example: the state indicator may take on a value of 2 to indicate such treatment), and (f) other data not relevant here but discussed below; (2) a confirmation table contains a record for each asserted confirmation of a lock placement, wherein each such record includes (a) an isolation point ID identifying the particular isolation point to which such confirmation relates, and (b) a user ID identifying the particular user having asserted such confirmation, along with a time/date stamp of such confirmation; (3) a teams table contains a record for each service team, wherein each such record includes (a) a team ID identifying such service team, (b) the user ID of the team leader of such service team, and (c) the system ID of the particular system to which such service team was assigned; and (4) a team members table, including a record for each enrollment of a user on a service team, wherein each such record includes (a) a user ID identifying a user that is enrolled on a team, and (b) a team ID identifying the particular team on which such user is enrolled. The data need not be organized as just described, and different data organizations, typically resulting in operational modifications to the method of FIG. 19, will present themselves to one of skill in the art, in view of the disclosure herein.

Turning to FIG. 19, the method is initiated by invocation with: (1) an identifier of a particular isolation point (example: an isolation point ID), the state of which is to be determined; and (2) an identifier of a user (example: a user ID) for whom such state is to be determined. Upon such invocation, operation 1900 is performed, wherein the aforementioned isolation point table is accessed and a record associated with the isolation point in question is located (e.g., the particular record with a matching isolation point ID is located).

Thereafter, in operation 1902, the aforementioned state treatment indicator is examined. For the sake of illustration it is assumed that such indicator takes on a value of 0, if the isolation point in question is to be treated as though no lock has been initially placed thereupon, that such indicator takes on a value of 1, if the isolation point is to be treated as though an initial lock placement has occurred at such isolation point, but that such placement has not been verified, and that such indicator takes on a value of 2, if the isolation point is to be treated as though an initial lock placement has occurred at such isolation point, and that such placement has been verified. Thus, pursuant to such an exemplary embodiment, such state treatment indicator is tested in operation 1902, and if it is found to take on a value of 0, then the isolation point in question is assigned a state of No Lock. If it is found to take on a value of 1, then the isolation point in question is assigned a state of Requires Verification. However, if it is found to take on a value of 2, an immediate state assignment cannot be determined, and control is passed to operation 1904. (As an aside, it may seem as though whether an isolation point is to be treated as though it has no lock placed thereupon, or whether it has a lock placed thereupon but such lock placement has not been verified, or whether it has a lock placed thereupon, the placement of which has been verified, is determinable from the other fields of the record (example: user ID of the user that asserted to have placed a lock, and the user ID of a user that asserted to have verified such lock), but there are circumstance under which a lock that has been asserted to have been placed or verified should receive different treatment, and such separate state treatment indicator provides the possibility of such different treatment. Examples of such circumstances are described herein, below.)

In operation 1904, the user ID passed to the state machine during invocation is compared to any user IDs in the located record relating to initial lock placement and verification. If the user ID passed to the state machine during invocation matches either (1) the user ID of the user that initially placed the lock, or (2) the user ID of the user that verified the placement of the lock, then the isolation point in question is assigned a state of Locked. Such state assignment would be appropriate in the context of a policy whereby a lock-out procedure performed upon a given isolation point must be placed by or observed by a user (either because he placed the lock to begin with or because he observed it while verifying or confirming such placement) and also observed by a second user (again, either because such second user placed the lock to begin with or because the second user observed it while verifying or confirming such placement). However, if the user ID passed to the state machine during invocation does not match the user IDs of either the initial placer of the lock or the verifier of such placement, then a state assignment cannot be determined, and control is passed to operation 1906.

In operation 1906, the aforementioned confirmation table is accessed to locate those records containing an isolation point ID matching the isolation point ID passed to the state machine during invocation. In other words, in operation 1906 a body of data describing confirmation operations performed upon the isolation point is amassed (i.e., a body of data describing which particular users have confirmed the presence of a lock at the isolation point in question, since the initial placement of the lock thereat).

Next, in operation 1908, the body of data collected in operation 1906 is inspected to determine whether the user for whom the isolation point state is being determined is indicated within the aforementioned body of data as having confirmed the presence of the initially placed lock at the isolation point in question. For example, in operation 1908, the records located in operation 1906 may be inspected to determine whether any of them contain a user ID matching the particular user ID passed to the state machine during invocation. If so, then the isolation point in question is assigned a state of Locked. If not, then a state assignment cannot be determined, and control is passed to operation 1910.

In operation 1910, the state machine determines whether the user for whom an isolation point state determination is being made is a member of a service team assigned to a system of which the isolation point in question is a component. If so, it further determines whether such user is the leader of such team or merely a member. Recall: if such user is a member of a service team assigned to a system containing the isolation point in question, then he or she may inherit the isolation point states of the leader of such team (only the states of isolation points contained in the system to which the service team is assigned). For example, in operation 1910, the aforementioned teams table and team members table may be accessed (example: joined) to locate those records (if any) revealing a service team roster pertaining to a system in which the isolation point in question is situated. If the user ID passed to the state machine during invocation is not found in such records, this means that there is no opportunity for such user to inherit a state from a team leader, and a state of Requires Confirmation is assigned to the isolation point in question. On the other hand, if the user ID passed to the state machine during invocation is not found in such records, and, further, if such user ID is not reflected as the leader of such team, then a state assignment cannot be determined, and control is passed to operation 1912.

In operation 1912, it is determined whether the leader of the team identified in operation 1910 previously confirmed the presence of the lock asserted to have been placed and verified at the isolation point in question. For example, the records located in operation 1908 may be examined to determine whether any of them include the user ID of the leader of the aforementioned service team. If so, then the isolation point in question is assigned a state of Locked. If not, then a state assignment cannot be determined, and control is passed to operation 1914.

Finally, in operation 1914, it is determined whether the leader of the team identified in operation 1912 actually performed the initial lock placement or verification operation of such placement. (In the context of an ad hoc team created by employees of a facility, such as a refinery, the leader of a team may be an operator who may have performed the initial lock placement at the isolation point in question, or may have verified such placement.) For example, the isolation point record located in operation 1900 may be examined to determine whether the user ID of the leader of the aforementioned service team is indicated therein as having initially placed such lock or verified such placement. If so, then the isolation point in question is assigned a state of Locked. If not, then the aforementioned isolation point is assigned a state of Requires Confirmation.

Previously, it was stated that in response to invocation of the middleware associated with the getSystemData API 1804, the middleware determines a reason string for inclusion in the banner 1700 as reason label 1730. (Recall: according to some embodiments, the purpose of the reason string is to express the next step that the user should take to advance the system toward a safe state. In other words, it is both an explanation of why the system is not safe to service, and an indication of the next step the user should take to advance the system to a safe state.). The middleware determines the reason string on the basis of the states of the isolation points of the system to which the reason string pertains, certain information concerning assertion operations that may or may not exist with respect to each such isolation point, certain information concerning the respective lengths of time that have elapsed since communications have been received from each lock at each such isolation point (thereby demonstrating continued presence and operation of such locks), and the presence of digital personal locks on the virtual lockbox corresponding to such system (if any).

Figure 20:
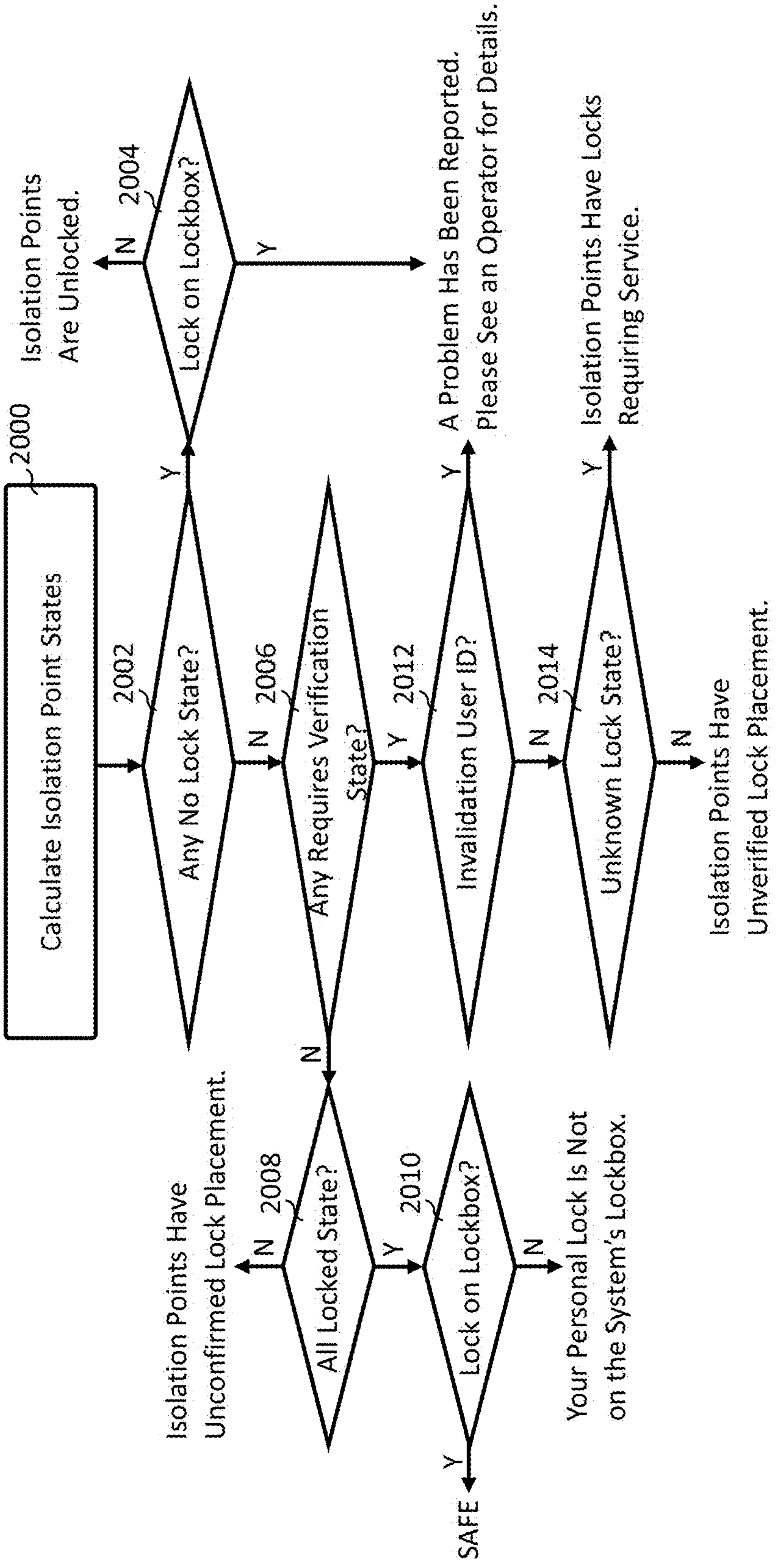
FIG. 20 depicts an exemplary embodiment of certain software that may execute upon the various embodiments of the backend computing platform of the various embodiments of the safety system disclosed herein.

FIG. 20 depicts an exemplary method by which the aforementioned middleware may determine the reason string. As can be seen from FIG. 20, in operation 2000, the states of the various isolation points of the system identified by the system ID passed to the getSystemData API 1804 in its invocation are determined. An example of how such calculation may be performed was described with reference to FIG. 19.

In the wake of having determined the states of the isolation points of the aforementioned system, the states are examined to determine whether any isolation point has been assigned a state of No Lock (operation 2002). If so, according to some embodiments, control is passed to operation 2004, whereupon the contents of the virtual lockbox corresponding to the system for this isolation point is examined. According to some embodiments, the app permits a user to report the occurrence of an issue at an isolation point, such as by tapping a "Report Issue" button 1758. One such issue that may be reported via tapping such button is that, despite indication by the app that the tile 1734, 1736, 1738 or 1740 in which the button 1758 is situated indicates that its corresponding isolation point should have a particular lock securing such isolation point, no such lock is observed by the user of the app. According to some embodiments, if such an issue is reported by a user assigned an operator role, then, in view of the expertise possessed by an operator, the middleware is designed to respond as though such issue assertion is true, without further verification, thereby transitioning the isolation point to a No Lock state, from whatever state it had previously been assigned. This presents the possibility that a completely locked out system—with digital personal locks on the system's virtual lock box-could transition from a Safe state to an Unsafe state, because one of its isolation points suddenly transitioned to a No Lock state. This could be confusing to users with their digital personal locks on such system's virtual lockbox. Thus, this condition is tested for in operation 2004, by examining the virtual lockbox corresponding to the digital lockbox to determine whether it has any digital personal locks thereupon. If so, the reason string is constructed and presented to direct the user to speak with an operator is presented (example: "A problem has been reported. Please see an operator for details."). If not, then the situation the reason string is constructed to simply state that at least one isolation point of the system has not been secured with a lock (example: "Isolation points are unlocked."). According to some embodiments, the database 1800 includes a lockbox table, wherein each record therein corresponds to a digital personal lock currently associated with a virtual lockbox. Each record may include: (1) a user ID; (2) a personal lock ID; and (3) a system ID. Thus, the information in such a record indicates that a particular personal lock (identified by the lock ID) belonging to a personal user (identified by the user ID) is being used to "lock" a virtual lockbox corresponding to a particular system (identified by the system ID). In operation 2004, the lockbox table may be examined to determine whether there exists a record containing a system ID equal to the particular system ID passed to the getSystemData API 1804 in the context of its invocation. On the other hand, if, in operation 2002, no isolation point was found to be in the No Lock state, then control is passed to operation 2006.

In operation 2006, the states are examined to determine whether any isolation point has been assigned a state of Requires Verification. If not, then one of two conditions must be the case: (1) all of the isolation points are in the Locked State; or (2) at least one of the isolation points must be assigned a state of Requires Confirmation. To distinguish between the two conditions, in operation 2008, the states are examined to determine whether all of them have been assigned a Locked state. If not, then the reason string is constructed to state that the lock placement at least one isolation point must be confirmed (example: "Isolation points have unconfirmed lock placement."). On the other hand, if it is indeed the case that all of the isolation points have been assigned a state of Locked, then the system would be safe to service if the user has placed his digital personal lock on the virtual lockbox of the system. Thus, in operation 2010, it is determined whether the user has placed his digital personal lock on the virtual lockbox of the system. For example, the aforementioned lockbox table may be examined for inclusion of a record with the user ID corresponding to the user logged in to the app and the system ID passed to the getSystem Data API 1804 in the context of its invocation. If such a record is found, then the user has, in fact, placed his digital personal lock on the virtual lockbox of the system and the reason string is constructed to indicate that the system is safe to service (example: "SAFE."). If no such record is found, then the reason string is constructed to remind the user to place his digital personal lock on the system's virtual lockbox (example: "Your personal lock is not on the system's lockbox.)

Returning to operation 2006, if there exists at least one isolation point in the requires verification state, according to some embodiments, this is consistent with three conditions: (1) an initial lock placement simply has not yet been verified by a second operator; (2) an isolation point at which an initially-placed lock that had, at one time, been verified by another operator, has had an issue reported in connection therewith (recall button 1758), by which some user not assigned an operator role asserted that no lock was found at the isolation point—and given the lack of expertise typically possessed by non-operators, the middleware was designed to respond to such an assertion by transitioning such isolation point into a Requires Verification state (requiring the intervention of an operator, because only an operator can verify placement of a lock), as opposed to immediately transitioning such isolation point into the No Lock state (which would happen, for example, in the event that an operator traveled to such isolation point to re-verify the lock placement, observed no lock, and reported the issue via button 1758); or (3) more than a threshold period of time (example: 12 hours) has elapsed since receiving a data message from a lock, and, in view of such prolonged lack of communication, the middleware has been designed to transition such isolation point into the Requires Verification state, in order to cause an operator to re-verify the presence and continued operation of the lock, as described above with reference to the second enumerated condition. Operation 2012 performs the initial step in distinguishing between the aforementioned three possible conditions. Previously, in connection with discussion of the isolation point table, it was stated that each record therein may include additional data that was not relevant to isolation point state determination. According to some embodiments, each such record may include a field for recording the user ID of a user asserting that no lock was, in fact, present at the isolation point corresponding to the record, along with another field recording a time/date stamp indicating when such assertion was made; this variety of assertion may be termed an "invalidation assertion." In operation 2012 the isolation point table is accessed and the record(s) corresponding to each isolation point assigned to the Requires Verification state are located and examined to determine whether any valid user ID is contained in the aforementioned field that would record a user ID corresponding to a user making an invalidation assertion. If a valid user ID exists, then it is the case that at least one isolation point is in the Requires Verification state on account of a user having reported that a lock previously thought to have been placed at such isolation point does not, in fact, appear to be there. Thus, a reason string is constructed to instruct the user to seek the assistance of an operator (example: "A problem has been reported. Please see an operator for details.). On the other hand, if no valid user ID is to be found in such field, then it may still be the case that at least one isolation point has been transitioned into the Requires Verification state due to a threshold period of time having elapsed without the backend computing platform 1208 receiving a data message from a lock at such isolation point. Previously, in connection with discussion of the isolation point table, it was stated that each record therein may include additional data that was not relevant to isolation point state determination. According to some embodiments, each such record may include a lock state field, indicating whether the physical lock located at the isolation point corresponding to the record is believed to be Locked, Unlocked or in an Unknown state. According to some embodiments, the middleware responds to the elapsing of more than a threshold period of time since having received a data message from a lock by transitioning the lock state field of the record corresponding to the isolation point at which the lock is placed into an Unknown state. Thus, in operation 2014, the isolation point table is accessed and the record(s) corresponding to each isolation point assigned to the Requires Verification state are located and examined to determine whether any lock state field is in an Unknown state. If so, a reason string is constructed to indicate that at least one lock may require the service attention (example: Isolation points have locks requiring service."). If not, then it is simply the case that a second operator has not yet verified an initial lock placement and a simple reason string explaining this is constructed (example: "Isolation points have unverified lock placement.")

Returning to the topics of the various states progressed through by the app (depicted in FIG. 16A), it is the case that, according to some embodiments, upon completion of the operations of FIG. 16E (which are operations included in the System Presentation state 1604), then the app awaits user input or "pushed" data input originating from the server-side aspect of the asynchronous data updating framework 1806. User input comes from user interaction (example: tapping a user interface element) with the input elements of the user interface, the fundamental screens of which are depicted in FIGS. 17F, 17G and 17H. For example, the user may cause the app to exit the System Presentation state by interaction with buttons 1714, 1716, 1718, 1758, 1760, 1762, 1764, or fields 1770 and 1772 (which function as buttons). Upon tapping such buttons 1714, 1716, 1718, 1758, 1760, 1762, 1764, or fields 1770 and 1772, the app transitions into a state 1606 appropriate to respond to such user input, as is described below. (A user tap of banner 1700 also causes the app to exit the System Presentation state 1604, to return to the Set Focus state 1602, as was discussed previously. For the sake of brevity, no further discussion of the topic is presented here.).

In the event that server-side aspect of the asynchronous data updating framework 1806 pushes a data message to its client-side counterpart within the app, then the app transitions from the System Presentation state 1604 to Callback Invocation state 1608, whereupon the particular callback method or function corresponding to the data message type is invoked, sending the data payload of such data message to the callback method or function in connection with its invocation. (The aforementioned correspondence between a data message type—a System Publication data message, a Team Publication message, or a Facility Publication data message—and a callback method or function is determined in operation 1622, described previously.) The data is then stored, the user interface updated, and the app returns to the System Presentation state 1604. Alternatively, the data message may carry no payload, but indicate type. The corresponding callback function or method may respond by calling the particular API 1804 that is ordinarily called by the app to obtain such data in a synchronous fashion. Example: in the event of a Facility Publication data message or a Team Publication data message, getUserFacilityInfo (originally called in connection with operation 1624) may be called; in the event of a System Publication data message, getSystemData (originally called in connection with operation 1654) may be called. In the wake of calling such APIs 1804, the response is stored as described previously, and the data is used as previously described to update the user interface.

Discussion now turns to the operational response of the app in response to a user interaction (example: a tap) with the hang lock button 1762 (FIG. 17H). An initial lock placement operation may be begun via detection of a button 1762 tap event by the app (operation 1658). In response, the app determines whether there are any digital personal locks on the virtual lockbox associated with the system-of-focus established during the Set Focus state 1602. For example, in operation 1656, the app stored a body of system safety data corresponding to the system-of-focus. As described previously, the body of system safety data includes the number of digital personal locks securing the virtual lockbox corresponding to the system-of-focus at the time of execution of operation 1654 (i.e., the API 1804 call by the body of system safety data was requested from the backend computing platform 1208). As previously described, as other users add or remove their digital personal locks from such virtual lockbox, the server-side aspect of the asynchronous data-updating framework 1806 will either “push” new lockbox data to its client-side counterpart in the app, or will “push” a message thereto that causes the app to re-execute the API call of operation 1654—in either case, the result is that the lockbox data is refreshed in near real-time. Thus, in operation 1660, the app may access such lockbox data and test it to determine whether it is a value greater than zero. This may be the case, for example, if the system-of-focus had been previously completely locked-out; a user had placed his digital personal lock on the virtual lockbox corresponding to the system-of-focus; and, thereafter, a user with an operator role tapped button 1758 to initiate a process reporting that he or she does not see a lock securing a particular isolation point of the system-of-focus. Such sequence of events would cause the aforementioned particular isolation point to transition from a Locked state into a No Lock state, and would cause the system’s safety state (indicated by label 1728) to transition from SAFE to UNSAFE. According to some embodiments, a lock placement sequence is not permitted to be initiated if there are any digital personal locks on a system’s virtual lockbox (as would be the case pursuant to the above-described sequence of events), and the app responds by presenting an error message to the user, indicating that at least one user has his or her digital personal lock on the virtual lockbox corresponding to the system-of-focus, and that such user(s) must halt their service operations upon such system, exit the system if they are physically within it, and then remove their digital personal locks from its virtual lockbox (operation 1662). Thereafter, the user may attempt to tap the hang lock button 1762, and re-initiate the process, beginning with operation 1658, and operational flow will proceed beyond test operation 1660. On the other hand, if, in operation 1660, no digital personal locks are found to be securing the virtual lockbox of the system-of-focus, then operational control is passed to operation 1664.

In operation 1664, the app scans for the presence of locks advertising to establish a connection via Bluetooth, and, in the wake of identifying such a lock, establishes a Bluetooth connection therewith. (If there are plural such advertising locks, the app may present the user with a menu by which the user may select the particular lock with which he or she wishes the app to establish a communication link.) The communication link need not be Bluetooth. Any communication capacity shared by the lock and the device 1211 on which the app is executing will suffice (example: each may be equipped with Wi-Fi or wireless data capability, e.g., 3G, 4G, 5G, etc., and communicate via wireless data).

Next, in operation 1666, the app uses the communication link established in operation 1664 to issue a command to the lock, by which it requests certain lock information. In response, the app receives, via the communication link, a set of lock information from the lock. The set of lock information includes a lock identifier (e.g., a lock ID) and an indication of whether the lock, itself, is in a locked state or an unlocked state. According to some embodiments, other data is also returned. Such other data is not relevant in the context of the present discussion, but is relevant to other discussion, and is presented below.

In operation 1668, the app makes an API 1804 call to the backend computing platform 1208 (LockOkToHang 1804), passing the lock ID acquired in operation 1666 as a part of the payload of the API call. The purpose of the LockOkToHang API 1804 is to determine whether the records of the database 1800 indicate whether placement of the particular lock identified by the lock ID upon an isolation point would result in operational error. For example, the middleware associated with the LockOkToHang 1804 responds by accessing the database 1800 to determine whether the aforementioned lock ID is associated with the facility ID of the particular facility associated with the logged-in user. If not, the server stack 1812 would reject the lock’s transmissions, as described above, meaning the lock could not communicate asynchronous information to the server stack 1208 via its low-power, long range communication pathway. The middleware also accesses the database 1800 to determine whether the aforementioned lock ID is reflected as already securing an isolation point (example: the aforementioned isolation table discussed with reference to FIG. 19, may be accessed to see whether any record therein includes the aforementioned lock ID). A physical lock cannot be in two places at the same time—it cannot be securing both a first isolation point and a second isolation point. The middleware responds to the API 1804 call by indicating whether the lock ID is properly associated with the facility at which the user is located, and whether the lock ID properly indicates that the lock it is associated with is presently unused—i.e., not already securing some other isolation point. Conceptually, the response is structured as:

[associated with facility: T/F; associated with another isolation point: T/F]

According to some embodiments, in the event that the lockID passed in connection with invocation of LockOkToHang API 1804 is indicated as referring to a lock securing some other isolation point, then the aforementioned other isolation point is transitioned into the Requires Verification state to force an operator to examine the isolation point to determine whether it, in fact, is secured by a lock, and, if so, the lock ID of such lock.

In operation 1670, the response from LockOkToHang API 1804 is examined by the app. If the response indicates that the lock ID is not properly associated with the facility at which the user is operating, then an error message to that effect is displayed (operation 1672). If the response indicates that the lockID is not properly associated with an unused lock (i.e., one not already securing some other isolation point), then an error message to that effect is displayed (operation 1674). In either case, the user would need to grab another lock, and begin the lock placement operation anew, beginning with operation 1658. If, on the other hand, the response from LockOkToHang API 1804 indicates that there is no need to present either such error message, then operational control is passed to operation 1676.

In operation 1676, the app makes an API 1804 call (RequestKey). The purpose of the call is to request the particular digital key corresponding to the lock with which the app has established a communication link in operation 1664. According to some embodiments, the app passes the lock ID received in operation 1666 and system ID of the system-of-focus to RequestKey 1804 in the course of the API 1804 call. The middleware associated with the RequestKey API 1804 responds by accessing the database 1800 to determine whether any digital personal lock is securing the virtual lockbox associated with the system identified by the system ID passed to it. For example, the database may include a digital personal lock table, with each record therein representing a personal digital lock currently securing a virtual lockbox. According to some embodiments, each record includes: (1) a personal lock ID; (2) a user ID; and (3) a system ID. The middleware may access such table, and search for a record including a system ID matching the particular system ID passed to it upon invocation of RequestKey 1804. If such a record is located, then it is the case that the virtual lockbox associated with the system-of-focus has a digital personal lock securing it, and the digital key corresponding to the aforementioned lock ID is forbidden from being returned. Thus, the middleware generates a response including a NULL response or an error code, and returns it to the app. On the other hand, if no such record is located, then the aforementioned virtual lockbox does not have any digital personal lock securing it, meaning that the requested digital key can be returned. For example, the database 1800 may include a lock table, wherein each record therein represents a particular physical lock, and wherein each such record contains information concerning a corresponding lock, including, a lock ID and a digital key that may be used in connection with a protected command to the lock, such as an unlock command (each record contains other information as well, but such information is not relevant to this discussion and is omitted here, and discussed elsewhere, as relevant). The middleware may access the lock table to find the particular record containing a lock ID matching the lock ID passed to it upon invocation of RequestKey 1804, retrieve the digital key from such record, construct a response including such digital key, and send the response to the app.

According to some embodiments, a digital key is uniquely assigned to each physical lock, as described previously above. Thus, each record in the aforementioned lock table contains a unique digital key. According to other embodiments, digital keys are reused from lock-to-lock. For example, the same key could be used across a batch of locks or across all locks assigned to a facility or all locks assigned to a client. Thus, in response to a RequestKey API 1804 call, no key is returned (as described above) if the system ID connected with the call has a digital personal lock on its corresponding virtual lockbox (as described above). But if no such digital personal lock is securing its corresponding virtual lockbox at the time of such API 1804 call, then a digital key is returned—a digital key required to unlock the specific physical lock referred to by the lock ID included in the RequestKey API 1804 call, but also used to unlock other locks. Thus, in some embodiments—where the same digital key is used across an entire facility, for example, there is no need to refer to the database 1800 to retrieve the digital key needed to unlock a lock—the key may be hardcoded into the firmware. Thus, according to such embodiments, the general structure of middleware response to a RequestKey 1804 invocation is to determine whether any digital personal lock is currently securing the virtual lockbox associated with the system ID passed during invocation, and, if not, to return the hardcoded key.

(Previously, certain embodiments of physical locks were described wherein each physical lock 1808 has its unique digital key stored in non-volatile memory during manufacture. According to some embodiments, the unique digital key is generated by transforming a unique ID or value associated with a hardware element of the lock 1808, such as an MCU ID or Bluetooth ID. Thus, the lock 1808 firmware may create such unique digital key by performing such transformation, and storing such key in non-volatile memory. According to some embodiments, in the wake of having created the unique digital key, the lock 1808 firmware may communicate the unique digital key to the back-end computing platform 1208 for storage in the database 1800, such as in the aforementioned lock table. According to some embodiments, however, during each initial lock placement operation, a new digital key is generated, such as via random generation. Such generation may be performed either by the lock 1808 firmware or the middleware of the platform 1208, and communicated lock-1808-to-platform-1208 or platform-1208-to-lock-1808, as appropriate. Thus, a digital key corresponding to a given lock 1808 is not likely to be reused from isolation-point-to-isolation-point, or guaranteed not to be reused. The present discussion of the initial lock placement operation assumes that the unique digital key is stored in the lock's 1808 memory and, correspondingly, in the aforementioned lock table, and does not change from placement-to-placement. This is only for the sake of providing a concrete example for the reader follow, and is not a limitation or requirement.)

Figure 16G:
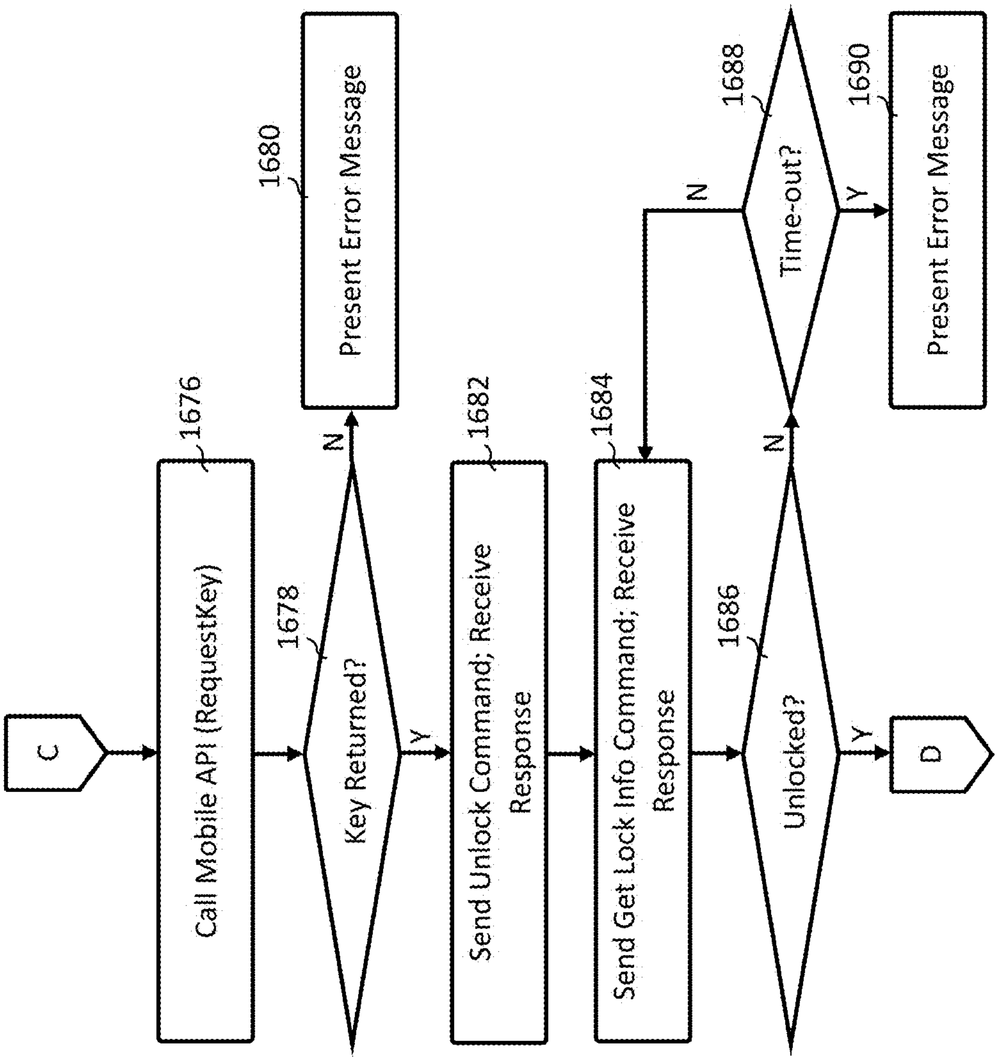
FIG. 16G depicts another portion of a state transition diagram or flowchart describing the operational and state flow of various embodiments off an app that may execute on a microcontroller of processor of a mobile device that may be used in connection with various embodiments of the safety system disclosed herein.

Returning to discussion of FIG. 16G, the response of the platform 1208 to invocation of RequestKey 1676 is tested in operation 1678. If the payload of the response is NULL or contains an error code, then this means that the middleware associated with RequestKey 1804 determined that a digital personal lock was securing the virtual lockbox corresponding to the system-of-focus. This situation could arise, for example, if a previous invalidation operation had been performed by an operator. In such a circumstance, an error message is presented to by the app, indicating that the system has at least one digital personal lock securing its virtual lockbox and that the corresponding individuals must cease servicing the system and remove their personal digital locks this operation can be performed (operation 1680). On the other hand, if, in operation 1676, the payload of the response is found to contain a valid digital key, then operational control is passed to operation 1682.

Figure 16H:
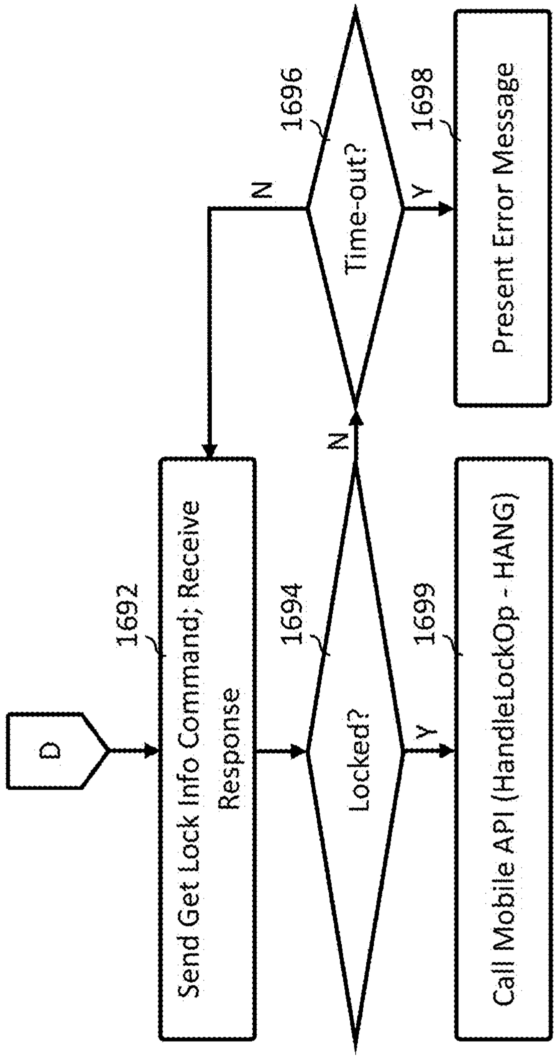
FIG. 16H depicts another portion of a state transition diagram or flowchart describing the operational and state flow of various embodiments off an app that may execute on a microcontroller of processor of a mobile device that may be used in connection with various embodiments of the safety system disclosed herein.
Figure 16I:
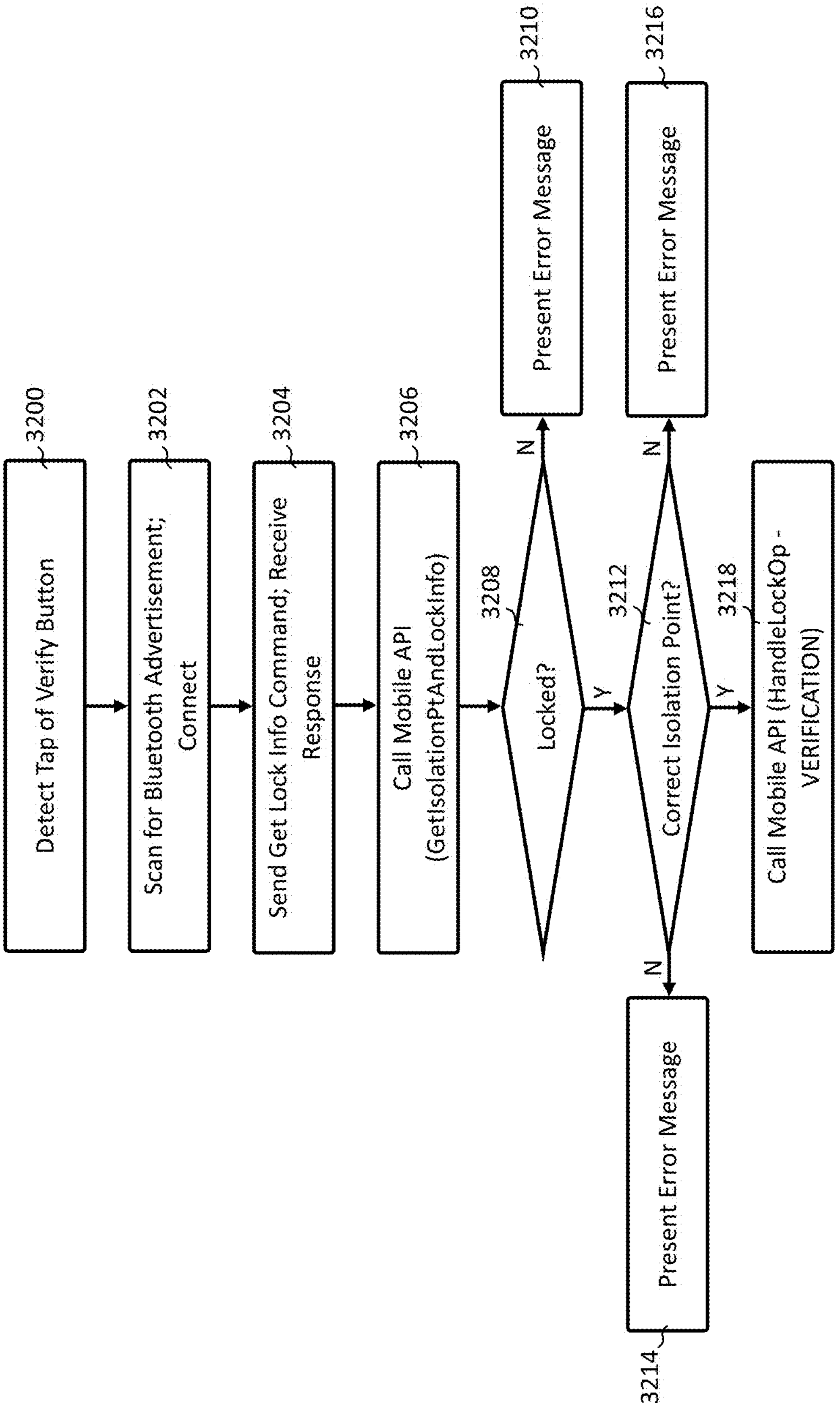
FIG. 16I depicts another portion of a state transition diagram or flowchart describing the operational and state flow of various embodiments off an app that may execute on a microcontroller of processor of a mobile device that may be used in connection with various embodiments of the safety system disclosed herein.
Figure 16J:
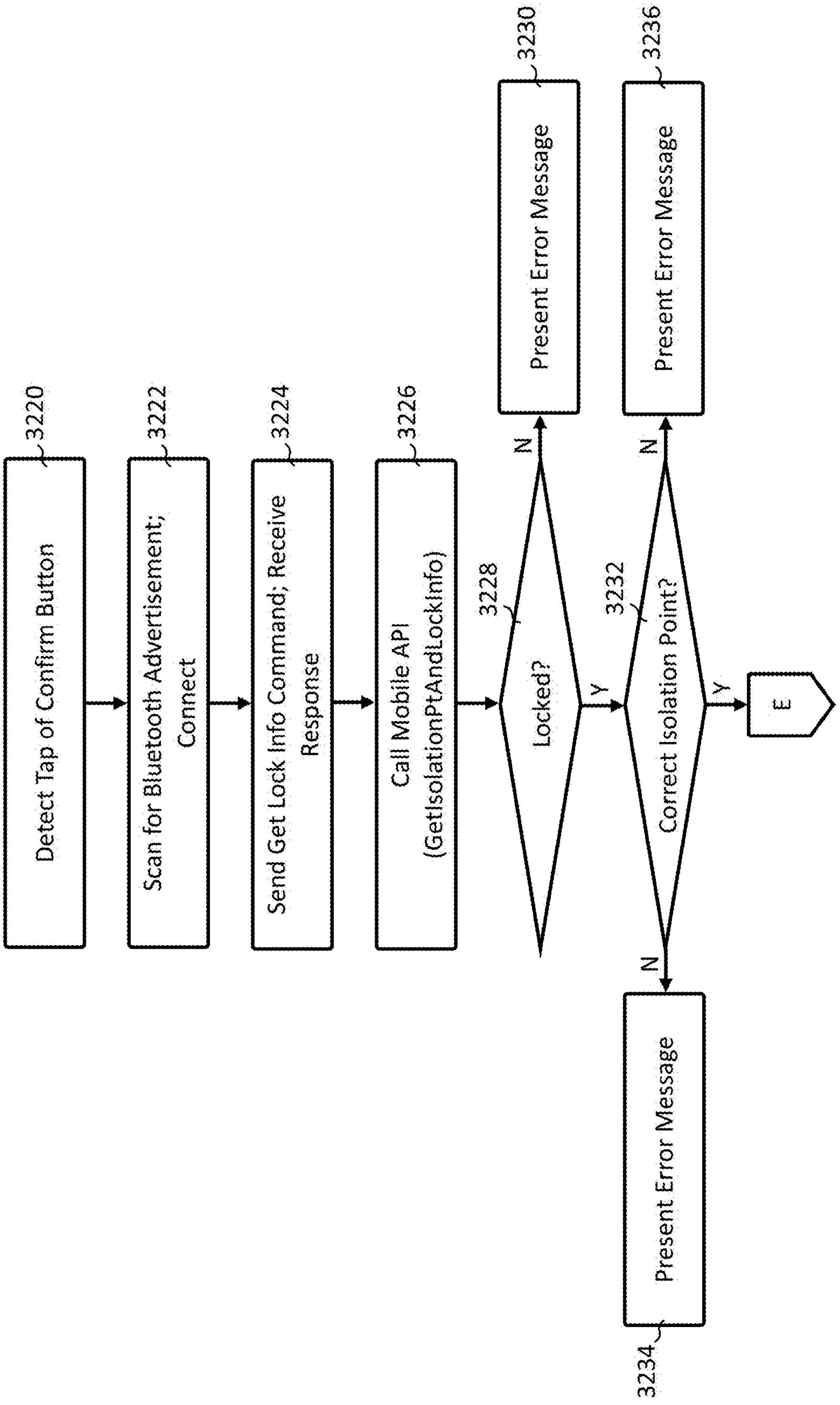
FIG. 16J depicts another portion of a state transition diagram or flowchart describing the operational and state flow of various embodiments off an app that may execute on a microcontroller of processor of a mobile device that may be used in connection with various embodiments of the safety system disclosed herein.

In operation 1682, an unlock command is sent to the lock 1808. The command carries the digital key returned to the app in operation 1678. The command may be delivered via the communication channel established in operation 1664. Upon receiving a response from the lock, the app sends a command to the lock by which it requests certain lock information, including whether it the lock is in a locked state or an unlocked state (operation 1684). For example, in operation 1684, the app may send a command identical to the one issued in operation 1666. Thus, in operation 1684, the app is seeking data generated from the sensors of the lock 1808, itself, that indicate whether the lock is locked or unlocked. The response of the lock is received (operation 1684), and then tested in operation 1686. If the response indicates that the lock is in a locked state (despite having been issued an unlock command in operation 1684), then control is passed to operation 1688, whereupon it is determined whether more than a threshold period of time has elapsed since issuance of the unlock command in operation 1684 (example: 5 seconds). If not, then the app returns to operation 1684 and once again seeks the state of the lock. The app will traverse the loop defined by operations 1684, 1686 and 1688 until the lock either responds to the information request of operation 1684 by indicating that its sensors conclude that the lock is unlocked or until the threshold period of time has elapsed. If the aforementioned threshold period elapses without the response indicating that the lock actually entered an unlock state, then an error message is returned to the user, indicating that the lock was unable to be unlocked (operation 1690). On the other hand, if the lock does, in fact, respond to the information request of operation 1684 by indicating that its sensors conclude that the lock is unlocked, then operational control is passed to operation 1692 (see FIG. 16H).

At the time operation 1692 is being executed, the user of the app is intending to initially place a physical lock 1808 on an isolation point in order to secure it. By virtue of having reached operation 1692, the lock 1808 has been previously determined to belong to the facility at which the user is operating, has been determined not to be recorded in the database 1800 as securing another isolation point, and has been determined to have had its shackle successfully opened (so that it can, in fact, be secured on the isolation point). Thus, the user should secure the isolation point by closing the lock's 1808 shackle on the isolation point in order to secure it. Operations 1692, 1694 and 1696 form a loop identical to that which was described with regard to operations 1684, 1686 and 1688, except that they test to determine that the sensors of the lock 1808 actually detect the shackle having been closed within a threshold period of time since the lock having been detected as being in an open-shackle state in operation 1686 (example of a reasonable threshold: 30 seconds for the user to complete the act of securing the isolation point by closing the shackle of the lock 1808 about/around/through/upon the control mechanism constituting the isolation point). If the shackle is not detected as having been closed within the threshold period of time, then an error message indicating that the app could not confirm the placement of the lock is presented in operation 1698. On the other hand, if the shackle is, in fact, detected as having been closed, then control is passed to operation 1699, whereupon the app makes an API 1804 call (HandleLockOp) to update the database 1800 to indicate that the logged-in user initially placed a lock at a particular isolation point at a particular time and date. For example, the app may call a HandleLockOp API 1804, passing data indicating occurrence of a given action (a lock HANG), an isolation point ID, and a lock ID. The middleware determines its flow based upon the action type (i.e., HANG), and then responds by: locating a record in the aforementioned isolation point table with a matching isolation point ID, updating its above-described fields indicating the user ID of a user asserting initial lock placement (using the passed-in user ID to do so), the time/date stamp of such assertion (using a timestamp functionality offered by the operating system operating at the platform 1208), and the lock ID of the lock asserted to have been placed at the isolation point (using the passed-in lock ID to do so). In addition to updating the database 1800, the middleware associated with HandleLockOp 1804 interacts with the server-side aspect of the asynchronous data-updating framework 1806 to declare the occurrence of a data event impacting the particular System Publication corresponding to the system ID with which the isolation point ID (passed to HandleLockOp 1804 in connection with its invocation) is associated—note: the isolation point table includes a field identifying the system ID with which the isolation point ID contained in the isolation point field is associated; this is an example of "other data" contained in the records of the isolation point table that was not relevant in the previous discussion and therefore not explicitly recited in the context of such previous discussion. According to some embodiments, the aforementioned middleware passes data pertaining to initial lock placement operation to the server-side aspect of the asynchronous data-updating framework 1806 in connection with declaration of the data event. For example, it may pass the data initially passed to it in connection with its invocation (example: isolation point ID, user ID, and lock ID) or it may access the database to augment such data and pass such augmented data (example: isolation point ID, lock ID, aforementioned time and data stamp, user name corresponding to the aforementioned user ID, and so on—i.e., data that can be directly used to update the user interface of the app without necessitating further data associations by the app). The data passed to the server-side aspect of the asynchronous data-updating framework 1806 in connection with declaration of the occurrence of the aforementioned data event is passed to the particular instances of the app that have subscribed to the aforementioned System Publication, and those instances use such data to update their respective user interfaces, as described previously. In these embodiments, the data used to calculate isolation point states (see the discussion pertaining to FIG. 19) is passed to the app in connection with declaration of the aforementioned data event. The app contains the state machine described with reference to FIG. 19, so that the app, itself, can calculate the isolation point states and populate the user interface.

On the other hand, according to some embodiments, the middleware associated with HandleLockOp 1804 does not pass any data in connection with declaration of the aforementioned data event (other than data indicating which particular System Publication was impacted). The server-side aspect of the asynchronous data-updating framework 1806 responds by sending a message indicating occurrence of a data event impacting a particular System Publication to the various subscribing instances of the app. Each instance responds by re-invoking getSystemData 1804 (initially called in connection with operation 1654 to obtain the data used to populate the user interface, in the immediate wake of the user having selected a system in the Set Focus state 1602). In response, the app receives an updated set of system safety data from the backend computing platform 1208, and uses such data to re-populate its user interface, thereby refreshing such data, and ultimately presenting new data reflecting the lock placement.

Discussion now turns to the operational response of the app in response to a user interaction (example: a tap) with the verify lock button 1764 (FIG. 17H). A lock verification operation may be begun via detection of a button 1764 tap event by the app (operation 3200). Next, in operation 3202, the app scans for the presence of locks 1808 advertising to establish a connection via Bluetooth, and, in the wake of identifying such a lock 1808, establishes a Bluetooth connection therewith. (If there are plural such advertising locks 1808, the app may present the user with a menu by which the user may select the particular lock with which he or she wishes the app to establish a communication link.) The communication link need not be Bluetooth. Any communication capacity shared by the lock 1808 and the device 1211 on which the app is executing will suffice (example: each may be equipped with wireless data capability, e.g., 3G, 4G, 5G, etc., and communicate via wireless data).

Next, in operation 3204, the app uses the communication link established in operation 3202 to issue a command to the lock, by which it requests certain lock 1808 information. In response, the app receives, via the communication link, a set of lock information from the lock 1808. The set of lock information includes a lock 1808 identifier (e.g., a lock ID) and an indication of whether the lock 1808, itself, is in a locked state or an unlocked state. According to some embodiments, other data is also returned. Such other data is not relevant in the context of the present discussion, but is relevant to other discussion, and is presented below.

In operation 3206, the app invokes an API 1804 exposed by the backend computing platform 1208 in order to obtain information concerning the lock 1808 and isolation point that are the subjects of the verification process. For example, the app may invoke a GetIsolationPtAndLockInfo API 1804, passing the lock ID obtained in operation 3204 in connection with such invocation. In turn, the middleware associated with the GetIsolationPtAndLockInfo API 1804 locates the record in the above-mentioned lock table having a matching lock ID, and uses the information in such record to identify the record in the above-mentioned isolation point table with a corresponding lock ID, and either returns both such records, or simply returns: (1) the isolation point ID contained in the record located from the isolation point table; and (2) a lock state indicator (OPEN/LOCKED) contained in the record obtained from the lock table (in previous discussion of the lock table, it was mentioned that each record therein contained information in fields that were in addition to those previously described, but that such additional information and corresponding fields were not relevant to the previous discussion—lock state information contained in a lock state field is an example of such additional information contained in such additional field). Thus, the general effect of operation 3206 is to return to the app, information sufficient to indicate whether the records of the database 1800 indicate that the lock 1808 that is the subject of the verification operation is opened or closed, and to identify the particular isolation point ID (if any) that the records of the database 1800 indicate that the aforementioned lock 1808 is currently securing.

In operation 3208, the information returned to the app in operation 3206 is accessed and tested in order to determine whether such information indicates that the lock 1808 is, in fact, in a LOCKED (or closed) physical state. If it is not, then control is passed to operation 3210, whereupon an error message is presented in order to indicate that the records of the database 1800 indicate that the lock 1808 that is the subject of the verification operation is, in fact, unlocked or open. (The shackle of a lock 1808 needs to be closed in order to properly secure an isolation point.) On the other hand, if, in operation 3208, such test reveals that the records of the database 1800 indicate that the aforementioned lock 1808 is in a LOCKED or closed physical state, then control is passed to operation 3212.

In operation 3212, the information returned in operation 3206 is tested to determine whether the records of the database 1800 indicate that the lock that is the subject of the verification operation is currently securing the particular isolation point that is the subject of the verification operation. Two failure options exist: (1) the records indicate that the aforementioned lock 1808 is currently not securing any isolation point at all; and (2) the records indicate that the lock 1808 is, indeed, securing an isolation point, but they reflect that it is securing an isolation point that is different than the one that is the subject of the verification operation. In the case of the first failure option, an error message is displayed (operation 3214) in order to state that the records of the database 1800 indicate that the lock 1808 is not currently securing any isolation point at all. In the case of the second failure option, an error message is displayed (operation 3216) in order to state that the records of the database 1800 indicate that the lock 1808 is currently securing a different isolation point (suggesting that perhaps the user has mistakenly traveled to wrong isolation point and is performing the verification operation at the incorrect isolation point and upon the incorrect lock). On the other hand, if, in operation 3212, it is determined that the records of the database 1800 indicate that the lock is, in fact, securing the same isolation point that is the subject of the verification operation, then the test is passed, and control is passed to operation 3218.

In operation 3218, the app makes an API 1804 call (HandleLockOp) to update the database 1800 to indicate that the logged-in user verified the placement of a lock at a particular isolation point at a particular time and date. For example, the app may call a HandleLockOp API 1804, passing data indicating occurrence of a given action (a lock VERIFICATION), an isolation point ID (obtained from the isolation point ID associated with the particular tile 1738 within which the tapped-button 1764 is situated), and a lock ID (obtained in operation 3204). The middleware, determines its flow based upon the action type (i.e., VERIFICATION), and then responds by: locating a record in the aforementioned isolation point table with a matching isolation point ID, updating its above-described fields indicating the user ID of a user asserting verification of the initial lock placement (using the passed-in user ID to do so), the time/date stamp of such assertion (using a timestamp functionality offered by the operating system operating at the platform 1208), and the lock ID of the lock verified as having been located at the isolation point (using the passed-in lock ID to do so). In addition to updating the database 1800, the middleware associated with HandleLockOp 1804 interacts with the server-side aspect of the asynchronous data-updating framework 1806 to declare the occurrence of a data event impacting the particular System Publication corresponding to the system ID with which the isolation point ID (passed to HandleLockOp 1804 in connection with its invocation) is associated. And via mechanisms similar to those described previously, the user interfaces of those particular apps that have subscribed to the aforementioned System Publication are updated to reflect the lock verification operation. For the sake of brevity, the aforementioned mechanisms relating to refreshing user interfaces of subscribing app instances is not reiterated here.

Discussion now turns to the operational response of the app in response to a user interaction (example: a tap) with the confirm lock button 1760 (FIG. 17F). A lock confirmation operation may be begun via detection of a button 1760 tap event by the app (operation 3220). Next, in operation 3222, the app scans for the presence of locks 1808 advertising to establish a connection via Bluetooth, and, in the wake of identifying such a lock 1808, establishes a Bluetooth connection therewith. (If there are plural such advertising locks, the app may present the user with a menu by which the user may select the particular lock with which he or she wishes the app to establish a communication link.) The communication link need not be Bluetooth. Any communication capacity shared by the lock 1808 and the device 1211 on which the app is executing will suffice (example: each may be equipped with Wi-Fi or wireless data capability, e.g., 3G, 4G, 5G, etc., and communicate via wireless data).

Next, in operation 3224, the app uses the communication link established in operation 3222 to issue a command to the lock 1808, by which it requests certain lock 1808 information. In response, the app receives, via the communication link, a set of lock information from the lock 1808. The set of lock information includes a lock 1808 identifier (e.g., a lock ID) and an indication of whether the lock 1808, itself, is in a locked state or an unlocked state. According to some embodiments, other data is also returned. Such other data is not relevant in the context of the present discussion, but is relevant to other discussion, and is presented below. In operation 3226, the app invokes an API 1804 exposed by the backend computing platform 1208 in order to obtain information concerning the lock 1808 and isolation point that are the subjects of the confirmation process. For example, the app may invoke a GetIsolationPtAndLockInfo API 1804, passing the lock ID obtained in operation 3224 in connection with such invocation. In turn, the middleware associated with the GetIsolationPtAndLockInfo API 1804 locates the record in the above-mentioned lock table having a matching lock ID, and uses the information in such record to identify the record in the above-mentioned isolation point table with a corresponding lock ID, and either returns both such records, or simply returns: (1) the isolation point ID contained in the record located from the isolation point table; and (2) a lock state indicator (OPEN/LOCKED) contained in the record obtained from the lock table. Thus, the general effect of operation 3226 is to return to the app, information sufficient to indicate whether the records of the database 1800 indicate that the lock 1808 that is the subject of the confirmation operation is opened or closed, and to identify the particular isolation point ID (if any) that the records of the database 1800 indicate that the aforementioned lock 1808 is currently securing.

In operation 3228, the information returned to the app in operation 3226 is accessed and tested in order to determine whether such information indicates that the lock 1808 is, in fact, in a LOCKED (or closed) physical state. If it is not, then control is passed to operation 3230, whereupon an error message is presented in order to indicate that the records of the database 1800 indicate that the lock 1808 that is the subject of the confirmation operation is, in fact, unlocked or open. (The shackle of a lock 1808 needs to be closed in order to properly secure an isolation point.) On the other hand, if, in operation 3228, such test reveals that the records of the database 1800 indicate that the aforementioned lock 1808 is in a LOCKED or closed physical state, then control is passed to operation 3232.

Figure 16K:
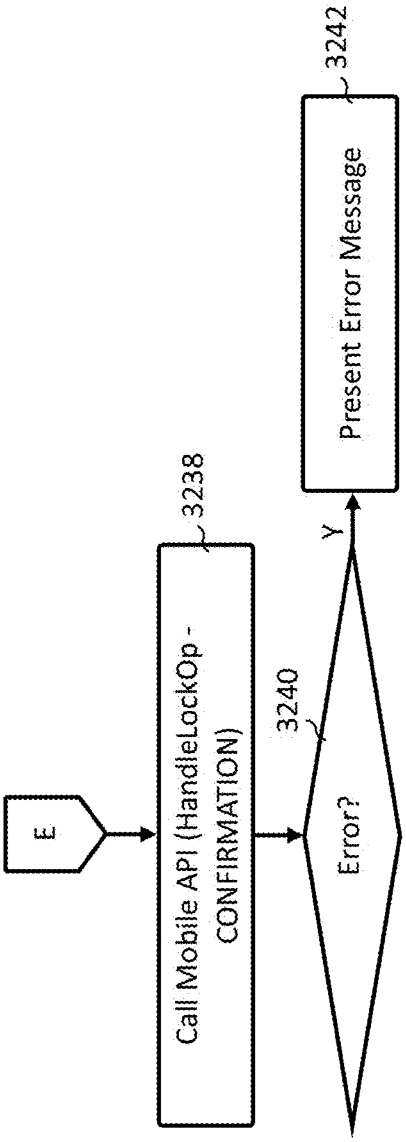
FIG. 16K depicts another portion of a state transition diagram or flowchart describing the operational and state flow of various embodiments off an app that may execute on a microcontroller of processor of a mobile device that may be used in connection with various embodiments of the safety system disclosed herein.

In operation 3232, the information returned in operation 3226 is tested to determine whether the records of the database 1800 indicate that the lock that is the subject of the confirmation operation is currently securing the particular isolation point that is the subject of the confirmation operation. Two failure options exist: (1) the records indicate that the aforementioned lock 1808 is currently not securing any isolation point at all; and (2) the records indicate that the lock 1808 is, indeed, securing an isolation point, but they reflect that it is securing an isolation point that is different than the one that is the subject of the confirmation operation. In the case of the first failure option, an error message is displayed (operation 3234) in order to state that the records of the database 1800 indicate that the lock 1808 is not currently securing any isolation point at all. In the case of the second failure option, an error message is displayed (operation 3236) in order to state that the records of the database 1800 indicate that the lock 1808 is currently securing a different isolation point (suggesting that perhaps the user has mistakenly traveled to wrong isolation point and is performing the confirmation operation at the incorrect isolation point and upon the incorrect lock). On the other hand, if, in operation 3232, it is determined that the records of the database 1800 indicate that the lock is, in fact, securing the same isolation point that is the subject of the confirmation operation, then the test is passed, and control is passed to operation 3238 (see FIG. 16K).

In operation 3238, the app makes an API 1804 call (HandleLockOp) to update the database 1800 to indicate that the logged-in user confirmed the placement of a lock at a particular isolation point at a particular time and date. For example, the app may call an HandleLockOp API 1804, passing data indicating occurrence of a given action (a lock CONFIRMATION), an isolation point ID (obtained from the isolation point ID associated with the particular tile 1736 within which the tapped-button 1760 is situated), and a lock ID (obtained in operation 3224). The middleware, determines its flow based upon the action type (i.e., CONFIRMATION), and then responds by: accessing the previously-mentioned confirmation table, examining such table to determine whether it contains a record including the isolation point ID and user ID passed to HandleLockOp 1804 in connection with its invocation, and, in the event that it does not, adding a record to the table to indicate that a user corresponding to such user ID confirmed the presence of a lock at an isolation point corresponding to such isolation point ID at a particular time and date (using, for example, a timestamp functionality offered by the operating system operating at the platform 1208). In addition to updating the database 1800, the middleware associated with HandleLockOp 1804 interacts with the server-side aspect of the asynchronous data-updating framework 1806 to declare the occurrence of a data event impacting the particular System Publication corresponding to the system ID with which the isolation point ID (passed to HandleLockOp 1804 in connection with its invocation) is associated. And via mechanisms similar to those described previously, the user interfaces of those particular apps that have subscribed to the aforementioned System Publication are updated to reflect the lock confirmation operation. For the sake of brevity, the aforementioned mechanisms relating to refreshing user interfaces of subscribing app instances is not reiterated here.

Previously, it was stated that the middleware associated with HandleLockOp 1804 determines whether the confirmation table contains a record including the isolation point ID and user ID passed to HandleLockOp 1804 in connection with its invocations. If it does, then that indicates that the logged-in user has previously confirmed the presence of the lock 1808 at the isolation point that is the subject of the confirmation operation. Therefore, the middleware may return an error code, for which the app may test in operation 3240. If such an error code is identified in operation 3240, then control is passed to operation 3242, and an error screen is presented, indicating that the user has previously confirmed the presence of the lock 1808 at the isolation point in question, and that, therefore, the confirmation operation will not have an effect on the state of the aforementioned isolation point.

To this point, discussion has related to operational response pertaining to the hang lock button 1762, verify lock button 1764 and confirm lock button 1760, which, together, cause the middleware of the backend computing platform 1208 to associate a lock with an isolation point within the records of the database 1800, and also cause the isolation point to progress through various states for various users, depending on several factors, as discussed previously. Discussion now turns to operations that dissociate a lock from an isolation point (i.e., unlocking a lock, and, potentially, asserting that no lock is to be found at an isolation point, despite the fact that an association between a given lock and the aforementioned isolation point is reflected in the records of the database 1800 and presented via the user interface of the app). After discussion of these topics, discussion will proceed to discuss the operational response of the app to other buttons 1714, 1718, 1770 and 1772.

Discussion now turns to the operational response of the app in response to a user interaction (example: a tap) with the unlock button 1716 (FIG. 17F). A lock unlock operation may be begun via detection of a button 1716 tap event by the app (operation 3244). Next, in operation 3246, the app scans for the presence of locks 1808 advertising to establish a connection via Bluetooth, and, in the wake of identifying such a lock 1808, establishes a Bluetooth connection therewith. (If there are plural such advertising locks, the app may present the user with a menu by which the user may select the particular lock 1808 with which he or she wishes the app to establish a communication link.) The communication link need not be Bluetooth. Any communication capacity shared by the lock 1808 and the device 1211 on which the app is executing will suffice (example: each may be equipped with Wi-Fi or wireless data capability, e.g., 3G, 4G, 5G, etc., and communicate via wireless data).

Next, in operation 3248, the app uses the communication link established in operation 3246 to issue a command to the lock 1808, by which it requests certain lock 1808 information. In response, the app receives, via the communication link, a set of lock information from the lock 1808. The set of lock information includes a lock 1808 identifier (e.g., a lock ID) and an indication of whether the lock 1808, itself, is in a locked state or an unlocked state. According to some embodiments, other data is also returned. Such other data is not relevant in the context of the present discussion, but is relevant to other discussion, and is presented below.

In operation 3250, the app makes an API 1804 call (RequestKey). The purpose of the call is to request the particular digital key corresponding to the lock with which the app has established a communication link in operation 3246. According to some embodiments, the app passes the lock ID received in operation 3248. According to some embodiments, the middleware associate with the RequestKey API 1804 responds by: (1) ensuring that the lock 1808 that is the subject of the unlock operation is, in fact, associated with the facility at which the logged-in user is operating; (2) ensuring that the lock is not securing an isolation point of a system that, in turn, corresponds to a virtual lockbox that is currently secured by a digital personal lock; and (3) returning the digital key corresponding to the aforementioned lock 1808, in the event the just-described conditions are satisfied. For example, the middleware may perform the operations depicted in FIG. 21.

Figure 21:
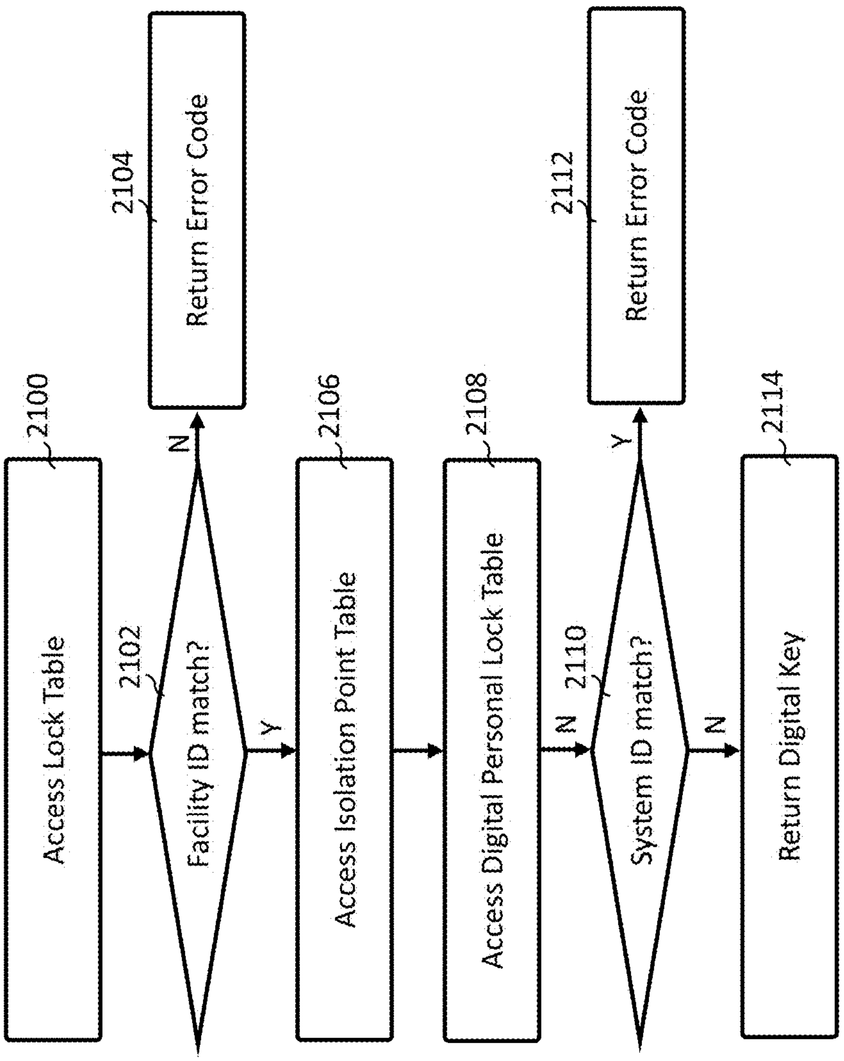
FIG. 21 depicts an exemplary embodiment of certain software that may execute upon the various embodiments of the backend computing platform of the various embodiments of the safety system disclosed herein.

As can be seen from FIG. 21, the middleware may initially access the above-described lock table, seeking a record therein with a lock ID matching the lock ID passed to it in connection with its invocation. Previously, it was mentioned that each record in a lock table includes a lock ID and the particular digital key that corresponds to such lock ID, as well as other additional unspecified information. According to some embodiments, such additional information includes a facility ID identifying the facility to which the lock was previously distributed by the operator of the safety system. The facility ID from the record is compared to the facility ID with which the logged-in user is associated (operation 2102) to ensure that they match. In the event that they do not, in fact match (meaning the user is interacting with a lock that does not belong to the facility), then the middleware returns an error code to the app in order to indicate occurrence of this condition (operation 2104). On the other hand, in the event, they do, in fact, match, then control is passed to operation 2106.

In operation 2106, the middleware accesses the previously-described isolation point table, and seeks a record containing a lock ID corresponding to the lock ID passed to it in connection with its invocation. Assuming such a record is found, then, in operation 2108, the previously-described digital personal lock table is accessed, and the middleware seeks a record therein with a system ID matching the system ID contained in the record located from the isolation point table (operation 2110). If such a record is found, then it is the case that a personal digital lock is securing the virtual lockbox corresponding to a system that the lock 1808 that is the subject of the unlock operation is securing. The digital key corresponding to the aforementioned lock 1808 cannot be returned in such a situation, as it would endanger one or more users of the safety system. Therefore, control is passed to operation 2112, and the middleware returns an error code to the app in order to indicate occurrence of this condition. On the other hand, if not such record is found, then the digital key located in the record from the lock table is returned to the app (operation 2114). (If, in operation 2106, no record containing a corresponding lock ID was found, that means that the lock 1808 that is the subject of the unlock operation is not currently protecting any isolation point at all, and, according to some embodiments, control is passed directly to operation 2114 to return the corresponding digital key.)

Returning to FIG. 16L, in operation 3252, the response of RequestKey 1804 is tested. If it contains an error code, then a corresponding error message is presented (operation 3254). On the other hand, if it contains a digital key, then control is passed to operation 3256.

In operation 3256, an unlock command is sent to the lock 1808. The command carries the digital key returned to the app in operation 3250. The command may be delivered via the communication channel established in operation 3246. Upon receiving a response from the lock, the app sends a command to the lock by which it requests certain lock information, including whether the lock is in a locked state or an unlocked state (operation 3258). For example, in operation 3258, the app may send a command identical to the one issued in operation 3248. Thus, in operation 3258, the app is seeking data generated from the sensors of the lock 1808, itself, that indicate whether the lock is locked or unlocked. The response of the lock is received (operation 3258), and then tested in operation 3260. If the response indicates that the lock is in a locked state (despite having been issued an unlock command in operation 3256), then control is passed to operation 3262, whereupon it is determined whether more than a threshold period of time has elapsed since issuance of the unlock command in operation 3256 (example: 5 seconds). If not, then the app returns to operation 3258 and once again seeks the state of the lock. The app will traverse the loop defined by operations 3258, 3260 and 3262 until the lock either responds to the information request of operation 3258 by indicating that its sensors detect that the lock is unlocked or until the threshold period of time has elapsed. If the aforementioned threshold period elapses without the response indicating that the lock actually entered an unlock state, then an error message is returned to the user, indicating that the lock was unable to be unlocked (operation 3264). On the other hand, if the lock does, in fact, respond to the information request of operation 3258 by indicating that its sensors detect that the lock is unlocked, then operational control is passed to operation 3266.

In operation 3266, the app makes an API 1804 call (HandleLockOp) to update the database 1800 to indicate that the logged-in user completed the operation of unlocking the lock 1808. For example, the app may call an HandleLockOp API 1804, passing data indicating occurrence of a given action (a lock UNLOCK), and a lock ID (obtained in operation 3224). The middleware, determines its flow based upon the action type (i.e., UNLOCK), and then responds by: accessing the database 1800 to determine with which particular isolation point the aforementioned lock ID is associated (if any); and updating records in the database to dissociate the lock ID from the aforementioned isolation point. For example, the middleware may: traverse the previously-described lock table and isolation point table to identify which particular isolation point the lock ID is associated with (this has been described previously herein and is not re-described here); assuming the lock ID is, indeed, associated with a particular isolation point record, memorialize the lock removal by updating a field identifying a user that most recently removed a lock from the corresponding isolation point with the user ID, and updating a field identifying the date and time of such removal with a current timestamp; and dissociate the lock from the isolation point by assigning null values to the lock ID field (which indicates the lock ID of the lock associated therewith), the fields indicating the user ID of a user that initially placed a lock thereat and the time/date of such operation, the fields indicating the user ID of the user that verified such placement and the time/date of such verification, the fields indicating the user ID of a user that may have performed an invalidation operation upon such isolation point and the time/date of such invalidation operation, setting the previously-described state field to a 0 value to indicate no lock is present upon the isolation point, and deleting all records from the previously-described confirmation table that contain an isolation point ID matching that of the associated isolation point record (if any). This has the net effect of dissociating the lock ID from the isolation point record in question, resets the isolation point state to indicate that no lock is present thereupon, and resets the isolation point data to indicate that, given that no lock is placed thereupon, there has been no initial lock placement, no verification thereof, no confirmation thereof, and no invalidation thereof. In addition to updating the database 1800, the middleware associated with HandleLockOp 1804 interacts with the server-side aspect of the asynchronous data-updating framework 1806 to declare the occurrence of a data event impacting the particular System Publication corresponding to the system ID with which the isolation point ID (passed to HandleLockOp 1804 in connection with its invocation) is associated. And via mechanisms similar to those described previously, the user interfaces of those particular apps that have subscribed to the aforementioned System Publication are updated to reflect the lock confirmation operation. For the sake of brevity, the aforementioned mechanisms relating to refreshing user interfaces of subscribing app instances is not reiterated here.

Discussion now turns to the topic of the operational response of the app in response to a user performing an invalidation operation therewith, i.e., reporting that, in fact, the user observes no lock securing an isolation point, despite the fact that such isolation point is in a state such that a lock should be securing such isolation point (example: the isolation point is in a Locked state, Requires Verification state or Requires Confirmation state, but the user observes no lock at such isolation point-meaning that in the opinion of the user, the isolation point is in an incorrect state). The invalidation operation is initiated by detecting a tap of the Report Issue button 1758 (operation 3268 in FIG. 16M). As will be seen, the operation of the Report Issue button 1758 differs from that of the Hang Lock button 1762, Verify Lock button 1764 or Confirm Lock button 1760. The operational flow associated with those other buttons 1760, 1762 and 1764 involves establishing a communication link with a lock 1818, which, in turn, may, according to some embodiments, involve a user depressing a button on the front of the lock for a designated period (example: two seconds) in order to cause the lock 1818 to transition into a mode whereby it seeks to establish a communication link. Because, according to such embodiments, the user is required to push the button on the front of the lock 1818 in addition to tapping the Hang Lock button 1762, Verify Lock button 1764 or Confirm Lock button 1760 in order to perform the operations associated with those buttons 1760, 1762 and 1764, it is not likely that a Hang Lock operation, Verify Lock operation or Confirm Lock operation could be performed via an inadvertent button 1760, 1762 or 1764 tap. On the other hand, the operations associated with the Report Issue button 1758 do not require that a communication link be established with a lock 1818, meaning that there is no requirement that a user also depress a button on the front of the lock in order to initiate these operations. Thus, according to some embodiments, button 1758 must be tapped-and-held for a threshold period, such as two seconds, in order to advance beyond operation 3268.

Figure 17I:
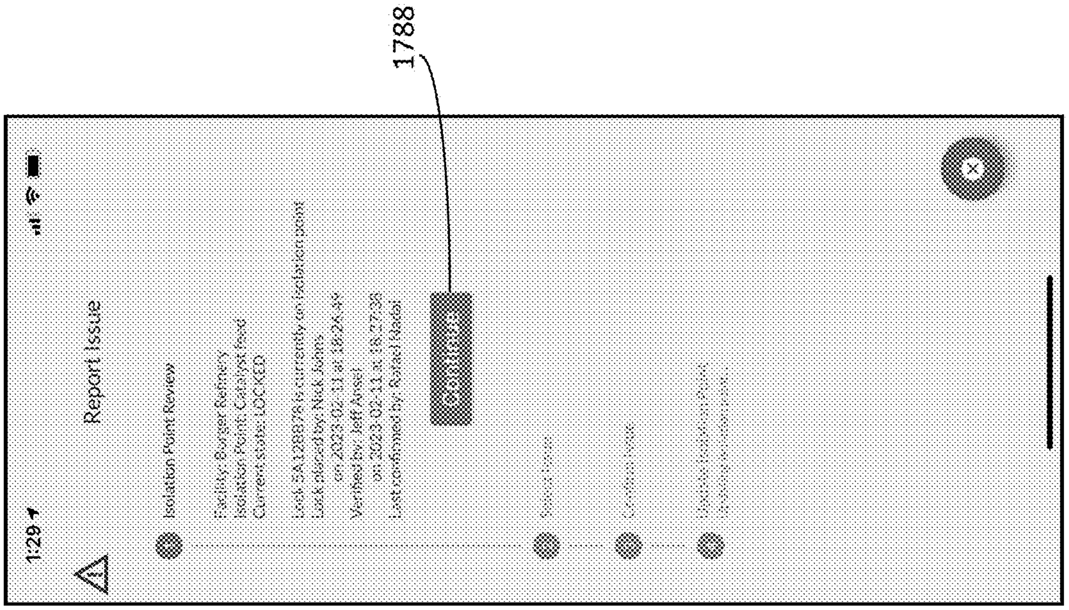
FIG. 17I depicts another exemplary embodiment of a user interface screen that may be used in connection with the various embodiments of the aforementioned app disclosed herein.
Figure 17J:
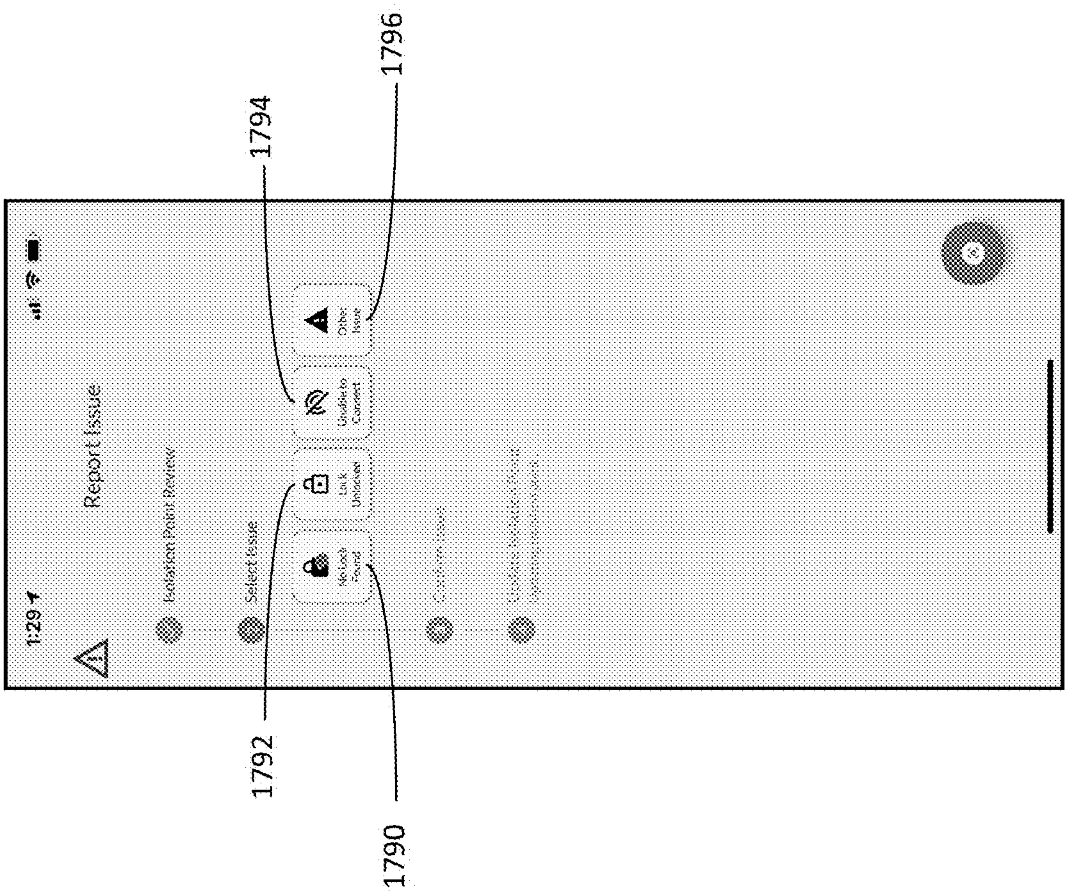
FIG. 17J depicts another exemplary embodiment of a user interface screen that may be used in connection with the various embodiments of the aforementioned app disclosed herein.

Next, in operation 3270, the app accesses device 1211 memory in order to access the system safety data (stored in device 1211 memory in the context of operation 1656) and the facility information data (stored in device 1211 memory in the context of operation 1626). The isolation point ID corresponding to the particular tile 1736 within which the particular Report Issue button 1758 that was the subject of a user tap is sought within the array of safety data structures previously described in connection with operation 1654, and the information contained within such data structure is used to populate a Report Issue screen (FIG. 17I) with data derived from or describing the previously conducted safety events having occurred at the isolation point corresponding to such isolation point ID (operation 3272). Thus, the user may view such data and confirm that such data does, in fact, refer to the particular isolation point at which he or she intends to report an issue (e.g., that there is actually no lock thereat).

After having confirmed that the data appears to refer to the particular isolation point intended by the user, the user may tap the Continue button 1788, and such user tap is detected by the app (operation 3274). In response to such detection, the app presents a series of buttons 1790-1796, each of which corresponds to a variety of issue that a user may report in connection with an isolation point (example: no lock is actually found at the isolation point; a lock is, in fact found thereat, but it is open; the user is unable to connect to the lock; or some other issue that does not fit the aforementioned varieties of issues) (operation 3276). According to some embodiments, if the state data within the aforementioned safety data structure indicates that the corresponding isolation point is in a No Lock state, then only button 1796 ("Other") is presented, as the other buttons 1790, 1792 and 1794 would not make sense in such a context. Next, in operation 3278, a user tap of the No Lock Found button 1790 is detected, and control is passed to operation 3280.

In operation 3280, a confirmation message is presented to the user. According to some embodiments, the message contains: (1) an indication of which particular isolation point the issue will be reported as having occurred at, should the user which to proceed; and (2) an indication of the variety of issue that will be reported, should the user which to proceed. For example, the message may state: "You are reporting an issue at <isolation point name>. The issue is a lock missing from this isolation point." The isolation point name may be obtained from the aforementioned safety data structure. The second sentence may be determined by the particular button 1790-1796 tapped by the user—in the example just stated, the second sentence corresponds to a tap of the No Lock button 1790. Next, a user tap of the Confirm Issue button 1798 is detected, and control is passed to operation 3282.

In operation 3282, the app makes an API 1804 call (HandleLockOp) to update the database 1800 to indicate that the logged-in user confirmed that he or she is reporting that no lock is found to be securing the aforementioned isolation point. For example, the app may call an HandleLockOp API 1804, passing data indicating occurrence of a given action (an INVALIDATION), an isolation point ID (obtained from the isolation point ID associated with the particular tile 1736 within which the tapped-button 1760 is situated), and, according to some embodiments, a NULL lock ID.

Figure 22:
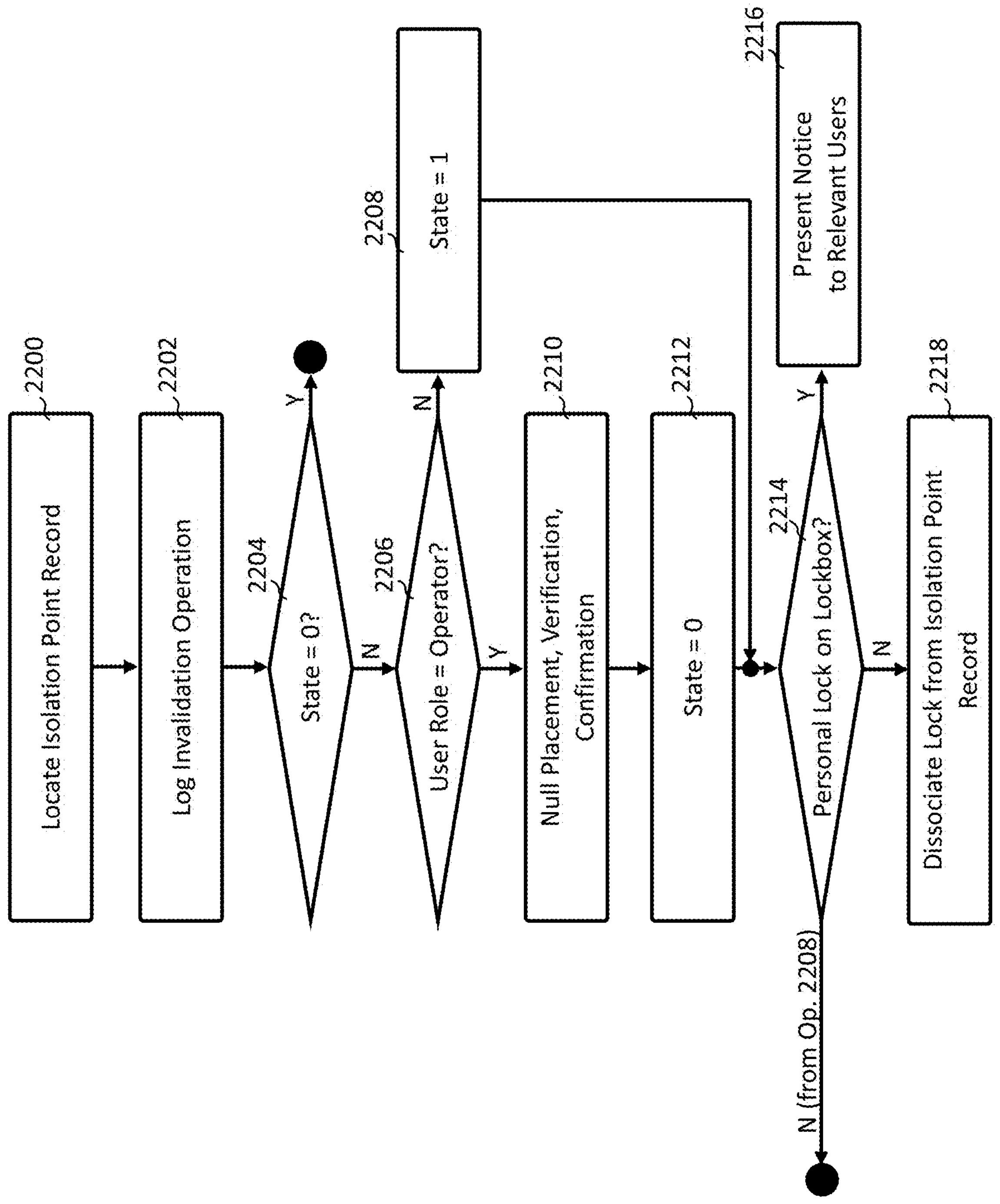
FIG. 22 depicts an exemplary embodiment of certain software that may execute upon the various embodiments of the backend computing platform of the various embodiments of the safety system disclosed herein.

In response to invocation, the middleware associated with the HandleLockOp API 1804 may perform operations such as those depicted in FIG. 22. As can be seen from FIG. 22, in operation 2200, the previously-mentioned isolation point table is examined to located a record therein containing an isolation point ID that matches the one passed to the API 1804 in connection with its invocation. Upon locating the record, occurrence of the invalidation operation maybe recorded therein (operation 2202). Previously, in connection with the discussion attending FIG. 19, it was noted that the records of the isolation point table may include additional fields that were not relevant to that previous discussion, and were therefore not explicitly raised at the time. According to some embodiments, each such record further includes fields for storage of a user ID that has most recently performed an invalidation operation at such isolation point (if any), along with fields for recording the time and date of such operation (if any). In order to record the invalidation operation, the middleware may store the user ID of the logged-in user in the aforementioned user ID field, and may access the operating system to obtain the current date and time, and store such data in the aforementioned timestamp field. According to some embodiments, wherever the middleware of the backend computing platform is described as accessing the operating system to obtain the current time and date, it is to be understood that such data may be passed to the middleware in connection with invocation (thereby eliminating the need to access the operating system to obtain such information), or such information may be obtained via a network call.

Previously, it was stated that the records of the isolation point table may include a state treatment indicator that reveals whether the corresponding isolation point is to be treated as though (i) no lock has been placed thereupon (example: the state indicator may take on a value of 0 to indicate such treatment), (ii) a lock has been placed thereupon but has not been verified (example: the state indicator may take on a value of 1 to indicate such treatment), or (iii) a lock has been placed thereupon and such placement has been verified (example: the state indicator may take on a value of 2 to indicate such treatment). In operation 2204, the state treatment indicator contained in the aforementioned record is tested. If it indicates that the isolation point is to be treated as though no lock has been placed thereupon (example: the state indicator equals zero), then it is the case that the invalidation operation was not a meaningful act—i.e., a user reported that no lock was actually present at the isolation point, and the records of the safety system agree, meaning that nothing is amiss. In that case, the execution of the invalidation operation is logged (previous operation 2202), and then, in the wake of test operation 2204, nothing more is to be done. On the other hand, if the state treatment indicator reveals that the isolation is to be treated in a manner other than as though no lock has been placed thereupon (example: the state indicator does not equal zero), then control is passed to operation 2206.

In operation 2206, the role of the logged-in user is tested. If the logged-in user's role indicates that the user has not been assigned an Operator role, then control is passed to operation 2208, whereupon the aforementioned state treatment indicator is set to a value so as to indicate that a lock has been placed thereupon but has not been verified (example: the state indicator may take on a value of 1 to indicate such treatment). As was discussed previously in the context of discussing FIG. 19, setting the state treatment indicator to such a value will have the effect of causing the corresponding isolation point to be reflected as being in the Requires Verification state for all users. Among other consequences, this means that the corresponding system will be reflected as being in a state whereby it is not safe to service, and that the only way to advance the isolation point to the Locked state (a prerequisite of the corresponding system being reflected as safe to service) is for a user assigned with an operator role to examine the isolation point and verify that a lock is actually there, if that is indeed the case. In other words, the invalidation operation is not completely trusted because the user asserting the invalidation is not understood to have an expertise concerning the system, and could simply be mistaken about his or her whereabouts (example: he or she believes himself or herself to be examining an isolation point and observing the absence of a lock, but he or she is actually looking at the wrong isolation point, explaining the absence of a lock—such a scenario would be cleared up by an operator examining the isolation point). (Previously, discussion has been presented pertaining to use of the real-time asynchronous data updating framework 1806 to update changes in isolation point states, among other data, to subscribing instances of the app, and it is to be understood that operation 2208 includes such operations to effect such real-time updating of isolation point states and corresponding system safety data for subscribing apps. A recitation of such operations is omitted here for the sake of brevity.) In the wake of completion of operation 2208, operational flow is passed to operation 2214, which is discussed below. On the other hand, if in operation 2206, it is determined that the user has, in fact, been assigned an Operator role, then the invalidation operation will be trusted. Thus, the state treatment indicator is assigned a value indicating that no lock has been placed thereupon (example: it is set to a value of zero) (operation 2212), and any information concerning a previous placement, confirmation or verification of such lock is nulled out (operation 2210). Thus, according to some embodiments, the previously-mentioned fields of the isolation point record devoted to storing the user ID of the user that asserted initial lock placement, the time and date of such placement, the user ID of the user that asserted verification of such placement and the time and date of such verification are all set to null values. Additionally, the previously-described confirmation table is examined for records including the isolation point ID passed to the HandleLockOp API 1804 in connection with its invocation, and any such records are deleted. One result of these operations is that, upon their completion, the app will display the state of such isolation point as being in the No Lock state. (Again, previously discussion has been presented pertaining to use of the real-time asynchronous data updating framework 1806 to update changes in isolation point states, among other data, to subscribing instances of the app, and it is to be understood that operation 2212 includes such operations to effect such real-time updating of isolation point states and corresponding system safety data for subscribing apps. A recitation of such operations is omitted here for the sake of brevity.)

Next, in operation 2214, the virtual lockbox associated with the system corresponding to the isolation point ID passed to HandleLockOp API 1804 in connection with its invocation is examined in order to determine whether it has a digital personal lock securing it. For example, this may be performed as described with reference to the operations of the RequestKey API 1804 (FIG. 21). If a digital personal lock is found to be securing the aforementioned virtual lockbox, operational flow is passed to operation 2216, which is discussed below. Prior to discussion of operation 2216, attention is turned to certain embodiments, wherein upon operations 2214 and 2216 are performed, and the operations of FIG. 22, are therefore completed, without having assigned a null value to the LockID field. Given this state of affairs, a lock ID remains associated with the isolation point, and a RequestKey API 1804 call would result in an error code being returned (see operation 2112), as opposed to resulting in the return of a digital key to unlock such lock. This prevents a user from approaching a lock at an isolation point, reporting an issue at such isolation point (i.e., No lock found at the isolation point), and then conducting an Unlock lock operation upon such lock, thereby imperiling any workers servicing the corresponding system—the lock ID of such lock will remain associated with the isolation point, and the Unlock operation will fail. (To permit dissociation of the aforementioned lock ID from the aforementioned isolation point, each user who has his or her digital personal lock on the aforementioned virtual lockbox must remove his or her digital personal lock. Thereafter, a user having access to the unlock button 1716, such as a user assigned to an Operator role, may initiate an Unlock lock operation, as previously described, and this will result in dissociation of the lock ID from the lock ID, at a time when it is known that no workers are servicing the corresponding system, and the lock may be safely unlocked.)

Discussion now turns to operation 2216, which follows upon an affirmative determination in operation 2214 that at least one digital personal lock is securing the virtual lockbox associated with the system corresponding to the isolation point ID passed to HandleLockOp API 1804 in connection with its invocation. Arrival at operation 2216 means that there is at least one user servicing the system that includes the aforementioned isolation point that has just been reported by an operator as not actually being secured by an isolation point. Keeping in mind that an individual assigned an Operator role is someone who is very familiar with the system and its various isolation points, this means that the user or users servicing the system are imperiled because the system is not actually in a safe state, and they should immediately halt the servicing operations. Thus, in operation 2216, the relevant users are notified that the aforementioned system is no longer safe to operate. For example, push notifications may be sent to the mobile device 1211 of each user determined in operation 2214 to have his or her digital personal lock on the aforementioned virtual lockbox. According to such embodiments, as a part of the aforementioned login operations, and as a part of responding to any other circumstance wherein the app has been newly loaded into the device's 1211 RAM, a push notification ID may be read by the app and sent to the backend computing platform 1208, which stores such push notification ID in association with the logged-in user. Keeping in mind that the app is a process executing under the administration of an operating system on the respective device 1211 of each user, a push notification ID may be understood to be an identifier assigned by the aforementioned operating system on each such device 1211, so as to uniquely identify the device-process combination. Thus, using the push notification ID(s), associated with each such user(s), the backend computing platform 1208 may invoke a third-party push-notification-messaging system to initiate delivery of a push notification to each such user to inform such user(s) that the system is no longer safe, and that they should cease servicing it. Example: the backend computing platform 1208 may, for each user servicing the system, call the aforementioned third-party system with a message containing such user's corresponding push notification ID and a message string (e.g., "The system you are servicing is unsafe. Halt services now, and evacuate."). The third-party system will deliver the push notification to the proper device, based on the push notification ID, and the operating system will receive the notification, and present it, such as on the lock screen of the device, in order to immediately alert the user. According to some embodiments, such notifications are accompanied with a loud audible alert, such as a siren noise. According to some embodiments, operation 2216 includes presenting a notice, via one or more instances of web clients 1818 (such as a portal), to inform users of such web clients 1818 that the aforementioned system is no longer safe to operate. This is discussed further, below.

Returning discussion to operation 2214, if it is determined that no digital personal lock is, in fact, securing the aforementioned virtual lockbox, then, if it is the case that operation 2214 was arrived at from operation 2208, then the operations of FIG. 22 are concluded, and nothing further is done. Otherwise, the aforementioned lock ID value within the isolation point record is assigned a null value, thereby dissociating the lock (errantly assumed to have been placed at the isolation point) from such isolation point (operation 2218).

Discussion now turns to the topic of the operational response of the app in response to a user tapping the Lockbox field or button 1770. According to some embodiments, the Lockbox field 1770 is always activated when there is a selected system-of-focus, meaning that a user may tap the field 1770, and the app will respond to such tap. The Lockbox field 1770, when tapped, presents the user with a user interface by which to interact with a virtual lockbox corresponding to the system-of-focus. The aforementioned user interface may: (i) present the user with a list of users that have digitally fastened or added their digital personal locks to such virtual lockbox; (ii) permit the user to digitally fasten or add his or her digital personal lock to such virtual lockbox, subject to certain conditions; and (iii) permit the user to remove his or her digital personal lock from such virtual lockbox.

Figure 17K:
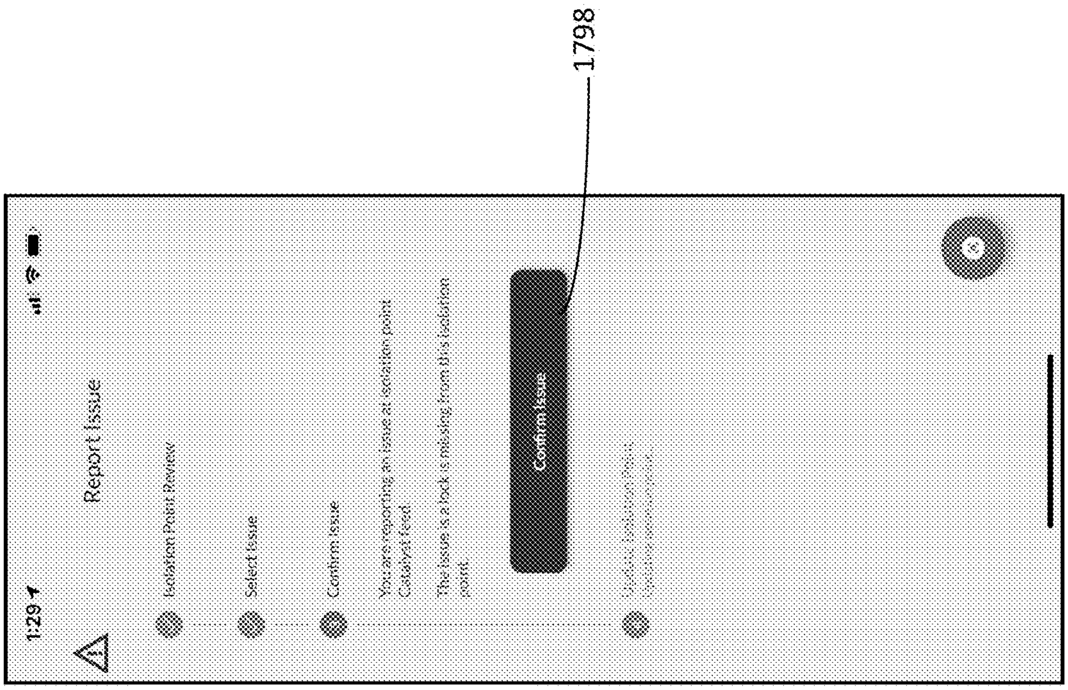
FIG. 17K depicts another exemplary embodiment of a user interface screen that may be used in connection with the various embodiments of the aforementioned app disclosed herein.
Figure 17L:
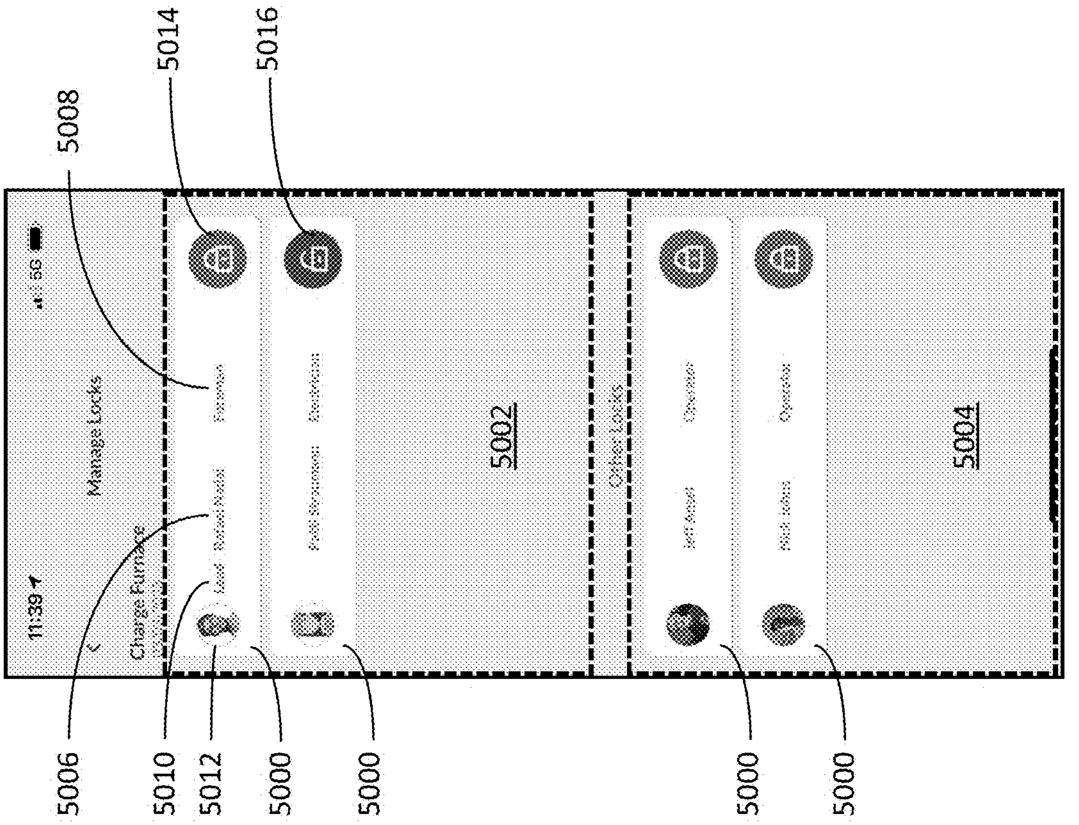
FIG. 17L depicts another exemplary embodiment of a user interface screen that may be used in connection with the various embodiments of the aforementioned app disclosed herein.

The operational response of the app to a tap of the Lockbox field or button 1770 begins with operation 3284, whereupon the tap is detected. Thereafter, operational control passes to operation 3286. In operation 3286, the app invokes one of the mobile APIs 1804 (example: getLocksOnVLBox), passing the API 1804 the system ID corresponding to the system-of-focus in connection with the invocation, in order to obtain the data required to populate the Lockbox Management screen. An embodiment of the Lockbox Management screen is depicted in FIG. 17L. According to some embodiments, in response to invocation, the middleware associated with the getLocksOnVLBox API 1804 searches the previously mentioned personal lock table for each record therein containing a matching system ID. Recall: each record within the personal lock table represents a personal digital lock currently securing a virtual lockbox. Each such record may include: (i) a user ID; (ii) a personal lock ID; and (iii) a system ID, among other data. Thus, such a record would indicate that a user identified by the user ID contained in the record has digitally fastened or added his or her digital personal lock identified by the personal lock ID contained in the record to a virtual lockbox corresponding to a system identified by the system ID contained in the record. Thus, each record containing a system ID matching that of the system-of-focus corresponds to a user that has added his or her digital personal lock to such system's virtual lockbox. According to some embodiments, for each record therein, the record data is supplemented by using the user ID information therein to access such tables as the previously mentioned teams table, team members table and user registration tables so that the following is returned for each user indicated by the personal lock table as having his or her digital personal lock on the virtual lockbox corresponding to the system-of-focus: (i) name of the user and/or user ID; (ii) user email; (iii) role; (iv) title; (v) path to an image of the user; (vi) a team ID identifying a service team to which the user is assigned; (vii) an indication of whether the user is the lead of such team; and (viii) an indication of whether the user is available to be added to a team (although this particular unit of information may be optional, as it may or may not relate to information presented on the particular screen used to present virtual lockbox information, such as the Lockbox Management screen of FIG. 17L, discussed below). The data set returned to the app in operation 3286 can be thought of as containing entries, each entry containing the data elements just described, and each entry corresponding to the user identified by the user name/user ID information. In the wake of receiving the response from the API 1804, the app stores and accesses the response data (entries) in order to construct the Lockbox Management screen (operation 3288).

FIG. 17L depicts an exemplary embodiment of the Lockbox Management screen, constructed in accordance with operation 3288. The particular screen depicted in FIG. 17L is an example of a screen that would be constructed in operation 3288, assuming the underlying facts: (1) the logged-in user is an electrician named "Patti Straumann"; (2) Patti is a member of a service team including one other member, a foreman named "Rafael Nadal," who is the Lead of the service team; (3) Rafael has placed his digital personal lock on the virtual lockbox corresponding to the system-of-focus, but Patti has not; (4) the particular users (operators) that initially placed the physical locks at the isolation points of the system-of-focus and verified such placement-"Jeff Ansel" and "Nick Johns"—have also placed their digital personal locks on the virtual lockbox corresponding to the system-of-focus. As can be seen from FIG. 17L, the exemplary Lockbox Management screen therein contains a plurality of digital personal lock tiles 5000. Each tile contains information about: (i) a particular corresponding digital personal lock that is currently securing the virtual lockbox corresponding to the system-of-focus; (ii) a particular corresponding digital personal lock that is not currently securing the virtual lockbox corresponding to the system-of-focus, but is assigned to a user that is a member of a service team that has been assigned to such system (and therefore potentially "should" add his digital personal lock to the virtual lockbox at some point); or (iii) the particular digital personal lock assigned to the logged-in user, whether or not such digital personal lock is presently securing the virtual lockbox corresponding to the system-of-focus. Each tile 5000 contains a username label 5006 that identifies the name of the user to which the digital personal lock tile 5000 corresponds, a title or role label 5008 that identifies the title or role assigned to the aforementioned user, and a lead indicator label 5010 that indicates whether the aforementioned user is the lead of the particular service team to which the logged-in user may be assigned (for the sake of eliminating visual clutter, only the top-most tile 5000 contains reference numerals identifying the various labels 5006, 5008 and 5010, although each such tile 5000 clearly contains such text labels 5006, 5008 and 5010). According to some embodiments, each tile 5000 may include an image 5012 of the user to which the tile 5000 corresponds (obtained by the app, for example, by accessing such an image file at the aforementioned path returned in the API 1804 response data). Finally, each tile may contain a button 5014 that a user may tap in order to add or remove his or her digital personal lock from the virtual lockbox corresponding to the system-of-focus. According to some embodiments, such button 5014 or other aspect of the tile 5000 may be color-coded to indicate whether the user to which the tile 5000 corresponds currently has his or her digital personal lock securing such virtual lockbox. For example, looking at FIG. 17L, it can be seen that button 5014 is green, indicating that Rafael Nadal currently has his digital personal lock securing the virtual lockbox. On the other hand, button 5016 is red, indicating that Patti Straumann has not added her digital personal lock to such lockbox-she would initiate such addition operation by tapping the button 5016. According to some embodiments, an entire tile 5000 is tappable, in order to initiate such addition or removal operations, so that while the button 5014 or 5016 may also be tapped to initiate such operations, their primary purpose is to function as a visual indicator as to whether the user corresponding to the tile 5000 within which a given button 5014, 5016 is situated currently has his or her digital personal lock securing the virtual lockbox corresponding to the system-of-focus. According to some embodiments, in addition to such indication being communicated via color coding, a text label (not depicted in FIG. 17L) may be included in each tile 5000 to textually state whether the user corresponding to a given tile 5000 currently has his or her digital personal lock securing the virtual lockbox corresponding to the system-of-focus.

The tiles are oriented on the screen in one of two regions 5002 and 5004. According to some embodiments, region 5002 contains tiles 5000 corresponding to: (i) the logged-in user; and (ii) any members of a service team of which he or she may be a member. According to some embodiments, in the event that the logged-in user is, in fact, a member of a service team, the particular user designated as the Lead of such team may correspond to the top-most tile 5000 in the region 5002. Such a convention allows for the tile 5000 corresponding to the Lead easy to locate. This may be significant because, according to some embodiments, members of a team cannot add their digital personal locks to a system's virtual lockbox, until the Lead of the service team assigned to such system has first added his or her digital personal lock to such virtual lockbox. Thus, users that are a member of such team may want to be able to readily ascertain whether the user assigned as such team's Lead has, in fact, added his or her digital personal lock to such system's virtual lockbox. According to some embodiments, if the logged-in user is not a member of a team, then region 5002 contains a single tile 5000, i.e., the particular tile 5000 corresponding to the logged-in user and his or her digital personal lock. According to some embodiments, every personal digital lock added to the virtual lockbox of the system-of-focus that does not correspond to a tile 5000 situated in area 5002 corresponds to a tile 5000 situated in area 5004. In other words, for a given logged-in user, area 5004 presents tiles 5000 corresponding to digital personal locks added to the virtual lockbox of the system-of-focus, wherein such digital personal locks do not correspond to either the logged-in user himself or herself, or to a member of a service team to which the logged-in user is assigned. According to some embodiments areas 5002 and 5004 independently scroll, in order to accommodate any number of tiles 5000. According to other embodiments, the screen of FIG. 17L, as a whole, scrolls.

According to some embodiments, in operation 3288, the add and remove digital personal lock buttons 5014 and 5016 are initially constructed in an inactive state, meaning that they are unresponsive to a tap event. Operations 3290-3298 cooperate to properly activate such buttons 5014 and 5016, as described below.

In operation 3290, the app determines whether the logged-in user is a Lead of a service team assigned to the system-of-focus. For example, the data returned in response to the invocation of the getLocksOnVLBox API 1804 may be examined to see whether an entry in the response data includes a user ID matching that of the logged-in user and also includes a data element indicating that the user is a Lead of a service team assigned to the system-of-focus.

If the determination made in operation 3290 is negative, then operational control is passed to operation 3291, whereupon it is determined whether the logged-in user currently has his or her digital personal lock securing the virtual lockbox corresponding to the system-of-focus. For example, the data returned in response to the invocation of the getLocksOnVLBox API 1804 may be examined to see whether an entry in the response data includes a user ID matching that of the logged-in user. If so, that would indicate that the user does, in fact, have his or her digital personal lock securing the virtual lockbox corresponding to the system-of-focus. If not, then the opposite conclusion is revealed.

If, in operation 3291, the determination is made that the logged-in user's digital personal lock is, in fact, on the virtual lockbox corresponding to the system-of-focus, then the button 5016 in the tile 5000 corresponding to the logged-in user, when tapped, would indicate an intent to remove the user's digital personal lock from such system' virtual lockbox (because the digital personal lock is already on such lockbox). According to some embodiments, it is always permissible for a user to remove his or her digital personal lock from a lockbox (because, for example, he or she may halt his or her service operations upon the aforementioned system at any time), and therefore the button 5016 is activated (operation 3292). (Assuming Patti Straumann is the logged-in user, then the button 5016 in its red state, as presented in FIG. 16L, indicates that Patti does not, in fact, have her digital personal lock on the virtual lockbox corresponding to the system-of-focus. The present discussion assumes a hypothetical fact pattern at odds with the state of the screen as shown in FIG. 17L.)

Figure 16L:
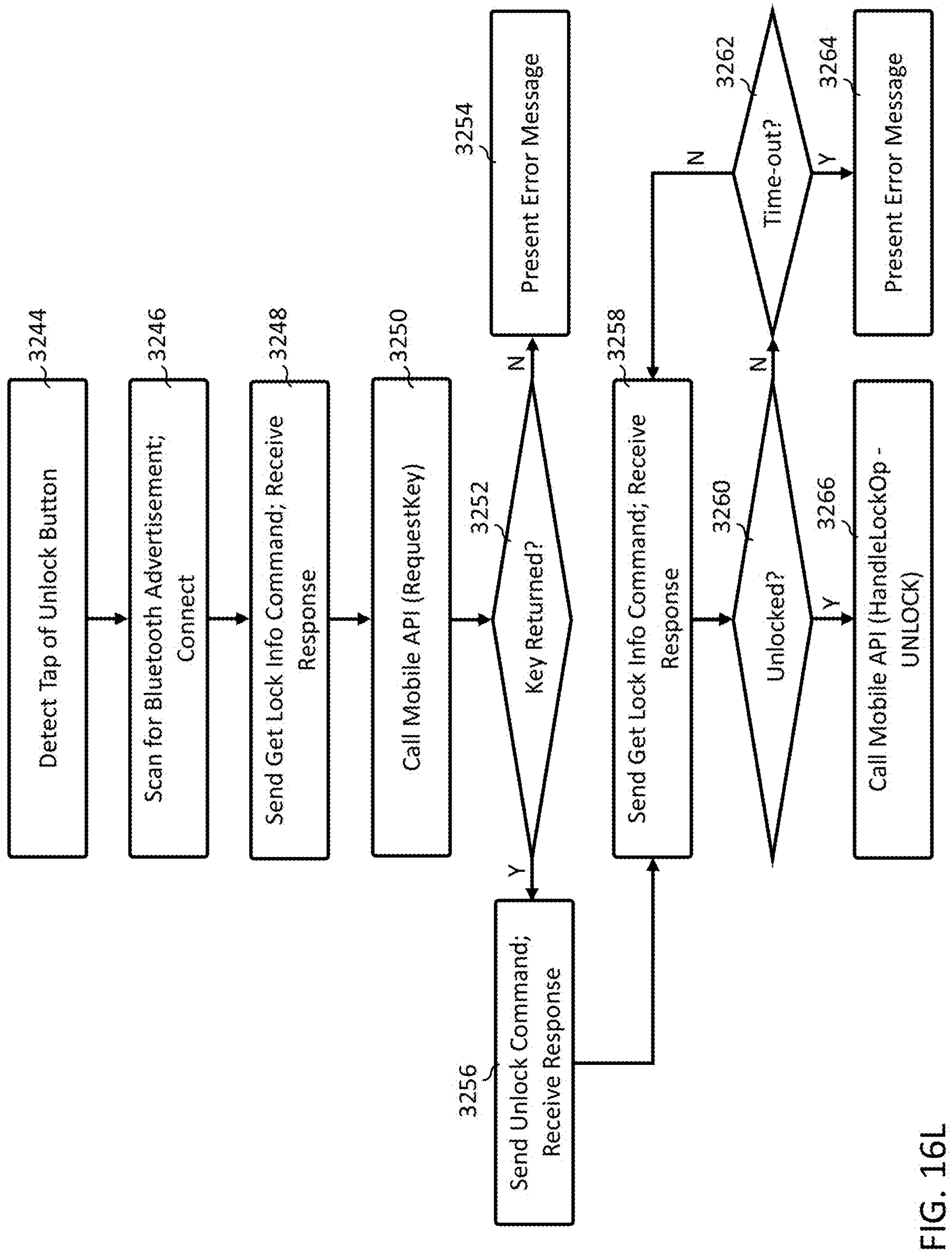
FIG. 16L depicts another portion of a state transition diagram or flowchart describing the operational and state flow of various embodiments off an app that may execute on a microcontroller of processor of a mobile device that may be used in connection with various embodiments of the safety system disclosed herein.
Figure 16M:
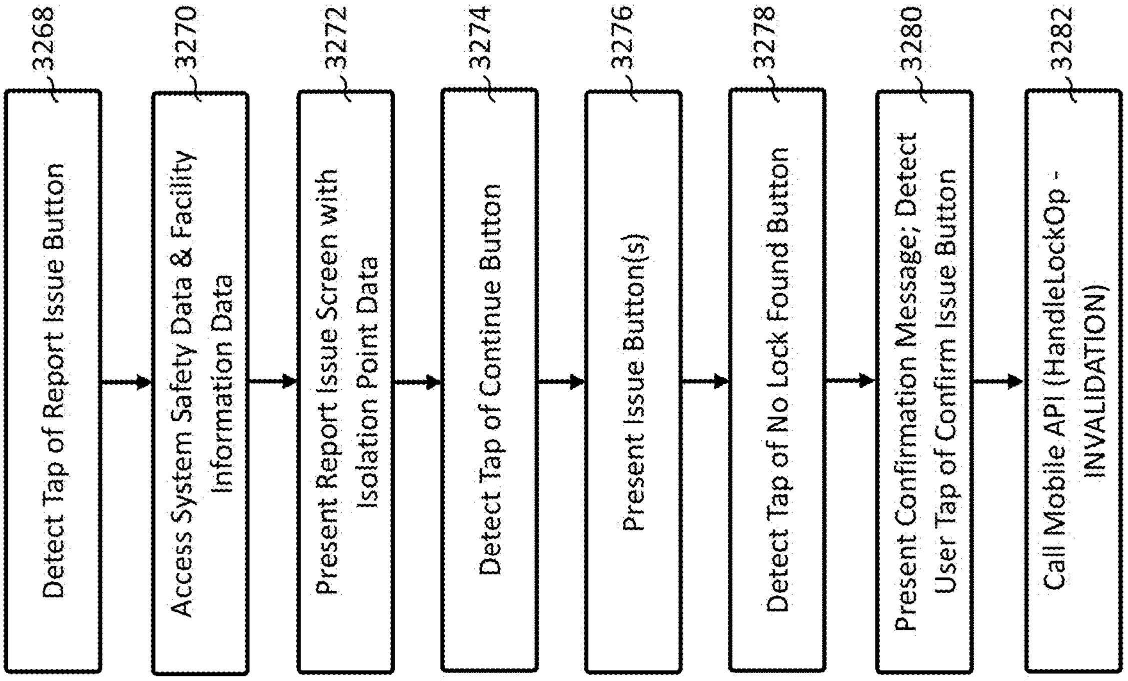
FIG. 16M depicts another portion of a state transition diagram or flowchart describing the operational and state flow of various embodiments off an app that may execute on a microcontroller of processor of a mobile device that may be used in connection with various embodiments of the safety system disclosed herein.
Figure 16N:
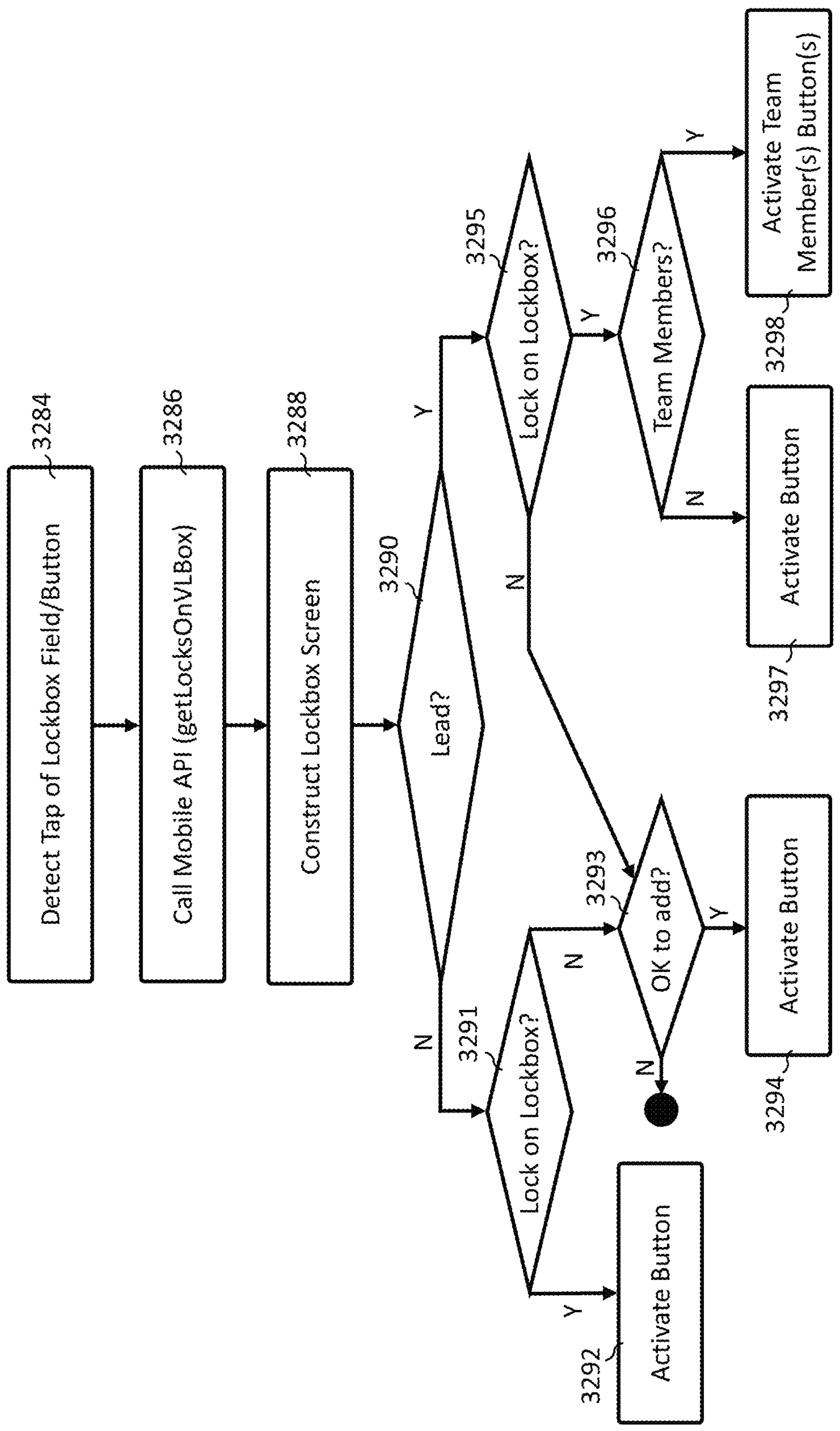
FIG. 16N depicts another portion of a state transition diagram or flowchart describing the operational and state flow of various embodiments off an app that may execute on a microcontroller of processor of a mobile device that may be used in connection with various embodiments of the safety system disclosed herein.

On the other hand, if, in operation 3291, the determination is made that the logged-in user's digital personal lock is not, in fact, on the virtual lockbox corresponding to the system-of-focus, then the button 5016 in the tile 5000 corresponding to the logged-in user, when tapped, would indicate an intent to add the user's digital personal lock to such system' virtual lockbox (because it is absent from such lockbox). According to some embodiments, circumstances must be tested to determine that a digital personal lock addition operation would be appropriate, prior to activation of the button 5016 (again, assuming Patti Straumann is the logged-in user, then activation of button 5016 is in question here). According to some embodiments, the button 5016 situated within the particular tile 5000 corresponding to the logged-in user may be activated if: (1) all of the isolation points of the system-of-focus are in a Locked state; (2) the user's lock is not already on the virtual lockbox corresponding to the system-of-focus (this condition was previously tested in operation 3291 and is included here for the sake of completeness); and (3) the user is (i) not on a member of a service team assigned to the system-of-focus, or (ii) if the user is a member of such a service team, then the user is not the Lead of the team, and it is the case that the user that is, in fact, the Lead of the team currently has his or her digital personal lock added to the aforementioned virtual lockbox, or (iii) if the user is a member of such a service team, he or she is the Lead of such team. Thus, in operation 3293, the app tests to determine whether the aforementioned button 5016 should be activated, such as by testing to determine whether the aforementioned conditions are satisfied. Exemplary data manipulations to test such conditions have been described herein, previously, and for the sake of brevity are not recited here. If the conditions are not satisfied, then the aforementioned button 5016 is not activated. On the other hand, if the conditions are satisfied, then the aforementioned button 5016 is, in fact, activated (operation 3294). According to the assumptions (recited above) under which FIG. 16L was created, the button 5016 is activated as shown in FIG. 16L. (Patti does not have her digital personal lock on the virtual lockbox corresponding to the system-of-focus, is a member of a service team assigned to the system-of-focus, each isolation point of the system-of-focus is in the Locked state, the Lead of Patti's service team has his digital personal lock securing the aforementioned virtual lockbox.)

Returning to operation 3290, if it is determined that the user is, in fact, the Lead of a service team assigned to the system-of-focus, then operational control is passed to operation 3295, whereupon the app determines whether the logged-in user currently has his or her digital personal lock securing the virtual lockbox corresponding to the system-of-focus. This test is parallel to that described with reference to operation 3291, and exemplary data manipulations to perform such a test are not described here, for the sake of brevity. If the logged-in user does not have his or her digital personal lock securing the virtual lockbox corresponding to the system-of-focus, then operational control is passed to operation 3293, to determine whether the button 5014 or 5016 situated within the tile 5000 corresponding to the logged-in user should be activated. Operation 3293 was just described and is not re-described here, for the sake of brevity.

On the other hand, if the logged-in user does, in fact, have his or her digital personal lock securing the virtual lockbox corresponding to the system-of-focus, then control is passed to operation 3296. In operation 3296, the app determines whether the service team of which the logged-in user has been assigned the role of Lead has any members other than the logged-in user, himself or herself. (Example: it is possible that all of the former members of the team had previously taken actions resulting in their dissociation from the team.) For example, the app may access the data set returned in the context of operation 3286, and may seek out entries contained in such data set that include a team ID equal to that contained in the team ID data element of the particular entry corresponding to the logged-in user. If such entries exist, the team has members—one member for each such entry with a matching team ID element. If no such entries exist (other than the particular entry corresponding to the logged-in user), then the team has no members other than the logged-in user, who is the Lead of such essentially empty team. If, in operation 3296, it is determined that the team of which the logged-in user has no other members, then the button 5014, 5016 situated within the particular tile corresponding to the logged in user is activated (operation 3297). (According to some embodiments, the user designated as a Lead of a team must be the last team member to remove his or her personal digital lock from a virtual lockbox corresponding to a system that the team has been assigned to service. If there are no other team members, then it is not possible that some other member still has his or her personal digital lock on such virtual lockbox.). On the other hand, according to some embodiments, if it is determined there are, in fact, other members, then the button(s) 5016 within the tile(s) 5000 corresponding to each such member may be activated (operation 3298). This addresses a certain potential problem. It may be the case that each member of a service team supplies his own device 1211 on which to execute the app. For example: each team member may install the app on his or her personal smartphone, and use such smartphone to execute the app (and to add/remove his or her digital personal lock to/from the virtual lockbox to which he or she has been assigned to service). In such a scenario, it is possible that one or more team members accidentally forget to bring their smartphone to the worksite on a given day. Thus, given that the add-or-remove-digital-personal-lock button 5016 of each team member's corresponding tile 5000 is activated in operation 3298, a team member that forgot to bring his or her device 1211 to work may use his Lead's device (example: foreman's device) to add or remove his or her personal digital lock by tapping the button 5016 contained in the tile corresponding to such team member. This is described further, below.

Figure 16O:
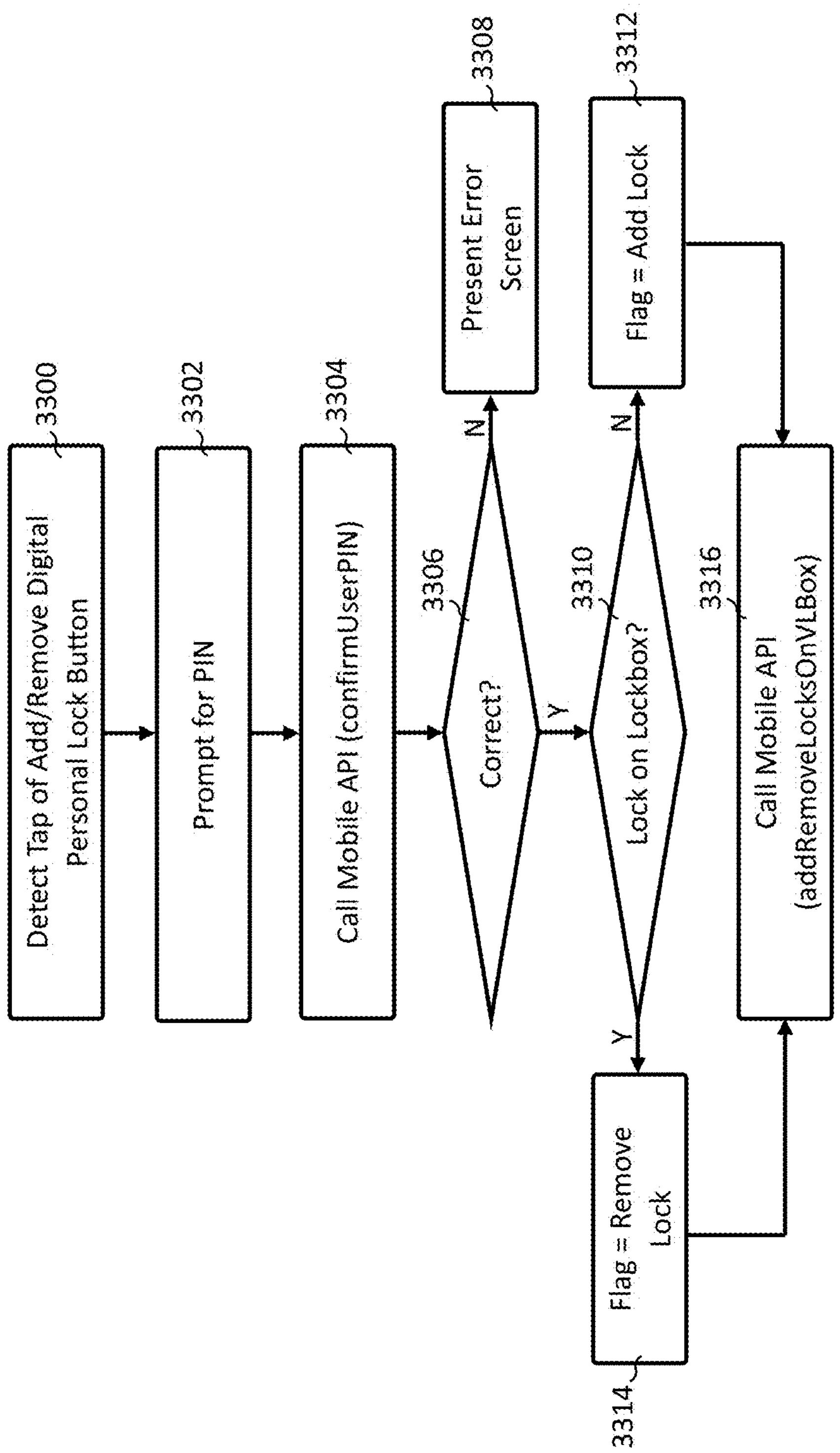
FIG. 16O depicts another portion of a state transition diagram or flowchart describing the operational and state flow of various embodiments off an app that may execute on a microcontroller of processor of a mobile device that may be used in connection with various embodiments of the safety system disclosed herein.
Figure 16P:
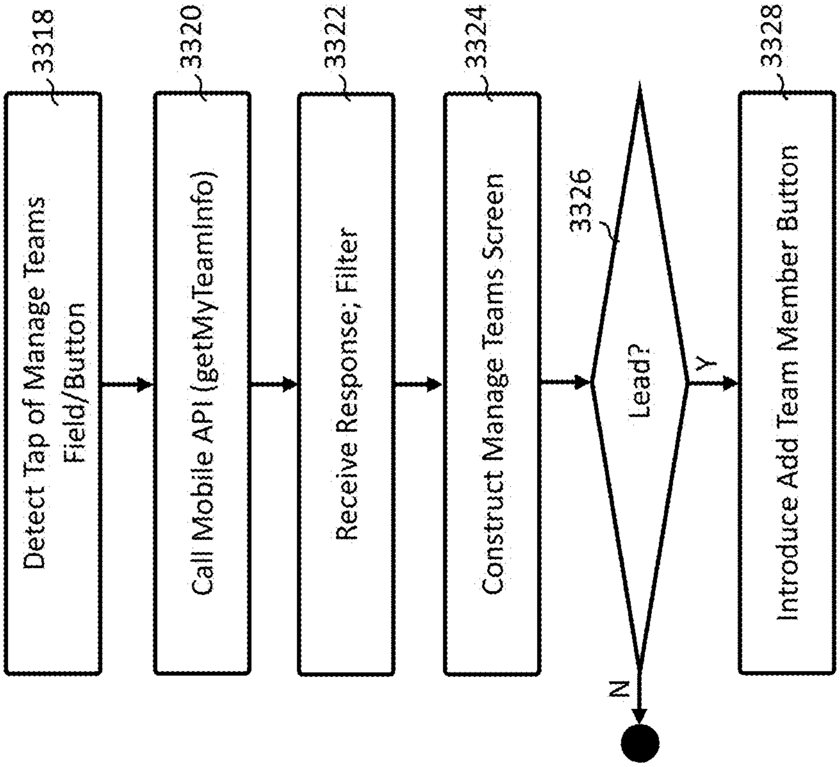
FIG. 16P depicts another portion of a state transition diagram or flowchart describing the operational and state flow of various embodiments off an app that may execute on a microcontroller of processor of a mobile device that may be used in connection with various embodiments of the safety system disclosed herein.
Figure 17M:
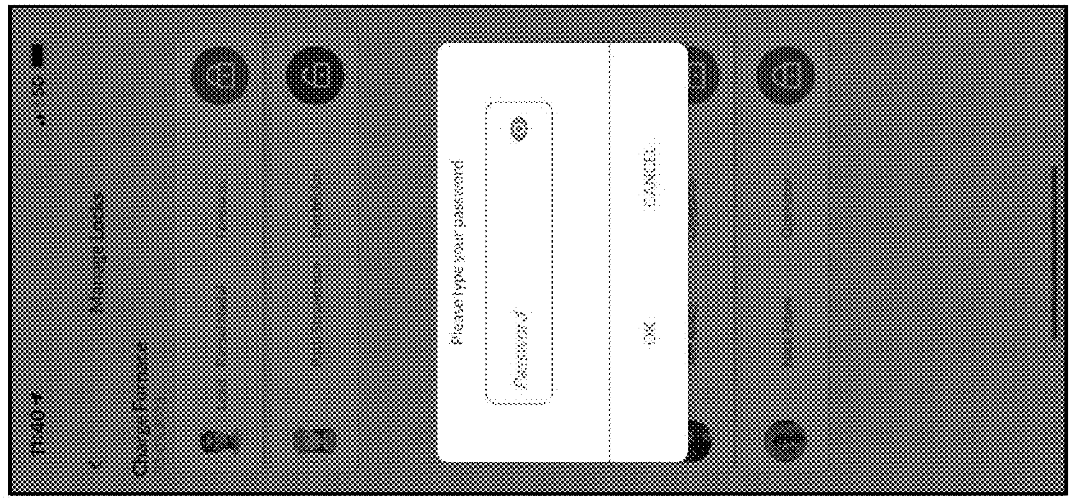
FIG. 17M depicts another exemplary embodiment of a user interface screen that may be used in connection with the various embodiments of the aforementioned app disclosed herein.

FIG. 16O depicts the operational flow of the app in response to a user tapping the aforementioned add-or-remove-digital-personal-lock button 5014, 5016. The process is initiated by detection of a user tap of the add-or-remove-digital-personal-lock button 5014, 5016 (operation 3300). Thereafter, in operation 3302, according to some embodiments, the app prompts the user to enter his PIN or password (see FIG. 17M). The app then calls a mobile API 1804 (confirmUserPIN), passing the user ID corresponding to the particular tile 5000 in which the tapped button 5014, 5016 was situated, and also passing the entered PIN/password to the API 1804. (Recall: any active button 5014, 5016 may be tapped-either a button 5014, 5016 in a tile 5000 corresponding to the logged-in user, or, in the case in which the logged-in user is a Lead of a service team, a button situated in a tile 5000 corresponding to members of the service team which the logged-in user leads. One purpose for prompting the user to enter his or her PIN is to ensure that a Lead does not add or remove a team member's digital personal lock. Because entry of a PIN is required, the team member, himself or herself, must take the device 1211 on which the app is executing into his or her hands and enter the PIN, in order to add or remove his or her digital personal lock). The middleware associated with the invoked API 1804, in turn, accesses user information stored in the database 1800, and confirms whether the API is correct in a response to the API 1804 call (operation 3304).

In operation 3306, the response from the middleware associated with confirmUserPIN 1804 is examined. If the response indicates that the PIN entered by the user in the context of operation 3302 was incorrect, then an error message is presented to the user (operation 3308), and the process is halted without either adding or removing the user's digital personal lock to or from the virtual lockbox corresponding to the system-of-focus. On the other hand, if the response indicates that the PIN was, in fact, correct then control is passed to operation 3310.

In operation 3310, the app determines whether the user corresponding to the particular tile 5000 in which the button-tap event was detected currently has his or her digital personal lock added to the virtual lockbox corresponding to the system-of-focus. The data returned to the app in operation 3286 may be used to make such a determination in a manner previously described. If it is determined that the user does not have his or her digital personal lock added to the virtual lockbox corresponding to the system-of-focus, then the app sets a flag to indicate that the button tap event represents an intent to add the user's digital personal lock to such virtual lockbox (operation 3312). On the other hand, if it is determined that the user does, in fact, have his or her digital personal lock added to the virtual lockbox corresponding to the system-of-focus, then the app sets a flag to indicate that the button tap event represents an intent to remove the user's digital personal lock from such virtual lockbox (operation 3314).

Finally, in operation 3316, the app invokes a mobile API 1804 (addRemoveLocksOnVLBox), passing a user ID, system ID and flag to the API 1804, in order to indicate that a particular user (indicated by the user ID corresponding to the particular tile 5000 in which the tapped button 5014, 5016 was situated) intends to add or remove his or her digital personal lock (such intended drop or addition being indicated by the flag) to or from a particular virtual lockbox corresponding to a particular system (indicated by the system ID corresponding to the particular tile 5000 in which the tapped button 5014, 5016 was situated). In response, the middleware associated with the aforementioned API 1804 effectuates such addition or removal. For example, in the event that the flag indicates that the interpretation of the button tap event is to add a digital personal lock, then the middleware may add a record to the previously-described digital personal lock table, using the user ID and system ID passed to the API 1804 in connection with invocation, in order to populate the user ID and system ID fields of the record. According to some embodiments, the personal lock ID field of the record may be populated with an autogenerated value. Thereafter, the middleware may interact with the server-side aspect of the asynchronous data updating framework 1806 to declare the occurrence of a data event pertaining to the particular publication that corresponds to the system-of-focus. According to some embodiments, the middleware passes the newly updated virtual lockbox data (example: a set of data like that which would have been returned had the getLocksOnVLBox API 1804 been called in the wake of such addition is passed to the server-side aspect of the asynchronous data updating framework 1806 in connection with such event declaration, so that the framework 1806 can pass such updated data to the app for proper handling and updating of the user interface—to reflect the addition of the digital personal lock—according to the manner of operations previously described). According to some embodiments, no data is passed in connection with declaration of such data event, and the previously-described callback method or function invoked by the app in response to receipt of such data from the server-side aspect of the framework 1806 invokes the getLocksOnVLBox API 1804 in order to obtain such information, and thereafter handles such information and updates the user interface in view of such information. On the other hand, in the event that the flag indicates that the interpretation of the button tap event is to remove a digital personal lock, then the middleware may search the previously-described digital personal lock table for a record with a matching user ID and system ID, and delete such record. According to some embodiments, upon a user removing his or her digital personal lock from a virtual lockbox, the user is dissociated from a service team that he may have been a member of, if that team was assigned to the particular system corresponding to the aforementioned virtual lockbox. Thus, the middleware may use the system ID passed to the API in connection with its invocation to search the previously-described teams table for a record with a matching system ID. In the event such a record is located, then the team ID from such record is obtained and the previously-described team members table is searched for a record including (i) the aforementioned team ID, and (ii) the user ID passed to the API 1804 in connection with its invocation. Any such record is deleted—thereby removing such user from such service team. In the event that the aforementioned located record within the teams table contained, in the field indicating the user ID of its Lead, a user ID equal to the user ID passed to the API 1804 in connection with its invocation, that would mean that the particular user removing his or her personal lock is the Lead of the team. According to some embodiments, such an action deconstructs the team. Therefore, in such a circumstance, the middleware deletes the aforementioned located record from the teams table. Thereafter, the middleware may interact with the server-side aspect of the asynchronous data updating framework 1806 to declare the occurrence of a data event pertaining to the particular publication that corresponds to the system-of-focus. Finally, according to some embodiments, in the event that the particular digital personal lock removed from the virtual lockbox associated with the aforementioned system ID was the final such lock, so that in the wake of such removal no further digital personal locks remain associated with the aforementioned virtual lockbox, then with respect to any isolation points of the aforementioned system that may have a lock ID associated therewith, while also having an asserted invalidation, the middleware will disassociate the lock ID from such invalidate isolation point or points, and will also clear the invalidation assertion or assertions. The effect of this is to permit another lock to be hung on isolation points bearing an invalidation assertion only after every user has ceased operating upon the particular system of which such isolation points are members and removed their digital personal lock from such system's virtual lockbox. For example, the middleware may search the aforementioned digital personal lock table for the existence of any record with a system ID matching that of the system ID passed to the API 1804 in connection with its invocation. If no such record is located, that indicates that no digital personal locks remain associated with the virtual lockbox corresponding to the aforementioned system. Thus, the middleware may search the aforementioned isolation point table for each record containing a matching system ID, a lock ID, and a non-null invalidation user ID and invalidation date, and in the wake of locating any such record, the lock ID, invalidation user ID and invalidation date fields are assigned a null value. According to some embodiments, the middleware passes the newly updated virtual lockbox data (example: a set of data like that which would have been returned had the getLocksOnVLBox API 1804 been called in the wake of such removal is passed to the server-side aspect of the asynchronous data updating framework 1806 in connection with such event declaration, so that the framework 1806 can pass such updated data to the app for proper handling and updating of the user interface—to reflect the removal of the digital personal lock—according to the manner of operations previously described). According to some embodiments, no data is passed in connection with declaration of such data event, and the previously-described callback method or function invoked by the app in response to receipt of such data from the server-side aspect of the framework 1806 invokes the getLocksOnVLBox API 1804 in order to obtain such information, and thereafter handles such information and updates the user interface in view of such information.

Discussion now turns to the topic of the operational response of the app in response to a user tapping the Manage Teams field or button 1772. According to some embodiments, the Manage Teams field 1772 is always activated when there is a selected system-of-focus, meaning that a user may tap the field 1772, and the app will respond to such tap. The Manage Teams field 1772, when tapped, presents the user with a user interface by which to manage the service team membership assigned to the system-of-focus. The aforementioned user interface may: (i) present the user with a list of users that are presently assigned to a service team assigned to the system-of-focus-according to some embodiments, only those particular service team(s) that are both (a) assigned to the system of focus, and (b) contain the logged-in user are presented via the aforementioned user interface; (ii) permit the user to add or remove a member to such team(s), according to certain conditions.

Figure 17N:
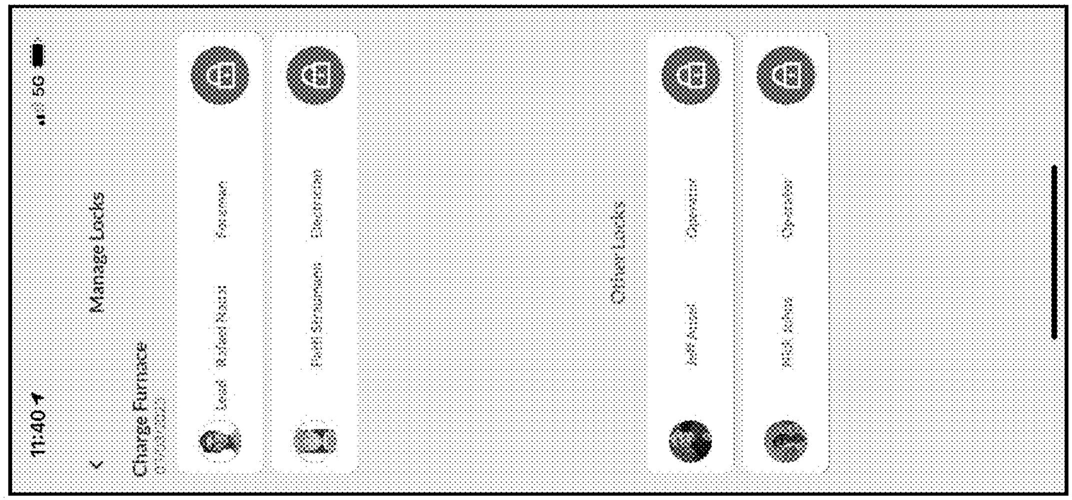
FIG. 17N depicts another exemplary embodiment of a user interface screen that may be used in connection with the various embodiments of the aforementioned app disclosed herein.
Figure 17O:
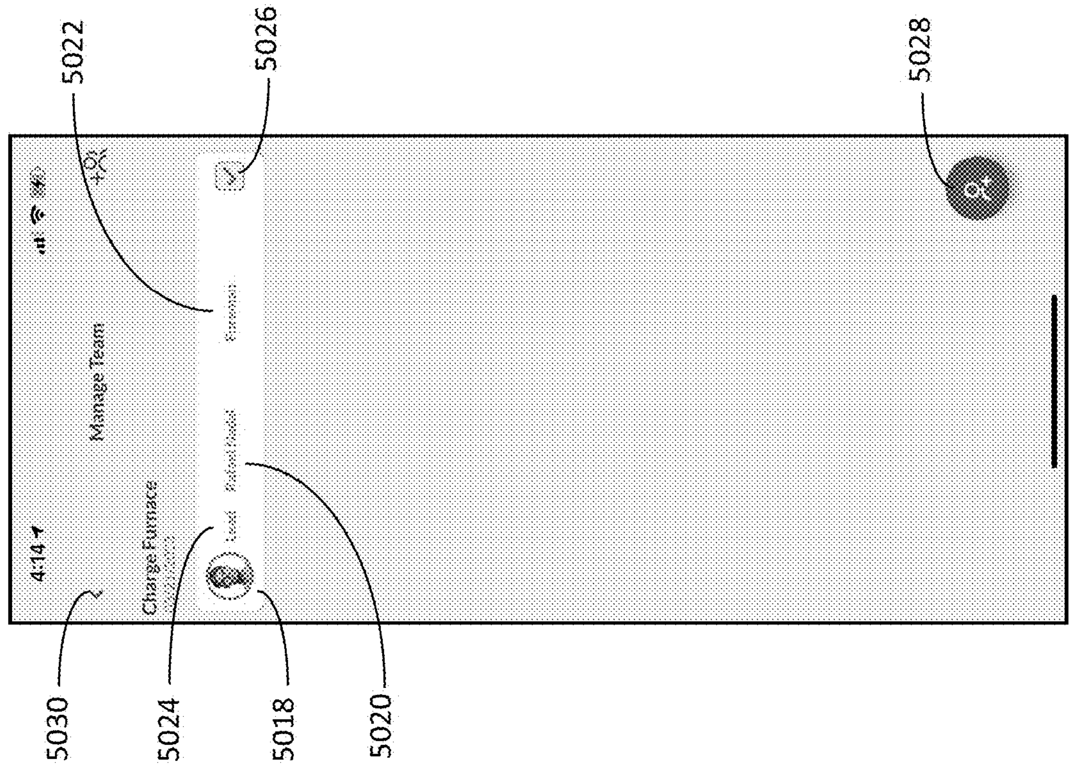
FIG. 17O depicts another exemplary embodiment of a user interface screen that may be used in connection with the various embodiments of the aforementioned app disclosed herein.

The operational response of the app to a tap of the Manage Teams field or button 1772 begins with operation 3318, whereupon the tap is detected. Thereafter, operational control passes to operation 3320. In operation 3320, the app invokes one of the mobile APIs 1804 (example: getMyTeamInfo) in order to request information concerning the service teams of which the logged-in user is a member. An embodiment of the Manage Teams screen is depicted in FIG. 17O—data received in response to the aforementioned API 1804 call is used to populate such screen. According to some embodiments, in response to invocation, the middleware associated with the getMyTeamInfo API 1804 searches the previously mentioned teams table and team members table for each record therein containing a matching system ID. Recall: (1) each record within the teams table represents an active team that was previously created by a user assigned a Lead role, and is assigned to service some particular system; and (2) each record within the team members table represents a user that has been added, by a Lead, to the membership of a team represented in the teams table. Thus, in searching the teams table, the middleware is searching for teams the logged-in user may have created in his or her capacity as a Lead of such team, and in searching the team members table, the middleware is searching for teams the logged-in user may be a member of by virtue of some other user(s) having added the logged-in user to such team(s). In the event that a matching user ID is identified in the teams table, this means the logged-in user is a member of a team by virtue of having created it. Recall that each record in the teams table includes a team ID. To identify the other members of such team(s), records containing matching team IDs are sought in the team members table. For example: if, in searching the teams table, the logged-in user is found to have created two teams, the middleware searches the team members table, first with the team ID corresponding to the first of such created teams, and each such record with a matching team ID identifies a current member of such first created team (identified by a user ID, for example); next, the middleware searches the team members table with the team ID corresponding to the second of such created teams, and each such record with a matching team ID identifies a current member of such second created team (again identified by a user ID, for example). Thus, the membership of each such team created by the logged-in user is found. Turning now to the context of searching the team members table for inclusion of a record including the user ID of the logged-in user, in the event that a matching user ID is identified in the team members table, this means the logged-in user is a member of a team by virtue of having added to it by another user that is the Lead of such team. Recall that each record in the team members table includes a team ID. To identify the other members of such team, records containing a matching team ID are sought in the team members table. Next, a record containing a matching team ID is sought in the teams table, and when located, the user ID of the Lead of such team is extracted. Thus, the membership of each such team to which the logged-in user has been added is found (according to some embodiments, a user may only be added to one team at any given time). According to some embodiments, for each team to which the logged-in user is a member (either by reason of having created such team, or by reason having been added to such team by the particular user that, in fact, created such team), the middleware uses the team membership information (for example, gathered as just described as arrays or lists or sets of user IDs making up each such team) to access such tables as the previously mentioned teams table, team members table and user registration tables so that the following information is returned to the app: for each team of which the logged in user is a member, (i) a team ID; (ii) an area ID; (iii) a unit ID; and (iv) a system ID; and (v) a set of information for each user within the team identified by team ID. According to some embodiments the aforementioned set of information for each user includes: (i) a user ID; (ii) a user name corresponding to such user ID; (iii) an email address corresponding to a user identified by such user ID; (iv) a role assigned to the user identified by such user ID; (v) a title corresponding to the user identified by the user ID; (vi) a path at which an image file is located, wherein such image file contains an image of the user corresponding to the user ID; (vii) an indication of whether such user is the Lead of the team (example: TRUE/FALSE); and (viii) an indication of whether such user is available to be added to another team (example: TRUE/FALSE). The data set returned to the app can be thought of as containing team entries, with each entry containing data identifying the team, and identifying the particular system to which the team is assigned. Each team entry can be thought of as further containing member entries, with each such member entry containing data identifying a corresponding team member (user ID, name, role, etc., as described above) and identifying whether or not such team member is the lead of the particular team corresponding to the team entry within which such member entry is situated. Thus, each member entry corresponds to a team member and a team entry, and each team entry corresponds to a service team (meaning that each team entry indirectly corresponds to a team, as well). In the wake of receiving the response from the API 1804, the app stores the response data and searches through such data for the presence of a team entry with data elements matching the system-of-focus (i.e., searches the response data for the presence of a team entry assigned to the system-of-focus) (operation 3322).

Next, in operation 3324, the Manage Teams screen is constructed using the particular team entry data located in operation 3322 (if any such team entry was, in fact, located).

FIG. 17O depicts an example of a constructed Manage Teams screen. The screen shown therein results from a scenario wherein the data returned by the getMyTeamInfo API 1804 did not contain a team entry corresponding to the system-of-focus (i.e., the logged-in user is not a member of a service team assigned to the system-of-focus). To describe the general structure of the Manage Teams screen, such screen contains one or more team member tiles 5018—one tile 5018 for each member of a service team: (i) assigned to the system-of-focus; and (ii) to which the logged-in user belongs. If no such team exists (as is the case in depicted example currently being discussed), and if the user is assigned a role that is eligible to be a Lead of a service team, then a single such tile 5018 is presented on the Manage Teams screen—one corresponding to the logged-in user. If the logged-in user is assigned a role that is not eligible to be a Lead of a service team (example: according to some embodiments, Craftsman), and if such user has not been assigned to a service team, then the user will not be able to reach the Manage Teams screen, because such user will not have been assigned a system-of-focus, and will presently be viewing a screen such as the one depicted in FIG. 17E—this is not the case in the scenario being discussed presently. As can be seen, the tile 5018 includes a name label 5020 stating the name of the user to which it which it corresponds (i.e., in this example, the logged-in user, Rafael Nadal), and also includes a title label 5022 indicating the title of the user (in this example, Rafael is a foreman). The tile 5018 also includes a Lead indicator label 5024 that indicates whether or not the user to which the tile 5018 corresponds is the Lead of the team presented via the screen. As depicted in FIG. 17O, the logged-in user is presented as the Lead of the non-existent team, under the assumption that the logged-in user has accessed the Manage Teams screen in order to create a team that will be assigned to the system-of-focus, and by virtue of having created such a service team, the logged-in user will be the Lead of such team. Although no other team member tiles 5018 are depicted in FIG. 17O, had they existed, they would include the same sort of data elements (although the Lead indicator label 5014 within the other tiles 5014 would either be blank or otherwise indicate that such other corresponding team members are not Leads of the team). According to some embodiments, such other tiles 5018 would be situated on the screen beneath the particular tile 5018 corresponding to the Lead, so that the tile 5018 corresponding to the Lead is always at the top. Finally, the tile 5018 includes a radio button 5026. The radio button 5026 in FIG. 17O is grayed out to indicate it is deactivated, i.e., will not respond to a user tap. Had there been other tiles 5018 on the Manage Teams screen, the radio buttons 5026 situated within such tiles 5018 may not have been grayed out, and the logged-in user, if the team Lead, could tap one of such other buttons 5026, thereby "unchecking" such tapped radio button 5026 to remove from the service team the user corresponding to the tile 5018 within which such tapped button 5026 was situated (the logged-in user, if the Lead, could re-tap such button 5026 thereby restoring the check to the radio button 5026 and returning the such user to the service team). According to some embodiments, removal of members from the service team is effected when the user taps the exit button 5030 to return to the screen depicted in FIG. 17F. This topic is discussed below. When constructing the screen, the app will activate the radio button 5026 in a given tile 5018 only if: (i) the logged-in user is the Lead of the service team; and (ii) the tile 5018 corresponds to a user that does not have his or her digital personal lock added to or securing the virtual lockbox corresponding to the system-of-focus (exemplary operations for accessing local memory to make such a determination have been previously described and are not reiterated here, for the sake of brevity). If, for a given radio button 5026, these two conditions are not met, then the radio button 5026 is presented in grayed-out form and is deactivated. The first condition means that only a Lead of a given service team may add or remove team members—other users accessing the Manage Teams screen (i.e., those who are not the Lead of the team presented via such screen) are therefore limited to simply viewing the identities of other members of the service team of which he or she is a member. The second condition means that for so long as a given team member has his or her digital personal lock added to or securing the virtual lockbox corresponding to the system to which the service team is assigned, the user cannot be removed from the team by the Lead. Finally, if the logged-in user is a Lead of the service team presented via the Manage Teams screen (this condition is tested in operation 3326), then app will construct the screen so as to include an add team members button 5028 (operation 3328), which the user may tap to access a screen by which to view other users eligible to be added to the service team being presented via the Manage Service Teams screen, and to add one or more such users to such service team, if desired.

Figure 17P:
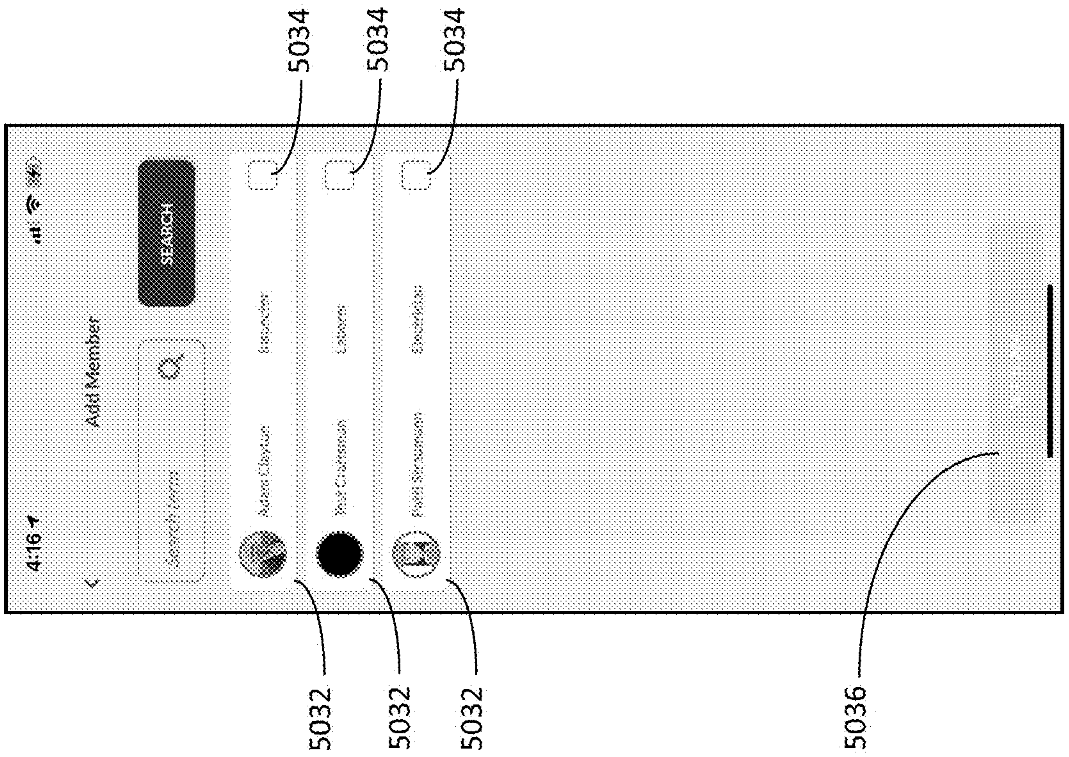
FIG. 17P depicts another exemplary embodiment of a user interface screen that may be used in connection with the various embodiments of the aforementioned app disclosed herein.

In response to the logged-in user tapping the add team members button 5028, such tap is detected, and the app responds by invoking one of the mobile APIs 1804 (example: getFacilityUsers) in order to obtain a list of and information concerning users available to be added to the service team, which the logged-in user may do via the Add Team Members screen. An embodiment of the Add Team Members screen is depicted in FIG. 17P-data received in response to the aforementioned API 1804 call is used to populate such screen. According to some embodiments, in response to invocation, the middleware associated with the getFacilityUsers API 1804 searches the previously mentioned user registration tables and team members table in order to identify the users having a top-level entity or employer matching that of the logged-in user, an assigned facility matching that of the logged-in user, and no team membership. In other words, the middleware searches for other users that report to the same employer, work at the same facility, and are not otherwise already assigned to a team (other than as a Lead, where, according to some embodiments, a user may be a Lead of a team, and yet added to another team). Example data operations to perform such identification of users have been disclosed herein and are not recited here, for the sake of brevity. Such identified user may be expressed as a list of user IDs satisfying such criteria. According to some embodiments, for each user ID found to have satisfied the above-mentioned conditions, the user ID data is supplemented with other data by using the user registration tables so that the following is returned for each user identified as being eligible to be added to a service team: (i) user ID; (ii) name; (iii) email; (iv) role; (v) title; (vi) a path that articulates a location at which an image of the user corresponding to the user ID may be accessed; (vii) a NULL team ID; (viii) a NULL or False indicator of whether the user corresponding to the user ID is the Lead of the team to which he or she may be added in the wake of the response of the middleware to this invocation; and (ix) a TRUE indicator of whether the user corresponding to the user ID is available to be added to a team. This data set is returned to the app by the middleware. The data set returned to the app can be thought of as containing team entries, with each entry containing data describing a particular user available to be added to the service team. In the wake of receiving the response from the API 1804, the app stores the response data and uses such data to construct the Add Team Members screen.

FIG. 17P depicts an example of a constructed Add Team Members screen. The structure of the Add Team Members screen is parallel to that of the Manage Teams screen (FIG. 17O). It contains a tile 5032 for each user that is available to be added to the service team. Each tile 5032 contains the same informational elements as the tiles 5018 of the Manage Teams Screen. For the sake of brevity those informational elements are not discussed here. Each tile 5032 includes a checkbox 5034. The checkbox 5034 may be tapped by the user in order to produce a "check" within such checkbox 5034, and may be tapped again to remove such "check." The Add Team Members screen includes a set team button 5036. In the example depicted in FIG. 17P, the button 5036 is grayed out, because not a single checkbox 5034 contains a check. If even one checkbox 5034 were to contain a check, the button 5036 would be activated and therefore responsive to a user tap. If the set team button 5036 were activated, the user could tap that button 5036 to add users corresponding to tiles 5032 containing checked radio buttons. In other words, the user taps a checkbox 5034 to indicate a corresponding user is to be added to the service team (i.e., the particular service team presented via the Manage Teams screen from which the user navigated to this Add Team Members screen), and then taps the set teams button 5036 to, in fact, add those users to the service team. The operations involved in adding such users to the service team are discussed below.

The exemplary screen of FIG. 17P includes three tiles 5032. In reality, such a screen may contain more than fifty or a hundred such tiles 5032. Such a quantity of tiles 5032 would make scrolling through each tile to locate the particular sought-after user (for addition to a service team) inconvenient, albeit possible. To make the screen's function more convenient for the user, the screen includes a search bar 5038. The user may enter a term in the search bar, and the app will respond by filtering the tiles 5032 presented via the screen to include only those tiles 5032 containing informational elements matching the term in the search bar 5038. In other words, the user may enter a name or a title ("Mike," "Patti," "electrician," "plumber," "inspector," etc.), and the screen would present only those tiles 5032 corresponding to users named "Mike" or "Patti," or having a title of "electrician," "plumber" or "inspector." The search feature facilitates convenient team construction.

Figure 17Q:
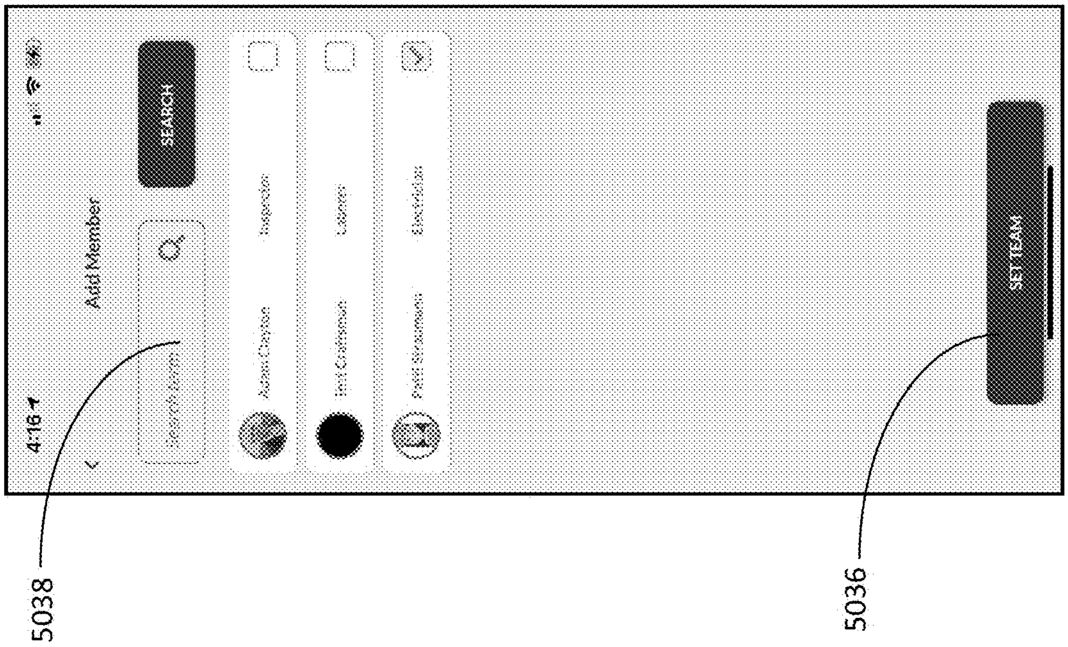
FIG. 17Q depicts another exemplary embodiment of a user interface screen that may be used in connection with the various embodiments of the aforementioned app disclosed herein.
Figure 17R:
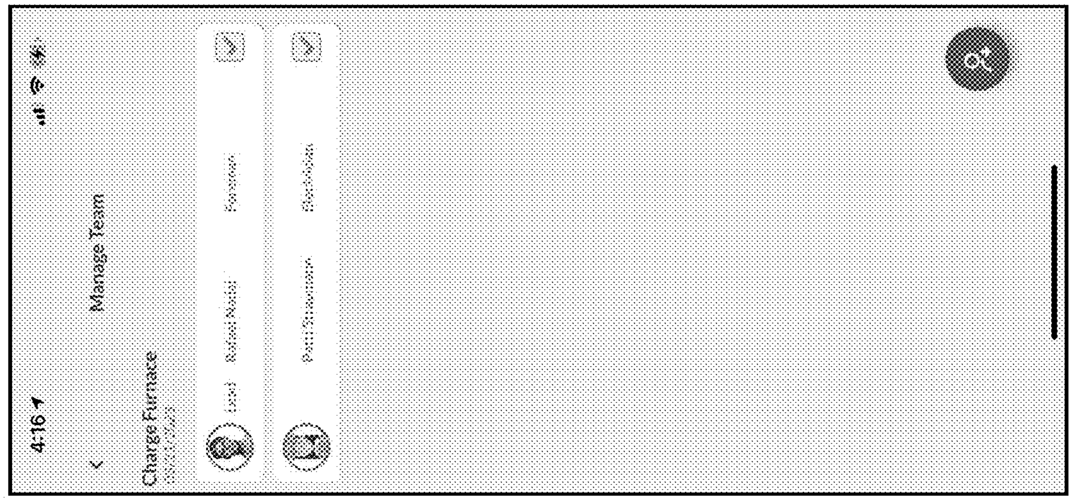
FIG. 17R depicts another exemplary embodiment of a user interface screen that may be used in connection with the various embodiments of the aforementioned app disclosed herein.

To demonstrate a hypothetical team construction, the reader is asked to assume that the user (Rafael) intends to add the electrician, Patti Straumann, to his service team. Thus, according to the above description, the user would tap the particular checkbox 5034 situated in the tile 5032 containing her name. This action would result in a check being added to such checkbox 5034 and the set team button 5036 being activated. This result is depicted in FIG. 17Q. Thereafter, the user would tap the set team button 5036 to actually add Patti Straumann to the service team.

Figure 23:
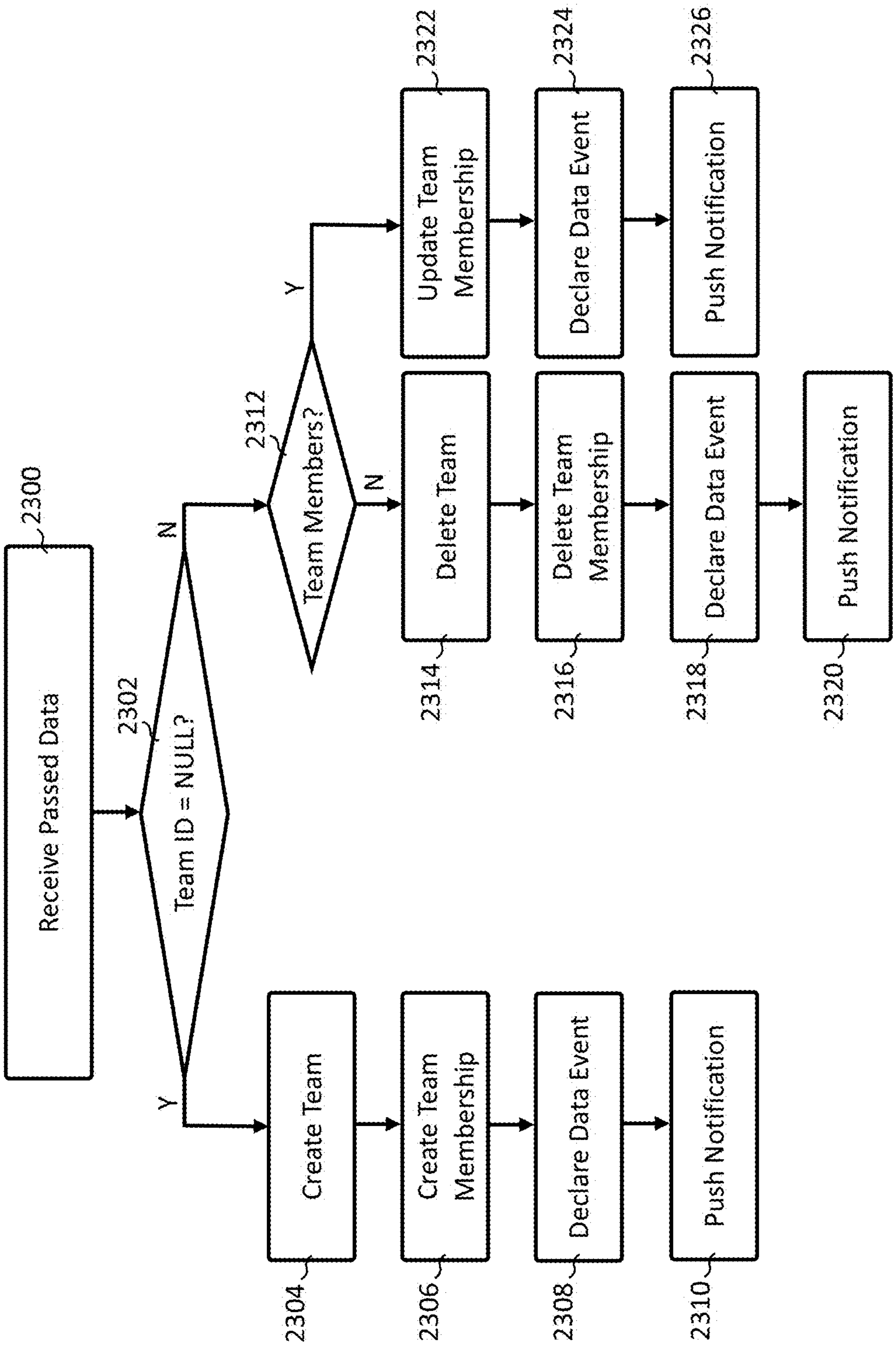
FIG. 23 depicts an exemplary embodiment of certain software that may execute upon the various embodiments of the backend computing platform of the various embodiments of the safety system disclosed herein.
Figure 24:
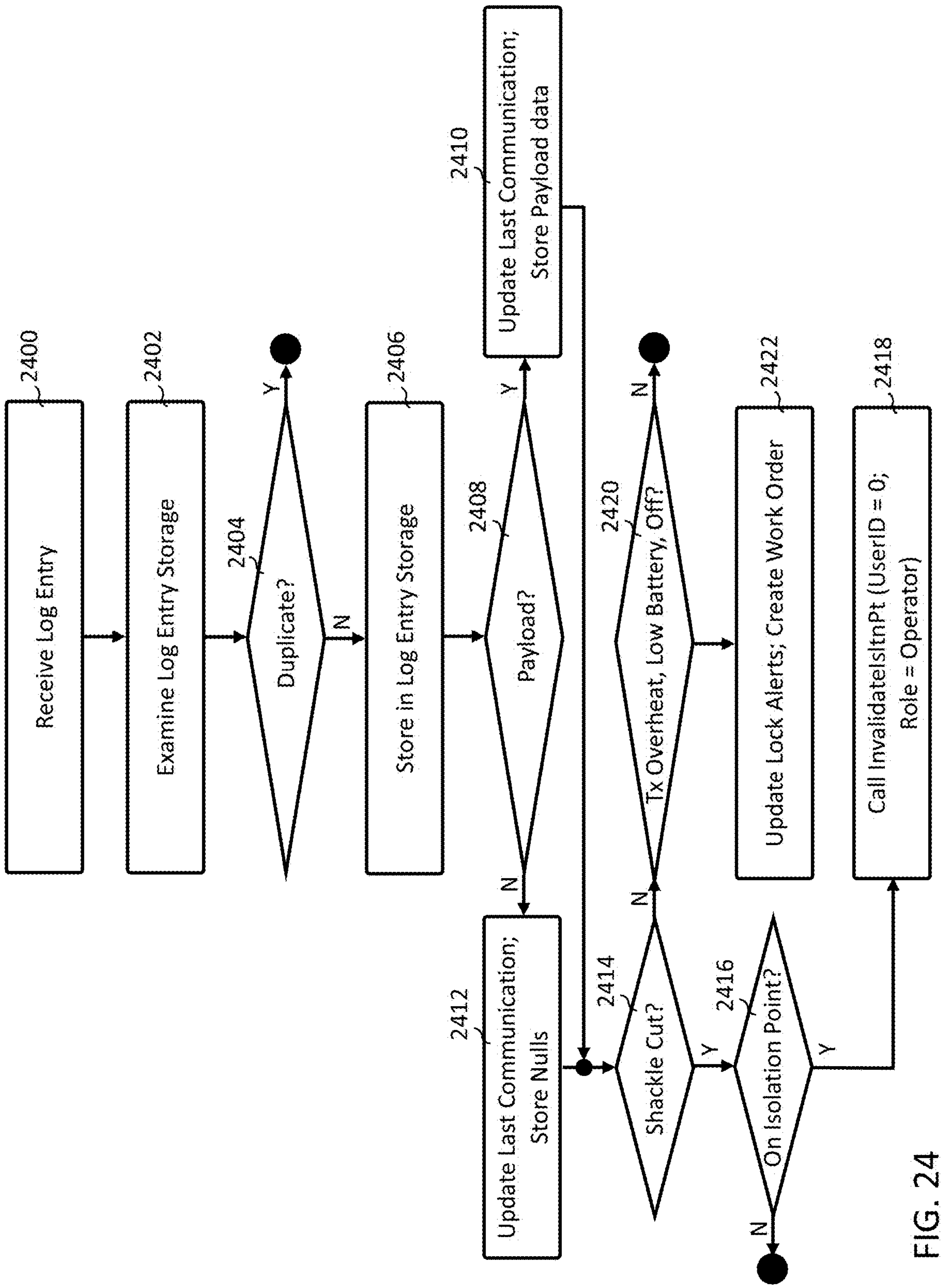
FIG. 24 depicts an exemplary embodiment of certain software that may execute upon the various embodiments of the backend computing platform of the various embodiments of the safety system disclosed herein.

Upon tapping the set team button 5036, such tap is detected by the app, and the app responds by calling a particular API 1804 (Example: setTeam) exposed by the backend computing platform 1208. According to some embodiments, in connection with invocation of the setTeam API 1804, the app passes: (i) the team ID of the team, the membership of which is to be updated; and (ii) the user IDs of the complete roster of members that are to constitute the team as newly configured. The middleware associated with the setTeam API 1804 responds by updating the team membership to reflect the new roster information. FIG. 23 depicts the response of the middleware associated with the setTeam API 1804. According to some embodiments, the setTeam API 1804 is also invoked in response to a user tapping the exit button 5030 situated on the Manage Teams screen (FIG. 17O). Thus, user additions to a service team are effected in response to a tap of the set team button 5036, while user removals from a service team are effected in response to unchecking a radio button 5026 corresponding to a user to be removed from a service team, and then tapping the exit button 5030 to return to the screen of FIG. 17F.

As can be seen from FIG. 23, the middleware associated the setTeam API 1804 begins its response to invocation by receiving the information passed to it in connection with its invocation (operation 2300), e.g., (i) a team ID that identifies the particular team that is to have its membership roster updated, and (ii) the user IDs identifying each particular user that is to belong to the service team as newly constituted. In certain situations, a service team may not pre-exist the invocation of the setTeam API 1804. Pursuant to the example being discussed, the user Rafa is creating an entirely new service team with two members: (i) Rafa, himself, as Lead of the new team; and (ii) Patti Straumann as an electrician assigned to the team. According to some embodiments, in a situation in which the membership roster communicated to the setTeam API 1804 is associated with a newly created team, the team ID passed to the setTeam API 1804 may be NULL. This may indicate to the middleware that the associated membership roster refers to a team that is to be created by the middleware, as opposed to referring to a pre-existing team that is to be updated to reflect a new member constitution. Thus, in operation 2302, the team ID passed to the middleware in connection with its invocation is tested to determine whether it is NULL or, instead, contains a valid team ID. In the example being discussed (where Rafa is creating a new service team with a single member other than himself-Patti Straumann), the team ID would be NULL, and control would therefore pass to operation 2304.

In operation 2304, the previously-described teams table is updated to include a new record reflecting the creation of a new team. In other words, creation of the record in the teams table effects creation of the team. Thus, for example, such new record may include: (i) an auto-generated team ID that uniquely identifies the service team; (ii) the user ID of the logged-in user (Rafa), identifying the user as the Lead of the team (and as the creator of the team); and (iii) the system ID of the particular system to which such service team is assigned, i.e., the system ID of the system-of-focus of the app. According to some embodiments, such record includes additional fields and data, including a unit ID identifying the unit within which the aforementioned system is situated, facility ID identifying the facility within which the aforementioned unit is situated, the title of the logged-in user, the role of the logged-in user, and an indication of whether the team is currently active.

After creation of the team in operation 2304, the membership of the team is created in operation 2306. For example, the middleware may create new records in the previously described team members table—one record for each member of the newly created team. Each such record may include: (i) the team ID; and (ii) the user ID of the user assigned to the team. According to some embodiments, each such record may include other data, such as an auto-generated team membership ID that uniquely identifies a particular instance of a particular user belonging to a particular team. In other words, the middleware records the team membership roster in the database 1800.

Next, in operation 2308, the middleware interacts with the server-side aspect of the asynchronous data updating framework 1806 to declare the occurrence of a data event affecting either the Publication devoted to the just-created team or devoted to the system to which the team is assigned to service. This causes all of the instances of the app that have subscribed to the aforementioned Publications to update their service team membership data, according to the operations described previously.

Finally, in operation 2310, the middleware pushes a notification to each of the users that have been added to the service team, alerting them to the fact that they have been assigned to a service team. According to this example, the user Patti Straumann would receive such a notification. According to some embodiments, the app may include a client-side notification framework, and while performing the operations making up the Login state 1600, the app may invoke such framework to obtain a notification framework ID, which is an identifier that uniquely specifies the device-app combination so that a push notification may be directed to the particular instance of the app executing on a particular device 1211 being accessed by the user. If the ID does not already exist, the client-side framework creates the identifier, and sends it to a server-side counterpart which associates the ID with the connection required to push a notification to the app-device pair. The client-side framework responds to the aforementioned invocation by returning the notification framework ID to the app, which communicates it to the backend computing platform 1208 via an API 1804. The ID is then stored in the database 1800, so as to preserve an association between the user ID of the logged-in user of the app and the notification framework ID. Therefore, the middleware may invoke an API exposed by the server-side aspect of the notification framework with the notification framework ID, a title for a push notification, and a message body to be used in connection with such notification, along with other data according to some embodiments, and the server-side aspect of the notification framework will respond by generating a push notification directed at the instance of the app executing on the particular device 1211 specified by the notification framework ID. According to some embodiments, the server-side aspect of the notification framework executes on a server system remote from the backend computing platform 1208, and the middleware communicates with such server-side aspect of the notification framework via the Internet 1802. Firebase Cloud Messaging is a contemporary example of such a remote server-side aspect of a notification framework.

Returning discussion to test operation 2302, in the event that the team ID passed to the middleware is a valid team ID (as opposed to being NULL, as just discussed), then control is passed to operation 2312. In operation 2312, the membership roster (e.g., list of user IDs) passed to the middleware in connection with its invocation is examined. Recall that the setTeam API may be called in response to exiting the Manage Teams screen via the exit button 5030, and further consider that it is possible that the user (Lead) may have unchecked all of the radio buttons 5026 in each of the tiles 5018 on the Manage Teams screen, thereby effectively removing all of the users from the service team. In such a circumstance, the membership roster passed to the setTeam API 1804 will be empty, indicating that the team should be dismantled. Thus, in operation 2312 the membership roster is examined to determine whether it is empty. If it is, in fact, empty, then control is passed to operation 2314.

In operation 2314, the middleware deletes the team. For example, the middleware accesses the teams table, locates the record with a team ID matching that which was passed to setTeam in connection with its invocation and deletes such record. Thereafter, control is passed to operation 2316.

In operation 2316, the middleware deletes the team membership, i.e., dissociates the users from the now-deleted team. The middleware accesses the team members table, locates the records with a team ID matching that which was passed to setTeam in connection with its invocation and deletes all such records. Thereafter, control is passed to operation 2318.

In operation 2318, the middleware interacts with the server-side aspect of the asynchronous data updating framework 1806 to declare the occurrence of a data event affecting either the Publication devoted to the just-deleted team or devoted to the system to which the team had been assigned to service. This causes all of the instances of the app that have subscribed to the aforementioned Publications to update their service team membership data to reflect the dissolution of the team, according to the operations described previously. Next, in operation 2320, push notifications are sent to all of the users that were just removed from the team (i.e., to each of the app/device pairs associated with the user IDs that were entered in the record(s) located in the team members table prior to the deletion of such record(s) in operation 2316). For example, the push notifications may be sent as described in the context of operation 2310.

Returning to discussion of operation 2312, it may be the case that the membership roster is determined not to be empty (e.g., the list of user IDs passed to the setTeams API 1804 may not be empty). In such circumstances, control is passed to operation 2322, where the middleware updates the team membership roster to match that passed to it in connection with its invocation. For example, the middleware may access the team members table to locate all records therein containing a team ID matching that passed to the SetTeams API 1804. If any of those records contain a user ID not contained in the aforementioned list of user IDs, then such record is deleted, and if any user ID contained within the aforementioned list of user IDs is not found in a record in the team members table, then a new record containing such user ID and team ID is created, in order to reflect such new enrollment of such user on such service team.

In operation 2324, the middleware interacts with the server-side aspect of the asynchronous data updating framework 1806 to declare the occurrence of a data event affecting either the Publication devoted to the just-updated team or devoted to the system to which the team has been assigned to service. This causes all of the instances of the app that have subscribed to the aforementioned Publications to update their service team membership data to reflect the membership roster of the team, according to the operations described previously. Next, in operation 2326, push notifications are sent to all of the users that were just removed from or added to the service team (i.e., to each of the app/device pairs associated with the user IDs that were entered in the record(s) located in the team members table prior to the deletion of such record(s) in operation 2322, and to each of the app/device pairs associated with the user IDs that were entered in the record(s) added to the team members table during execution of operation 2322). For example, the push notifications may be sent as described in the context of operation 2310.

Discussion now turns to the operational response of the app to a user tap of the unlock lock button 1716. The unlock lock button 1716 is depicted, for example, in FIG. 17F, and as depicted therein it is grayed out. According to some embodiments, use of the unlock lock button 1716 is restricted to users having been assigned a particular role. For example, it may be the case that only users assigned an Operator role are permitted to access the unlock button. The reader will note that the particular user logged into the app in the context of FIG. 17F has been assigned a Foreman role. Thus, the button 1716 is grayed out. This discussion assumes the button is active (i.e., not grayed out) and therefore responsive to a user tap.

Briefly, the unlock lock button 1716 is used by a user (if permitted) to: (i) establish a communication session with a lock; (ii) identify the lock; (iii) communicate with the backend computing platform 1208 in order to indicate that the app is initiating an unlock command vis-à-vis the particular lock identified during the session; (iv) cause the backend computing platform 1208 to determine whether the lock may be safely unlocked; (v) in the event of a positive determination, cause the backend computing platform 1208 to respond to the app with a payload including a digital key that may be used to unlock the aforementioned lock; (vi) send an unlock command to the aforementioned lock, including the aforementioned digital key in the payload of such command; and (vii) communicated with the backend computing platform 1208 in order to cause the platform 1208 to reflect the proper state of the lock in view of it having been unlocked (example: dissociate the lock from any isolation point with which it may have been associated).

An unlock operation may be begun via detection of a button 1716 tap event by the app (operation 3330). In response to such detection, in operation 3332, the app scans for the presence of locks advertising to establish a connection via Bluetooth, and, in the wake of identifying such a lock, establishes a Bluetooth connection therewith. (If there are plural such advertising locks, the app may present the user with a menu by which the user may select the particular lock with which he or she wishes the app to establish a communication link.) The communication link need not be Bluetooth. Any communication capacity shared by the lock and the device 1211 on which the app is executing will suffice (example: each may be equipped with wireless data capability, e.g., 3G, 4G, 5G, etc., and communicate via wireless data).

Next, in operation 3334, the app uses the communication link established in operation 3332 to issue a command to the lock, by which it requests certain lock information. In response, the app receives, via the communication link, a set of lock information from the lock. The set of lock information includes a lock identifier (e.g., a lock ID) and an indication of whether the lock, itself, is in a locked state or an unlocked state. According to some embodiments, other data is also returned. Such other data is not relevant in the context of the present discussion.

In operation 3336, the app makes an API 1804 call (RequestKey). The purpose of the call is to request the particular digital key corresponding to the lock with which the app has established a communication link in operation 3332. According to some embodiments, the app passes the lock ID received in operation 3332 to RequestKey 1804 in the course of the API 1804 call. The middleware associated with the RequestKey API 1804 responds by accessing the database 1800 to: (i) determine whether the lock ID is associated with any isolation point, i.e., whether the lock is indicated as securing an isolation point-if not, then it is permissible to return a digital key to the app by which the lock may be unlocked; (ii) if the lock is associated with an isolation point, access the database to determine which particular system the isolation point is a member of; (iii) access the database to determine whether the virtual lockbox corresponding to the aforementioned system has any digital personal lock securing it-if not, then it is permissible to return, to the app, the digital key corresponding to the aforementioned lock.

For example, to determine whether the lock ID is associated with any isolation point, the previously-mentioned isolation point table may be accessed to determine whether any record therein contains the lock ID passed to the RequestKey API 1804 in connection with its invocation. If not, then the lock ID is not associated with any isolation point, meaning the digital key corresponding to the lock may be returned. Thus, the middleware may access the previously-mentioned locks table, and search for the particular record containing the aforementioned lock ID, and upon locating such record, the digital key may be extracted from such record and returned to the app. On the other hand, if the isolation point table does, in fact, contain a record including the aforementioned lock ID, then the system ID contained in such record may be read in order to determine the particular system the isolation point is a member of. Next, to determine whether the virtual lockbox corresponding to the aforementioned system has any digital personal lock securing it, the previously-described digital personal lock table may be accessed to search for any record including the system ID. If no such record exists, then no digital personal lock is currently securing the aforementioned virtual lockbox, meaning the digital key may be retrieved and returned to the app as just described, above. On the other hand, if such a record is located, then a digital personal lock is currently securing the aforementioned virtual lockbox, and an error code is returned to the app instead of the digital key.

According to some embodiments, a digital key is uniquely assigned to each physical lock, as described previously, above. Thus, each record in the aforementioned locks table contains a unique digital key. According to other embodiments, digital keys are reused from lock-to-lock. For example, the same key could be used across a batch of locks or across all locks assigned to a facility or all locks assigned to a client. Thus, in response to a RequestKey API 1804 call, an error code may be returned (or simply a NULL key) if the system ID connected with the call has a digital personal lock on its corresponding virtual lockbox (as described above). But if the lock is not associated with an isolation point, or if the lock is associated with an isolation point that is a member of a system with no digital personal lock is securing its corresponding virtual lockbox at the time of such API 1804 call, then a digital key is returned—a digital key required to unlock the specific physical lock referred to by the lock ID included in the RequestKey API 1804 call, but also used to unlock other locks. Thus, in some embodiments—where the same digital key is used across an entire facility, for example, there is no need to refer to the database 1800 to retrieve the digital key needed to unlock a lock—the key may be hardcoded into the firmware.

Figure 16Q:
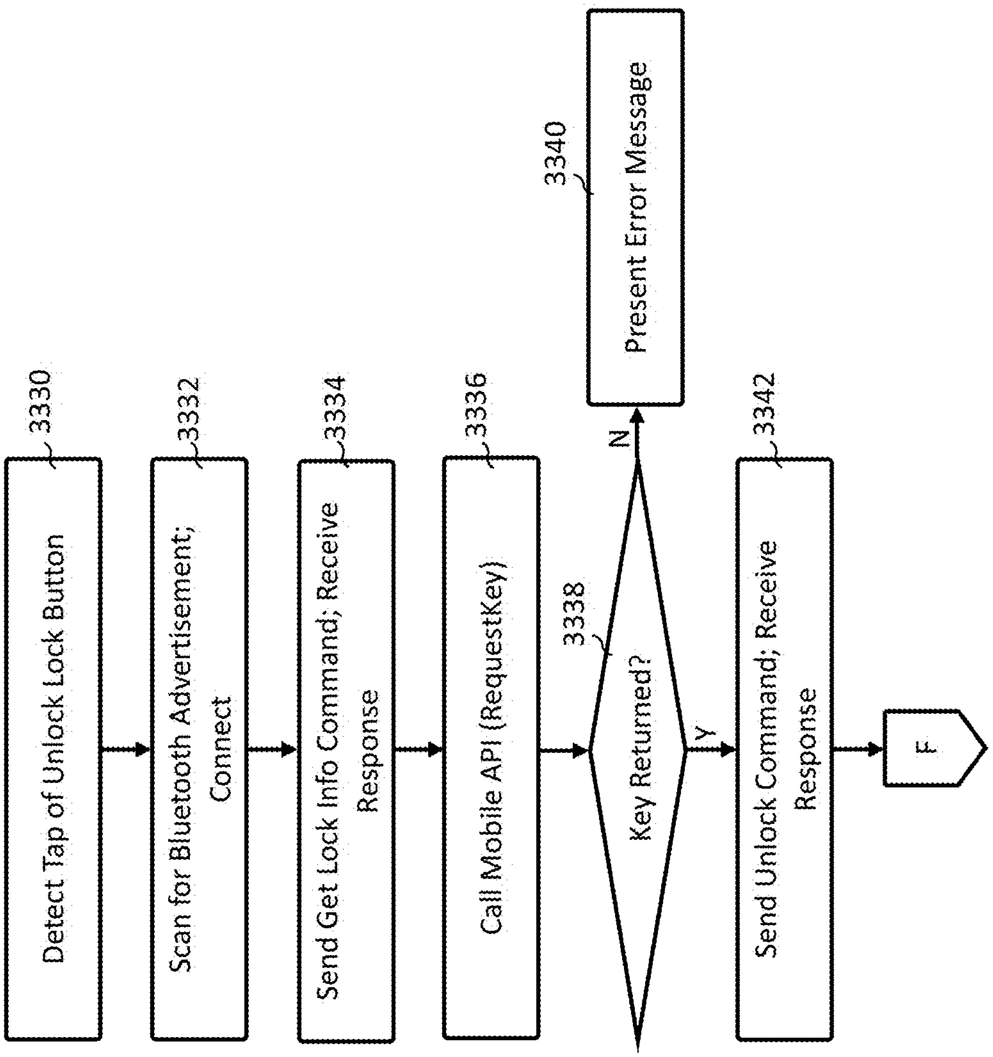
FIG. 16Q depicts another portion of a state transition diagram or flowchart describing the operational and state flow of various embodiments off an app that may execute on a microcontroller of processor of a mobile device that may be used in connection with various embodiments of the safety system disclosed herein.
Figure 16R:
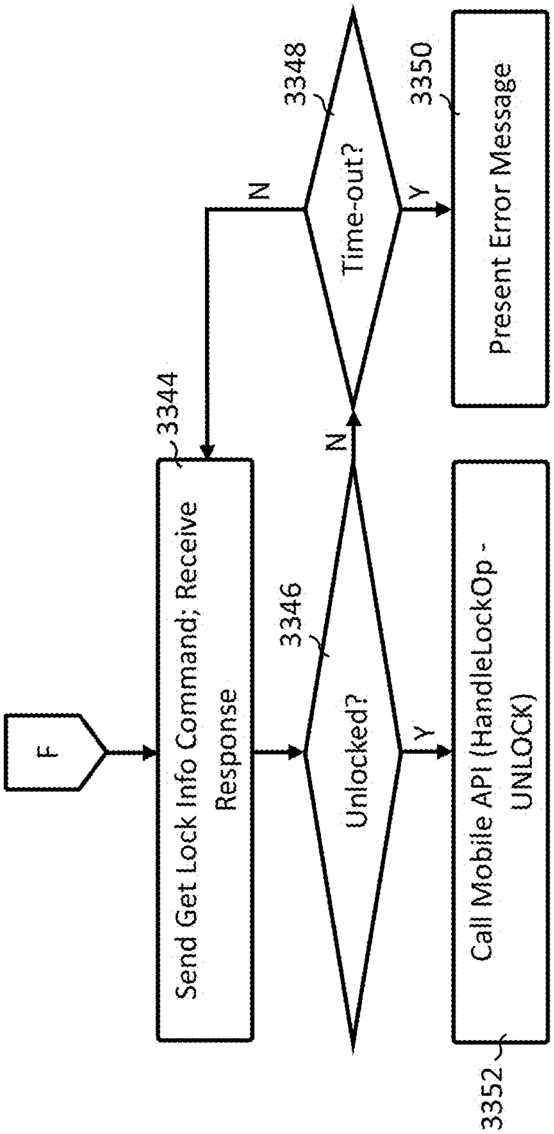
FIG. 16R depicts another portion of a state transition diagram or flowchart describing the operational and state flow of various embodiments off an app that may execute on a microcontroller of processor of a mobile device that may be used in connection with various embodiments of the safety system disclosed herein.
Figure 16S:
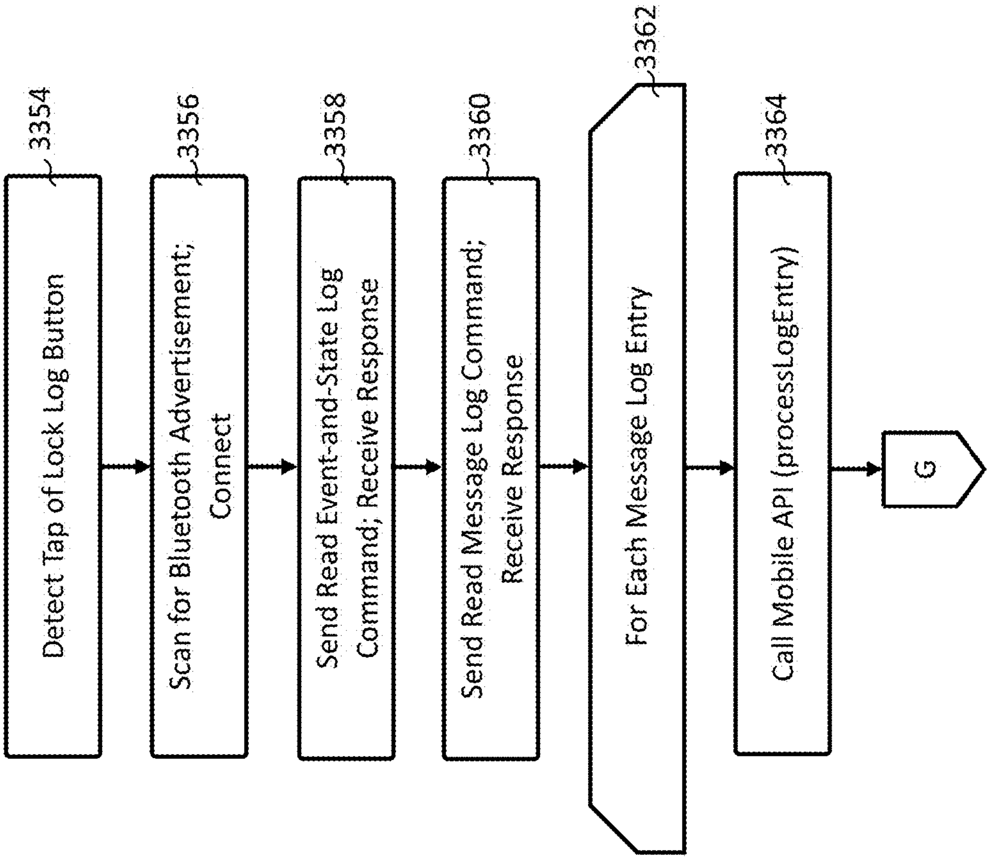
FIG. 16S depicts another portion of a state transition diagram or flowchart describing the operational and state flow of various embodiments off an app that may execute on a microcontroller of processor of a mobile device that may be used in connection with various embodiments of the safety system disclosed herein.

Returning to discussion of FIG. 16Q, the response of the platform 1208 to invocation of the RequestKey API 1804 is tested in operation 3338. If the payload of the response is NULL or contains an error code, then this means that the middleware associated with RequestKey 1804 determined that it was not permissible to return the digital key required to unlock the lock, for reasons previously discussed. In such a circumstance, an error message is presented by the app, indicating that the lock is protecting a system that has at least one digital personal lock securing its lockbox and that the corresponding individuals must cease servicing the system and remove their personal digital locks before this operation can be performed (operation 3340). On the other hand, if, in operation 3338, the payload of the response is found to contain a valid digital key, then operational control is passed to operation 3342.

In operation 3342, an unlock command is sent to the lock. The command carries the digital key returned to the app in operation 3336. The command may be delivered via the communication channel established in operation 3332. Upon receiving a response from the lock, the app sends a command to the lock by which it requests certain lock information, including whether it the lock is in a locked state or an unlocked state (operation 3344). For example, in operation 3344, the app may send a command identical to the one issued in operation 3334. Thus, in operation 3344, the app is seeking data generated from the sensors of the lock, itself, that indicate whether the lock is locked or unlocked. The response of the lock is received (operation 3344), and then tested in operation 3346. If the response indicates that the lock is in a locked state (despite having been issued an unlock command in operation 3342), then control is passed to operation 3348, whereupon it is determined whether more than a threshold period of time has elapsed since issuance of the unlock command in operation 3342 (example: 5 seconds). If not, then the app returns to operation 3344 and once again seeks the state of the lock. The app will traverse the loop defined by operations 3344, 3346 and 3348 until the lock either responds to the information request of operation 3344 by indicating that its sensors conclude that the lock is unlocked or until the threshold period of time has elapsed. If the aforementioned threshold period elapses without the response indicating that the lock actually entered an unlock state, then an error message is returned to the user, indicating that the lock was unable to be unlocked (operation 3350). On the other hand, if the lock does, in fact, respond to the information request of operation 3344 by indicating that its sensors conclude that the lock is unlocked, then operational control is passed to operation 3352.

In operation 3352, the app makes an API 1804 call (HandleLockOp) to update the database 1800 to reflect having unlocked the lock. For example, the app may call an HandleLockOp API 1804, passing data indicating occurrence of a given action (a lock UNLOCK) and a lock ID. The middleware determines its flow based upon the action type (i.e., UNLOCK), and then responds by: locating a record in the aforementioned isolation point table with a matching lock ID. If no such record exists, then the actions of the middleware may be complete, according to some embodiments. According to some embodiments, the lock table is updated to reflect that the lock associated with the aforementioned lock ID has been unlocked, prior to the completion of actions. On the other hand, if such a record does, in fact, exist then the middleware updates its previously-described fields to indicate that the state of the isolation point is unlocked (e.g., according to previous examples, the state value is set to zero), to reflect the user ID of the logged-in user as the individual that removed the lock from the isolation point, to reflect the time/date stamp of such lock removal, to clear the lock ID field so that no lock ID continues to be associated with the isolation point described by the record (e.g., record a NULL in such field, to clear the field identifying the user ID of the individual that initially placed a lock at the aforementioned isolation point, to clear the field indicating the time/date stamp of such initial lock placement, to clear the field identifying the user ID of the individual may have verified such initial lock placement on the aforementioned isolation point, to clear the field indicating the time/date of such verification, to clear the field identifying the user who may have asserted an invalidation of such lock placement (and, potentially, verification and confirmation thereof), and to clear the field indicating the time/date stamp of such invalidation. Finally, the isolation point ID is read from the aforementioned record in the isolation point table that had contained the matching lock ID (prior to being cleared), and the previously mentioned confirmation table is accessed, and all records containing a matching isolation point ID are deleted. Thus, the actions of the middleware return an isolation point on which the just-unlocked lock had been placed to a state wherein it is associated with no lock, is reflected to be in an unlocked state, and has no active assertions relating to a lock (e.g., no placement, confirmation, verification, or invalidation). Finally, in addition to updating the database 1800 as just described, the middleware associated with HandleLockOp 1804 interacts with the server-side aspect of the asynchronous data-updating framework 1806 to declare the occurrence of a data event impacting the particular System Publication corresponding to the system ID with which the isolation point ID (from the aforementioned record in the isolation point table) is associated. And via mechanisms similar to those described previously, the user interfaces of those particular apps that have subscribed to the aforementioned System Publication are updated to reflect the unlock operation. For the sake of brevity, the aforementioned mechanisms relating to refreshing user interfaces of subscribing app instances is not reiterated here.

Discussion now turns to the operational response of the app to a user tap of the lock log button 1718. As discussed previously, according to some embodiments, the firmware executing on a lock 1808 may be structured as state machine, wherein certain events cause the lock to transition from one state to another. According to some embodiments, as each event occurs, it is entered into a log that is maintained onboard the lock 1808, either in its volatile or non-volatile memory, as discussed previously. According to some embodiments, only a subset of such events is logged. Additionally, according to some embodiments, with the transition of the firmware into each state, each state is logged. According to some embodiments, only a subset of such states is logged. Thus, conceptually, such a log may be structured as:

$\{state_1, event_1, state_2, event_2, state_3 \ldots\}$

The entries within the log need not alternate in a strict state-event-state-event pattern. In general terms, the log contains information concerning the operational flow of the firmware, itself, and also contains information concerning events that the lock has had visited upon it. According to some embodiments, the log is dimensioned so that it can hold a quantity of states and events expected to occur during a service event, such as a turnaround event. For example, the log may be dimensioned to hold a quantity of states and events expected to occur over the span of at least one month or two months or three months, or longer.

Conceptually, an integer may be uniquely assigned to each event and state, so that the integer can be interpreted as indicating a state or event, and can be stored in a log, such as in a circular list, with the oldest entries exiting the list. Therefore, each such entry may be structured as:

{timestamp, state/event ID, unique ID}, so that the log records lock states and events (identified by the state/event ID integer), and a timestamp indicating the time or approximate time at which such event occurred or such state was entered. Each entry may also include a number that uniquely identifies it. According to some embodiments, the timestamp data may reflect precision down to only one second (or one minute, and so on), with further reflection of precision being sacrificed for the purpose of reducing data size. In the context of such embodiments, if the same event or state were to occur or be entered within the same one-second interval (or one-minute interval, as the case may be, and so on), a simple timestamp-state/event ID pair would be insufficient to uniquely identify the state or event. Thus, the pair may be augmented with another data element to form a triplet, such as an integer indicating position within the log (e.g., fifth entry in the log or ninety-ninth entry in the log, and so on). Thus, each such log entry may be a triplet of data, wherein timestamp, event ID and the unique ID (e.g., position within the log) may be used together to uniquely identify a log entry (i.e., no other entry would have the same data in all three fields). Because this log contains entries identifying events and states, it may be referred to herein as the event-and-state log.

According to some embodiments, the firmware may maintain a second log, the entries of which reflect outbound message frames intended for reception by a gateway unit 1810 for subsequent communication to the backend computing platform 1208. The reception of such messages by the backend computing platform 1208 may be acknowledged by an inbound acknowledgement message that is ultimately broadcast from a gateway unit 1810 (such as the particular gateway unit 1810 that initially received the outbound message). According to some embodiments, if no such acknowledgement message is received by the firmware, the firmware may initially attempt to re-transmit the unacknowledged outbound message, and should re-transmission fail to result in receipt of an acknowledgment after a certain quantity of re-transmission operations, the firmware may enter the outbound message in the aforementioned second log, so that the outbound message is preserved. Such logged outbound messages could therefore be the subject of a re-transmission operation at some point in the future, or could be manually shuttled to the backend computing platform 1208 via the mobile device 1211 acting as a proxy for a gateway unit 1810. For example, the app may query the lock for any messages stored in the second log, and may forward any such messages to the backend computing platform 1208 via wireless data service. According to some embodiments, such operations occur in connection with a user tap of the lock log button 1718. Examples of this are discussed in greater detail below. Because this second log contains entries identifying the contents of outbound message frames, it may be referred to herein as the message log.

According to some embodiments, certain occurrences of lock events are communicated as messages (via a gateway unit 1810) to the backend computing platform 1208. Examples: power on; battery installed; battery removed; shackle open; shackle cut; shackle closed; transceiver overheat; low battery; power off; Bluetooth-command-to-unlock-received; heartbeat message event. (The occurrence of these events are also stored in the event-and-state log.) Messages intending to communicate the occurrence of such lock events to the backend computing platform 1208 may be stored in the aforementioned message log, as discussed previously. Given the correspondence between the contents of the message log and the event-and-state log, according to some embodiments, each entry in the message log may be structured identically to those in the event-and-state log. Alternatively, each message may include additional data, such as battery level data and temperature data, so that, with the receipt of each message at the backend computing platform 1208, information concerning the battery level of the lock that sent such message is received, along with temperature data, so that such data can be tested in order to determine that a low battery event is imminent or that a lock is close to exiting its operating temperature range. Thus, conceptually, an entry in the message log may be structured as:

{timestamp, state/event ID, unique ID, battery level, temperature}.

According to some embodiments, each entry may include an explicit indication of whether the message was acknowledged as having been received by the backend computing platform 1208, such as by inclusion of a Boolean (true/false). This would permit the message log to contain a quantity of the most recently sent messages, whether or not acknowledged, and provide a basis for determining which of the logged messages had not been acknowledged. Thus, conceptually, each entry in the message log may be structured as:

{timestamp, state/event ID, unique ID, battery level, temperature, success}, where the success data is a Boolean, as just described.

With this background in place, discussion returns to the operational response of the app to a user tap of the lock log button 1718. Briefly, the lock log button 1718 may be used by a user to: (i) establish a communication session with a lock; (ii) to read all or a portion of the entries in the event-and-state log and the message log; (iii) to communicate the entries in the event-and-state log to the backend computing platform 1208 for storage of such entries so that the database 1800 contains a record of the operational flow of the firmware of the aforementioned lock, further contains a record of the events visited upon the lock, and also so that certain of the entries may be processed in order to properly respond to the occurrence of those events, if the occurrence of such event was not previously successfully communicated to the platform 1208; (iv) to communicate the entries in the message log to the backend computing platform 1208 for storage of such entries so that the database 1800 contains a record of the events visited upon the lock, and also for processing of certain of the entries in order to properly respond to the occurrence of certain events, if the occurrence of the event was not previously successfully communicated to the platform 1208; and (v) to display the some or all of the entries in the event-and-state log to the user. As discussed previously, according to some embodiments, if, with respect to a lock that is recorded in the database 1800 as securing a particular isolation point, no communication is received from such lock for longer than a threshold period of time, then the backend computing platform 1208 may transition the aforementioned isolation point out of the Locked state and into another state, such as a state indicating that the isolation point is ready for verification. This would have the result of causing the app to present the system of which the aforementioned isolation point is a constituent to exit a safe state, meaning all service activity on such system would have to be halted. Thus, there is an effective time deadline for receiving a communication from any given lock that is securing an isolation point. One particular consequence of using the lock log button 1718 is that, by virtue of the app communicating the entries within the event-and-state log and message log to the backend computing platform 1208, the lock is deemed to have communicated with the platform 1208, and the deadline is extended out by a period of time, such as a period of time equal to the aforementioned threshold.

Operations pertaining to the reading of the event-and-state log and message log may be initiated via detection of a button 1718 tap event by the app (operation 3354). In response to such detection, in operation 3356, the app scans for the presence of locks advertising to establish a connection via Bluetooth, and, in the wake of identifying such a lock, establishes a Bluetooth connection therewith. (If there are plural such advertising locks, the app may present the user with a menu by which the user may select the particular lock with which he or she wishes the app to establish a communication link.) The communication link need not be Bluetooth. Any communication capacity shared by the lock and the device 1211 on which the app is executing will suffice (example: each may be equipped with wireless data capability, e.g., 3G, 4G, 5G, etc., and communicate via wireless data).

Next, in operation 3358, the app uses the communication link established in operation 3356 to issue a command to the lock, by which it requests the return of entries within the event-and-state log. In response, the app receives, via the communication link, entries from within the event-and-state log from the lock, along with the lock ID identifying the particular lock with which the firmware is communicating. According to some embodiments, the app receives all of the entries in the event-and-state log. According to some embodiments, the app receives a requested quantity, or a quantity determined in the instruction base of the firmware, of consecutive entries in the event-and-state log, beginning at a requested position within the event-and-state log. According to some embodiments, the app receives a requested quantity, or a quantity determined in the instruction base of the firmware, of the most recent entries in the event-and-state log. Each entry may include the information discussed previously.

In a similar fashion to operation 3358, in operation 3360, the app uses the communication link established in operation 3356 to issue a command to the lock, by which it requests the return of entries within the message log. In response, the app receives, via the communication link, entries from within the message log from the lock, along with the lock ID identifying the particular lock with which the firmware is communicating. According to some embodiments, the app receives all of the entries in the message log. According to some embodiments, the app receives a requested quantity, or a quantity determined in the instruction base of the firmware, of consecutive entries in the message log, beginning at a requested position within the message log. According to some embodiments, the app receives a requested quantity, or a quantity determined in the instruction base of the firmware, of the most recent entries in the message log. Each entry may include the information discussed previously.

Figure 17S:
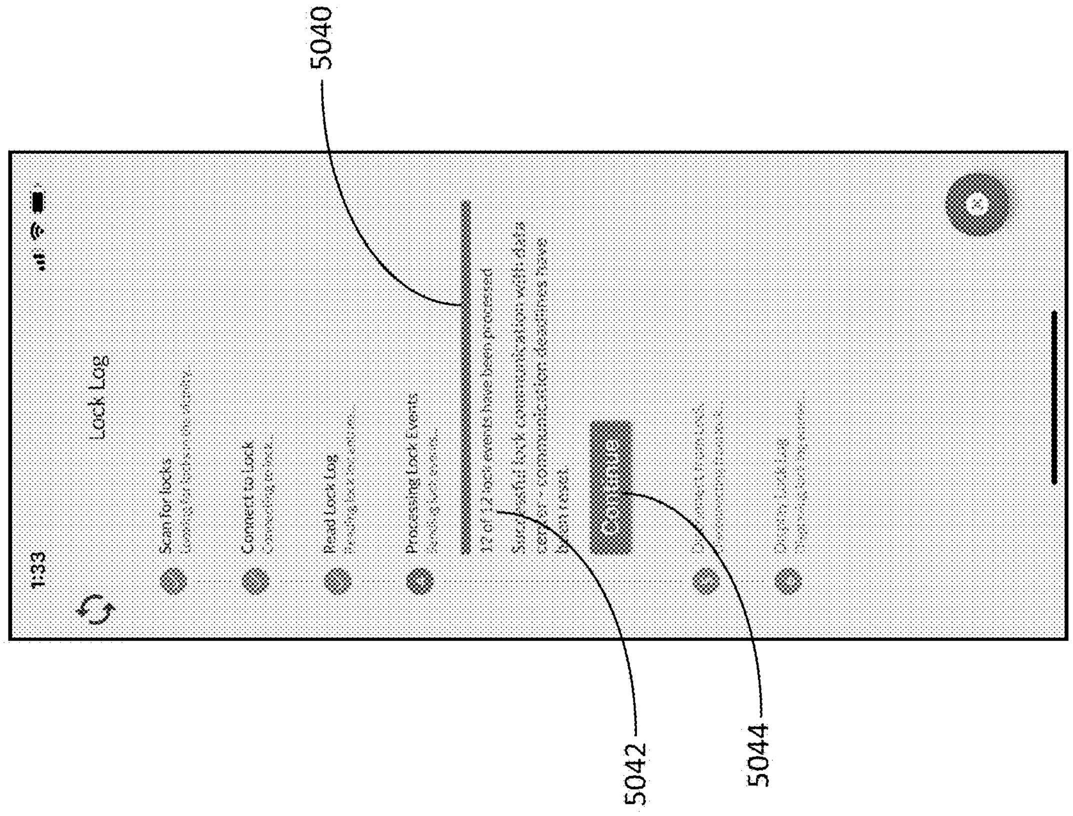
FIG. 17S depicts another exemplary embodiment of a user interface screen that may be used in connection with the various embodiments of the aforementioned app disclosed herein.

In the wake of operation 3360, the app traverses the loop defined by loop limit indicators 3362 and 3368. Therefore, operations 3364 and 3366 (discussed below) are performed once for each entry retrieved from the message log in operation 3360. In operation 3364, the app makes an API 1804 call (processLogEntry). The purpose of the call is to communicate the particular entry (and associated lock ID) identified by loop limit indicator 3362 to the backend computing platform 1208 for storage of such entries, so that the database 1800 contains a record of the events visited upon the lock, and also for potential processing if, for example, occurrence of the event indicated by such entry would potentially change the state of an isolation point if the occurrence of the event had not been previously successfully communicated to the platform 1208, or if occurrence of the event indicated by such entry would otherwise necessitate an operation above and beyond storage of the event in the database 1800. Operational flow of the middleware associated with the processLogEntry API 1804 is described below. As the loop defined by loop limit indicators 3362 and 3368 is traversed, the screen depicted in FIG. 17S may be presented by the app. As can be seen, according to some embodiments, the screen contains a progress bar 5040 that depicts the progress of the app in terms of shuttling the entries from the message log to the backend computing platform 1208. The length of the progress bar is increased in equal increments with each traversal of the loop defined by loop limit indicators 3362 and 3368, so that the user is kept appraised of the progress (operation 3366). Additionally, with each traversal of the aforementioned loop, an entry number label 5042 is updated for the same purpose (e.g., in the context of having retrieved twelve entries from the message log, "1 of 12 events has been processed" is updated to "2 of 12 events have been processed" and so on, until all of such entries have been shuttled, at which time the label would read "12 of 12 events have been processed"). According to some embodiments, upon the final traversal of the aforementioned loop, a message indicating that the aforementioned effective communication deadline associated with the particular lock with which the app established a communication link in operation 3356 has been reset (e.g., "Successful lock communication with data center—communication deadline has been reset."), so as to establish a new deadline for such lock that is further into the future than the previous deadline, as described previously. To provide the user an opportunity to see the aforementioned message, the app may introduce a continue button 5044 on the screen (operation 3366), and require that it be pressed by the user as a precondition of advancing. Although not discussed previously, the screen of FIG. 17S would have been presented immediately upon the user having clicked the lock log button 1718, although immediately after having pressed such button 1718, the screen would have appeared in a state indicating that a communication link with the lock was being established, in order to indicate that the app was, at that point, performing operation 3356.

Upon detection of the user having pressed the continue button 5044, operational flow advances and the app traverses the loop defined by loop limit indicators 3370 and 3374. Therefore, for each entry in the event-and-state log returned to the app in the context of operation 3358, the aforementioned processLogEntry API 1804 is called, and the particular entry indicated by loop limit indicator 3370 is passed to such API 1804 (along with the associated lock ID), so that upon conclusion of the traversal of the aforementioned loop, each such entry will have been passed to the API 1804 on a one-by-one basis. Although the previous discussion describes sending log entries to the backend computing platform 1208 on a one-by-one basis, according to some embodiments, they are sent in the context of a single API call, as a group.

Prior to continuing with the present discussion of the operations of the app in connection with the lock log button 1718, a discussion of the operational flow of the middleware in connection with a call of the processLogEntry API 1804 now follows. Upon invocation, the processLogEntry API 1804 initiates operation 2400 (FIG. 2400), whereupon the middleware receives the particular log entry passed to the API 1804 in connection with its invocation, along with the lock ID identifying the particular lock with which the entry is associated. The log entry received by the API 1804 may be an entry from either the message log or the event-and-state log, and may be generally structured as, or otherwise contain the information, described previously. For the sake of brevity, the information content of an entry is not redescribed here.

Here, it is assumed that the database 1800 contains a device event table. Each record in the device event table stores the informational content of an entry from either the message log or event-and-state log of any lock. Each record contains fields such as a device ID or lock ID field to store data identifying the particular device from which the entry was shuttled, a set of fields corresponding to those of the event informational structure described above (example: a timestamp field, a state/event ID field, a unique ID field, and so on) in order to store the data of the event or state message, itself, a date-and-time received field to store a timestamp indicating when the record of the event or state entry was actually stored in the database 1800, as opposed to when the event occurred at the lock or the firmware of the lock entered a particular state, a source field to hold data indicating whether the record was entered as a result of having been shuttled via wireless data (from the app—as is being discussed presently) or was received from a message frame forwarded from a gateway unit 1810 to the backend computing platform 1208, such as via a LoRaWAN channel (discussed previously), and a user ID field to contain the user ID of the user that shuttled the message (in the event the message was, in fact, shuttled). In operation 2402, the database 1800 is queried to determine whether it contains a record with a device ID matching the lock ID passed to the API 1804 in connection with its invocation, along with a timestamp, state/event id and unique ID data that matches that of the entry data passed to the processLogEntry API 1804 in connection with its invocation. The existence of such a record is tested in operation 2404. If such a record exists, then the shuttled entry had already been received at the database 1800 by another means (such as via the LoRaWAN channel when the event actually occurred, or via a previous shuttling operation-such as may occur if a different user had shuttled log entries previously with his or her instance of the app executing on his or her own device 1211). In such a situation, the operational flow halts. On the other hand, if no such record exists, then contents of the entry data are stored as a record in the device event table, along with timestamp indicating the time of such storage (in the time-and-date received field), with data to indicate that the entry was received via having been shuttled to the platform 1208 via the operations associated with the lock log button 1718 of the app (operation 2406), and, in the event the entry had been received via shuttling, with data indicating the user ID of the user that initiated the shuttle operation.

Previously, it was stated that the database 1800 may contain a lock table, wherein each record therein represents a particular physical lock, and wherein each such record contains fields for storage of information concerning a corresponding lock, including, a lock ID field to store a lock ID identifying the particular lock to which the record corresponds and a digital key field to store a digital key that may be used in connection with a protected command to the corresponding lock, such as an unlock command. It was also stated that each such record therein contains other information as well. Examples of such other information in each such record include: a battery level field for storage of data indicating the battery level of the corresponding lock; a temperature field for storage of the temperature of the corresponding lock; and, along with the preceding fields which correspond to the payload data, each such record further includes a last-communicated field for storage of a timestamp indicating the approximate time and date of the last communication with the corresponding lock. Upon determining whether the event passed to the API 1804 includes payload data (operation 2408), the particular record in the table including a lock ID matching that passed to the API is located, and the record is updated to include a current timestamp in the last communicated field, and to include the payload data passed to the API (if the event originated from the message log) (operation 2410), or to record null data in the payload fields (e.g., the battery level field and temperature field) if the passed event did not include payload data (which would be the case if the event originated from the event-and-state log) (operation 2412)—although recording null data in such fields may be optional, as it may be a design choice not to null out previously recorded lock data, such as battery level information, temperature data, which would have otherwise been carried in the payload data, in order to preserve the most recently recorded measurements of such information.

Next, in operation 2414 the state/event ID is tested to determine whether the passed event indicated a shackle cut event. If so, then operational control is passed to operation 2416, and the lock ID is tested to determine whether the lock it identifies is recorded in the database 1800 as presently securing an isolation point. For example, the middleware may search the aforementioned isolation point table for a record including a lock ID matching the lock ID passed to the API 1804. If no such record is found, then operational flow is halted. On the other hand, if such a record is located, then the database 1800 does, in fact, include data indicating that the lock corresponding to the passed lock ID is presently securing an isolation point, and operational control is passed to operation 2418.

In operation 2418, a set of steps that are in principle the same as those described with reference to the invalidatelsltnPt API 1804 (described previously) are performed, with the constraints that the invalidating user be assigned a user ID of 0 in order to indicate that the system is invalidating the reported placement or verification or confirmation of a lock at the isolation point corresponding to the record located in the isolation point table in operation 2416. This has the effect of restoring the state of the isolation point to one that reflects that no lock is presently securing it (e.g., returning it to an Unlocked state), while at the same time preserving its association with the aforementioned lock ID, if there are any digital personal locks on the virtual lockbox of the system of which the aforementioned isolation point is a constituent. The preservation of the association with the aforementioned lock ID prevents another lock from being added to the isolation point until all users have removed their digital personal locks from the aforementioned virtual lockbox, at which time the association is removed, as described previously with reference to FIG. 22. This also has the effect of notifying each of the users that may have their respective digital personal lock on the virtual lockbox corresponding to the system of which the aforementioned isolation point is a constituent that the aforementioned system is unsafe to service and instructing them to halt service and evacuate. This notification may be delivered via a push notification, as described previously.

Returning discussion to test operation 2414, if the state/event ID did not indicate that the passed event was a shackle cut event, then operation control is passed to operation 2420. In operation 2420, the middleware tests the passed event to determine whether it indicates a type of event that requires additional processing. For example, the state/event ID may be tested to determine whether it indicates a power off event, a transceiver overheat event, or a low battery event. If the state/event ID does not so indicate a type of event that requires further processing, then operational flow is halted. On the other hand, if the state/event ID does indicate that further processing is required, then operational flow continues and further appropriate processing of the event is performed by the middleware. For example, operational control may be passed to operation 2422.

As a predicate for discussion of operation 2422, it is assumed that the database 1800 contains a lock alert table. The lock alert table contains records of various lock error or exception conditions that a lock may experience and which may require intervention. A record in a lock alert table will generally correspond to a work order that may be closed out upon conclusion of such intervention. For example, a record in the lock alert table may indicate that a particular lock has detected a low battery event. Such a record may initiate creation of a work order that may be assigned to an operator, for example. The operator may intervene to resolve the condition by replacing the battery. Upon the operator indicating that he or she has completed intervention, the work order may be closed out. According to some embodiments, the work order is closed out upon both the operator indicating that he or she has completed intervention, and the lock no longer detecting the particular condition or state that caused the creation of the work order. Each record in the lock alert table may include, for example, a lock ID field to store a lock ID identifying the particular lock to which the record pertains, a timestamp field to store a timestamp that indicates the time and date that the error or exception event was detected by the lock, a state/event ID field to store a state/event ID that identifies to the exception or error event, and a priority field to store data indicating the priority of the error or exception condition corresponding to the record (example: low, medium, high, critical).

In operation 2422, the data elements of the passed event are used to create a record in the aforementioned lock alert table, and a corresponding work order is created. The work order may contain data so that it may be associated with the aforementioned record in the lock alert table. According to some embodiments the priority of the error or exception condition indicated in a lock alert record (and therefore its corresponding work order) is a function of the state/event ID. According to some embodiments, the priority is a function of the state/event ID and a determination of whether or not the particular lock identified by the lock ID in the record is identified in the database 1800 (such as in the isolation point table) as securing an isolation point—with it being understood that error or exception conditions occurring on locks that are actively securing isolation points are of higher priority than those corresponding to locks that are not actively securing isolation points. According to some embodiments, priority is a function of the state/event ID and the duration of time for which the work order has been open—with it being understood that as error or exception conditions remain open, their respective priorities may increase. According to some embodiments, priority is a function of state/event ID, the duration of time for which the work order has been open, and a determination of whether or not the particular lock identified by the lock ID in the record is identified in the database 1800 as securing an isolation point—with it being understood that the priority of a given work order would increase based upon both its open duration and a determination that the lock to which the lock order pertains is, in fact, actively securing an isolation point.

Figure 16T:
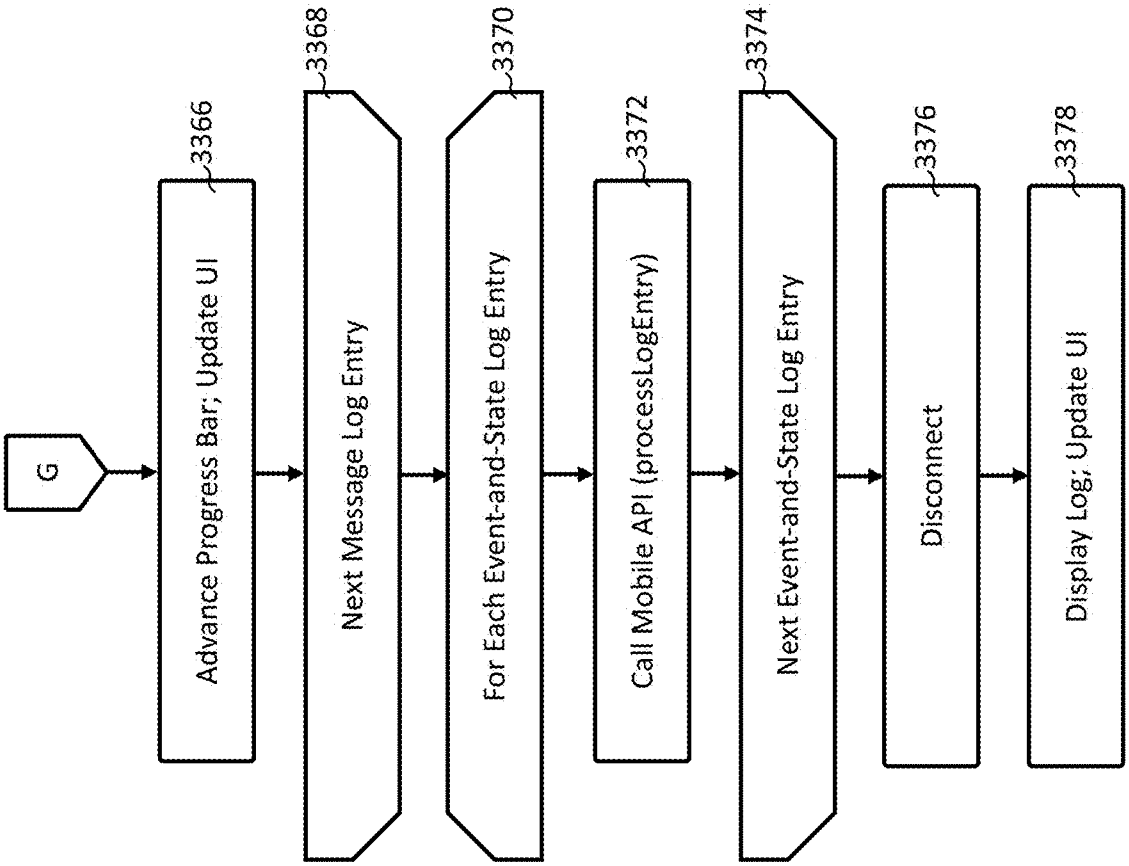
FIG. 16T depicts another portion of a state transition diagram or flowchart describing the operational and state flow of various embodiments off an app that may execute on a microcontroller of processor of a mobile device that may be used in connection with various embodiments of the safety system disclosed herein.
Figure 16U:
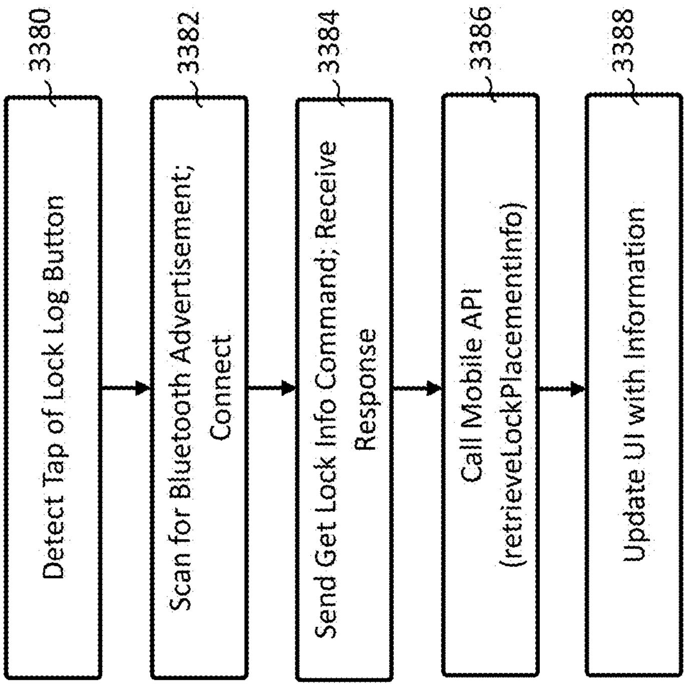
FIG. 16U depicts another portion of a state transition diagram or flowchart describing the operational and state flow of various embodiments off an app that may execute on a microcontroller of processor of a mobile device that may be used in connection with various embodiments of the safety system disclosed herein.

Having described exemplary operations of the middleware associated with the processLogEntry API 1804 in order to store and process an event passed thereto, discussion now returns to operational flow of the app (FIG. 16T). Having passed each of the log entries from the message log and event-and-state log to the processLogEntry API 1804 (and thereby causing the middleware to store and process each such entry as described above), in operation 3376, the app terminates the connection link it had previously created in operation 3356.

Figure 17T:
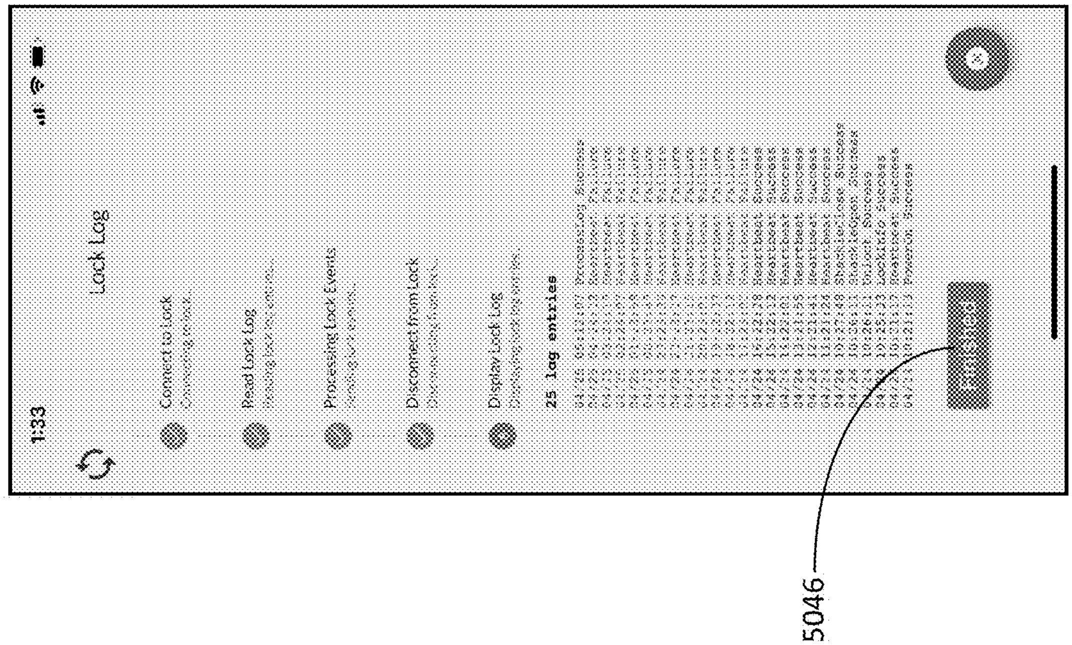
FIG. 17T depicts another exemplary embodiment of a user interface screen that may be used in connection with the various embodiments of the aforementioned app disclosed herein.

Next, in operation 3378, the app presents the entries read from the event-and-state log on the user interface (see FIG. 17T), and also adds a Finished button 5046 thereto. According to some embodiments, those particular entries corresponding to entries in the message queue (that required shuttling in order to reset the effective communication deadline assigned to the aforementioned lock) are identified via the user interface. In the exemplary user interface of FIG. 17T, such entries are presented in a red font, while the other entries (i.e., those entries in the event-and-state log not corresponding to an entry in the message log) are in a black font. Other means of designation may be employed, such as presentation of a data field with each entry, in order to specify whether or not such entry had been acknowledged in the course of communication to the backend computing platform 1208 via broadcast to a gateway unit 1810. Upon the user pressing the button 5046, the screen of FIG. 17T is closed, and the user once again views the screen of 17F.

Discussion now turns to the operational response of the app in response to a user interaction (example: a tap) with the read tag button 1714 (FIG. 17F). A tag read operation may be begun via detection of a button 1714 tap event by the app (operation 3380). Next, in operation 3382, the app scans for the presence of locks 1808 advertising to establish a connection via Bluetooth, and, in the wake of identifying such a lock 1808, establishes a Bluetooth connection therewith. (If there are plural such advertising locks 1808, the app may present the user with a menu by which the user may select the particular lock with which he or she wishes the app to establish a communication link.) The communication link need not be Bluetooth. Any communication capacity shared by the lock 1808 and the device 1211 on which the app is executing will suffice (example: each may be equipped with wireless data capability, e.g., 3G, 4G, 5G, etc., and communicate via wireless data).

Next, in operation 3384, the app uses the communication link established in operation 3382 to issue a command to the lock, by which it requests certain lock 1808 information. In response, the app receives, via the communication link, a set of lock information from the lock 1808. The set of lock information includes a lock 1808 identifier (e.g., a lock ID) and an indication of whether the lock 1808, itself, is in a locked state or an unlocked state. According to some embodiments, other information is included in the lock information, such as model number of the lock, hardware version of the lock, firmware version of the firmware executing on the lock, and battery level of the lock. Such other data is not relevant in the context of the present discussion, but is relevant to other discussion, and is presented below.

In operation 3386, the app invokes an API 1804 exposed by the backend computing platform 1208 in order to obtain information concerning the placement of the lock 1808, assuming it has been placed at all. The database 1800 is accessed in order to retrieve information to determine whether the lock 1808 has been placed upon an isolation point, and, if so, the name of the aforementioned isolation point, the name of the system of which the isolation point is a constituent, the name of the unit of which the system is a constituent, the name of the area in which the unit is situated, the name of the facility of which the area is a geographic region, the name of the user that placed the lock on the isolation point, and, if the placement has been verified, the name of the user that performed such verification operation. According to some embodiments, the data and time of such initial placement and verification is also accessed from the database 1800. This information is returned to the app. For example, in operation 3386 the app may make an API call (retrieveLockPlacementInfo) 1804, passing to the API 1804 the lock ID obtained in operation 3384. In response, the middleware associated with retrieveLockPlacementInfo 1804 may search the previously described isolation point table for a record with a lock ID matching the particular lock ID passed to it in connection with its invocation. If no such record is located, then the lock 1808 that is the subject of the tag read operation is not actively securing any isolation point (example: it is located in a storage facility, such as a warehouse, at a refinery or other industrial location, ready to be used to secure an isolation point), and in this case, a set of null data is returned to the app by the API 1804. On the other hand, if such a record is located, then the lock is, in fact, actively securing an isolation point—i.e., it is securing the isolation point to which the record corresponds. Previously, the isolation point table was described as containing certain fields, and it was stated that, according to some embodiments, this table may contain other fields. Such other fields may include a system ID identifying the system of which the isolation point referred to by the record is a constituent. With the use of such system ID data, the database 1800 may be traversed in order to obtain the name of the isolation point, the name of the system the name of the system of which the isolation point is a constituent, the name of the unit of which the system is a constituent, the name of the area in which the unit is situated, and the name of the facility of which the area is a geographic region. The aforementioned record within the isolation point table may be directly accessed to obtain the identity of the user that placed the lock, and, if the placement has been the subject of a verification operation, the identity of the user that performed such verification. According to some embodiments, the aforementioned record may also be directly accessed to obtain the time and date of such placement and verification (if any). All of this information is returned to the app by retrieveLockPlacementInfo 1804. According to some embodiments, if the placement of the lock has not been verified, null data is returned among the body of returned data, to represent that the placement has not been verified (and therefore there is no user associated with the verification of the placement, nor a timestamp indicating when such verification occurred).

Figure 17U:
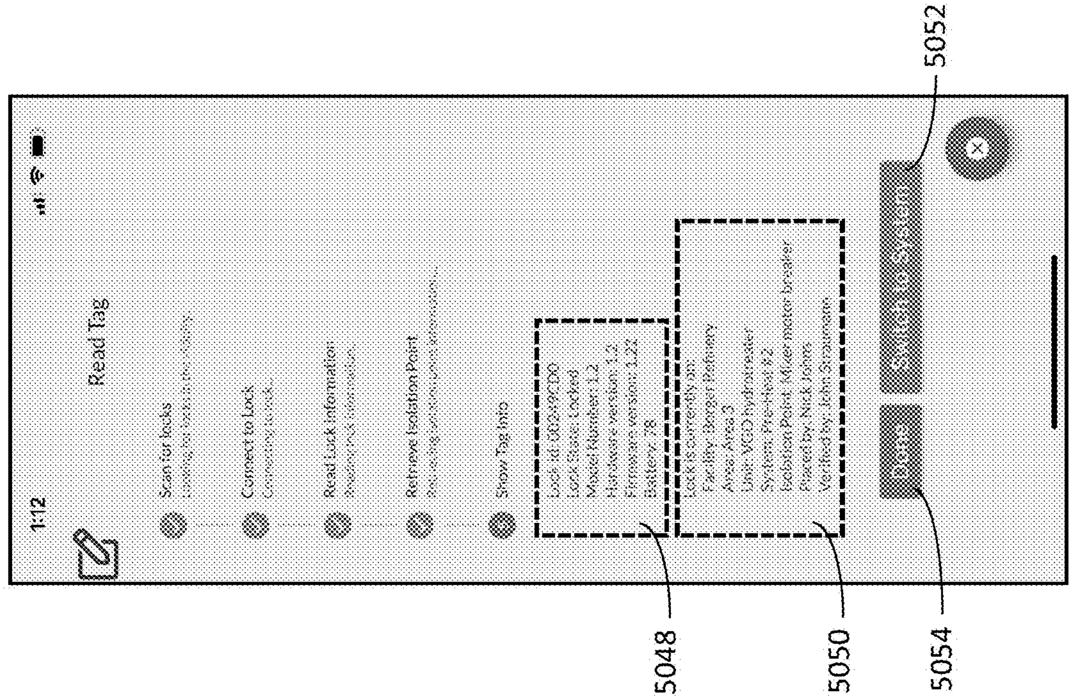
FIG. 17U depicts another exemplary embodiment of a user interface screen that may be used in connection with the various embodiments of the aforementioned app disclosed herein.

Next, in operation 3388, the app responds by presenting the information obtained from the lock in operation 3384 and from retrieveLockPlacementInfo 1804 on the user interface. For example, in response to detection of the read tag button 1714 having been pushed, a read tag screen such as the one depicted in FIG. 17U may be presented. In operation 3388, the app may present the information obtained from the lock on the read tag screen, as shown by the data element within in region 5048. Similarly, the app may present the information obtained from retrieveLockPlacementInfo 1804 on the read tag screen, as shown by the data elements within in region 5050. (The screen of FIG. 17U depicts an example wherein the lock 1808 was placed on an isolation point-if this were not the case, the data within region 5050 would be omitted. If the placement of the lock 1808 had not been the subject of a verification operation, the name of the user having performed such verification would be omitted.)

According to some embodiments, the read tag screen contains a switch to system button 5052. The button 5052, when selected, causes the app to re-enter the set focus state 1602 (FIG. 16A), and to re-establish the system-of-focus to be that of the particular system on which the lock is placed, whereupon the system presentation state 1604 is re-entered, so that the app presents information concerning the system on which the lock is placed without the user having to navigate the previously described menus of FIG. 17D manually. The read tag screen also contains a done button 5054, the selection of which causes the read tag screen to close so that the app returns to presenting the system presentation screen, such as the one depicted in FIG. 17F.

To this point much of the discussion has pertained to interactions between the app and the backend computing platform 1208 (or a lock, such as lock 1300). As has been described previously, though, the locks of the safety system may also communicate with the backend computing platform 1208. For example, the lock may communicate with the backend computing platform via LoRa transmissions, the payloads of which are received via base stations or gateways (such as base stations 1810 in FIG. 18) and relayed to the backend computing platform 1208 via a network 1802, such as via wireless data communication (example: 4G or 5G). In the context of the following discussion, it is assumed that the communication of the locks of the safety system with the backend computing platform 1208 occurs in such a manner. As is discussed below, though, the locks of the safety system may be embodied to include wireless data transceivers or WiFi transceivers, and may communicate with the backend computing platform, without the imposition of base stations or gateways 1810 in the communication path.

Figure 25:
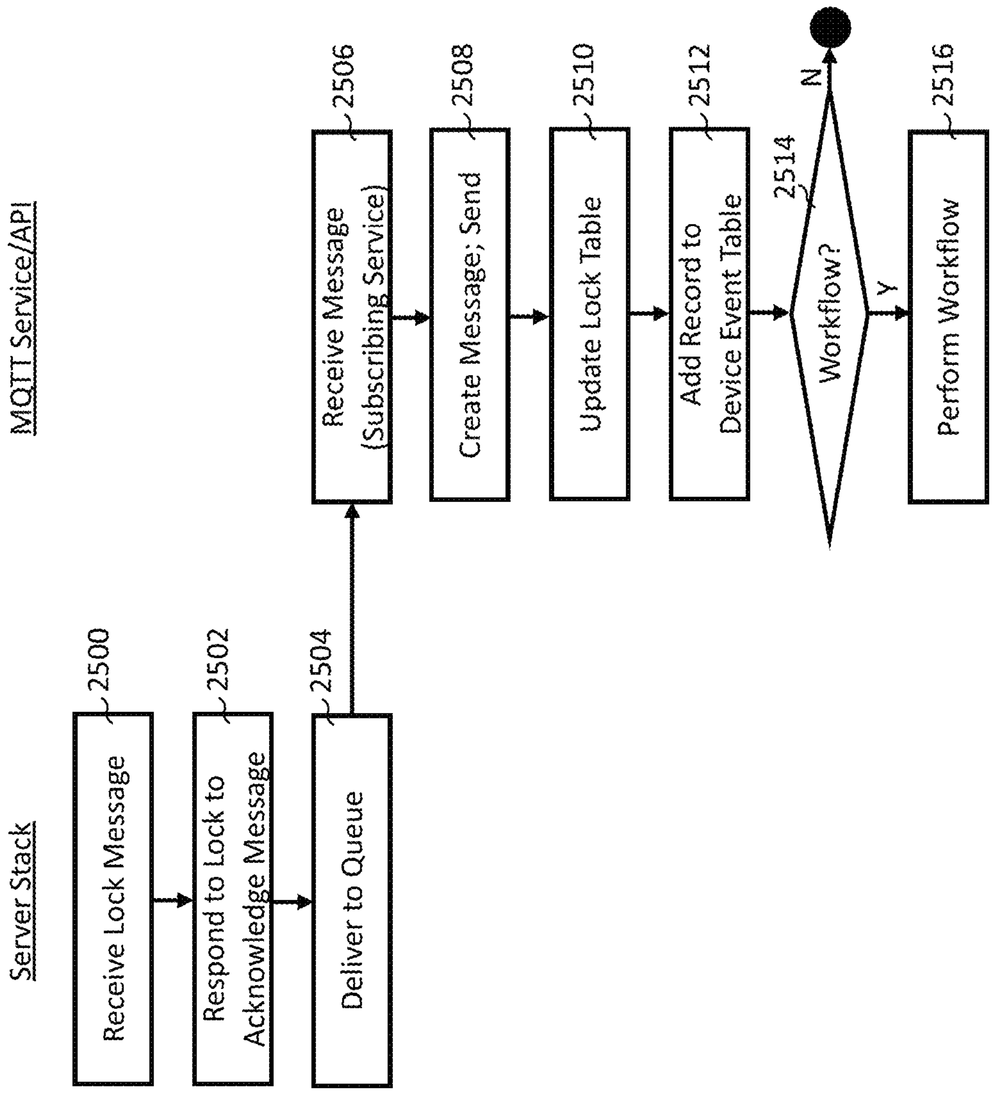
FIG. 25 depicts an exemplary embodiment of certain software that may execute upon the various embodiments of the backend computing platform of the various embodiments of the safety system disclosed herein.

Discussion now turns to the response of the backend computing platform 1208, in the event of having received a message (relayed from a base station or gateway 1810) from a lock. FIG. 25 depicts embodiments of such response. As can be seen from FIG. 25, the message is initially received by the server stack 1812 in operation 2500. According to some embodiments, the message may be structured to contain a header and a payload. The header may contain data uniquely identifying the particular lock that sent the message, such as a lock ID or other identifier that may be mappable to a lock ID. The payload may contain an event ID, timestamp, and a unique ID, such as a sequence number assigned to the message by the lock (example: a number between 0-255, incremented by 1 with each transmission, and that returns to 0 upon having reached 255). The event ID may be a number that uniquely identifies the variety of the message (example: identifies the message as a heartbeat message, or a shackle-open message, or a shackle-cut message, or a shackle-closed message, or a battery-removed message, or a battery-inserted message, or a battery-critically-low message, or a critical-error message, or a powering-off message, or a powering-on message). The timestamp may indicate the date and time at which the message was created/sent by the lock. According to some embodiments, the timestamp may resolve time to units of one minute or one second, which may permit the possibility of more than one message, of the same variety, having been created within the same one-minute or one-second unit of time. Were such an event to occur, the payload of each such message would contain the same event ID and timestamp, but their respective unique IDs (e.g., sequence numbers) would be different (example: the second such message may include a sequence number that is greater than that of the previous message by a quantity of one). Thus, as a trio, the event ID, timestamp, and unique ID/sequence number uniquely identify a lock message. According to some embodiments, the payload may contain other data. For example, the payload may also contain: an indication of battery level, such as an integer ranging from 0 to 100, or a decimal or floating point number representing voltage level of the battery, or an integer representing aggregate coulombs drawn from a battery since its insertion, and so on; an indication of whether the lock is in a locked or unlocked state, such as an integer (0 or 1) representing unlocked or locked, respectively; an indication of the temperature of the environment in which the lock is situated, such as a decimal or floating point number representing such temperature in Fahrenheit or Celsius; and so on). The present discussion assumes the presence of such additional payload data, as it is useful in supplying the backend computing platform with relatively constant and up-to-date data—although it need not be the case that all such additional data, or any of it, be included in the lock message payload.

In the wake of having received the message in operation 2500, the server stack 1812 creates a response message that acknowledges that the server stack 1812 has received the lock message, and sends the acknowledgement message to the lock corresponding to the lock ID contained in the header of the message received in operation 2500. Thereafter, in operation 2504, the server stack 1812 sends the lock message to its queue, which responds by sending such message to all subscribing MQTT services/API's, proceeding through its queue on a message-by-message basis. According to some embodiments, the backend computing platform contains one such MQTT service/API that subscribes to all incoming lock messages, and therefore receives all such messages (example: deviceService). Thus, in operation 2506, the subscribing MQTT service receives the message.

Upon receiving the message, the service creates a response message, and sends it to the lock (operation 2508). The response message is received by the server stack 1812, which relays such message to the particular base station/gateway 1810 with which the aforementioned lock most recently communicated, which, in turn, relays such message to the lock. The response message indicates that the lock message was received by the subscribing MQTT service-meaning it will be properly processed. The response message may contain a message ID and a timestamp, and conceptually may be thought of as being structured as:

{message ID, timestamp}

The message ID indicates the particular variety of lock message to which the response message is responding. According to some embodiments, there may be a corresponding message ID for each lock message event ID. Example: for the particular event ID assigned to a heartbeat message, there is a message ID assigned as a heartbeat response; for the particular event ID assigned to a shackle-open message, there is a message ID assigned as a shackle-open response; and so on. The timestamp data indicates the time at which the response message was created/sent in operation 2508. The timestamp data may be used by the firmware of the lock to map the output of a timer/counter aboard the microcontroller 1404 to an approximate date and time. According to some embodiments, the microcontroller 1404 includes a timer/counter that is commanded by the firmware to begin counting from zero, and increments with each clock cycle of the microcontroller 1404. Thus, upon receiving the timestamp data, the firmware reads the output of the timer/counter, and associates such output with the time and date indicated by the timestamp, storing both the aforementioned timer/counter output data and date and time data. Thereafter, an approximate day and time may be arrived at by reading the output of the aforementioned timer/counter, subtracting such output from the stored timer/counter output data, to arrive at difference that indicates how many clock cycles have been counted since the stored timer/counter output data was read previously. The difference is divided by the clock cycle frequency, and the result indicates how many seconds have elapsed since the stored timer/counter output data was read previously. Given that the previous read of the timer/counter output data corresponding to the stored date and time data, the aforementioned difference data can be added to the stored date and time data to arrive at the approximate current day and time, to within about one second.

Upon conclusion of operation 2508, the MQTT service updates the lock table (operation 2510). Previously, the lock table was described as containing a record for each lock in the safety system. Thus, in operation 2510, the lock table is accessed, and the particular record containing the lock ID matching that contained in the header of the lock message is accessed. Thereafter, its various fields are updated (battery level field, temperature field, state field—locked/unlocked—and last-communicated field), so that they contain the most up-to-date data in the wake of operation 2510. Thereafter, in operation 2512, the information from header and payload of the lock message is used to create a new record in the aforementioned device event table. Thus, the lock table reflects the most recent information concerning any particular lock, while the device event table contains a record of all of the messages received from any particular lock (whether having been received via the LoRa channel or by virtue of having been shuttled via the app, as discussed previously), along with any additional information couriered therewith in the payload of such messages.

Next, in operation 2514, the MQTT service inspects the event ID of the lock message to determine if such variety of message is associated with a workflow. If not, the operational flow of FIG. 25 halts. For example, according to some embodiments, a heartbeat message is not associated with any workflow, meaning that, for a heartbeat message, the operational flow of the MQTT service is concluded upon having performed operation 2514. On the other hand, if the event ID is associated with workflow, then, in operation 2516, the workflow is performed. For example, a shackle-open message may be associated with workflow, as is a shackle-cut message. Their workflows are presented below.

Figure 26:
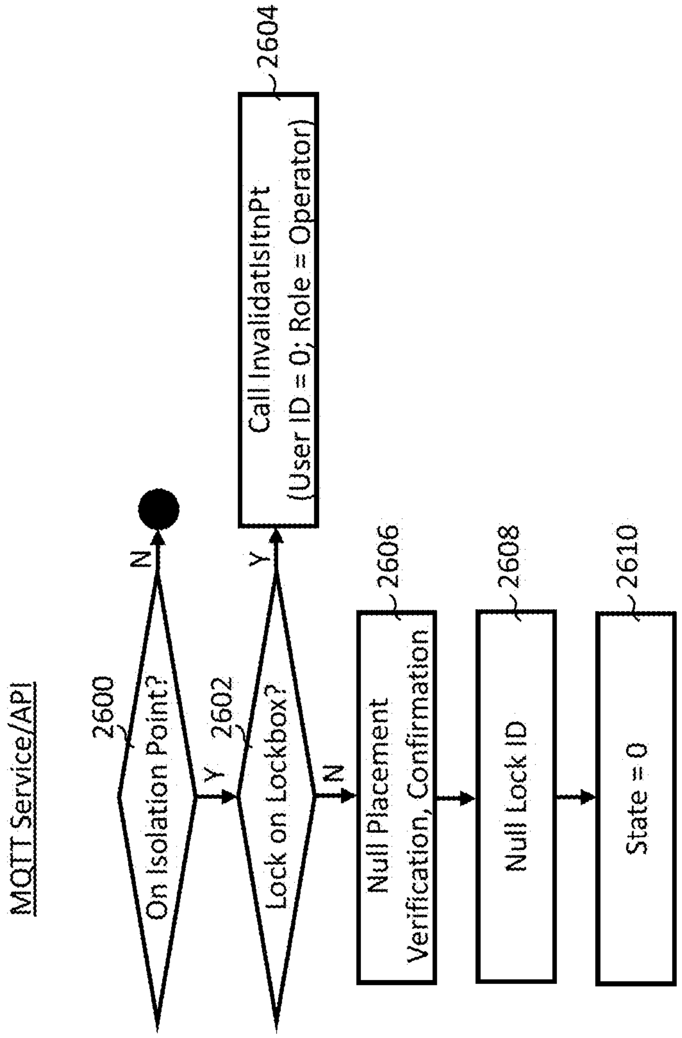
FIG. 26 depicts an exemplary embodiment of certain software that may execute upon the various embodiments of the backend computing platform of the various embodiments of the safety system disclosed herein.

FIG. 26 depicts exemplary embodiments of workflow associated with a shackle-open message. In other words, FIG. 26 shows the workflow that would be undergone in the context of having received a shackle-open message from embodiments of the lock that do not distinguish between a shackle-open event and a shackle-cut event, and therefore send a shackle-open message every time the shackle is detected as being open. As can be seen from FIG. 26, the workflow begins with determining whether the particular lock that sent the shackle open message is actually securing an isolation point (operation 2600). For example, the isolation point table may be searched to determine whether it contains a record with a lock ID matching that of the lock ID in the header of the lock message conveying the shackle-open message. If no such record exists, then the lock that sent the shackle-open message is not securing an isolation point, and the workflow halts. On the other hand, if such a record exists, then the lock is, in fact, securing an isolation point (i.e., the particular isolation point corresponding to the isolation point ID of the located record), and the system ID and isolation point ID information from such record is obtained, and then operation flow is passed on to operation 2602.

In operation 2602, it is determined whether the virtual lockbox corresponding to the system of which the aforementioned isolation point is a constituent has a digital personal lock securing it. For example, the aforementioned lockbox table may be searched to determine whether it contains a record with a system ID matching the system ID obtained in the previous operation 2600. If so, then there is at least one personal lock on the aforementioned virtual lockbox, and operational flow is passed to operation 2604. In operation 2604, a set of steps that are in principle the same as those described with reference to the invalidateIsltnPt API 1804 (described previously) are performed, with the constraints that the invalidating user be assigned a user ID of 0 in order to indicate that the system is invalidating the reported placement or verification or confirmation of a lock at the isolation point corresponding to the record located in the isolation point table in operation 2600. This has the effect of restoring the state of the isolation point state to one that reflects that no lock is presently securing it (e.g., returning it to an Unlocked state), while at the same time preserving its association with the aforementioned lock ID. The preservation of the association with the aforementioned lock ID prevents another lock from being added to the isolation point until all users have removed their digital personal locks from the aforementioned virtual lockbox, at which time the association is removed, as described previously with reference to FIG. 22. This also has the effect of notifying each of the users that may have their respective digital personal lock on the aforementioned virtual lockbox that the aforementioned system is unsafe to service and instructing them to halt service and evacuate. This notification may be delivered via a push notification, as described previously. On the other hand, if the lockbox table does not contain a record with a system ID matching the system ID obtained in the previous operation 2600, then there are no personal digital locks securing the aforementioned virtual lockbox, and operational flow is passed to operation 2606.

In operation 2606, the record from the isolation point table located in operation 2600 is updated to: (1) assign null values to the field indicating the user ID of the user that initially placed a lock at the isolation point corresponding to the record, and to the field indicating the time/date of such placement operation; and (2) assign null values to the field indicating the user ID of the user that verifies such placement, and to the field indicating the time/date of such verification operation. Additionally, all records from the previously-described confirmation table that contain an isolation point ID matching the isolation point ID obtained in operation 2600 are deleted. Next, in operation 2608, the lock ID field of the aforementioned record in the isolation point table is assigned a null value. Finally, in operation 2610, the state field of the aforementioned record in the isolation point table is assigned a 0 value to indicate no lock is present upon the isolation point corresponding to the record. Together, operations 2606-2610 have a net effect similar to processing the completion of an unlock operation that was performed upon a lock securing an isolation point (except that no user ID is recorded in the isolation point table record to identify the user having performed such operation, nor is any timestamp information pertaining to such operation recorded). According to some embodiments, the execution of operations 2606-2610 may be conditioned upon determining that the various fields referred to in those operations are not already in the conditions that operations 2606-2610 would assign to them—in the event that a lock was commanded to be unlocked via the app, the interaction of the app with the backend computing platform 1208 would cause these fields to be in such a condition, and a user ID would be stored in connection with the execution of such unlock command; it would ordinarily be desirable to preserve the user ID in order to indicate the identity of the user that unlocked the lock.

In the context of embodiments of the lock that do, in fact, distinguish between a shackle-open event and a shackle-cut event, then upon receiving a shackle-cut lock message, the workflow would commence by determining whether the lock that sent the message was securing an isolation point (as described with reference to operation 2600). If not, then the workflow concludes. If so, then the steps recited in operation 2604 would be performed vis-à-vis the isolation point record located in the previous operation. The net effect of this would be to reset the aforementioned isolation point record to a condition indicating that the corresponding isolation point contains no lock (and to delete any associated confirmations in the confirmation table), and to notify any users having their digital personal lock securing the virtual lockbox corresponding to the system of which the aforementioned isolation point is a constituent that the system is no longer safe to service, that service should halt, and that they should evacuate. Such notification may be performed by push notification, as described previously.

According to some embodiments, the various tables of the database 1800 are associated with triggers. For example, the database 1800 contains tables that contain records expressing the current state of the safety system and related safety operations. Example: the isolation point table contains data revealing the particular lock currently securing a particular isolation point; the lock table contains data revealing the temperature of the lock or its battery level, currently (or as of its most recent reading); the teams table contains data describing the service teams currently in place; and so on. For each table containing data expressing the current state of the safety system and related safety operations, there may exist a counterpart historical table, the records of which include fields identical to those of its counterpart, with three additional fields: a timestamp field, a type field, and a user ID field. The tables of the database containing current-state information may be associated with triggers, so that whenever a record therein is updated or deleted, prior to effecting such update or deletion, the record to be updated or deleted is inserted into the table's historical counterpart, along with: (i) a timestamp indicating the date and time of such insertion (in the timestamp field); (ii) an indication of whether the insertion had been triggered by an update or deletion (in the type field); and (iii) the user ID of the user responsible for such update or deletion, if such information is known. Thus, such historical tables record the state and operational information of the safety system historically, since the inception of its operation, and may be queried to support various safety audits.

Previously, it was stated that, according to some embodiments, the safety system may include one or more web clients, such as web client 1818. For example, the web client 1818 may be structured as JavaScript, cascading style sheets, and hypertext markup language files executing on a web browser. The web client 1818 may invoke web APIs 1816, in order to perform various operations (as discussed below), and to read data from, write data to, update data in, or delete data from the database 1800. As is discussed in greater detail below, the web client 1818 may permit its user to investigate historical information, for example, by interaction with the aforementioned historical counterpart tables. Such historical investigation capacities may be useful in the context of investigating occurrences leading up, contributing to, or causing a safety incident, and may be useful in the context of auditing compliance with safety procedures.

According to some embodiments, the web client 1818 may be logged into by an employee (example: safety personnel or administrator) of a company serviced by the safety system, or by personnel of a safety company that operates such safety system. In the event that the web client 1818 is logged into by an employee of a company serviced by the safety system, then such employee may use the client 1818 to create a new definition of a facility belonging to such company (and to be serviced by the safety system), update information concerning an existing facility belonging to such client (and serviced by the safety system), create a new definition of a user and associate such new user definition with one of such company's facility definitions, update information concerning an existing user (associated with one of such company's facilities), create a new definition of a lock and associate such new lock definition with one of such company's facility definitions, update information concerning an existing lock definition (associated with one of such company's facility definitions), create a new definition of a gateway and associate such new gateway definition with one of such company's facility definitions, and update information concerning an existing gateway definition (associated with one of such company's facility definitions), among other things, which are discussed below. If, on the other hand, the web client 1818 is logged into by an employee of a safety company that operates such safety system, then such employee may use the client 1818 to create a new company and any contractors associated therewith, and could also create a new definition of a facility belonging to any company serviced by the safety system, update information concerning any existing facility definition, create a new definition of a user and associate such new user definition with any facility definition, update information concerning any existing user definition, create a new definition of a lock and associate such new lock definition with any facility definition, update information concerning any existing lock definition, create a new definition of a gateway and associate such new gateway definition with any facility definition, and update information concerning any existing gateway definition, among other things, which are discussed below.

For example, the web client 1818 may present a user interface permitting the creation of a new definition of a facility. The user interface may include fields for entry of: (1) a facility name; (2) a name of a city in which the facility is located; (3) a state in which the facility is located; (4) an indication of whether a user assigned to the role of craftsman is to be permitted to select a system-of-focus vis the above-mentioned embodiments of the app (e.g., YES/NO, TRUE/FALSE, etc.); (5) the names of each area of the facility; (6) the names of each unit in each area; (7) the names of each system in each unit; and (8) the names of each isolation point of each system. Such user interface may be used to define a new facility. If such user interface had been accessed by an employee of a company serviced by the safety system, then such newly defined facility would be associated with the company that employs such employee. If, instead, such user interface had been accessed by an employee of a company that operates the safety system, then such newly defined facility would be associated with a company selected by such employee. The web client 1818 may also present a user interface that lists each of the existing facilities (in the case of an employee of a company being serviced by the safety system, such list includes only those facilities associated with such employee's employer, whereas in the case of an employee of a company operating such safety system, such list includes all facilities of all companies serviced by the safety system), and permits a user to select a particular facility from such list, in order to return to the above-referred-to user interface, in order to update information concerning the definition of the facility. In response to having used such user interface to define a new facility, a web API 1816 may be invoked, which may insert a new record into a facility table in the database 1800, to represent such new facility. In response to having used such user interface to update the definition of a facility, a web API 1816 may be invoked, which may update a record in the facility table in the database 1800, to represent such facility. In response to having used such user interface to delete the definition of a selected facility, a web API 1816 may be invoked, which may delete a record in the facility table in the database 1800, to remove such facility.

Additionally, the web client 1818 may present a user interface permitting the creation of a new definition of a user. The user interface may include fields for entry of: (1) a username for display via user interfaces, such as via the user interface of the aforementioned app; (2) a first name of such user; (3) a last name of such user; (4) an email address of such user; (5) a telephone number of such user, such as the telephone number corresponding to a smartphone on which such user accesses the aforementioned app; (6) the name of a facility with which such user definition is to be associated (the facility name is chosen from a list—the list may contain only those facility definitions associated with the user's employer, if the user is an employee of a company serviced by the safety system, whereas the list may contain all facilities, if the user is an employee of a company that operates the service system); (7) a radio channel that may be used to reach such user (some facilities provide their employees or contractors radios on which to communicate); (8) a user role assigned to the newly defined user (e.g., operator, facility employee, foreman, craftsman); and (9) a web client role assigned to the newly defined user (administrator—which can create or alter or delete any sort of definitions pertaining to any company or facility; company administrator—which can create or alter or delete any sort of definition pertaining to any facility of the company with which the company administrator is associated; and facility administrator—which can create or alter or delete any sort of definition pertaining to the particular facility with which the facility administrator is associated). Such user interface may be used to define a new user. If such user interface had been accessed by a company administrator, then such newly defined user would be associated with a facility selected by the company administrator, provided that such facility must be associated with the particular company that the facility administrator is employed by. If such user interface had been accessed by a facility administrator, then such newly defined user would be associated with the particular facility associated with the facility administrator. If such user interface had been accessed by an administrator, then such newly defined user would be associated with the particular facility selected by the administrator. The web client 1818 may also present a user interface that lists each of the existing users (in the case of a company administrator, all of the users associated with a facility of the company with which the company administrator is employed, in the case of a facility administrator, all of the users of the particular facility that the facility administrator is associated with, and in the case of an administrator, all of the users of the safety system, as a whole), and permits a user to select a particular user from such list, in order to return to the above-referred-to user interface, in order to update information concerning the definition of the selected user or to delete such information. In response to having used such user interface to define a new user, a web API 1816 may be invoked, which may insert a new record into a user table in the database 1800, to represent such new user. In response to having used such user interface to update the definition of a user, a web API 1816 may be invoked, which may update a record in the user table in the database 1800, to represent such user. In response to having used such user interface to delete the definition of a selected user, a web API 1816 may be invoked, which may delete a record in the user table in the database 1800, to remove such user.

Still further, the web client 1818 may present a user interface permitting the creation of a new definition of a lock. The user interface may include fields for entry of: (1) a lock identifier; (2) an identifier that may be printed on a label disposed on the surface of the lock, which, according to some embodiments, may map on a one-to-one basis with the aforementioned lock identifier, so that the label may contain data uniquely identifying the lock, without bearing the actual lock identifier; an (3) a status indicator, indicating whether the lock is to be added to server stack 1812 as a device eligible to communicate with the lock (e.g., ACTIVE/INACTIVE or ON/OFF, etc.). Such user interface may be used to define a new lock. If such user interface had been accessed by a company administrator, then such newly defined lock would be associated with a facility selected by the company administrator, provided that such facility must be associated with the particular company that the facility administrator is employed by. If such user interface had been accessed by a facility administrator, then such newly defined lock would be associated with the particular facility associated with the facility administrator. If such user interface had been accessed by an administrator, then such newly defined lock would be associated with the particular facility selected by the administrator. The web client 1818 may also present a user interface that lists each of the existing locks (in the case of a company administrator, all of the locks associated with a facility of the company with which the company administrator is employed, in the case of a facility administrator, all of the locks of the particular facility that the facility administrator is associated with, and in the case of an administrator, all of the locks of the safety system, as a whole), and permits a user to select a particular lock from such list, in order to return to the above-referred-to user interface, in order to update information concerning the definition of the selected lock. In response to having used such user interface to define a new lock, a web API 1816 may be invoked, which may insert a new record into the previously-described lock table in the database 1800, to represent such new lock, and assuming such new lock was defined as active, the web API 1816 may interact with the server stack 1812 to cause the stack 1812 to add the lock identifier associated with such new lock into its list of devices permitted to communicate with the stack 1812. In response to having used such user interface to update the definition of a lock, a web API 1816 may be invoked, which may update a record in the lock table in the database 1800, to represent such lock, and assuming such updated lock definition altered the status (i.e., from ACTIVE to INACTIVE or vice versa), the web API 1816 may interact with the server stack 1812 to cause the stack 1812 to add or remove the lock identifier associated with such updated lock definition to or from its list of devices permitted to communicate with the stack 1812, as the case may be. In response to having used such user interface to delete the definition of a selected lock, a web API 1816 may be invoked, which may delete a record in the lock table in the database 1800, to remove such lock definition, and the web API 1816 may interact with the server stack 1812 to cause the stack 1812 to remove the lock identifier associated with such selected lock definition from its list of devices permitted to communicate with the stack 1812.

Still further, the web client 1818 may present a user interface permitting the creation of a new definition of a gateway 1810. The user interface may include fields for entry of a gateway identifier, which may be a numerical sequence that uniquely identifies a particular gateway, for example, in a manner analogous to a MAC address. The entry of such data via such user interface defines a new gateway. If such user interface had been accessed by a company administrator, then such newly defined gateway would be associated with a facility selected by the company administrator, provided that such facility must be associated with the particular company that the facility administrator is employed by. If such user interface had been accessed by a facility administrator, then such newly defined gateway would be associated with the particular facility associated with the facility administrator. If such user interface had been accessed by an administrator, then such newly defined gateway would be associated with the particular facility selected by the administrator. The web client 1818 may also present a user interface that lists each of the existing gateways (in the case of a company administrator, all of the gateways associated with a facility of the company with which the company administrator is employed, in the case of a facility administrator, all of the gateways of the particular facility that the facility administrator is associated with, and in the case of an administrator, all of the gateways of the safety system, as a whole), and permits a user to select a particular gateway from such list, in order to return to the above-referred-to user interface, in order to update information concerning the definition of the selected gateway. In response to having used such user interface to define a new gateway, a web API 1816 may be invoked, which may insert a new record into a gateway table in the database 1800, to represent such new gateway, and the web API 1816 may interact with the server stack 1812 to cause the stack 1812 to add the gateway identifier associated with such new gateway into its list of devices permitted to communicate with the stack 1812. In response to having used such user interface to update the definition of a gateway, a web API 1816 may be invoked, which may update a record in the gateway table in the database 1800, to represent such gateway, and assuming such updated gateway definition altered the gateway identifier, the web API 1816 may interact with the server stack 1812 to cause the stack 1812 to remove the previous gateway identifier associated with such prior gateway definition from its list of devices permitted to communicate with the stack 1812, and to add the new gateway identifier associated with the updated gateway definition to the aforementioned list. In response to having used such user interface to delete the definition of a selected gateway, a web API 1816 may be invoked, which may delete a record in the gateway table in the database 1800, to remove such gateway definition, and the web API 1816 may interact with the server stack 1812 to cause the stack 1812 to remove the gateway identifier associated with such selected gateway definition from its list of devices permitted to communicate with the stack 1812.

According to some embodiments, the web client 1818 may also present a dashboard user interface. The dashboard may present information concerning the safety status of a selected topic-of-focus, and may also present information concerning the operation of the safety system, itself. For example, the user interface of the web client 1818 may present a user interface that permits its user to select a topic-of-focus, such as a particular facility, particular area, particular unit, or particular system. The web client 1818 may respond to such selection invoking one or more web APIs 1816, in order to obtain information concerning the safety status of each system within the selected topic-of-focus. For example, if the selected topic-of-focus was a given facility, then the web API(s) 1816 return safety information concerning each system within the selected facility. On the other hand, if the selected topic-of-focus was a given area, then the web API(s) 1816 return safety information concerning each system within the selected area, and so on.

According to some embodiments, the aforementioned safety information includes, for each system, the name of the system, the name of the unit within which such system is situated, and the name of the area within which the unit is situated, in order to identify each such system. Additionally, the safety information may include, for each system: (1) if the records of the database 1800 indicate that a given system has not a single isolation point with a lock having been initially placed thereupon, data indicating that none of its isolation points are recorded in the database 1800 as having had a lock initially placed thereupon; or (2) if the records of the database 1800 indicate that a given system has at least one isolation point with a lock initially placed thereupon, and at least one isolation point without a lock initially placed thereupon, data indicating the quantity of isolation points without a lock initially placed thereupon; or (3) if the records of the database 1800 indicate that a given system has each isolation point with a lock initially placed thereupon, and at least one isolation wherein such initial placement has not been verified, data indicating the quantity of isolation points without an associated verification; or (4) if the records of the database 1800 indicate that a given system has each isolation point with a lock initially placed thereupon, and each isolation point has an associated verification, data indicating that all of such system's isolation points have been the subject of an initial lock placement, and that all of such initial lock placements have been verified.

The safety information pertaining to each system may be organized into tiles, and presented via the dashboard user interface on a one-tile-for-one-system basis. Each such tile may include text indicating the name of the corresponding system, the area unit in which such system is situated, and the area in which such unit is situated, in order to completely identify the system. Each such tile may also include the above-mentioned safety data pertaining to lock-out status (example: "No locks are securing any isolation points" or "3 isolation points still require a lock to be initially placed thereupon" or "7 isolation points require an initial placement to be verified" or "all 12 isolation points have had a lock placed thereupon, and all such placements have been verified"). According to some embodiments, each such tile may be color coded. For example, tiles corresponding to systems that have no isolation points with an initially-placed lock may be colored red, while tiles corresponding to systems having only some isolation points with a lock having been initially placed thereupon may be colored orange, while tiles corresponding to systems having locks initially placed upon all of its isolation points but having at least one such placement not yet verified may be colored yellow, while tiles corresponding to systems having locks placed upon each of its isolation point with each such placement having been verified may be colored green.

According to some embodiments, each such tile may be selectable. Upon selecting or clicking a tile, the web client 1818 may respond to such selection invoking one or more web APIs 1816, in order to obtain additional information concerning such system. Such additional information may include all or some of the information presented in region 1732 (isolation-point-by-isolation-point state information and information concerning each initial placement operation, verification operation, confirmation operation performed upon each such isolation point) and region 1766 of the user interface of the app (information concerning team membership of service teams assigned to the corresponding system, and information identifying users that have secured their digital personal lock on the corresponding system's virtual lockbox).

Previously, it was stated that the dashboard user interface may present information concerning the operation of the safety system, itself. According to some embodiments, the dashboard user interface may contain a graphical indication, such as a pie chart, indicating the battery status of locks within the safety system. For example, a first pie chart may present information concerning the locks currently securing isolation points (i.e., locks located in the process area or process block of the facility), while a second pie chart may present information concerning locks not securing any isolation point (i.e., locks held in storage at the facility). For example, each such pie chart may indicate the quantity of locks exhibiting a desirable voltage level (example, in the context of a lock intended to operate at 3 volts, a voltage level of 3 volts or more), the quantity of locks exhibiting a moderate voltage level (example, in the context of a lock intended to operate at 3 volts, a voltage level greater than 2.9 volts, but less than 3 volts), and the quantity of locks exhibiting a critical voltage level (example, in the context of a lock intended to operate at 3 volts, a voltage level less than 2.9 volts). Each region of the respective pie charts may be selectable. In response to selection of a region (e.g., desirable voltage region, moderate voltage region, or critical voltage region), a user interface screen may be presented that presents information concerning the particular locks exhibiting voltage levels corresponding to the region selected by the user. Thus, for example, if the user were to select the critical voltage region of the pie chart concerning locks located in the process area or process block, then the user interface screen would present information concerning those particular locks that are located in the process area or process block that are currently exhibiting a critically low voltage level. Such information may include, for example, the identifier printed on the label of the lock, the isolation point the lock is currently securing (articulated as, for example, an area name, a unit name, a system name, and an isolation point name—in order to completely identify the isolation point), the most recent voltage level reading received from the lock, and the time and date of the most recent voltage level reading. To obtain such information, the web client 1818 calls one or more web APIs 1816, which query the aforementioned locks table and the isolation point table in order to develop and return such information to the web client for display via its user interface. To give another example, if the user were to select the moderate voltage region of the pie chart concerning locks located storage at the facility, then the user interface screen would present information concerning those particular locks that are located in storage at the facility that are currently exhibiting a moderate low voltage level. The information presented would be similar to that just described, except that the location of the lock would be indicated as "in storage." The net result of such user interface is to permit its user to monitor the battery levels of the various locks of the safety system, to identify those particular locks that may need their respective batteries replaced, and to present information to help such user locate such locks, so that the batteries can, in fact, be replaced.

According to some embodiments, the dashboard user interface also includes one or more graphical indicators revealing the quantity of locks that have last communicated with the backend computing platform 1208 (either directly, such as through the LoRa channel, or indirectly, such as via a shuttling operation, as described previously), in each of a plurality of time ranges. For example, the graphical indicator may be a bar chart, with the length of a first bar indicating the quantity of locks defined (as active) in the lock table that have not yet communicated with the backend computing platform 1208, the length of a second bar indicating the quantity of locks that have communicated with the backend computing platform 1208 within that last two hours, the length of a third bar indicating the quantity of locks that have communicated with the backend computing platform 1208 within the last six hours but not within the last two hours, the length of a fourth bar indicating the quantity of locks that have communicated with the backend computing platform 1208 within the last twelve hours but not within the last six hours, and the length of a fifth bar indicating the quantity of locks that have not communicated with the backend computing platform 1208 within the last twelve hours. According to some embodiments, each such bar is selectable. In response to such selection, a user interface screen may be presented that presents information concerning the particular locks exhibiting last-date-and-time-of-communication data corresponding to the particular bar selected by the user. Thus, for example, if the user were to select the particular bar concerning locks that had been most recently communicated with within the last twelve hours, but not within the last six hours, then the user interface screen would present information concerning those particular locks that currently exhibit last-date-and-time-of-communication data corresponding to such bar. Such information may include, for example, the identifier printed on the label of the lock, the isolation point the lock is currently securing (articulated as, for example, an area name, a unit name, a system name, and an isolation point name—in order to completely identify the isolation point), or, if the lock is not currently securing an isolation point, an indication that the lock is located in facility storage, and the time and date of the most recent voltage level reading. To obtain such information, the web client 1818 calls one or more web APIs 1816, which query the aforementioned locks table and the isolation point table in order to develop and return such information to the web client 1818 for display via its user interface. A user may use such information, to locate such locks, so that a user may use the app to shuttle unacknowledged messages from each such lock to the backend computing platform 1208, in order to reset the last-date-and-time-of-communication data for each such lock—thereby having the effect of forestalling programmatic state transitions of such locks out of the locked state, which would have the effect of causing the system each such lock was safeguarding to exit the safe state, meaning service activity relating to each such system would have to halt, among other things.

According to some embodiments, the dashboard user interface includes instructions, such as JavaScript executing on a web browser, that cause the dashboard to reload from time to time, such as on a schedule (example: once every 30 seconds, or once every 60 seconds), in order to refresh the data presented via the dashboard. According to some embodiments, the data on the dashboard is updated via the cooperation of a client-side asynchronous data updating framework (integrated into the dashboard instruction set, such as JavaScript) and the server-side aspect of the asynchronous data updating framework 1806, in a manner similar to that discussed with reference to the app, and which, for the sake of brevity, is not reiterated here.

According to some embodiments, the web client 1818 further includes an investigative user interface screen permitting data collected by the safety system to be used, such as to investigate an incident or support a safety audit, among other uses. For example, as described previously, the safety system collects, without limitation, information concerning: (1) lock events; and (2) app-initiated actions relating to a system. A lock event is an event, the occurrence of which is determined by the firmware executing on the microcontroller 1404 of the lock (sometimes in concert with detection circuitry onboard the lock), wherein, according to some embodiments, such event was not initiated in response to a command, such as a command delivered via the previously-described app. Therefore, lock events include: a battery-inserted event; a battery-removed event; a powered-by-supercapacitor event; a powered-by-battery event; a battery-critically-low event; a powering-off event; a powering-on event; a shackle-open event; a shackle-closed event; a shackle-cut event; a heartbeat-message-sent event; a critical-temperature event; and a critical-error event. An app-initiated action relating to a lock is an action initiated by use of the app, wherein such action relates to a lock, such as commanding the lock to perform an action, or using the app to make an assertion about a lock's presence or absence at or from an isolation point. Therefore, app-initiated actions relating to a lock include: an assertion-of-an-initial-placement action; a verification-of-an-initial-placement action; a confirmation-of-an-initial-placement action; an assertion-of-a-missing-lock action; an interrogation-of-a-lock-tag action; a command-lock-to-unlock action; and a shuttle-of-unacknowledged-lock-messages action. An app-initiated action relating to a system is an action initiated by use of the app, wherein such action relates to a system, such as creating a service team assigned to service a system. Therefore, such app-initiated actions relating to a system include: an addition-of-a-digital-personal-lock-to-a-virtual-lockbox-of-a-system action; a removal-of-a-digital-personal-lock-from-a-virtual-lockbox-of-a-system action; an addition-of-user(s)-to-a-service-team-assigned-to-a-system action; and a removal-of-user(s)-from-a-service-team-assigned-to-a-system action.

According to some embodiments, the investigative user interface permits a user to select a facility-of-interest, or an area-of-interest, or a unit-of-interest, or a system-of-interest, or an isolation-point-of-interest, or a user-of-interest, or a lock-of-interest. The investigative user interface may also permit a user to select a timeframe-of-interest, such as by selecting a date (or time and date) upon which such timeframe-of-interest begins, and by selecting a date (or time and date) upon which such timeframe-of-interest ends. In the event that a user selects a facility-of-interest and a timeframe-of-interest, then the user interface presents: (1) every lock event occurring within the timeframe-of-interest on a lock securing an isolation point that is a constituent of a system situated within the selected facility-of-interest; (2) every app-initiated action, within the timeframe-of-interest, relating to a lock securing an isolation point that is a constituent of a system situated within the selected facility-of-interest; and (3) every app-initiated action, within the timeframe-of-interest, relating to a system that is situated within the selected facility-of-interest. In the event that a user selects an area-of-interest and a timeframe-of-interest, then the user interface presents: (1) every lock event occurring within the timeframe-of-interest on a lock securing an isolation point that is a constituent of a system situated within the selected area-of-interest; (2) every app-initiated action, within the timeframe-of-interest, relating to a lock securing an isolation point that is a constituent of a system situated within the selected area-of-interest; and (3) every app-initiated action, within the timeframe-of-interest, relating to a system that is situated within the selected area-of-interest. In the event that a user selects a unit-of-interest and a timeframe-of-interest, then the user interface presents: (1) every lock event occurring within the timeframe-of-interest on a lock securing an isolation point that is a constituent of a system situated within the selected unit-of-interest; (2) every app-initiated action, within the timeframe-of-interest, relating to a lock securing an isolation point that is a constituent of a system situated within the selected unit-of-interest; and (3) every app-initiated action, within the timeframe-of-interest, relating to a system that is situated within the selected unit-of-interest. In the event that a user selects a system-of-interest and a timeframe-of-interest, then the user interface presents: (1) every lock event occurring within the timeframe-of-interest on a lock securing an isolation point that is a constituent of the selected system-of-interest; (2) every app-initiated action, within the timeframe-of-interest, relating to a lock securing an isolation point that is a constituent of the selected system-of-interest; and (3) every app-initiated action, within the timeframe-of-interest, relating to the selected system-of-interest. In the event that a user selects an isolation-point-of-interest and a timeframe-of-interest, then the user interface presents: (1) every lock event occurring within the timeframe-of-interest on a lock securing the selected isolation-point-of-interest; (2) every app-initiated action, within the timeframe-of-interest, relating to a lock securing the selected isolation-point-of-interest;

and (3) every app-initiated action, within the timeframe-of-interest, relating to a system including the selected isolation-point-of-interest as a constituent. In the event that a user selects a lock-of-interest and a timeframe-of-interest, then the user interface presents: (1) every lock event occurring within the timeframe-of-interest on the selected lock-of-interest; (2) every app-initiated action, within the timeframe-of-interest, relating to the selected lock-of-interest; and (3) every app-initiated action, within the timeframe-of-interest, relating to a system including, as a constituent, an isolation point secured by the selected-lock-of-interest. In the event that a user selects a user-of-interest and a timeframe-of-interest, then the user interface presents: every app-initiated action, within the timeframe-of-interest, whether relating to a lock or to a system, if initiated by the selected user-of-interest. Such lock events and app-initiated actions may be presented on a timeline, for example, or may be presented as a list that is ordered by chronology of the occurrence of such lock events and app-initiated action. This permits a user to view all of the events and actions, within a selected time-frame, occurring in or initiated in or by a chosen facility, area, unit, system, isolation point, user or lock, in order that such user may determine a root cause of a safety event, or to determine whether safety procedures are properly being followed, among other things.

According to some embodiments, upon selection of a timeframe-of-interest and a facility-of-interest, area-of-interest, unit-of-interest, system-of-interest, isolation-point-of-interest, user-of-interest, or lock-of-interest, the web client 1818 may interact with one or more web APIs 1816 to access the database to obtain the data to be displayed. According to certain embodiments disclosed herein, all of the lock events are determinable from the previously-described device event table, all of the app-initiated actions relating to a system are determinable from the historical counterpart tables of the teams table, team members table and lockbox table, and all or most of the app-initiated action relating to a lock are determinable from the device event table and the historical counterpart table of the isolation point table. In the event that a particular app-initiated event is not preserved and therefore determinable from the previously-described tables in the database 1800, such event may be preserved in an audit actions table in the database. Example: in response to invocation of retrieveLockPlacementInfo (in the context of a read tag action/operation) (operation 3386 of FIG. 16U), the middleware associated with the retrieveLockPlacementInfo API 1804 may create a record in the audit actions table to record the occurrence of such action/event by such user. A record in the audit actions table may include fields such as: an action type field to uniquely identify the type of action; an action date field to record the time and date of the action; a user ID field to record the user ID of the user having performed such action via the app; a facility ID to record the facility at which such action took place; a unit ID to record the unit at which such action took place; a system ID to record the system at which such action took place; an isolation point ID to record the isolation point at which such action took place, a lock ID to identify the particular lock involved in the action, and a description field containing text describing the action, for presentation on the investigative user interface, for example. In response to invocation, the middleware associated with the invoked web API(s) 1816 may: interact with the aforementioned tables to locate the sought-after lock events and app-initiated actions; generate a text string describing such lock events and app-initiated actions, and return a structured result that may be conceptually thought of as:

{time/date; facility; area; unit; system; isolation point; lock label; user name; string}.

Example: {Jun. 6, 2024, 1:32:06 PM; Area A; Atmospheric Distillation Unit; Bottom Pump Around; Inlet Valve; 12-34-56-78; John Doe; Initial Lock Placement}. Such data means "A lock bearing the identifier 12-34-56-78 on its label was initially placed by John Doe, at Jun. 6, 2024, 1:32:06 PM, upon the Inlet Valve of the Bottom Pump Around of the Atmospheric Distillation Unit in Area A of Facility #1." Example: {Jul. 15, 2024, 2:12:07 PM; Null; Null; Null; Null; 12-34-56-78; Null; Battery Removal}. Such data means "A battery was detected as having been removed from the lock bearing the identifier 12-34-56-78 at Jul. 15, 2024, 2:12:07 PM."

Thus, from such data, the web client may structure and populate the investigatory user interface, to permit the user to understand the various lock events and app-initiated actions in relation to one another, and in relation to facility equipment and employees and other users of the safety system.

Figure 27:
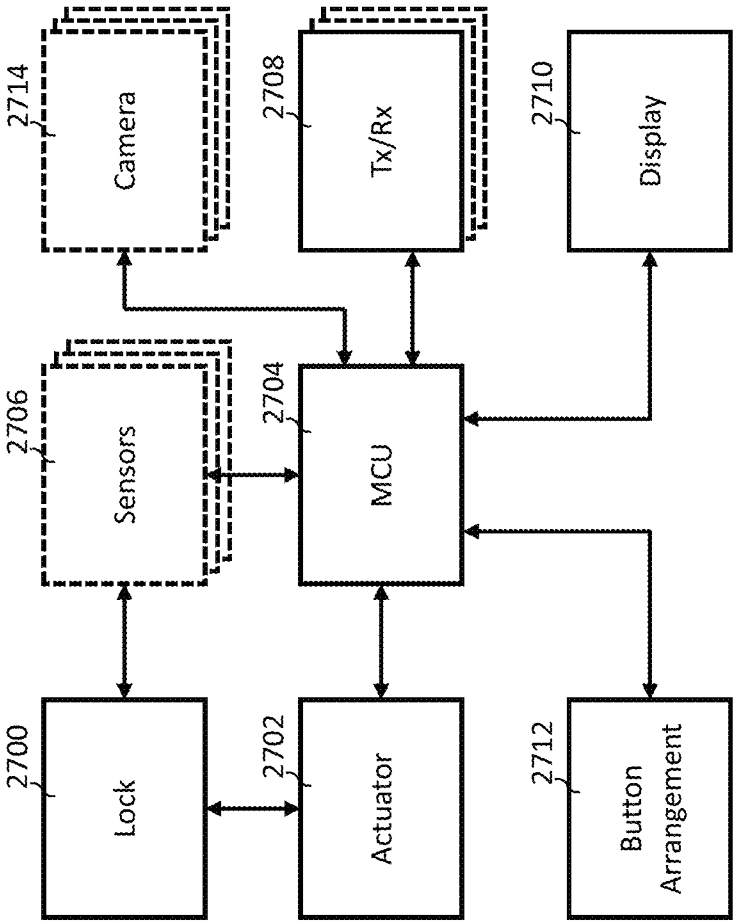
FIG. 27 depicts another exemplary embodiment of a lock that may be used in connection with the various embodiments of the safety system disclosed herein.

According to some embodiments, the safety system includes a lock structured as depicted in FIG. 27. As can be seen from FIG. 27, such embodiments include a locking mechanism 2700 (example: the mechanism may include a shackle, a lock body structured to receive the shackle, an engageable lock that can be engaged in a first manner so as to retain or lock the shackle closed and can be engaged in a second manner so as to free the shackle to open). An actuator 2702 engages the lock 2700, so as to either lock or unlock the shackle, or to simply unlock the lock, while closure of the shackle, itself, is sufficient to engage the lock mechanism 2700 in order to put it into a locked state. The action of the actuator 2702 is under control of firmware executing on a microcontroller 2704, so that the state of the lock (locked or unlocked) is under the control of such firmware, or so that it is the case that the lock 2700 can be unlocked via such firmware, while locking the lock 2700 occurs in response to having closed the shackle. According to some embodiments, the firmware may operate similar to those embodiments previously disclosed, and may have additional or different operations, as described herein.

According to some embodiments, the lock may include one or more sensors 2706 that detect information concerning the lock, itself, and also detect information about its environment. Examples of such sensors 2706 have been discussed previously, and include, without limitation, temperature sensors, humidity sensors, shackle state sensors (open/closed), shackle integrity sensors (intact/not intact), battery-level sensors, power source sensors (battery/supercapacitor) and light-level sensors. Such sensors 2706 are operably coupled to the microcontroller 2704 to provide it data, either synchronously or asynchronously (example: as a detected event occurs, such as upon the shackle being opened or closed, upon the shackle having been detected as being no longer intact, upon a temperature crossing a threshold, or upon a battery level crossing a threshold, and so on). Sensors 2706 that are to detect the occurrence of an event asynchronously may couple to one or more ports of the microcontroller 2704, and may stimulate the occurrence of an interrupt on the microcontroller 2704 in connection with such detection.

The lock may include one or more transceivers 2708 operably coupled to the microcontroller 2704 to permit it to communicate with a backend computing platform, such as the embodiments of such platforms that have been discussed previously, such as with reference to FIGS. 12 and 18, for example, and to permit communication with other devices, described below.

Discussion now turns to various embodiments of locks for use with in connection with the safety system, and description of how such a system operates, relative to operations that have been previously disclosed. All such embodiments include a lock mechanism 2700, actuator 2702, and microcontroller 2704, and preferably include sensors 2706, although this need not be the case.

Certain embodiments of the lock include a LoRa transceiver 2704 for communication access to a network coupled to a backend computing platform, and also include a Bluetooth transceiver 2704 for communication with an app executing on a mobile device (example: smartphone or tablet). This has been discussed in detail previously herein. These embodiments may also include a display 2710 (such as the display depicted in FIG. 14D) and a button arrangement 2712 that is embodied as a simple singular button 2712. Such a button 2712 has been discussed in detail previously herein. A safety system including such locks functions similarly to the embodiments described above with the exception that the operations of the lock are communicated to the user via the display-either via text, icons or images, or both, as opposed to be communicated to the user via illumination of a composite light element, as described previously. Examples: "Advertising for pairing"; "Connecting to app"; "Connected to app"; "Unlock command refused-Incorrect digital key"; "Digital key accepted-Unlocking lock"; "Unable to confirm success of unlock operation"; "Transmitting tag data"; "Transmitting log data"; "Transmitting unacknowledged lock event messages"; "Shackle cut detected"; "Shackle open detected"; "Shackle closed detected"; "Battery removal detected"; "Battery insertion detected"; "Running on supercapacitor power"; and so on. A display 2710 allows for precise and understandable communication with a user of the lock, without requiring such a user to memorize the meaning of the color of a light indicator, such as is the case in the context of embodiments of the lock with a composite light element as an output device.

According to other embodiments, the button arrangement 2712 is embodied as plural buttons, sufficient to permit navigation of a menu structure presented via the display 2710 (example: the arrangement 2712 may be embodied as a 5-way button arrangement—up, down, left, right, ok—similar to what is depicted in FIG. 14C, or may be embodied as a 3-way button arrangement—up, down, ok). According to embodiments, upon pressing one of the buttons in the arrangement 2712, the display is activated, and the firmware presents a menu. For example:

"Connect to App
Read Tag Information
Read Log Data
Battery Level
Temperature/Humidity
About"

The user may use the arrangement 2712 to navigate the menu. In response to selecting "Connect to App," the lock initiates advertising for connection via Bluetooth, in order to establish a communication link with the app, and the safety system operates as described previously. In response to the user selecting "Read Log Data" or "Battery Level" or "Temperature/Humidity," the lock simply either reads the sensor data and presents such data via its display 2710, or accesses the log information from memory and presents it via its display, such as in a paginated manner (example: one "page" at a time, with a "next page" option). In response to the user selecting "About," the lock may access memory to obtain model number data, firmware version data, and similar such data, lock identifier data or serial number, and may present such information to the user via the display 2710. Finally, in response to the user selecting "Read Tag Data," the lock may access memory to display: lock ID, isolation point being secured by the lock (example: area, unit, system, and isolation point names), the name of any person who initially placed the lock in such location, the time and date of such placement, the name of any person who verified the placement of such lock on such isolation point, the time and data of such verification, and the names of any persons who confirmed such placements, and the dates and times of such confirmations. Examination of FIGS. 16A-16U reveals that one of the initial operations involved in initially placing a lock, or in verifying such placement, or in confirming such placement is for the app to interrogate the lock in order to obtain its lock ID (see, for example, operation 1666 on FIG. 16F). This is done so that the lock ID can be combined with the user ID of the user logged into the app, and further combined with the selected isolation point and choice of action determined by the user interaction with the user interface of the app to form a data foundation for the desired action (example: this user ID is initially placing a lock identified by the returned lock ID at the isolation point indicated by the user interface interaction). Thus, the operations depicted previously in FIGS. 16A-16U may be altered to send information from the app to the lock indicating that the lock is being communicated with in connection with a particular user initiating an initial placement (or verification or confirmation) of the lock on a particular isolation point, and that data could be stored in memory by the firmware, so that it can be retrieved and displayed in response to the user having selected "Read Tag Data." According to some embodiments, such tag data is erased from memory upon the lock 2700 being unlocked.

According to some embodiments, the lock includes a display 2710 and a button arrangement 2712 sufficient to permit navigation of a menu, but the lock may also include a wireless data transceiver, such as a 4G or 5G or similar module 2708 operably couple to the microcontroller unit 2704, so that the firmware operating on the microcontroller 2704 can utilize network access and transmit and receive data at rates greater than is permitted via LoRa. Thus, such embodiments may include a LoRa transceiver 2708, a Bluetooth transceiver 2708 and a wireless data transceiver 2708, or may include a wireless data transceiver 2708 and a Bluetooth transceiver 2708, or may include a wireless data transceiver 2708 and a LoRa transceiver 2708, or may include only a wireless data transceiver 2708. The lock may also include a satellite transceiver or transceiver module 2708, either in addition to or in replacement of a LoRa transceiver 2708, a wireless data transceiver 2708, a Wi-Fi transceiver 2708, or a Bluetooth transceiver 2708. Such embodiments may include firmware executing on the microcontroller, wherein the firmware has been structured to perform operations similar to those described with reference to FIGS. 16A-16U (in other words the app may run on the lock). For example, such firmware operations may be structured as depicted in FIG. 29.

Figure 29:
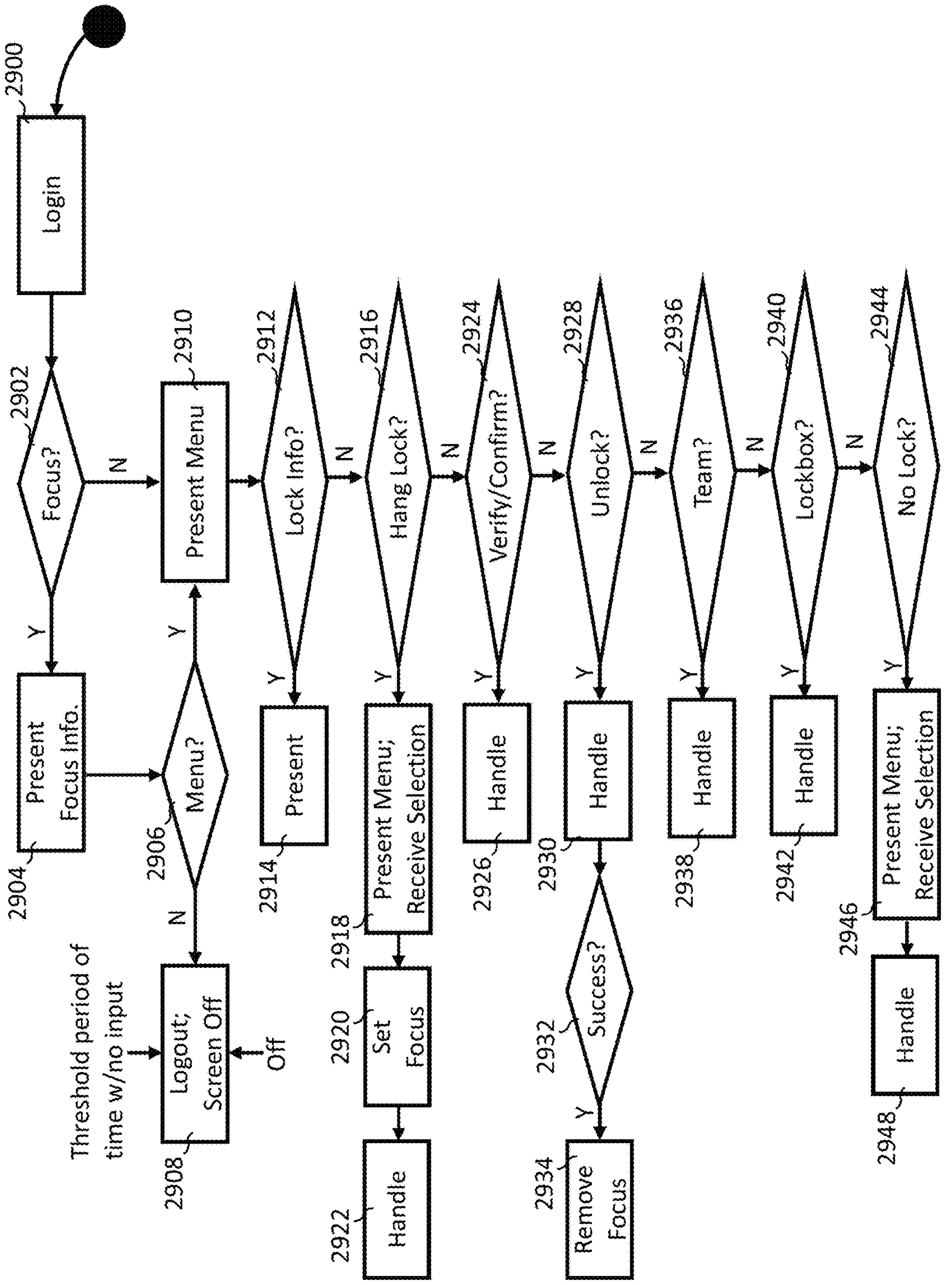
FIG. 29 depicts an exemplary embodiment of operational and state flow of firmware that may execute upon the microcontroller or processor of the various embodiments of the lock disclosed herein.

Turning to FIG. 29, a user of a safety system including such lock embodiments may initially interact with the button arrangement 2712 to activate the display 2710, which may initially prompt the user to enter login credentials, such as via using the arrangement to traverse a virtual keypad/keyboard presented on the display 2710. The ensuing login operations are similar to those described above, with reference to FIGS. 16A-16U. Thereafter, operational flow is passed to operation 2902.

In operation 2902, the firmware tests whether it has acquired a system of focus and an isolation point of focus. In the context of the discussion pertaining to the app, the user navigated a menu structure (1708, 1710, 1712 in FIG. 17D) in order to select a system of focus. The result was that the user interface of the app presented information concerning the system of focus. According to some embodiments, the firmware fixes the system of focus and isolation point of focus in connection with an initial placement of the lock on a particular isolation point of a particular system. This is discussed in greater detail below. The system of focus and isolation point of focus remains fixed until an unlock operation is performed. This is also discussed further, below.

In the event that there is, in fact, a system and isolation point of focus, then operational flow is passed to operation 2904. In operation 2904, the firmware presents on the display 2710: (i) the information contained in banner 1700 (FIG. 17F), identifying the system of focus, and indicating whether it is safe to service, and, if not, a reason for such status (as described previously); (ii) the information contained in field 1768 (FIG. 17F), indicating, relative to the system of focus, how many isolation points of such system are in each state; (iii) an isolation-point-by-isolation-point statement of the state of each particular isolation point of the system of focus; and (iv) a user interface element that the user may select to proceed on to a menu. Thus, the user may approach any lock securing an isolation point of a system that such user is to service, tap a button to activate its display 2710, login, and learn whether the system is safe to service, and further learn of the state of each of its isolation points.

Although not stated throughout the present discussion, it is to be understood that each screen contains a user interface element that the user may select to turn the lock "off," which, according to some embodiments, refers to putting the lock into a sleep mode, wherein most (but not all) of the circuitry is deactivated or quiescent. (Each screen, other than the login screen, also contains a user interface element to return to the menu, which is discussed below). In the wake of operation 2904, if the user elects to turn off the lock, such election is detected at operation 2906, and control is passed to operation 2908. In operation 2908, the user is logged out, and the display 2710 is deactivated. According to some embodiments, with each tap of a button in the arrangement 2712, a timer maintained by the firmware is reset (example: a 30-second timer is reset to zero). If the timer reaches a threshold (example: 30 seconds), then the timer fires, and the logout operation 2908 is invoked. Thus, if at any point, the user just walks away from a lock without selecting the "off" option, the user will be logged out and the display will deactivate.

Returning to the topic of test operation 2906, if it is determined that the user selected the menu option by which he or she elects to proceed on to the menu, then operational flow is passed to operation 2910, wherein the firmware displays such menu. Operation 2910 may also be reached in the event that test operation 2902 determined that the lock does not have a system of focus and isolation point of focus. According to some embodiments, in operation 2910 the firmware displays the following menu (although the menu options may be ordered or arranged or organized differently):

"Connect to App
Read Tag Information
Read Log Data
Battery Level
Temperature/Humidity
About
Hang Lock
Verify Lock Placement
Confirm Lock Placement
Unlock
Manage Team
Lockbox
Report Missing Lock"

According to some embodiments, the safety system may not include a mobile device on which the app executes. Thus, in the context of such embodiments, the first menu option may be omitted. For example, certain facilities may contain process areas or process blocks wherein the environment (example: the air) may contain explosive elements/materials. The management of such facilities may not permit personnel to bring mobile devices into such areas, as a protective measure—or may otherwise impose certain conditions pertaining to personnel bringing mobile devices into such areas. (It is to be understood that the locks disclosed herein are certified to be intrinsically safe, and are therefore suitable for use in such environments.) Embodiments of the safety system that eliminate the need for such mobile devices meet the needs of such facilities. If the menu does, in fact, contain such an option, then user selection of such option causes the lock to advertise for pairing via Bluetooth, and the system operates as previously described (i.e., driven via the app).

If the user selects "Read Tag Information," "Read Log Data," "Battery Level," "Temperature/Humidity," or "About"—i.e., if the user makes a menu selection seeking lock information—then such selection is detected in operation 2912, and the lock presents such information (operation 2914), as has been described in the context of discussion pertaining to the preceding embodiment.

Discussion now turns to firmware response to a user selection of "Hang Lock," "Verify Lock Placement," or "Confirm Lock Placement." According to some embodiments, the presentation of such menu options is mutually exclusive: if "Hang Lock" is presented in the menu, then neither "Verify Lock Placement" nor "Confirm Lock Placement" are; if "Verify Lock Placement" is presented in the menu, then neither "Hang Lock" nor "Confirm Lock Placement" are; and if "Confirm Lock Placement" is presented in the menu, then neither "Hang Lock" nor "Verify Lock Placement" are. According to some embodiments, if in operation 2904, it is determined that no system and isolation point focus has been acquired, then "Hang Lock" is presented in the menu (and neither "Verify Lock Placement" nor "Confirm Lock Placements" are included). According to some embodiments, if in operation 2904, it is determined that a system and isolation point focus has been acquired, and if no verification operation has been recorded, then "Verify Lock Placement" is presented in the menu (and neither "Hang Lock" nor "Confirm Lock Placement" are included). According to some embodiments, if in operation 2904, it is determined that a system and isolation point focus has been acquired, and if a verification operation has, in fact, been recorded, then "Confirm Lock Placement" is presented in the menu (and neither "Hang Lock" nor "Verify Lock Placement" are included). According to some embodiments, access to or presentation of "Hang Lock," "Verify Lock Placement," and "Unlock" are subject to user role restrictions like those previously described. Thus, if the particular user that logs in at operation 2900 is an operator, then the menu includes "Hang Lock" or "Verify Lock Placement" or "Unlock," but the menu excludes such options, if the user is assigned a different role.

In the event the user selects the "Hang Lock" menu option, then such selection is detected in operation 2916, and operational flow is passed to operation 2918. In operation 2918, the firmware presents, via the display 2710, a menu structure similar to the one presented in FIG. 17D, except that it also includes a menu by which an isolation point may be selected. In other words, the user makes a selection of area, unit, system, and isolation point, and the firmware receives such selections. Thus, at this stage, the firmware has constructed data to record that a user identified by the user ID obtained during the login operation 2900 is intending to hang a lock identified by the lock ID stored on the microcontroller's 2704 memory at an isolation point identified by the aforementioned menu selection, at a time and date determined by a clock onboard the microcontroller 2704. Next, in operation 2920, the focus is set to the system and isolation point determined by the user's aforementioned menu selection. This means that the next time a user logs in, in operation 2904, the safety summary information and isolation point information presented by the firmware will pertain to the system of focus. This also means that the next time a user logs in to verify or confirm the lock placement, the firmware will interpret such menu selections (i.e., "Verify Lock Placement" or "Confirm Lock Placement") as pertaining to the isolation point of focus. In the wake of operation 2920, operational flow is passed to operation 2922, and the firmware performs operations similar to those previously described in the context of the interaction of the app and backend computing platform 1208 to conduct an initial lock placement operation.

In the event the user selects either "Verify Lock Placement" or "Confirm Lock Placement," then the firmware detects such selection (operation 2924), and interprets such menu selection as applying to the isolation point of focus. The firmware responds to such selection by performing operations similar to those previously described in the context of the interaction of the app and backend computing platform 1208 to conduct a verification or confirmation operation, as the case may be (operation 2926).

In the event the user selects "Unlock," then the firmware detects such selection (operation 2928), and performs operations similar to those previously described in the context of the interaction of the app and backend computing platform 1208 to conduct an unlock operation (operation 2930). In operation 2932 the firmware tests to determine whether the unlock command was successful (e.g., determines whether the role of the user is such that the command should be honored, determines whether there are any digital personal locks on the virtual lockbox associated with the system of focus, determines whether the digital key returned by the backend computing platform 1208 in operation 2930). If so, then the system of focus and isolation point of focus assigned to the lock is cleared (operation 2934).

In the event the user selects the "Manage Team" button, the firmware detects such selection (operation 2936) and presents, via the display xx10, a user interface providing the user with the option to add or remove team members to or from a service team assigned to the system of focus. The user interface may parallel the user interface depicted in FIGS. 17O-17R, and the firmware may perform operations that parallel those described with reference to the app adding or removing members to a team (or creating a new team) (or removing a team) (operation 2938).

In the event the user selects the "Lockbox" button, the firmware detects such selection (operation 2940) and presents, via the display 2710, a user interface providing the user with the option to add or remove his or her digital personal lock to or from the virtual lockbox corresponding to the system of focus. The user interface may parallel the user interface depicted in FIGS. 17L-17N, and the firmware may perform operations that parallel those described with reference to adding or removing such digital personal locks (operation 2942).

In the event the user selects the "Report Missing Lock" button, the firmware detects such selection (operation 2944) and presents, via the display 2710, a menu structure to permit the user to identify which particular isolation point he or she believes to be missing a lock. The menu structure may be similar to that presented in operation 2918, discussed previously, except that it may include only those isolation points at which a lock is presently asserted to have been hung (to prevent a user from reporting a lock missing from an isolation point that is, in fact, not believed to have a lock placed upon it). Therefore, as part of operation 2946, the lock calls the backend computing platform 1208, to obtain a list of every isolation point that is presently asserted to have a lock initially placed thereupon, and receives a response therefrom. After selection of the area, unit, system and isolation point, the firmware may prompt the user to confirm the issue, such as presenting a screen similar to that depicted in FIG. 17K. In the wake of such confirmation, the firmware performs operations paralleling those described with reference to the app interacting with the backend computing platform 1208 to report that a lock previously claimed to have been placed on an isolation point is, in fact, missing (operation 2948).

The foregoing discussion pertaining to the lock executing firmware similar to the previously-described app has been presented in the context of a lock having a wireless transceiver module 2708, meaning interactions between the firmware and the backend computing platform 1208 are conducted via wireless data access. According to some embodiments, the lock may include a WiFi transceiver module 2708, and the aforementioned interactions may be conducted via WiFi. According to some embodiments, the lock may include a LoRa transceiver 2708, and the aforementioned interactions may be conducted via LoRa. According to some embodiments, the lock may include a satellite transceiver 2708 or satellite transceiver module 2708, and the aforementioned interactions may be conducted via a satellite communication service such as IRIDIUM® and the like. According to some embodiments, interactions between the lock and the backend computing platform 1208 that are initiated by the user via the aforementioned menu structure are communicated via wireless data or WiFi or satellite, as the case may be, while other interactions (e.g., heartbeat messages) may be communicated via LoRa (to preserve battery power).

The foregoing discussion pertaining to the lock executing firmware similar to the previously-described app has been presented as though the firmware duplicates substantially all of the capabilities of the app. According to some embodiments, the firmware duplicates only a portion of such capabilities. For example, the firmware may exclude the capabilities pertaining to adding/removing personal digital locks to and from virtual lockboxes, and may also exclude the capabilities pertaining to managing a service team. The excluded capabilities may be performed via the app, or may be performed via computer stations (performing operations paralleling those already described herein), such as at computer stations located at a safety office at a facility. According to some embodiments: (i) the safety system excludes an app executing on a mobile device; (ii) includes firmware executing on the app, as described above; (iii) such firmware excludes certain capabilities; and (iv) the excluded capabilities must be performed at computers located at an office or offices located at the facility. These embodiments force service personnel to visit such offices, which permits office personnel to work with service personnel to perform administrative tasks (e.g., sign forms, show identification, and the like).

According to some embodiments, the safety system includes locks that, in turn, include a wireless data transceiver modules (or a WiFi transceiver module) as their only transceivers (example: such locks include a wireless data transceiver, but no Bluetooth transceiver, or include a WiFi transceiver, but no Bluetooth transceiver). The aforementioned safety system includes instances of the previously disclosed app executing on mobile devices. This raises the issue of how the app communicates with a particular lock, given that embodiments of such locks do not have a Bluetooth transceiver modules.

Figure 30:
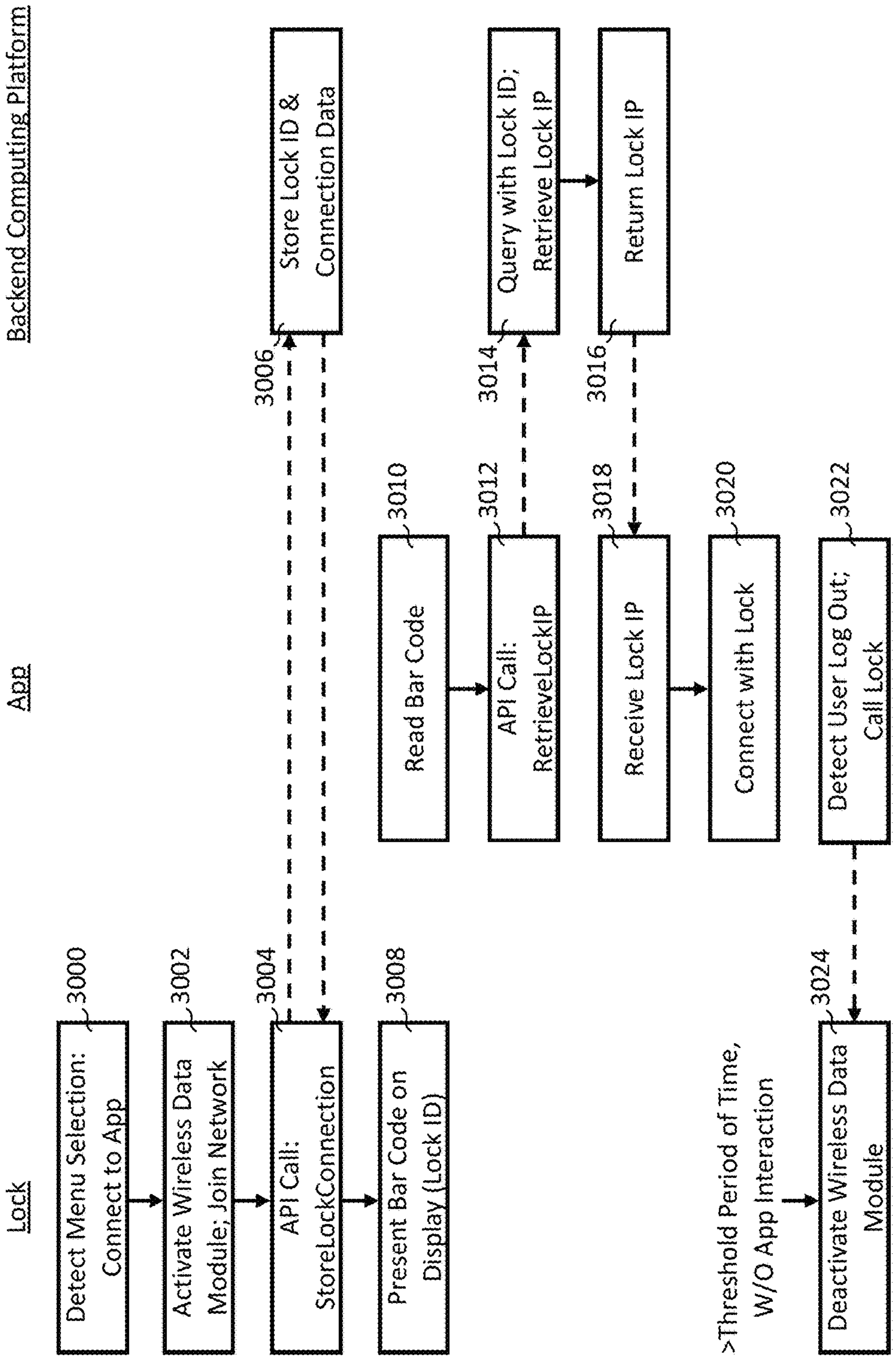
FIG. 30 depicts an exemplary operational flow that may be performed by various embodiments of firmware executing on the microcontroller or processor of the aforementioned lock, an app executing on the microcontroller or processor of the aforementioned mobile device, and various embodiments software executing on the backend computing platform.

FIG. 30 depicts an embodiment of an operational flow by which the app may communicate with a particular lock. The operational flow of FIG. 30 assumes the lock may operate in a manner congruous to that depicted in FIG. 29, but augmented with additional operations. Thus, if it is the case that at operation 2910 (wherein the lock presents the aforementioned menu via the display) the user selects the "Connect to App" menu option, then such selection is detected in operation 3000.

Next, in operation 3002, the wireless data module is activated and the network (example: 4G or 5G network) is joined. It is assumed that the network assigns the wireless data module 2708 a public IP address (either static or dynamic) upon joining such network. Thereafter, in operation 3004, the firmware initiates an API call to the backend computing platform 1208, sending the platform 1208 a unique identifier, such as the lock ID of the lock. At the backend computing platform 1208, the IP address is obtained from the incoming API call, and is stored in association with the aforementioned unique identifier (operation 3006), such as in database 1800. According to some embodiments, the unique identifier and IP address are stored as a record in a table in the database 1800, and prior to creation of such a new record, the aforementioned table is queried to determine whether it already contains a record containing the aforementioned identifier, and if it does, then the field containing the IP address is updated to contain the IP address obtained from the incoming API call—this accommodates the possibility that the lock's IP address may not be static, and may change at the time the wireless data module 2708 joins the network. The backend computing platform 1208 returns a reply to the aforementioned API call, signifying the successful storage of the IP address/unique identifier pair. Receipt of such response causes the operational flow to proceed to operation 3008, whereupon the firmware presents the unique identifier on the display 2710, such as in characters or in encoded format, such as via a barcode. By presenting the identifier on the display 2710 after having received the aforementioned response, it is known that the IP address/unique identifier pair is stored at the backend computing platform 1208 prior to operational flow having advanced.

Next, in operation 3010, the user uses the app to read the barcode. Alternatively, the unique identifier may be entered into the app by the user, if it was displayed on the screen. Alternatively, the unique identifier may be stored in a near field chip (NFC), and in operation 3010, the app may read such NFC and obtain the unique identifier. Alternatively, instead of presenting the barcode via the display 2710, the barcode may be printed on the lock or on a label disposed (example: adhered) on the lock's housing 1304 or 1306, and in operation 3010, the user may use the app to read the aforementioned barcode and thereby obtain the unique identifier. Alternatively, the unique identifier may be printed on the lock or on a label disposed (example: adhered) on the lock's housing 1304 or 1306, and in operation 3010, the user may use the app to read such identifier via optical character recognition.

Next, in operation 3012, the app initiates an API call to the backend computing platform 1208, sending the platform 1208 the unique identifier obtained via the previous operation 3010. At the backend computing platform 1208, the unique identifier is used to obtain the lock's IP address, such as by using it to query the aforementioned table in the database 1800, to locate a record with a matching identifier and then reading the field containing the corresponding IP address (operation 3014). Thereafter, the backend computing platform 1208 responds to the API call by returning a reply message containing the IP address of the lock (operation 3016). The app receives the IP address (operation 3018), and uses it to connect to the lock (operation 3020).

According to some embodiments, in connection with the user logging out of the app (3022), the app sends a message to the lock and the firmware executing on its microcontroller 2704 responds by deactivating the wireless data transceiver module 2708 (or WiFi transceiver module 2708, as the case may be) (operation 3024), and, according to some embodiments, deactivating the display 2710, if it was, in fact, activated (operation 3024). According to some embodiments, in the event that no message is received from the app for more than a threshold period of time (example: 30 seconds), then the firmware responds similarly.

According to some embodiments, the lock includes an NFC reader among its various transceivers 2708. Each user of the safety system may be provided a badge or other item with an NFC chip (example: RFID tag) embedded therein, wherein each chip contains a unique identifier (example: a user ID) assigned to the user. The relationship between the aforementioned unique identifier and the user's account information (role, title, name, facility to which he or she is assigned and so on, as described previously) may be stored at the backend computing platform 1208, such as in the database 1800. Thus, during login, the user may use the button arrangement 2712 to navigate to a menu option indicating that the user prefers to login via NFC, and the microcontroller 2704 may activate the NFC reader 2708, read the NFC chip, thereby acquiring the unique identifier, and call the backend computing platform 1208, passing along the unique identifier, to conduct the login process in accordance with the login steps previously described. (According to some embodiments, the app operates on a mobile device that includes an NFC reader, and the user may login as just described.)

According to some embodiments, the lock includes a fingerprint reader among its various sensors 2706. As a part of registration for use of the safety system at a given facility, each user of the system may have his or her fingerprint data read and stored at the backend computing platform 1208 in association with his or her account information (role, title, name, facility to which he or she is assigned and so on, as described previously). Thus, during login, the user may use the button arrangement 2712 to navigate to a menu option indicating that the user prefers to login via fingerprint, and the microcontroller 2704 may activate the fingerprint reader 2706, which then reads the user's fingerprint, and returns such fingerprint data to the firmware (such as in a standard format, such as ANSI 381 or ISO 19794-2 or the like). The firmware calls the backend computing platform 1208, passing along the fingerprint data, and the fingerprint data is compared to data the various users' fingerprint data in order to identify which particular user is logging in, and upon matching the fingerprint data to a particular user account, the login process is conducted in accordance with the login steps previously described. (According to some embodiments, the app operates on a mobile device that includes a fingerprint reader, such as an in-display fingerprint reader, and the user may login as just described.)

According to some embodiments, the lock includes one or more cameras 2714. For example, the lock may include a camera 2714 housed in the front portion of the upper housing 1304 or lower housing 1306, such as above or beneath the membrane 1354 that forms the touchable portion of the button arrangement 2712, and, according to some embodiments, approximately such camera 2714 may be centrally disposed (in the context of embodiments wherein the button arrangement 2712 is a simple singular button), or, in the context of embodiments wherein the button arrangement 2712 includes plural buttons, such a camera 2714 may be housed in the front portion of the upper housing 1304 or lower housing 1306, above or below such arrangement 2712 and, according to some embodiments, such camera 2714 may be approximately centrally disposed. According to some embodiments the lock includes cameras 2714 housed within plural faces of its housing 1304, 1306. For example, if one considers the geometry of the lock to be approximately similar to a rectangular block with six faces, then the lock may include a camera 2714 housed within its front face, each side face, its rear face, and its upper and lower faces.

According to some embodiments, the firmware is structured so as to command the camera or cameras 2714, to capture each event by which a lock was initially placed upon an isolation point in order to secure it, each subsequent verification event, each subsequent confirmation event, any subsequent event by which the lock was unlocked, and any subsequent event by which the lock determined that its shackle had been cut (as discussed previously). Thus, the firmware may command such cameras 2714 to capture an image while the lock's button arrangement 2712 is initially interacted with, so as to ensure that the user's face will be captured in one of the images. Thereafter, upon the firmware receiving input indicating that the interaction was in connection with an event that is to be memorialized by imagery, the data constituting the image may be transmitted via one of its transceivers (example: via a wireless data transceiver module 2708 or WiFi transceiver module 2708) to the backend computing platform 1208 for storage in the database 1800 in association with such event (or the image files may be stored in a directory, while the name and path are stored in the database 1800 in association with such event, or similar arrangements). For example, in the context of embodiments wherein the app is executing on a mobile device, a hang event, verify event, confirmation event, and unlock event all include an initial operation whereby the app seeks the lock identifier from the firmware (example: operation 1666, operation 3204, operation 3224, operation 3248)—such operations (i.e., the Get Lock Info command) may be altered to include data identifying the particular operation (i.e., hang, verify, confirm, unlock, other), user ID, and isolation point in connection with which the lock ID is being requested (example: "the lock ID is being requested in connection with a user identified by a particular user ID, wanting to perform a particular operation, upon an isolation point identified by a particular isolation point ID"). The firmware may test on the basis of such data, and send the image data to the backend computing platform 1208, along with such operation data, user ID, isolation point ID, and lock ID, if such data indicates that the lock ID is being sought in connection with a hang, verify, confirm, or unlock operation (so that the image data may be associated with a particular event). On the other hand, in the context of embodiments wherein the app is executing on the lock, the firmware may respond to a menu selection (made via the button arrangement 2712) indicating that the user intends to initially place the lock on an isolation point, or verify such placement, or confirm such placement, or unlock the lock, by activating its cameras 2714, capturing image data, and sending such data, along with the user ID of the logged in user, operation data identifying the operation, the isolation point ID of the isolation point of focus (e.g., see operation 2920) and the lock's lock ID, to the backend computing platform 1208 for storage in association with such event. Furthermore, the firmware may be structured so as to immediately activate its one or more cameras 2712 in response to having detected that its shackle has been cut, and may transmit such image data to the backend computing platform 1208, along with its lock ID and data indicating that the shackle had been detected as having been cut, for storage in the database 1800 in association with such event.

By capturing the image data associated with the aforementioned events, and storing such image data in association with such events for later retrieval, further verification of the event may be had (by virtue of the image of the particular user actually performing such event, combined with background imagery or image data from the other cameras confirming the setting of the action as being actually located at the isolation point in question).

According to some embodiments, the image data may be used to identify the particular isolation point at which a given lock is initially placed. Thus, such information may be used in the context of the initial placement (hang) operation, the verification operation, and the confirmation operation, without necessarily requiring the user to navigate a menu structure to identify the isolation that is the subject of the operation.

Figure 31:
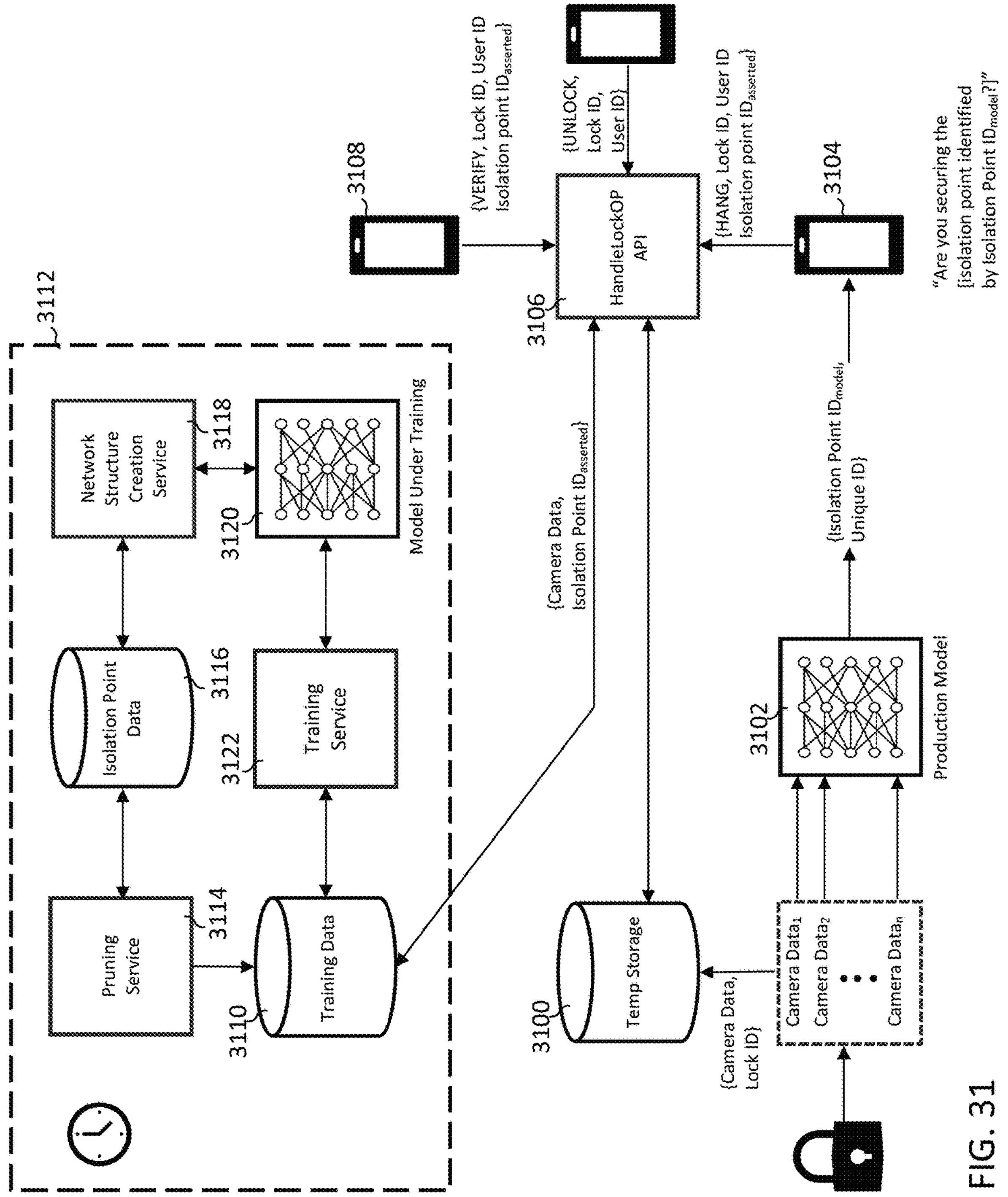
FIG. 31 depicts an exemplary embodiment of a software system that may reside and execute at various embodiments of the aforementioned backend computing platform.
Figure 32:
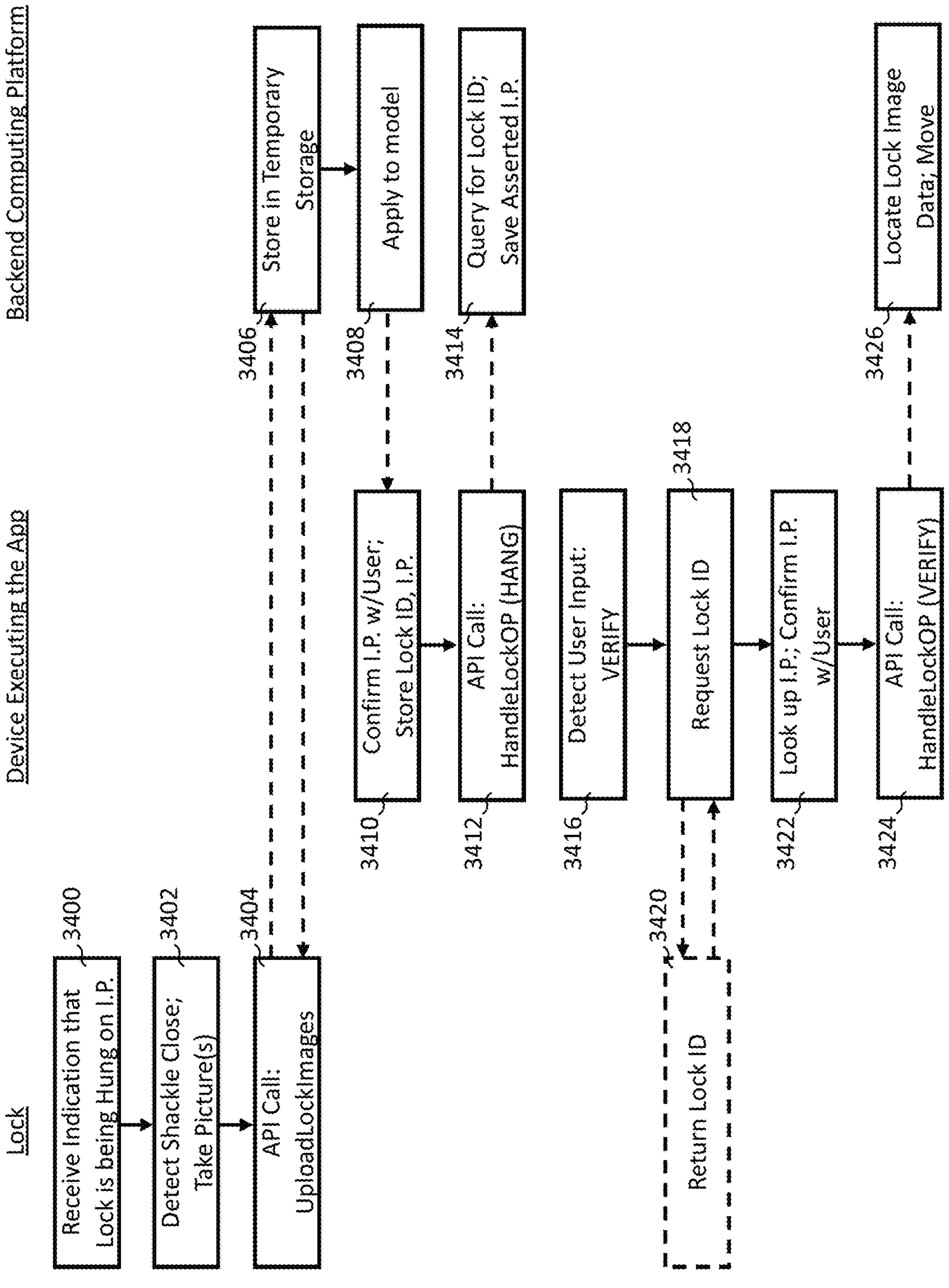
FIG. 32 depicts an exemplary operational flow that may be performed by various embodiments of firmware executing on the microcontroller or processor of the aforementioned lock, an app executing on a microcontroller or processor, and various embodiments software executing on the backend computing platform.

FIG. 31 depicts a system for using such image data to identify the particular isolation point at which a lock is situated, and FIG. 32 depicts a corresponding method for arriving at such determination. One of ordinary skill in the art will understand that the output of such system and method (i.e., the identification of the particular isolation point at which a lock is situated, e.g., the isolation point ID corresponding to such isolation point) is to be used in connection with the initial hang operations, verification operations, confirmation operations, and unlock operations previously disclosed herein, and as modified to accommodate such determination having been calculated on the basis of image data. The method of FIG. 32 is depicted as involving operations performed by the lock, by the backend computing platform 1208, and by operations performed by the device executing the app. Thus, FIG. 32 is presented as though the device executing the app is not the lock. However, this need not be the case—the device executing the app may, in fact, be the lock, and the operations shown as being performed by such device may, in fact, be performed by the lock. Similarly, FIG. 31 depicts a system that includes a lock and various mobile devices. The mobile devices therein may actually be locks, and the actions attributed to such devices in the following discussion may, in fact, be performed by firmware executing on the microcontroller 2704 of a lock.

As can be seen from FIG. 32, the system begins its operation with a lock receiving an indication that it is being placed upon an isolation point. For example, assuming the device executing the app is a mobile device (and not the lock), then the aforementioned initial interaction between the app and the firmware by which the app requests the firmware to return its lock ID (example: operation 1666) may be supplemented so that the Get Lock Info command includes a payload including data indicating: (i) the user ID of the particular user logged into the app; and (ii) an indication that the user has tapped a button indicating that he or she intends to hang a lock at an isolation point. By testing such data at operation 3400, the firmware may determine that it has received an indication the lock is being placed on an isolation point. On the other hand, assuming that the device executing the app is the lock (i.e., the app is executing as firmware on the microcontroller 2704 of the lock, as described above), then such determination may be received if it is the case that the firmware detects that the user made a menu selection indicating he or she intends to hang a lock on an isolation point, such as the sort of detection that is made in the context of operation 2916, which was described previously.

Upon receiving an indication that the lock is to be hung upon an isolation point to secure it (operation 3400), operational flow is passed to operation 3402. In operation 3402, the firmware executing on the microcontroller 2704 detects that the shackle has closed, meaning that the lock should be securing an isolation point at this stage. For example, such detection may be initiated by a signal from a sensor 2706 delivered to a port of the microcontroller 2704, such as a microswitch 2706 delivering a voltage transition (example: a transition from 3 volts or 3.3 volts or similar voltage to ground) to the aforementioned port. In response to such detection, the firmware activates one or more of the cameras 2712 and uses them to collect image data. Given that the lock is located at and securing a particular isolation point, the collective image data from the cameras 2712 will contain features that can be used to identify the particular isolation point. In operation 3404, the firmware initiates an API call to the backend computing platform 1208, and uploads the image data. Conceptually, the uploaded data may be structured as:

{Lock ID, $CAMERA_1$, image_data, $CAMERA_2$, image_data, . . . . $CAMERA_n$, image_data}

Thus, the image data from each camera is associated with the lock ID from which it was sent and, according to some embodiments, with a camera ID that identifies the particular camera from which the image data emanates (e.g., in the case of embodiments wherein the lock includes plural cameras). It may be advantageous for embodiments of the lock to include plural cameras housed on various faces of the lock, in order to obtain image data from various angles, maximizing the likelihood of such collective image data including recognizable features.

In operation 3406, the middleware associated with the aforementioned API (UploadLockImages), stores the uploaded data in temporary storage 3100, and also delivers the image data to a neural network model 3102. The neural network model 3102 receives the collective image data as input data, and delivers as an output the isolation point ID most likely to correspond to the input data (operation 3408). For example, the model 3102 may include as many output nodes as there are isolation points in the facility the safety system is serving, so that each output node corresponds to a particular isolation point. The outcome of applying the image data to the model 3102 is that each output node will exhibit an output value, and the particular output node exhibiting the greatest output value corresponds to the particular isolation point that the lock is most likely to be securing, given the collective image data. Thus, the most likely (or set of n most likely) isolation point(s) are returned to the device executing the app, along with the lock ID, according to some embodiments (indicating that "the artificial intelligence of the backend platform 'thinks' that the lock corresponding to this lock ID was just hung on an isolation point corresponding to this isolation point ID"). In FIG. 31, the device executing the app is depicted as a mobile device. As described previously, the device executing the app may be the lock, itself.

In operation 3410, the device executing the app confirms the isolation point returned by the model 3102 as being correct. For example, the app may present a message such as: "Are you securing the inlet valve (example isolation point) of the bottom pump around (example system) of the distillation unit (example unit) in Area C (example area)?" If the user responds in the affirmative, that means the model 3102 generated the correct isolation point ID, and operational flow advances to operation 3412. If the user responds in the negative, then the user is prompted to identify the isolation point being secured by traversing a menu structure, as described previously. In either case, the isolation point identified by the user-either through confirming in the affirmative, or through manual identification, such as traversal of a menu structure—is considered to be the isolation point identity asserted by the user. The asserted isolation point and the lock ID passed to the app by the backend computing platform 1208 are stored in association with one another (operation zy10). Next, in operation 3412, the device executing the app makes an API call (HandleLockOp API 3106), indicating that a particular lock has been hung on a particular isolation point (i.e., the asserted isolation point) by a particular user, as has been described previously. For the sake of brevity, the details of the operational flow associated with such API call are not repeated here. In addition to performing operations congruous to those recited previously with respect to processing the initial placement of a lock on an isolation point, in operation 3414, the middleware associated with the aforementioned API 3106 searches the temporary storage facility 3100 for image data associated with the lock ID passed to the API in connection with its invocation, and upon locating such image data, it stores the asserted isolation point ID in association with such image data.

In operation 3416, a different user of the safety system performs a verification operation to verify that the lock indicated as having been hung on the asserted isolation point in operation 3412, was, in fact, hung on such isolation point, and not, in fact, hung errantly on some other isolation point. Thus, the user of the device executing the app 3108 taps a user interface selection indicating that he or she wishes to verify a placement of a lock, and such selection is detected by the app/firmware of the device executing the app 3108 (operation 3416). Next, in operation 3418, the device executing the app 3108 commands the lock to return its lock ID, and the firmware executing on the lock responds accordingly (operation 3420). (If the device executing the app is the lock itself, operations zy18 and zy20 are omitted.).

In operation 3422, the lock ID is used by the device executing the app 3108 to look up the asserted isolation point stored in association with such lock ID during a previous execution of operation 3410. If the device executing the app 3108 is the lock, itself, then the asserted isolation point for such lock is simply retrieved from memory. Thereafter, the user is prompted to confirm the asserted isolation point is correct. Example: "Are you verifying that this lock is securing the inlet valve (example isolation point) of the bottom pump around (example system) of the distillation unit (example unit) in Area C (example area)?" Assuming the user answers in the affirmative, then the flow advances to operation 3424. (If, on the other hand, the verifying user believes the lock is misplaced, he will have to unlock it, and place it on the correct isolation point, as an initial placement operation, and the flow starts over at operation 3400. According to some embodiments, if at any time a lock is unlocked, then the middleware associated with the HandleLockOp API 3106, searches the temporary storage for image data associated with lock ID and asserted isolation point ID, and removes such data from the temporary storage 3100. Thus, if a user performing the verification operation determines that the lock had been errantly placed on the wrong isolation point during the initial hang operation, his or her response-unlocking the lock in order to remove it, and re-hang it in the correct location-will cause the image data and associated isolation point ID and lock ID to be removed from the temporary storage 3100.) In operation 3424, the device executing the app 3108 initiates an API call (HandleLockOp API 3106), passing the lock ID, user ID of the logged in user, asserted isolation point ID, and data indicating a VERIFY operation is being performed. The middleware associated with the HandleLockOp API 3106 performs operations congruous to those described previously in the context of a verification operation, and, for the sake of brevity, those operations are not reiterated here. In addition to the aforementioned operations, the middleware searches temporary storage 3100 for image data associated with the lock ID and asserted isolation point ID passed to it, and moves the image data and isolation point data into storage devoted to storing training data 3110. By moving the image data into the training data storage facility 3110 only after verification, it is assured that the training data used to relate image data to isolation point ID is correct, and not gathered on the basis of an errant initial lock placement. According to some embodiments, during a verification operation, the cameras 2714 are activated and a another set of image data is sent to the HandleLockOp API 3106, for the middleware associated therewith to transfer into the storage facility devoted to storing training data 3110. This generates more training data, and may assist in gather image data that may exclude temporary features (such as a facility worker that happened to be walking into the field of view of one of the cameras 2714 during a different occasion on which image data may have been captured). According to some embodiments, such image data is captured and similarly conveyed into the storage facility devoted to storing training data 3110 with each confirmation operation. Conceptually, the data in the training data storage facility 3110 may be structured as:

{Isolation Point $ID_1$, CAMERA1, image_data, $CAMERA_2$, image_data, . . . . $CAMERA_n$, image_data
Isolation Point $ID_1$, CAMERA1, image_data, $CAMERA_2$, image_data, . . . . $CAMERA_n$, image_data
Isolation Point $ID_1$, CAMERA1, image_data, $CAMERA_2$, image_data, . . . . $CAMERA_n$, image_data
Isolation Point $ID_1$, CAMERA1, image_data, $CAMERA_2$, image_data, . . . . $CAMERA_n$, image_data
Isolation Point $ID_2$, CAMERA1, image_data, $CAMERA_2$, image_data, . . . . $CAMERA_n$, image_data
Isolation Point $ID_2$, CAMERA1, image_data, $CAMERA_2$, image_data, . . . . $CAMERA_n$, image_data
. . .
Isolation Point $ID_n$, CAMERA1, image_data, $CAMERA_2$, image_data, . . . . $CAMERA_n$, image_data}

In other words, with each occurrence of a lock being placed upon a given isolation point (if such placement is later verified), image data originating from the camera(s) 2712 of the particular lock used to secure that isolation point are added to the training data storage facility 3110. Thus, if a given isolation point had been secured with a lock (and verified) a quantity of 100 times, then the facility 3110 would include at least 100 sets of image data—each of which is associated with the isolation point ID corresponding to the aforementioned given isolation point. (The facility 3110 may also contain image data originating from each verification event or confirmation event, as discussed previously, and, in the context of the previous example, may therefore contain more than 100 sets of image data.) Thus, body of the training data accumulates as lockout activity is carried out.

According to some embodiments, the training data storage facility is included within a training system 3112, which includes various components (e.g., facilities, services, and so on) that operate pursuant to a scheduler. For example, a scheduler may initiate operation of a pruning service 3114 (example: once per day or once per week). The pruning service 3114 has access to a repository of isolation point data 3116 that includes the isolation point ID of every isolation point in the facility served by the safety system (example: it may have access to the aforementioned isolation point table). The pruning service 3114 identifies any image data associated with an isolation point ID that is absent from the repository of isolation point data 3116, and prunes such data from the training data storage facility 3110. For example, the service may move such data to another storage facility, or flag such data for exclusion from use in training, or may delete such data. One purpose of the pruning service 3114 is to accommodate the fact that facilities change over time, and therefore isolation points that existed previously may have been eliminated. Thus, the pruning service 3114 may interact with the training data storage facility 3110 to obtain a list of unique isolation point IDs therein, and, on a one-by-one basis, may query the isolation point data repository 3116 for return of any record including a given isolation point; if no record is returned, then the service 3114 may respond by pruning such image data, such as via any of the methods described previously.

The aforementioned scheduler may also initiate operation of a network structure creation service 3118—for example, at approximately the same time the pruning service 3114 had been initiated. A network structure creation service 3118 also has access to the isolation point data repository 3116, and makes use of such access to create a model structure 3120 suitable for the facility, given its current configuration (e.g., given how many isolation points it currently has). Thus, the network structure creation service 3118 may create a neural net structure 3120 with sufficient input nodes to receive the image data, a chosen quantity of intermediate layers and nodes, and an output layer with one node for each isolation point in the repository 3116, so that there is a one-to-one correspondence between any given node in the output layer and an isolation point ID in the repository 3116.

Upon completion of the operations of the pruning service 3110 and network structure creation service 3118, the scheduler may initiate operation of a training service 3122. The training service accesses the training data in the facility 3110, and applies it to the model structure 3120, in order to train it, according to methods understood in the art of artificial intelligence. Upon completion of training, the newly-trained model 3120 is deployed in production, replacing the previous production model 3102.

Using image data to identify the particular isolation point on which a lock is situated addresses the inability of GPS data to operate accurately in certain environments, including environments that do not permit a clear transmission path to the sky and/or present the prospect of incoming GPS transmissions having reflected off of one or more structures along their path to the GPS transceiver. A refinery is an example of such an environment. Thus, according to embodiments wherein a GPS receiver 2708 is included among the transceiver modules 2708, in the context of a refinery, it may be that the produced positional data contains approximately 200 yards or so of positional error on certain occasions. In such settings, GPS data, alone, is insufficient to identify the particular isolation point on which a lock is situated. According to some embodiments, the lock includes a GPS module 2708, and the positional data therefrom is used in concert with image data from the camera(s) 2712 as inputs to the model 3102 and 3120, along with the image data, as described previously. Such positional data may serve as a "coarse tune," while the image data serves as a "fine tune." According to some embodiments, beacons or NFC chips could be placed at or near isolation points, and the locks contain NFC readers and Bluetooth receivers to receive signals emanating from such devices, and may determine their location on the basis of such signals. However, beacons require battery power, and such embodiments require preparation of a facility to be serviced by the safety system, i.e., placement of such NFC chips throughout the facility or placement of such beacons throughout—all of which places burden upon the operator of such facility. Nevertheless, the safety system may include such NFC chips and beacons.

According to some embodiments, a command may be sent to a lock, such as from the backend computing platform 1208 (in response to an API call from originating from a web client 1818, for example), wherein such command is received by the lock's wireless data module 2708, or WiFi module 2708, or LoRa module 2708, and causes the firmware to respond to such command by activating its camera(s) 2712 and sending the image data, along with its lock ID to the backend computing platform 1208, so that such data may be processed as previously described in order to determine which isolation point the lock is on. For example, in the event that a user of the safety system asserts that an isolation point in a verified (or locked) state is actually lacking a lock (e.g., such user makes a "no lock" assertion via tapping button 1790), the software executing on the backend computing platform 1208 may respond by commanding the lock recorded in the database 1800 as being on such isolation point to acquire new image data and send it to the platform 1208, in order to mediate the dispute.

Figure 28:
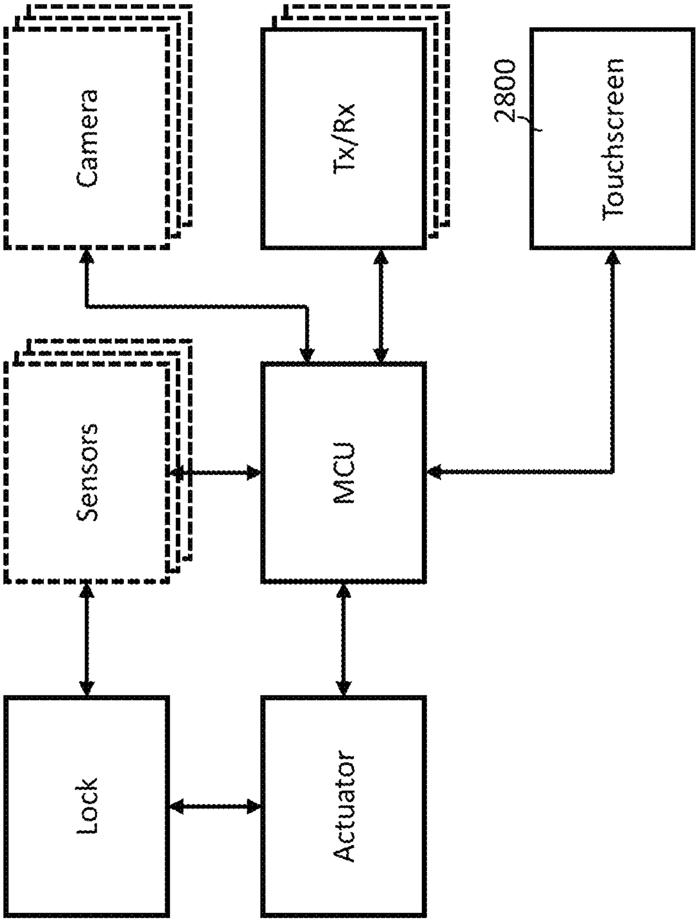
FIG. 28 depicts another exemplary embodiment of a lock that may be used in connection with the various embodiments of the safety system disclosed herein.

According to some embodiments, the lock includes a touchscreen module 2800 (see FIG. 28), and user input is received via said touchscreen 2800. According to some of these embodiments, a button arrangement 2712 is eliminated from such locks. On the other hand, although not depicted in FIG. 28, according to some embodiments, such locks include a button arrangement 2712, in order to expand the operating temperature range of such locks. Ordinarily, a user could interact with such locks via the touchscreen 2800, however, in very cold temperatures (i.e., temperatures falling beneath the temperature operating range of the touchscreen, wherein the display may present data but fail to properly respond to touch), such a user could use the button arrangement 2712. A lock with a touchscreen 2800 may perform all of the operations described previously, and for the sake of brevity, such operations and capabilities are not described here.

Aspect 1. A safety system for use at a facility with one or more gateway units installed therein, wherein said one or more gateway units are configured to receive broadcast message frames and relay payload data of said message frames to a computing platform via a network, said safety system comprising a lock comprising a processing unit; a first transceiver communicably connected with said processing unit; a second transceiver communicably connected with said processing unit; and a memory communicably connected with and readable by said processing unit, said memory containing instructions that, when executed by the processing unit cause the processing unit to receive and respond to incoming commands received by said first transceiver, and to send a heartbeat message from said second transceiver for reception by said one or more gateway units and subsequent relay to said computing platform; and a mobile device comprising a processing unit; a first transceiver communicably connected with said processing unit of said mobile device; a second transceiver communicably connected with said processing unit of said mobile device; and a memory communicably connected with and readable by said processing unit of said mobile device, said memory of said mobile device containing instructions that, when executed by said processing unit of said mobile device cause the processing unit of said mobile device to send commands to said first transceiver of said lock via said first transceiver of said mobile device, in response to input from a user of said mobile device.

Aspect 2. A safety system for use at a facility including one or more systems of equipment, wherein said one or more systems of equipment include one or more isolation points, said safety system comprising a lock comprising a first processing unit; a first transceiver communicably connected with said first processing unit; and a first memory communicably connected with and readable by said first processing unit, said first memory containing instructions that, when executed by said first processing unit cause said first processing unit to receive and respond to incoming commands received by said first transceiver; and a mobile device for use by a user of said mobile device, said comprising a second processing unit; a second transceiver communicable connected with said second processing unit; a third transceiver communicably connected with said second processing unit; and a second memory communicably connected with and readable by said second processing unit, said second memory containing instructions that, when executed by said second processing unit cause said second processing unit to send commands to said first transceiver via said second transceiver, and to send messages via said third transceiver, wherein said messages contain information by which said user asserts state information of at least one of said one or more isolation points.

Aspect 3. A safety system for use at a facility including one or more systems of equipment, wherein said one or more systems include one or more isolation points, said safety system comprising a lock comprising a first processing unit; a first transceiver communicably connected with said first processing unit; a first memory communicably connected with and readable by said first processing unit, said memory containing instructions that, when executed by the processing unit cause the processing unit to send a heartbeat message; a mobile device for use by a user of said mobile device, said mobile device comprising: a second processing unit; a second transceiver communicably connected with said second processing unit; a third transceiver communicably connected with said second processing unit; and a second memory communicably connected with and readable by said second processing unit, said second memory containing instructions that, when executed by said second processing unit cause said second processing unit to send commands to said first transceiver via said second transceiver, and to send messages via said third transceiver, wherein said messages contain information by which said user asserts state information of at least one of said one or more isolation points.

Aspect 4. A lock comprising a shackle arranged to be able to assume an unlocked state and a locked state; a processing unit, having a port; a transceiver communicably connected with said processing unit; and a memory communicably connected with and readable by said processing unit, said memory containing instructions that, when executed by said processing unit cause said processing unit to transition said shackle from said locked state to said unlocked state in response to receipt of an unlock command; and send a message via said transceiver in response to a signal received via said port indicating that said shackle has undergone a transition from said locked state to said unlocked state without said transition having been initiated by receipt of an unlock command.

Aspect 5. A lock comprising a shackle arranged to be able to assume an unlocked state and a locked state; a processing unit, having a port; a transceiver communicably connected with said processing unit; and a memory communicably connected with and readable by said processing unit, said memory containing instructions that, when executed by said processing unit cause said processing unit to: transition, during one or more unlock periods, said shackle from said locked state to said unlocked state, in response to receipt of an unlock command; and send a message via said transceiver in response to a signal received via said port indicating that said shackle has transitioned from said locked state to said unlocked state, upon determining that reception of said signal at said port occurred outside of said one or more unlock periods.

Aspect 6. A lock comprising a metallic lock body having an upper surface that defines a first and second shackle receptacle, and wherein said lock body defines an interior region a shackle having a first end and a second end, wherein said first end is retained within said first shackle receptacle so that said first end has a range of motion relative to said first shackle receptacle, wherein said range of motion does not permit withdrawal of said first end from said first shackle receptacle, and wherein said range of motion is sufficient to permit said second end to withdraw from or insert into said second shackle receptacle; a lock mechanism disposed in said interior region of said lock body, wherein said lock mechanism is arranged to be able to assume a locked and unlocked state, and arranged to retain said second end of said shackle within said second shackle receptacle when in said locked state, and to release said second end of said shackle when in said unlocked state; a polymeric housing disposed about said lock body, wherein said polymeric housing defining an interior region; and an antenna disposed in said interior region of said polymeric housing, without being disposed in said interior region of said lock body.

Aspect 7. A lock comprising a metallic lock body having an upper surface that defines a first and second shackle receptacle, and an opposed lower surface defining a recess; a shackle having a first end and a second end, wherein said first end is retained within said first shackle receptacle so that said first end has a range of motion relative to said first shackle receptacle, wherein said range of motion does not permit withdrawal of said first end from said first shackle receptacle, and wherein said range of motion is sufficient to permit said second end to withdraw from or insert into said second shackle receptacle; a lock mechanism arranged to be able to assume a locked and unlocked state, and arranged to retain said second end of said shackle within said second shackle receptacle when in said locked state, and to release said second end of said shackle when in said unlocked state; a polymeric housing disposed about said lock body and defining an interior region in fluid communication with said recess; a printed circuit board having one or more electrically conductive pathways, wherein said printed circuit board is disposed within said recess; and an antenna disposed in said interior region, wherein said antenna is directly or indirectly in electrical communication with at least one of said conductive pathways.

Aspect 8. A lock for use at a facility with one or more gateway units installed therein, wherein said one or more gateway units are configured to receive broadcast message frames and relay payload data of said message frames to a computing platform via a network, said safety system comprising a metallic lock body defining a first interior region containing a locking mechanism that cooperates with a shackle to either retain said shackle in a locked position or to release said shackle from said locked position; a polymeric housing defining a second interior region, wherein said metallic lock body is disposed within said second region; and an antenna for broadcast of said message frames, wherein said antenna is disposed in said second interior region, without being disposed in said first interior region.

Aspect 9. A safety system for use at a facility including one or more systems of equipment, wherein said one or more systems of equipment include one or more isolation points, wherein said facility maintains a first policy of securing isolation points of a particular system of equipment to be serviced with locks to render said particular system of equipment in a state wherein said particular system of equipment may be safely serviced, wherein said facility maintains a second policy pertaining to steps that must be carried out in order for said particular system to be considered safe for a particular person to service, so that, pursuant to said second policy, said particular system may be considered safe to service for said particular person, while being considered unsafe to service for a different person, said safety system comprising a lock comprising a first processing unit; a first transceiver communicably connected with said first processing unit; a first memory communicably connected with and readable by said first processing unit, said first memory containing instructions that, when executed by said first processing unit cause said first processing unit to receive and respond to messages received via said first transceiver; a mobile device comprising a second processing unit; a second transceiver communicably connected with said second processing unit; an input/output device communicably connected to said second processing unit; a second memory communicably connected with and readable by said second processing unit, said second memory containing instructions that, when executed by said second processing unit cause said second processing to permit a user of said mobile device to login so as to identify said user; present a user interface to said user of said mobile device, wherein said user interface includes at least one interactable element to permit said user to choose a selected system from among said one or more systems of equipment at said facility, includes an indication of whether, pursuant to said second policy, said selected system is considered safe for said user to service, and includes a first interactable element with which said user may interact to cause a message to be sent to said lock via said second transceiver, so as to enable performance of at least one of said steps that must be carried out.

Aspect 10. A safety system for use at a facility including one or more systems of equipment, wherein said one or more systems of equipment include one or more isolation points, wherein said facility maintains a first policy of securing isolation points of a particular system of equipment to be serviced with locks to render said particular system of equipment in a state wherein said particular system of equipment may be safely serviced, wherein said facility maintains a second policy pertaining to steps that must be carried out in order for said particular system of equipment to be considered safe for a particular person to service, so that, pursuant to said second policy, said particular system may be considered safe to service for said particular person, while being considered unsafe to service for a different person, said safety system comprising a computing system; a mobile device comprising a processing unit; a transceiver communicably connected with said processing unit; an input/output device communicably connected to said processing unit; a memory communicably connected with and readable by said processing unit, said memory of said mobile device containing instructions that, when executed by said processing unit, cause said processing unit to permit a user of said mobile device to login so as to identify said user as a particular logged-in user; present a user interface to logged-in user, wherein said user interface includes at least one interactable element to permit said logged-in user to choose a selected system from among said one or more systems of equipment at said facility; communicate, via said transceiver of said mobile device, to said computing system, a set of information sufficient to identify said particular logged-in user and said selected system; receive, via said transceiver of said mobile device, from said computing system, information concerning whether, pursuant to said second policy, said selected system is considered safe for service by said logged-in user; and present via said user interface said information concerning whether, pursuant to said second policy, said selected system is considered safe for said logged-in user.

Aspect 11. A safety system for use at a facility including one or more systems of equipment, wherein said one or more systems of equipment include one or more isolation points, wherein said facility maintains a first policy of securing isolation points of a particular system of equipment to be serviced with locks to render said particular system of equipment in a state wherein said particular system may be safely serviced, wherein said facility maintains a second policy pertaining to steps that must be carried out in order for said particular system of equipment to be considered safe for a particular person to service, so that, pursuant to said second policy, said particular system may be considered safe to service for said particular person, while being considered unsafe to service for a different person, said safety system comprising a lock comprising a first processing unit; a first transceiver communicably connected with said first processing unit; a first memory communicably connected with and readable by said first processing unit, said first memory containing instructions that, when executed by said first processing unit, cause said first processing unit to respond to an unlock command received via said first transceiver by examining said unlock command to determine whether said command contains a key code matching an unlock code stored in said first memory, and to cause said lock to enter an unlocked state, only in response to an affirmative determination; a computing system arranged to store said key code in a data store, to receive one or more inbound requests for return of said key code to a sender of said one or more incoming requests; a mobile device comprising a second processing unit; a second transceiver communicably connected with said second processing unit; an input/output device communicably connected to said second processing unit; a second memory communicably connected with and readable by said second processing unit, said second memory containing instructions that, when executed by said second processing unit, cause said second processing unit permit a user of said mobile device to login so as to identify said user as a particular logged-in user; present a user interface to said particular logged-in user, wherein said user interface includes at least one interactable element to permit said user to command said computing system to refuse return of said key code in response to any incoming request for said key code.

Aspect 12. A safety system for use at a facility including one or more systems of equipment, wherein said one or more systems of equipment include one or more isolation points, said safety system comprising a plurality of locks for securing said one or more isolation points of said one or more systems of equipment, wherein each of said locks comprises a processing unit; a transceiver communicably connected with said processing unit; a memory communicably connected with and readable by said processing unit, said memory containing instructions that, when executed by said processing unit, cause said processing unit to respond to an unlock command received via said transceiver by examining said unlock command to determine whether said command contains a key code matching an unlock code stored in said memory, and to cause said lock to enter an unlocked state, only in response to an affirmative determination; a computing system arranged to store each respective key code of each of said plurality of locks, in a data store, so as to associate each key code with a corresponding lock, to associate each particular lock of said plurality of locks with an isolation point secured by said particular lock, to associate each isolation point with a particular system of equipment of which said isolation point is a member, to receive one or more inbound requests for return of said key code for an identified lock to a sender of said one or more inbound requests, and to receive a command to refuse all inbound requests for key codes associated with locks associated with an identified system.

Aspect 13. A safety system for use at a facility including one or more systems of equipment, wherein said one or more systems of equipment include one or more isolation points, said safety system comprising a plurality of locks for securing said one or more isolation points of said one or more systems of equipment, wherein each of said locks comprises a first processing unit; a first transceiver communicably connected with said first processing unit; a first memory communicably connected with and readable by said first processing unit, said first memory containing instructions that, when executed by said first processing unit, cause said first processing unit to respond to an unlock command received via said first transceiver by examining said unlock command to determine whether said unlock command contains a key code matching an unlock code stored in said first memory, and to cause said lock to enter an unlocked state, only in response to an affirmative determination; and a mobile device comprising a second processing unit; a second transceiver communicably connected with said second processing unit; an input/output device communicably connected to said second processing unit; a second memory communicably connected with and readable by said second processing unit, said second memory containing instructions that, when executed by said second processing unit, cause said second processing unit to permit a user of said mobile device to login so as to identify said user as a particular logged-in user; present a user interface to said particular logged-in user, wherein said user interface includes at least one interactable element to permit said user to choose a selected system from among said one or more systems of equipment at said facility, and a second interactable element to permit said user to command a remote computing platform storing said key codes to refuse return of any key code associated with said selected system.

Aspect 14. A mobile device for use at a facility including one or more systems of equipment, wherein said one or more systems of equipment include one or more isolation points, said mobile device comprising a processing unit; a transceiver communicably connected with said processing unit; an input/output device communicably connected to said processing unit; a memory communicably connected with and readable by said processing unit, said memory containing instructions that, when executed by said processing unit, cause said processing unit to permit a user of said mobile device to login so as to identify said user as a particular logged-in user; present a user interface to said particular logged-in user, wherein said user interface includes at least one interactable element to permit said user to choose a selected system from among said one or more systems of equipment at said facility, wherein said user interface includes an indication of whether said selected system is safe for said particular logged-in user to service said system, and wherein said user interface includes a second interactable element to permit said user to command a remote computing platform storing said key codes to refuse return of any key code associated with any lock associated with said selected system.

Aspect 15. A safety system for use at a facility including one or more systems of equipment, wherein said one or more systems of equipment include one or more isolation points, wherein said facility maintains a first policy of securing isolation points of a particular system of equipment to be serviced with locks to render said particular system of equipment in a state wherein said particular system may be safely serviced, wherein said facility maintains a second policy pertaining to steps that must be carried out in order for said particular system to be considered safe for a particular person to service, so that, pursuant to said second policy, said particular system may be considered safe to service for said particular person, while being considered unsafe to service for a different person, said safety system comprising a lock comprising a first processing unit; a first transceiver communicably connected with said first processing unit; a first memory communicably connected with and readable by said first processing unit, said first memory containing instructions that, when executed by said first processing unit, cause said first processing unit to respond to an unlock command received via said transceiver by causing said lock to enter an unlocked state; a computing system arranged to receive an inbound request for authorization of an unlock command to be sent to a particular lock identified by data contained within said inbound request; to determine whether said inbound request is to be authorized or refused; to respond to said inbound request with either an authorization or a refusal; a mobile device comprising a second processing unit; a second transceiver communicably connected with said second processing unit; an input/output device communicably connected to said second processing unit; a second memory communicably connected with and readable by said second processing unit, said second memory containing instructions that, when executed by said second processing unit, cause said second processing unit to permit a user of said mobile device to login so as to identify said user as a particular logged-in user; present a user interface to said particular logged-in user, wherein said user interface includes at least one interactable element to permit said logged-in user to command said computing system to refuse all requests for authorization of an unlock command to be sent to a particular lock.

Aspect 16. A safety system for use at a facility including one or more systems of equipment, wherein said one or more systems of equipment include one or more isolation points, wherein said facility maintains a first policy of securing isolation points of a particular system of equipment to be serviced with locks to render said particular system of equipment in a state wherein said particular system of equipment may be safely serviced, wherein said facility maintains a second policy pertaining to steps that must be carried out in order for said particular system of equipment to be considered safe for a particular person to service, so that, pursuant to said second policy, said particular system of equipment may be considered safe to service for said particular person, while being considered unsafe to service for a different person, said safety system comprising a lock comprising a first processing unit; a first transceiver communicably connected with said first processing unit; a first memory communicably connected with and readable by said first processing unit, said first memory containing instructions that, when executed by said first processing unit, cause said first processing unit to respond to an unlock command received via said first transceiver by causing said lock to enter an unlocked state; a computing system arranged to receive an inbound request for authorization of an unlock command to be sent to a particular lock identified by data contained within said inbound request; to determine whether said inbound request is to be authorized or refused; and to respond to said inbound request with either an authorization or a refusal; a mobile device comprising a second processing unit; a second transceiver communicably connected with said second processing unit of said mobile device; an input/output device communicably connected to said second processing unit; a second memory communicably connected with and readable by said second processing unit, said second memory containing instructions that, when executed by said second processing unit cause said second processing unit to permit a user of said mobile device to login so as to identify said user as a particular logged-in user; present a user interface to said particular logged-in user, permitting said particular logged-in user to identify a selected system from among said one or more systems of equipment at said facility; present a user interface to said particular logged-in user, wherein said user interface includes at least one interactable element to permit said user to command said computing system to refuse all requests for authorization of an unlock command to be sent to any lock securing an isolation of said selected system.

Aspect 17. A safety system comprising a lock comprising a shackle able to assume an unlocked state and a locked state; a processing unit, having a port; a transceiver communicably connected with said processing unit; and a memory communicably connected with and readable by said processing unit, said memory containing instructions that, when executed by said processing unit cause said processing unit to transition said shackle from said locked state to said unlocked state in response to receipt of an unlock command; and send a message via said transceiver in response to a signal received via said port indicating that said shackle has undergone a transition from said locked state to said unlocked state; a computing platform arranged to received said message; and determine whether or not said message indicates that said lock had transitioned from said locked state to said unlocked state as a result of having received an unlock command.

Aspect 18. A safety system comprising a lock comprising a shackle able to assume an unlocked state and a locked state; a processing unit, having a port; a transceiver communicably connected with said processing unit; and a memory communicably connected with and readable by said processing unit, said memory containing instructions that, when executed by said processing unit cause said processing unit to transition said shackle from said locked state to said unlocked state in response to receipt of an unlock command; send a message via said transceiver in response to a signal received via said port indicating that said shackle has undergone a transition from said locked state to said unlocked state; a computing platform arranged to receive said message at a first time and date; perform a comparison between said first time and date and a second time and date, wherein said second time and date identifies a time and date of a most recent instance at which said computing platform received a request to return a digital key corresponding to said lock, and responded to said request by returning said key; and determine whether or not said message indicates that said shackle had been compromised, based on said comparison.

Aspect 19. A safety system comprising a lock comprising a shackle able to assume an unlocked state and a locked state; a processing unit, having a port; a transceiver communicably connected with said processing unit; and a memory communicably connected with and readable by said processing unit, said memory containing instructions that, when executed by said processing unit cause said processing unit to transition said shackle from said locked state to said unlocked state in response to receipt of an unlock command; and send a message via said transceiver in response to a signal received via said port indicating that said shackle has undergone a transition from said locked state to said unlocked state; a computing platform arranged to receive said message at a first time and date; perform a comparison between said first time and date and a second time and date, wherein said second time and date identifies a time and date of a most recent instance at which said computing platform received a request to authorize delivery of an unlock command to said lock, and responded to said request by authorizing said delivery; and determine whether or not said message indicates that said shackle had been compromised, based on said comparison.

Aspect 20. A safety system for use at a facility including one or more systems of equipment, wherein said one or more units include one or more isolation points, said safety system comprising a mobile device comprising a processing unit; a transceiver communicably connected with said processing unit; a memory communicably connected with and readable by said processing unit, said memory containing instructions that, when execute by said processing unit, cause said processing unit to permit a user of said mobile device to login, thereby identifying said user as corresponding to a first unique user identifier; permit said user to identify one of said one or more systems of equipment as a selected system; permit said user to establish a service team for said selected system, wherein said service team includes said user and one or more other users of said safety system, and wherein said service team is communicated to a computing platform; communicate with said computing platform to send said computing platform a first outbound message indicating said first unique user identifier, and also indicating said selected system, and in response to having sent said outbound message, receive an inbound message indicating isolation points included in said selected system, and, for each of said isolation points, a corresponding state; and said computing platform, arranged to receive said first outbound message, and determine each state of each of said isolation points included in said selected system, using said first unique user identifier; receive a second outbound message having originated from a second mobile device operated by a member of said service team, wherein said second outbound message indicates a second unique user identifier corresponding to said member of said service team, and also indicates said selected system; and determine, in response to receipt of said second outbound message, each state of each of said isolation points included in said selected system, using said first unique user identifier.

The various embodiments described above are provided by way of illustration only and should not be construed to limit the invention. Those skilled in the art will readily recognize various modifications and changes that may be made to the present invention without departing from the true spirit and scope of the present invention, which is set forth in the following claims.

The invention claimed is:

1. A safety system for use at a facility with one or more systems of equipment having one or more isolation points, said facility having one or more gateway units installed therein, wherein said one or more gateway units are configured to receive broadcast message frames and relay payload data of said message frames to a computing platform via a network, said safety system comprising:

a lock comprising:

a shackle arranged to be able to assume an unlocked state and a locked state;

a processing unit, having a port;

a first transceiver communicably connected with said processing unit;

a second transceiver communicably connected with said processing unit; and a memory communicably connected with and readable by said processing unit, said memory containing instructions that, when executed by the processing unit cause the processing unit to:

receive and respond to incoming commands received by said first transceiver;

send a heartbeat message via said second transceiver for reception by said one or more gateway units and subsequent relay to said computing platform; and send a shackle-unlocked message via said second transceiver in response to a signal received via said port indicating that said shackle has undergone a transition from said locked state to said unlocked state, for reception by said one or more gateway units and subsequent relay to said computing platform; and a mobile device comprising:

a second processing unit;

a third transceiver communicably connected with said second processing unit;

a fourth transceiver communicably connected with said second processing unit;

an input/output device operably connected with said second processing unit;

a second memory communicably connected with and readable by said second processing unit, said second memory containing instructions that, when executed by said second processing unit cause said second processing unit to:

permit a user of said mobile device to login;

open a network connection with said computing platform;

permit said user to identify a selected system from among said one or more systems of equipment;

send a get-system-information message to said computing platform, via said third transceiver, wherein said get-system-information message includes data indicating said selected system;

receive a response to said get-system-information message, via said third transceiver, wherein said response includes safety information pertaining to whether said selected system is in a safe state to service;

present said safety information via said input/output device; and receive, via said network connection, asynchronous updates to said safety data from said computing platform, and, in response to said asynchronous updates, present said updated safety data via said input/output device.

2. The safety system of claim 1, wherein said second memory contains further instructions that, when executed by said second processing unit cause said second processing unit to:

permit said user to initiate a transmission of a command to said first transceiver of said lock, via said fourth transceiver of said mobile device.

3. The safety system of claim 2, wherein said command contains data causing said lock to respond to said command with tag data.

4. The safety system of claim 2, wherein said command contains data causing said lock to respond to said command with log data.

5. The safety system of claim 2, wherein said command contains data causing said lock to respond to said command by unlocking.

6. The safety system of claim 1, wherein said first transceiver comprises a Bluetooth transceiver.

7. The safety system of claim 1, wherein said second transceiver comprises a LoRa transceiver.

8. The safety system of claim 1, wherein said third transceiver comprises a wireless data transceiver.

9. The safety system of claim 8, wherein said wireless data transceiver comprises a 4G wireless data transceiver.

10. The safety system of claim 8, wherein said wireless data transceiver comprises a 5G wireless data transceiver.

11. The safety system of claim 1, wherein said fourth transceiver comprises a Bluetooth transceiver.

12. The safety system of claim 1, wherein said mobile device comprises a smartphone.

13. The safety system of claim 1, wherein said mobile device comprises a tablet.

14. A safety system for use at a facility with one or more systems of equipment having one or more isolation points, said facility having one or more gateway units installed therein, wherein said one or more gateway units are configured to receive broadcast message frames and relay payload data of said message frames to a computing platform via a network, said safety system comprising:

a lock comprising:

a shackle arranged to be able to assume an unlocked state and a locked state;

a processing unit, having a port;

a first transceiver communicably connected with said processing unit;

a second transceiver communicably connected with said processing unit; and a memory communicably connected with and readable by said processing unit, said memory containing instructions that, when executed by the processing unit cause the processing unit to:

receive and respond to incoming commands received by said first transceiver;

send a heartbeat message via said second transceiver for reception by said one or more gateway units and subsequent relay to said computing platform; and send a shackle-unlocked message via said second transceiver in response to a signal received via said port indicating that said shackle has undergone a transition from said locked state to said unlocked state, for reception by said one or more gateway units and subsequent relay to said computing platform; and a mobile device comprising:

a second processing unit;

a third transceiver communicably connected with said second processing unit;

a fourth transceiver communicably connected with said second processing unit;

an input/output device operably connected with said second processing unit;

a second memory communicably connected with and readable by said second processing unit, said second memory containing instructions that, when executed by said second processing unit cause said second processing unit to:

permit a user of said mobile device to login;

open a network connection with said computing platform;

permit said user to identify a selected system from among said one or more systems of equipment;

send a get-system-information message to said computing platform, via said third transceiver, wherein said get-system-information message includes data indicating said selected system;

receive a response to said get-system-information message, via said third transceiver, wherein said response includes safety information pertaining to whether said selected system is in a safe state to service;

present said safety information via said input/output device; and receive, via said network connection, an asynchronous message from said computing platform, and, in response to said asynchronous message, send a second get-system-information message to said computing platform, receive a response to said second get-system-information message, wherein said response includes updated safety information pertaining to whether said selected system is in a safe state to service, and present said updated safety data via said input/output device.

15. The safety system of claim 14, wherein said second memory contains further instructions that, when executed by said second processing unit cause said second processing unit to:

permit said user to initiate a transmission of a command to said first transceiver of said lock, via said fourth transceiver of said mobile device.

16. The safety system of claim 15, wherein said command contains data causing said lock to respond to said command with tag data.

17. The safety system of claim 15, wherein said command contains data causing said lock to respond to said command with log data.

18. The safety system of claim 15, wherein said command contains data causing said lock to respond to said command by unlocking.

19. The safety system of claim 14, wherein said second transceiver is a LoRa transceiver.

* * * * *